(12) United States Patent
Urech et al.

(10) Patent No.: US 12,503,505 B2
(45) Date of Patent: Dec. 23, 2025

(54) MULTISPECIFIC ANTIBODIES HAVING SPECIFICITY FOR TNFα AND IL-17A, ANTIBODIES TARGETING IL-17A, AND METHODS OF USE THEREOF

(71) Applicant: Numab Therapeutics AG, Wädenswil (CH)

(72) Inventors: David Urech, Jona (CH); Tea Gunde, Zurich (CH); Sebastian Meyer, Eggenwil (CH); Christian Hess, Zurich (CH)

(73) Assignee: Numab Therapeutics AG, Horgen (CH)

( * ) Notice: Subject to any disclaimer, the term of this patent is extended or adjusted under 35 U.S.C. 154(b) by 1178 days.

(21) Appl. No.: 17/427,208

(22) PCT Filed: Jan. 31, 2020

(86) PCT No.: PCT/EP2020/052481
§ 371 (c)(1),
(2) Date: Jul. 30, 2021

(87) PCT Pub. No.: WO2020/157305
PCT Pub. Date: Aug. 6, 2020

(65) Prior Publication Data
US 2022/0127350 A1 Apr. 28, 2022

(30) Foreign Application Priority Data

Jan. 31, 2019 (EP) .................................. 19154846
Jan. 31, 2019 (EP) .................................. 19154850
Jan. 31, 2019 (EP) .................................. 19154852

(51) Int. Cl.
*C07K 16/24* (2006.01)
*A61K 39/00* (2006.01)
*C07K 16/18* (2006.01)

(52) U.S. Cl.
CPC ............ *C07K 16/244* (2013.01); *C07K 16/18* (2013.01); *C07K 16/241* (2013.01); *A61K 2039/505* (2013.01); *C07K 2317/24* (2013.01); *C07K 2317/31* (2013.01); *C07K 2317/33* (2013.01); *C07K 2317/565* (2013.01); *C07K 2317/622* (2013.01); *C07K 2317/76* (2013.01); *C07K 2317/92* (2013.01)

(58) Field of Classification Search
None
See application file for complete search history.

(56) References Cited

U.S. PATENT DOCUMENTS

2019/0161544 A1 5/2019 Zhang et al.

FOREIGN PATENT DOCUMENTS

| | | |
|---|---|---|
| EP | 3181587 A1 | 6/2017 |
| WO | 2017102830 A1 | 6/2017 |
| WO | 2017158101 A1 | 9/2017 |
| WO | 2017215524 A1 | 12/2017 |
| WO | 2018224439 A1 | 12/2018 |
| WO | 2018224441 A1 | 12/2018 |
| WO | 2018224443 A1 | 12/2018 |

OTHER PUBLICATIONS

Steinmetz et al., MABS 2016, 8: 867-878 (Year: 2016).*
Kontermann ((2005) Acta Pharmacol. Sin. 26, 1-9 (Year: 2005).*
Website downloaded Aug. 29, 2024 from https://www.genmab.com/antibody-science/antibody-technology-platforms/duobody (Year: 2024).*
Egan et al., MABS 2017, vol. 9, No. 1, 68-84 (Year: 2017).*

\* cited by examiner

*Primary Examiner* — Christina M Borgeest
(74) *Attorney, Agent, or Firm* — Prismatic Law Group, PLLC; Ronald J. Kamis

(57) ABSTRACT

The present invention relates to an isolated multispecific antibody comprising a first domain specifically binding TNFα and a second domain specifically binding IL-17A and, optionally, a third domain specifically binding human serum albumin. The present invention furthermore relates to an isolated antibody which specifically binds human IL-17A, Additionally, the present invention further relates to methods of use of said antibodies, pharmaceutical compositions and methods of use thereof, and a kit comprising said antibodies. The present invention also relates to a nucleic acid comprising a nucleotide sequence encoding said antibodies, a vector comprising said nucleic acid, a host cell comprising said nucleic acid or said vector, and a method of producing said antibodies.

28 Claims, 31 Drawing Sheets

Specification includes a Sequence Listing.

Figure 2:
(A)
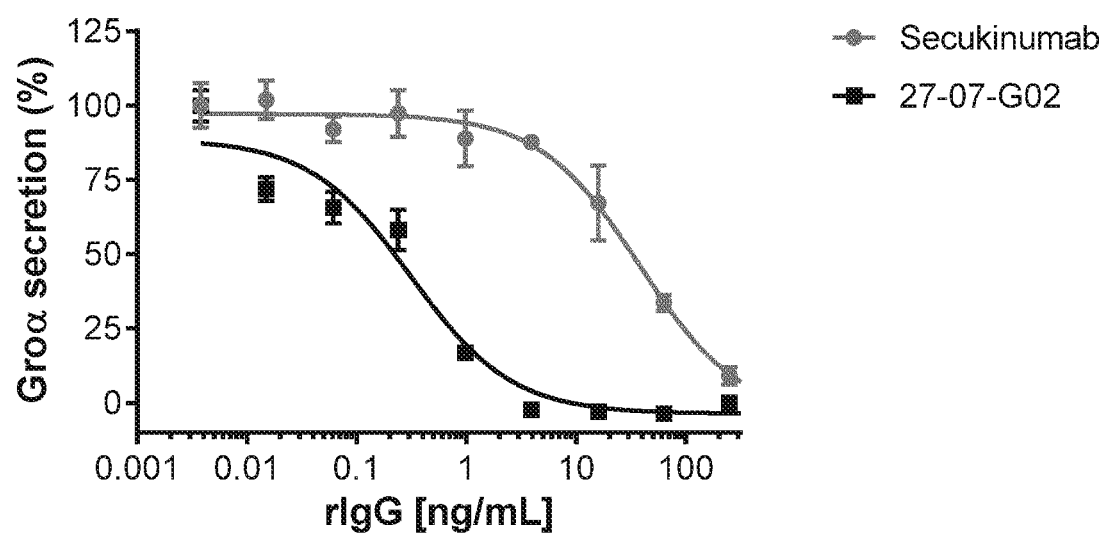
(B)
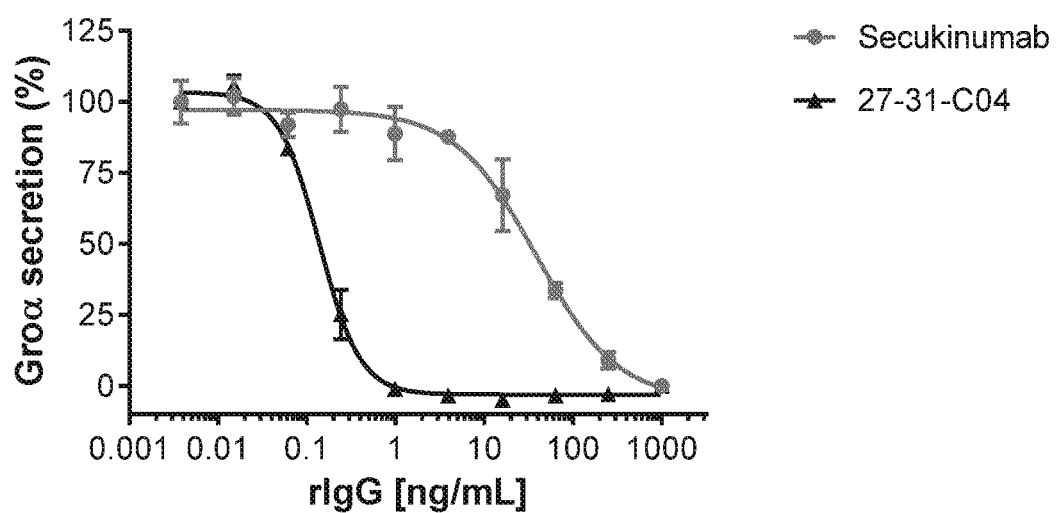

Figure 3:
(A)
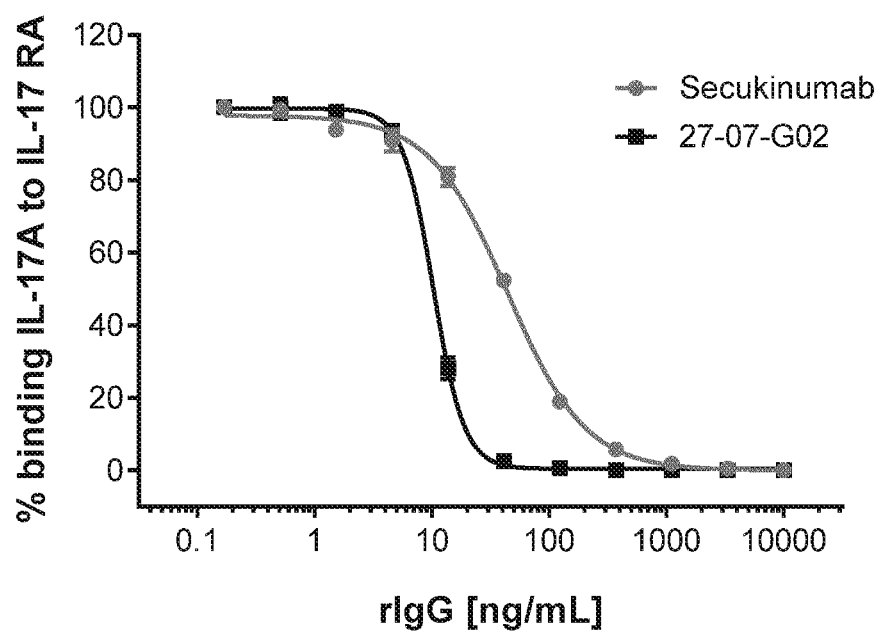
(B)
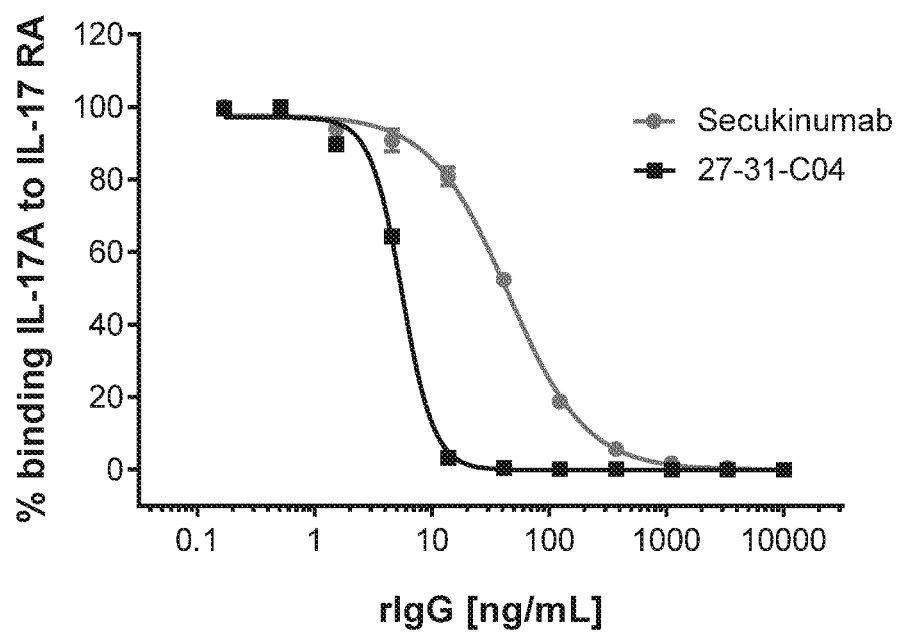

Figure 4:
(A)
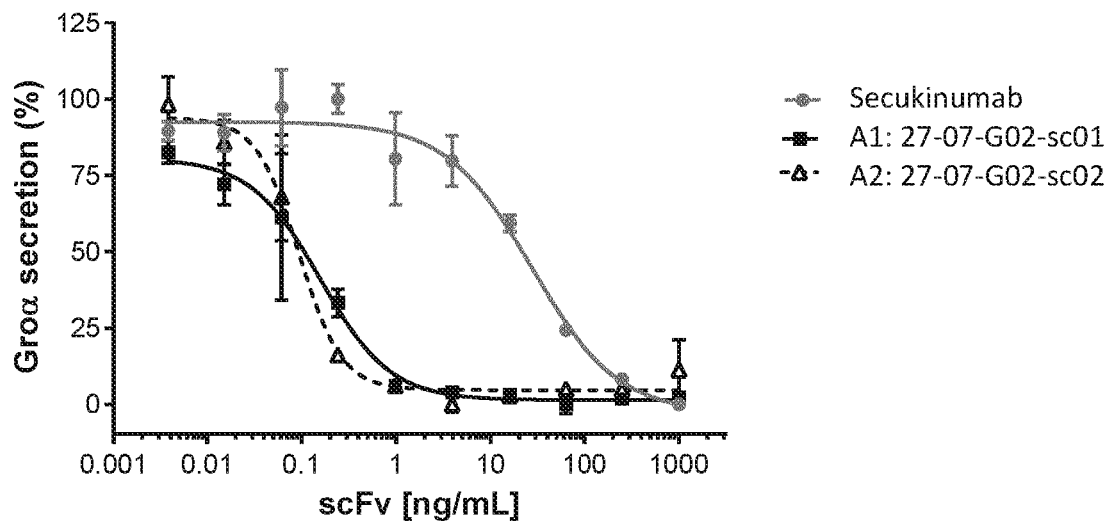
(B)
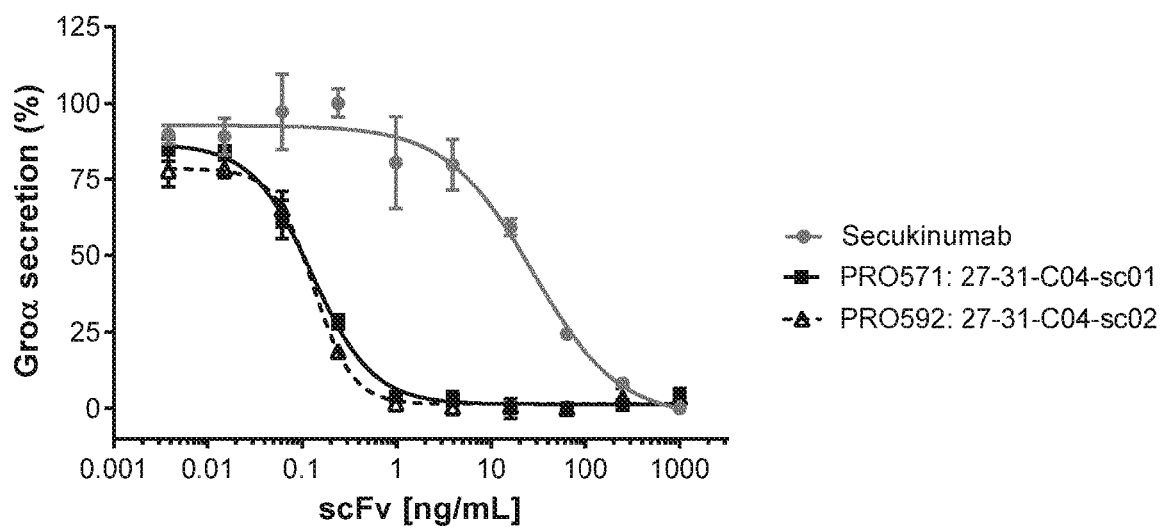
Figure 4

Figure 5:
(A)
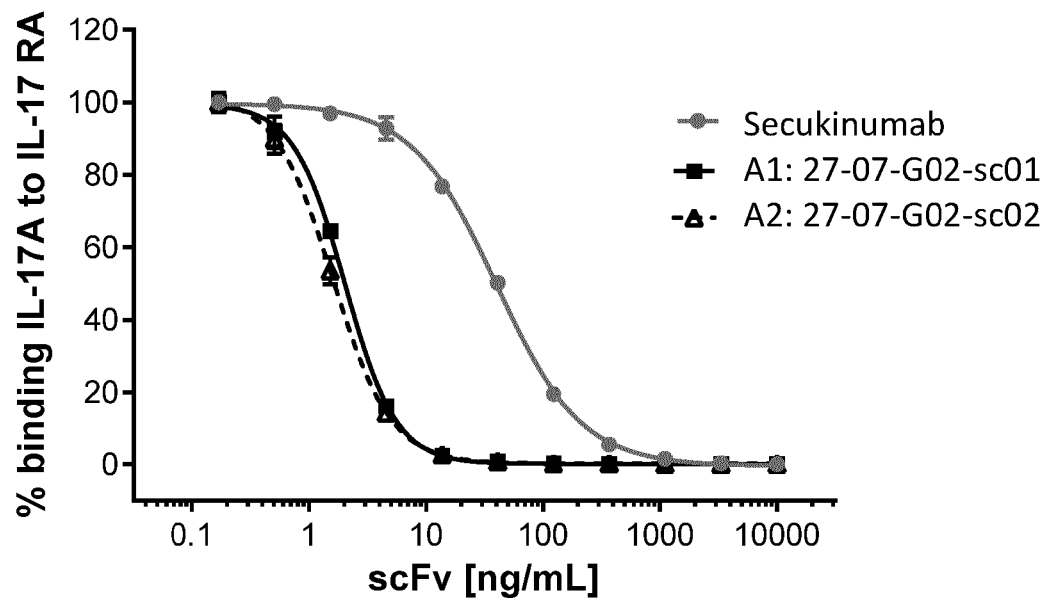
(B)
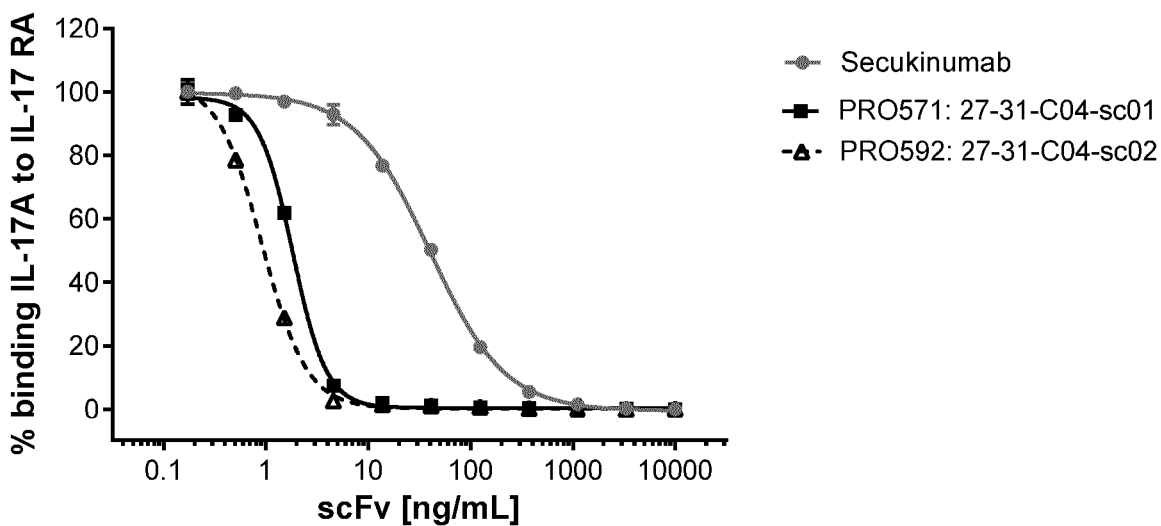

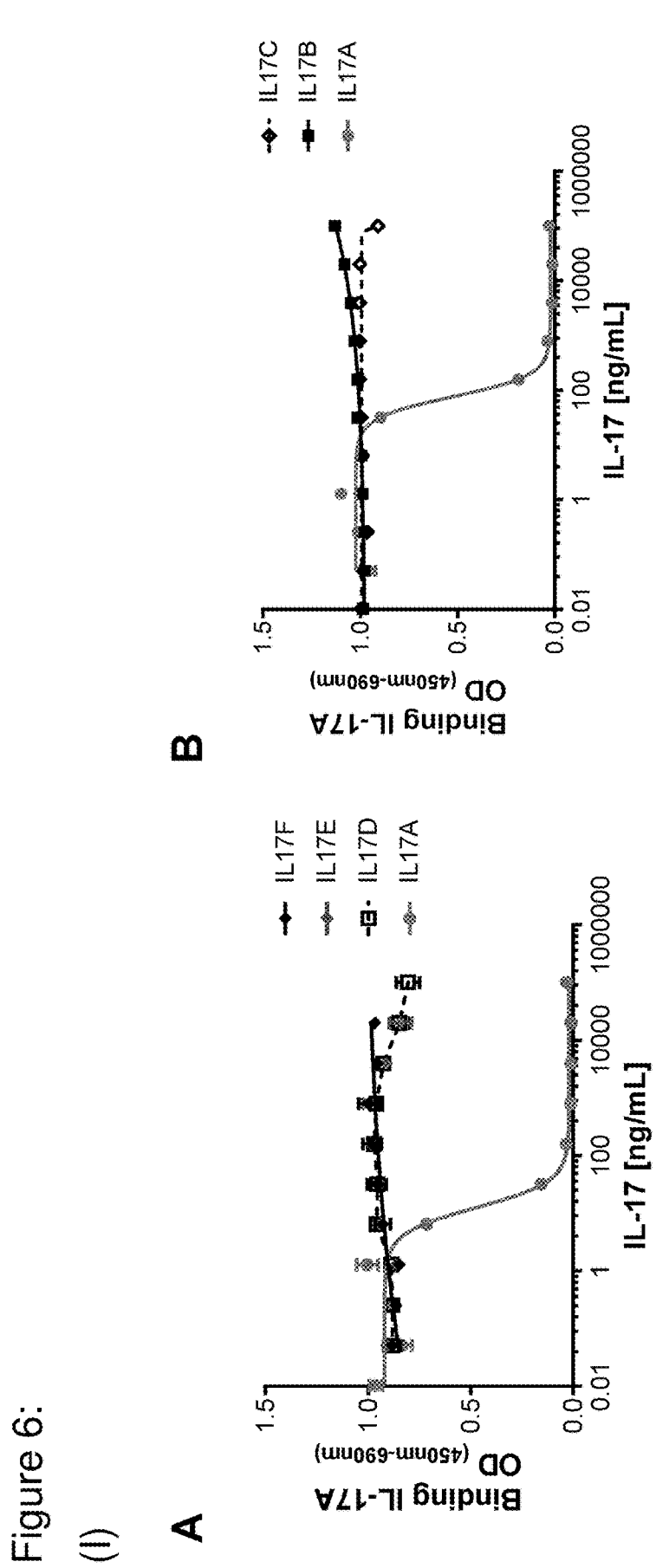
Figure 6: (I)

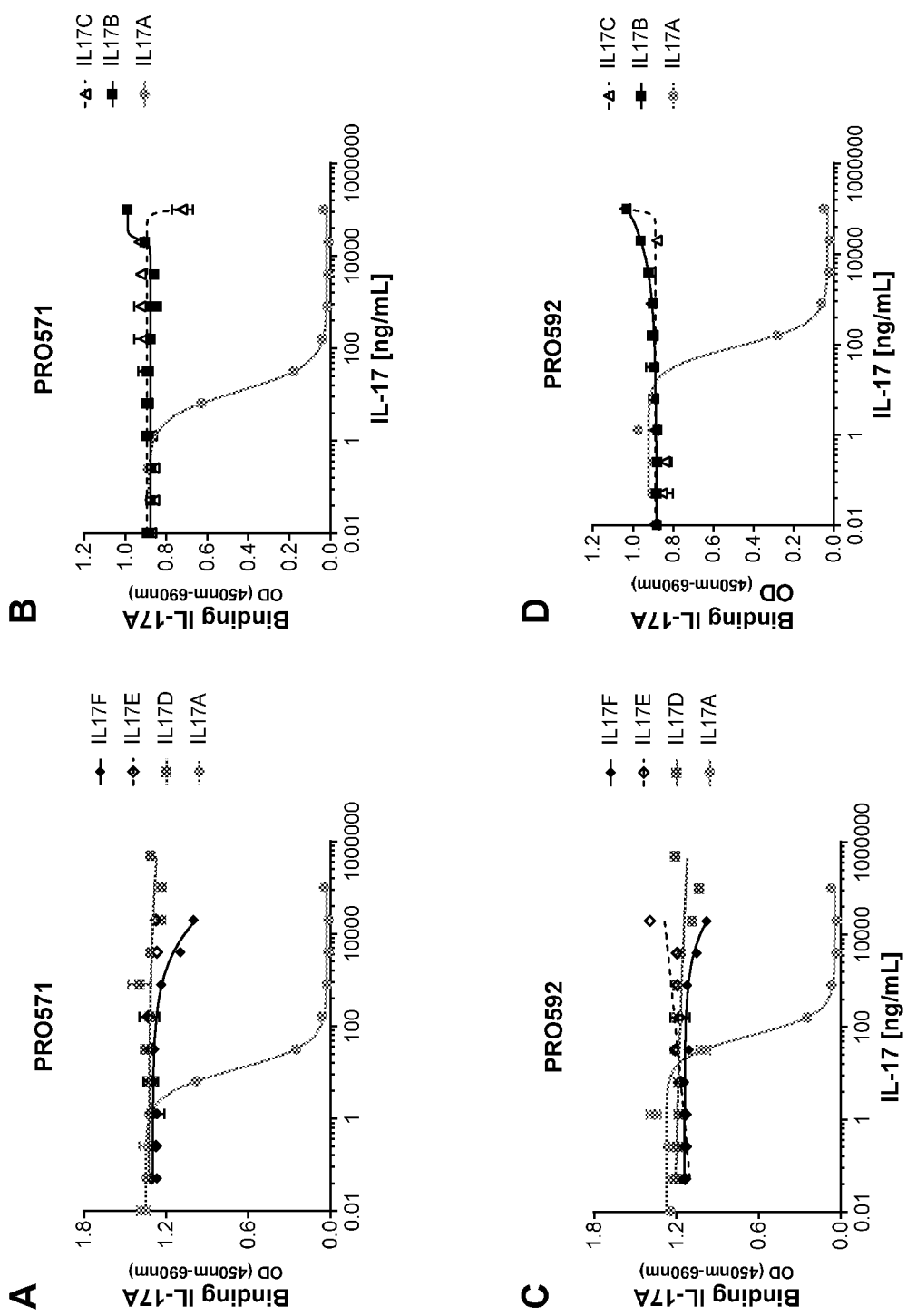
Fig. 6 (continued) (II)

Figure 7:
(A)
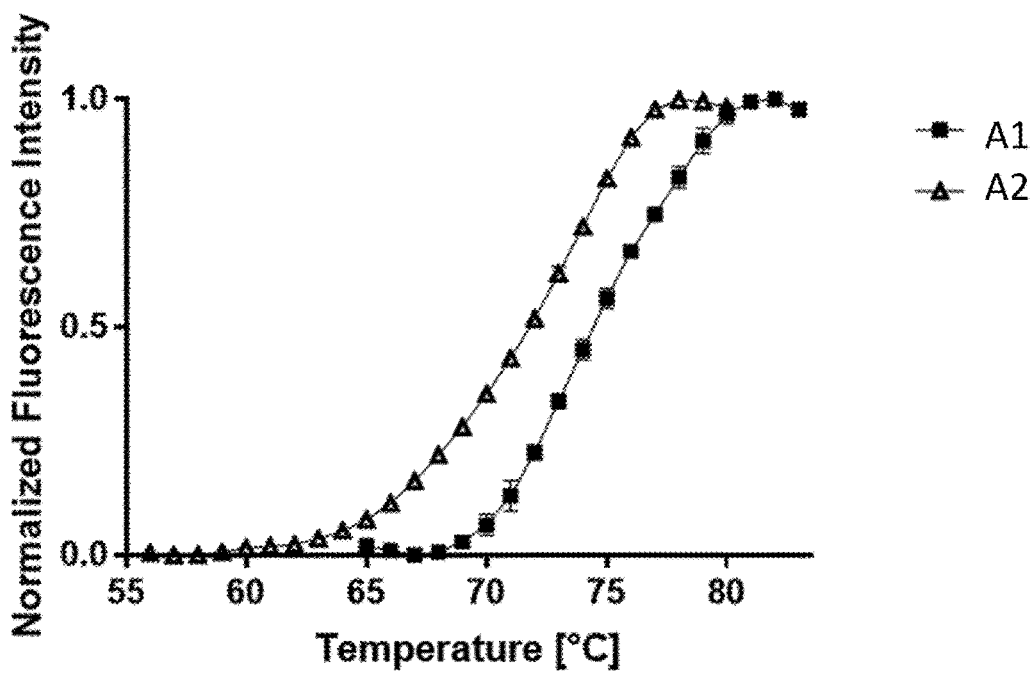
(B)
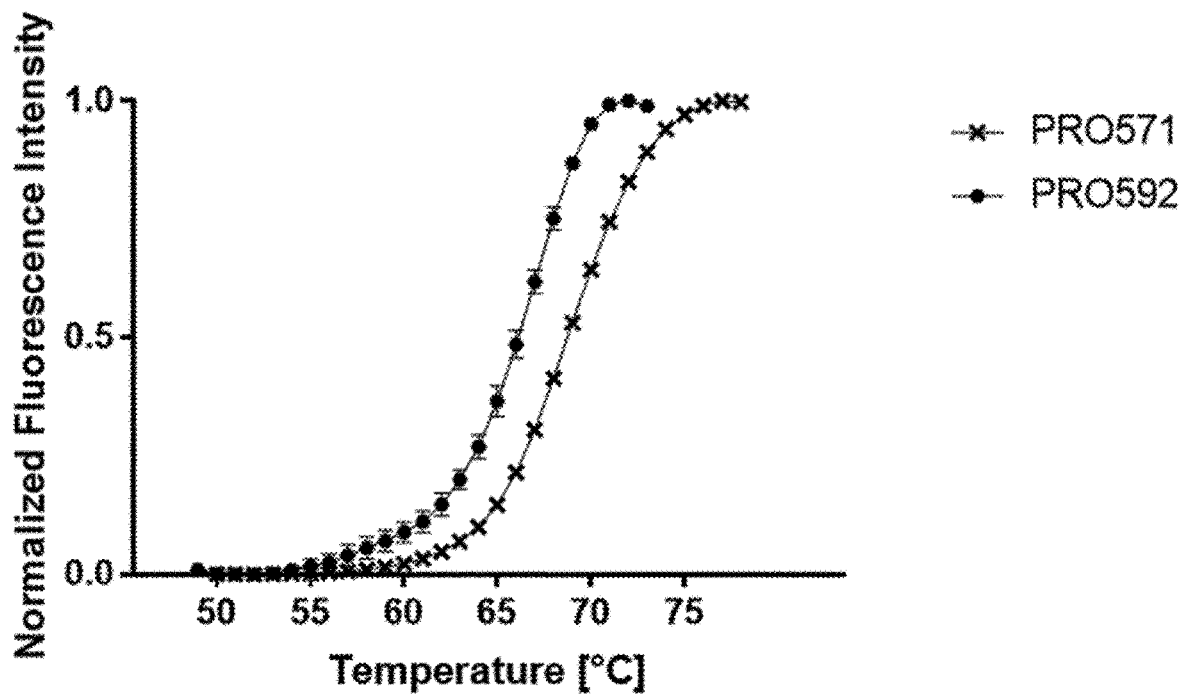

(A)

(B)

Figure 9:
(A)
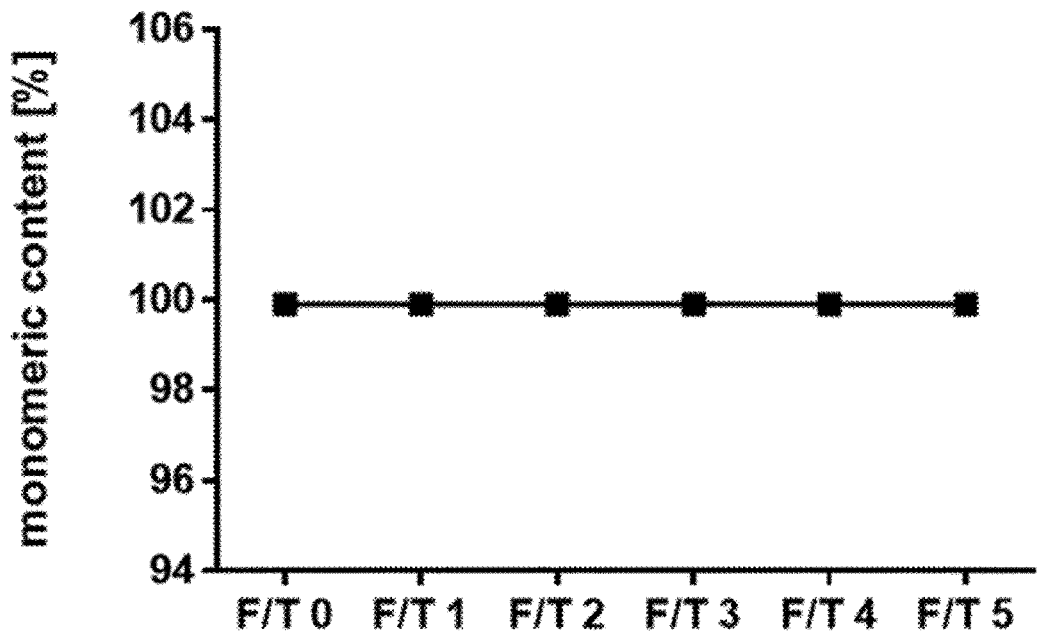
(B)
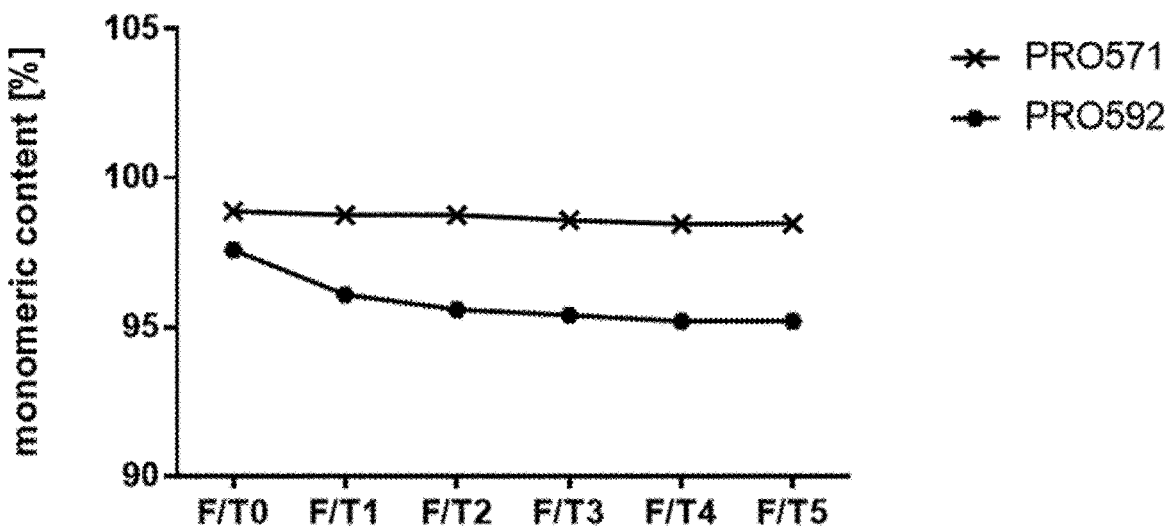

Figure 10:
A  Fab-(scFv)₂ (Tribody™)
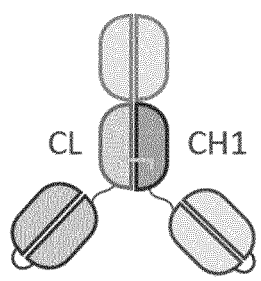 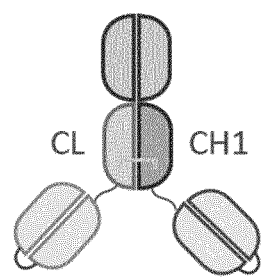 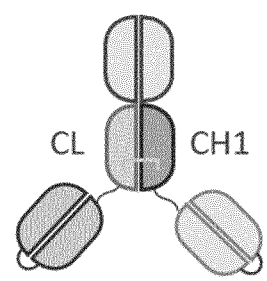
A3  A4  A5
B  scDb-scFv
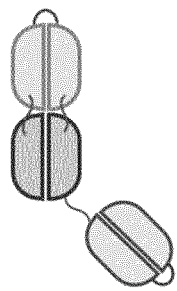 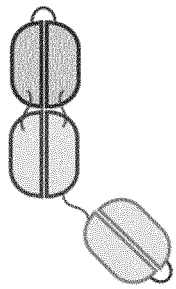 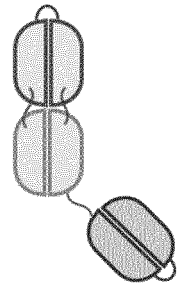
A6  A7  A8
  
αHSA  αIL17  αTNF Figure 14:
A
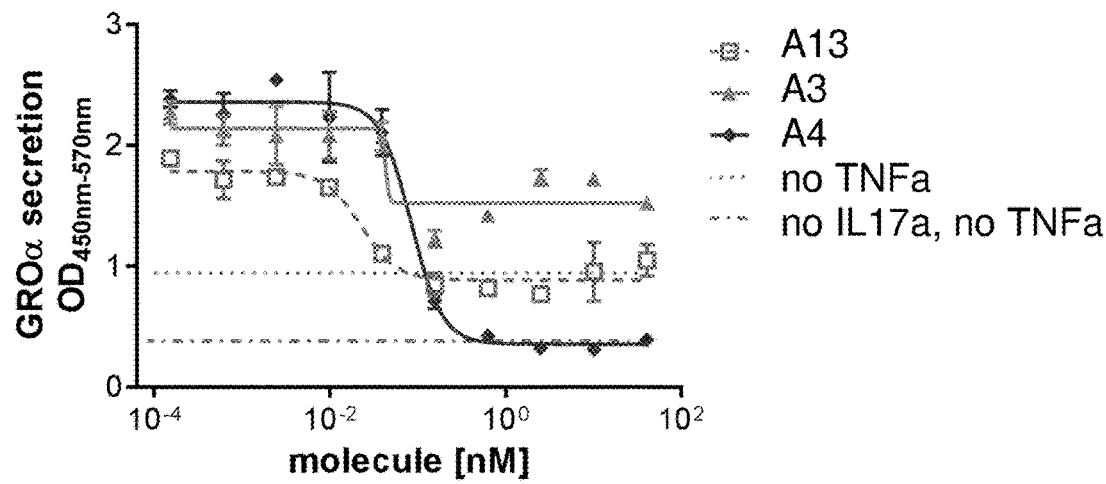
B
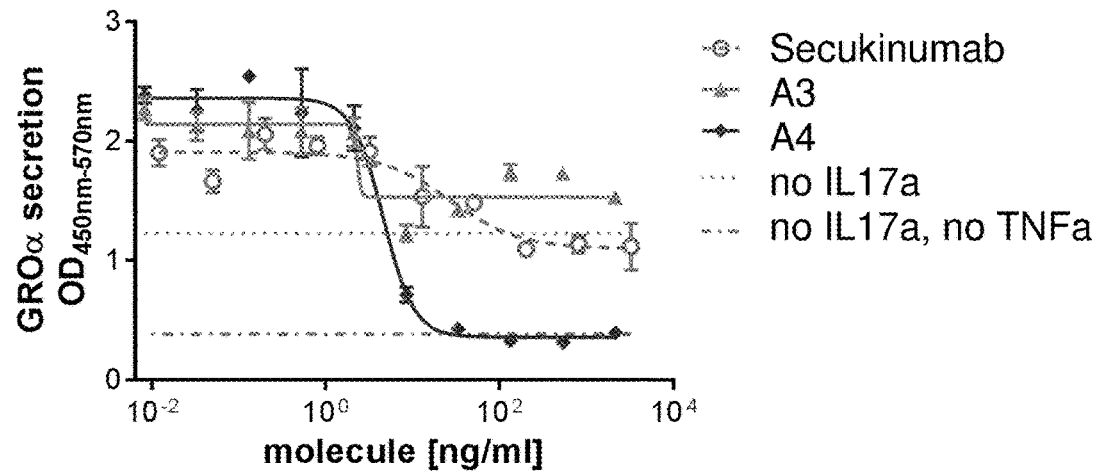

Figure 14 (contd.):
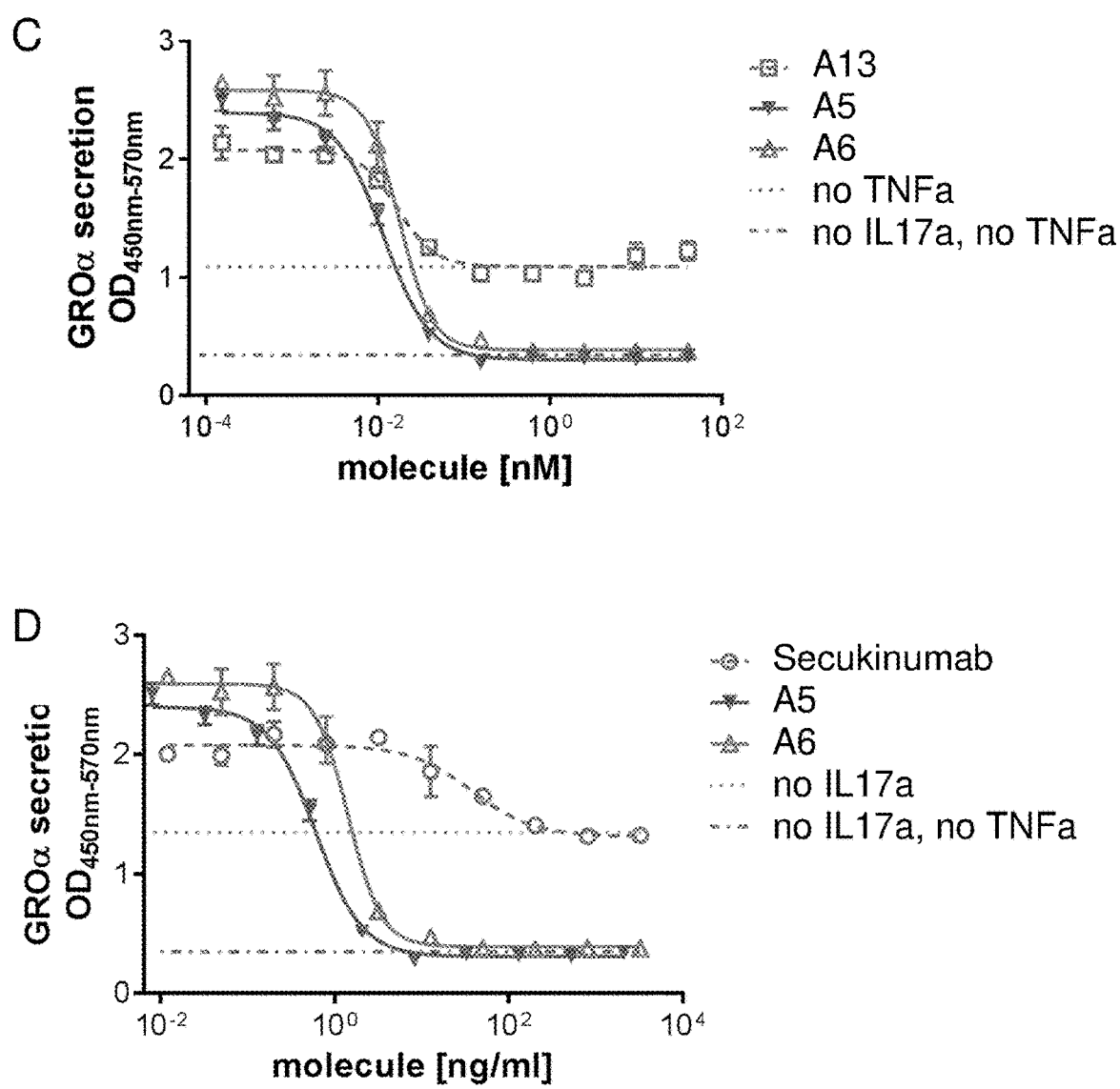

Figure 14 (contd.):
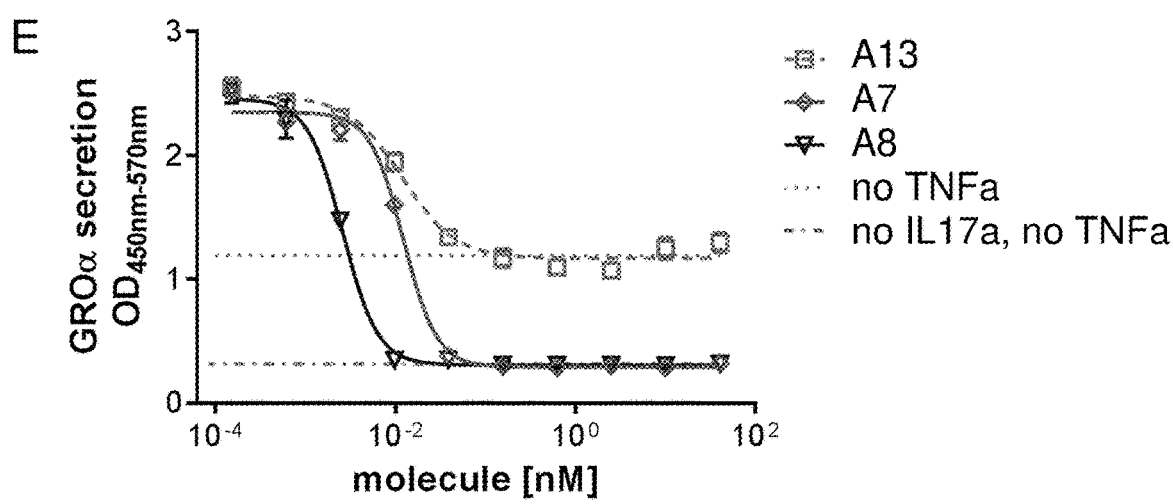
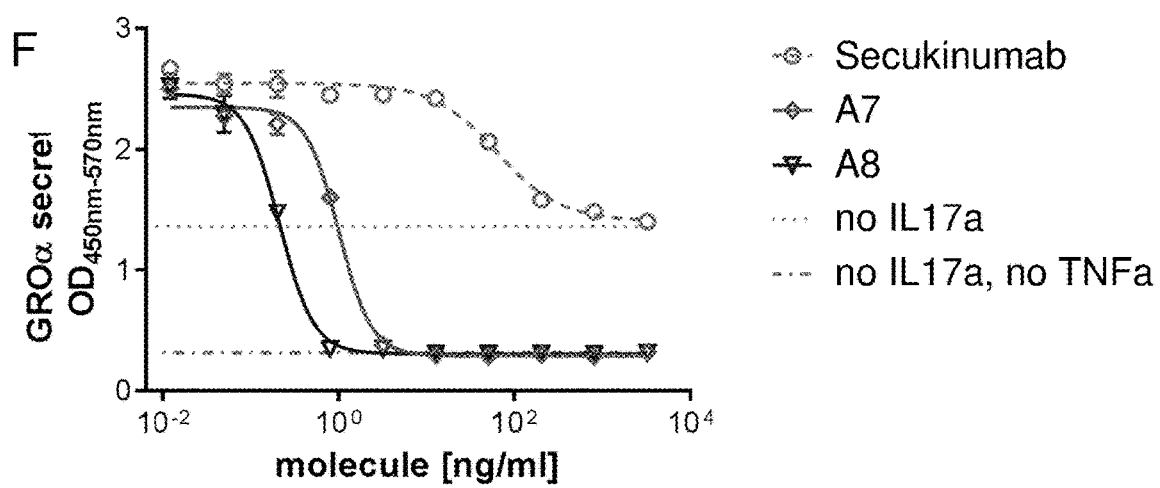

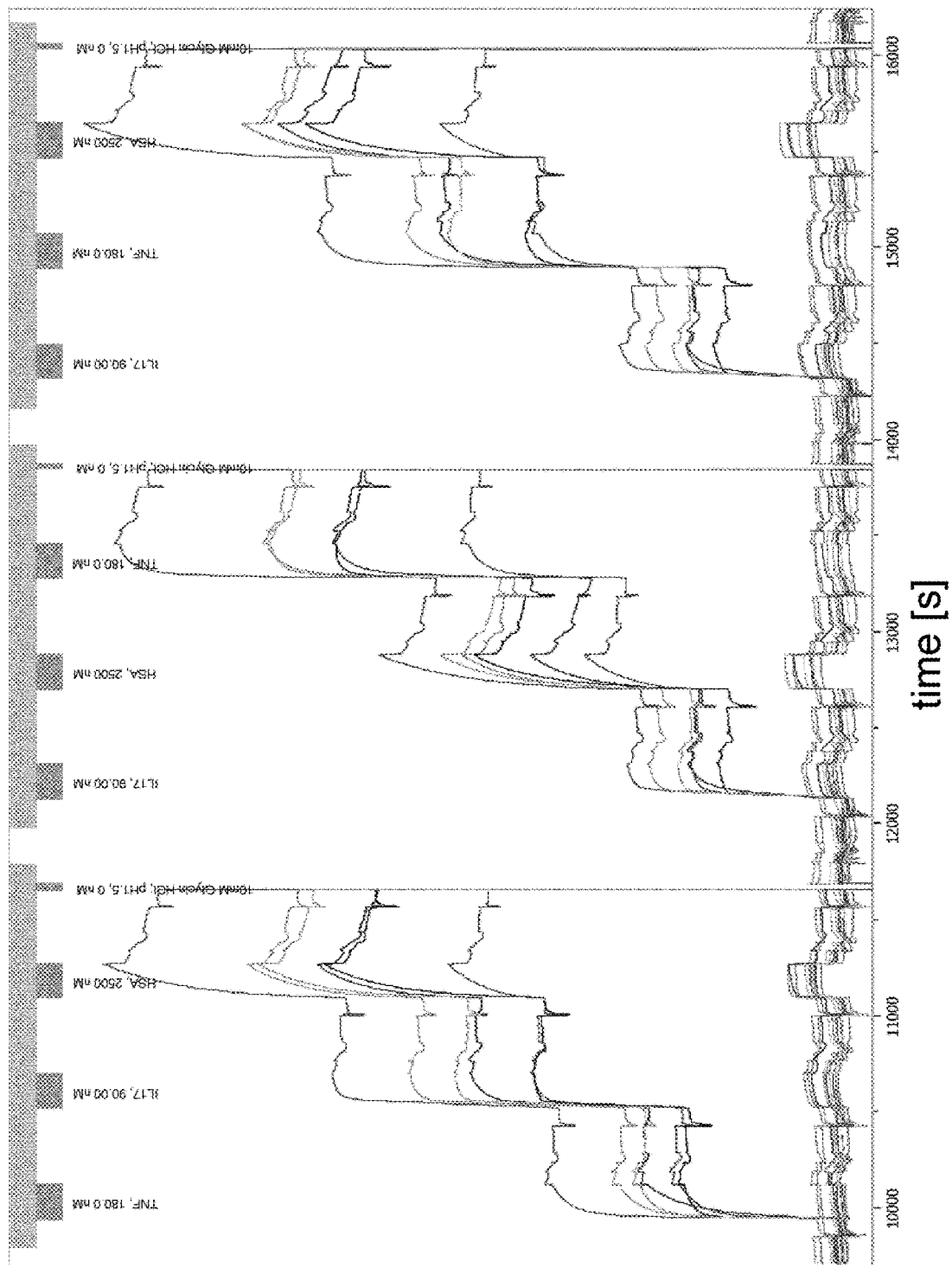
Figure 16 (contd.):

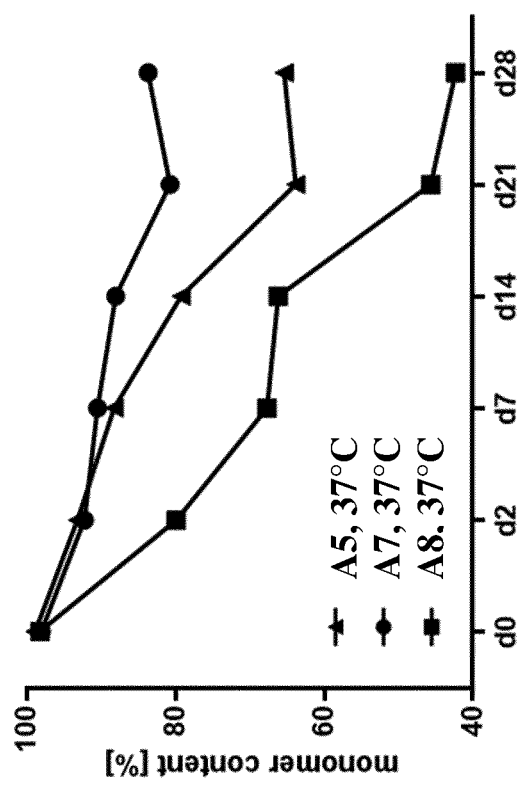
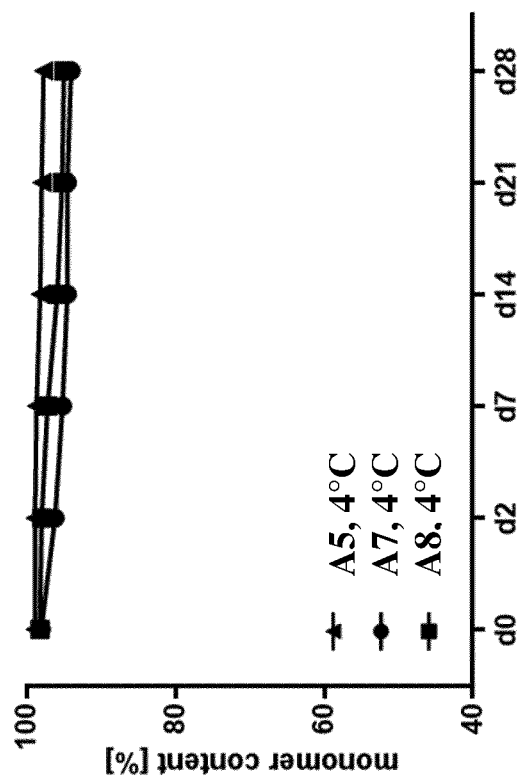
Figure 17:

```
                            SEQUENCE LISTING

<160> NUMBER OF SEQ ID NOS: 149

<210> SEQ ID NO 1
<211> LENGTH: 11
<212> TYPE: PRT
<213> ORGANISM: Artificial Sequence
<220> FEATURE:
<223> OTHER INFORMATION: artificial antibody-related sequence

<400> SEQUENCE: 1

Gly Phe Ser Phe Ser Ser Asp Tyr Trp Met Cys
1               5                   10

<210> SEQ ID NO 2
<211> LENGTH: 18
<212> TYPE: PRT
<213> ORGANISM: Artificial Sequence
<220> FEATURE:
<223> OTHER INFORMATION: artificial antibody-related sequence

<400> SEQUENCE: 2

Cys Ile Tyr Ala Gly Asp Val Asp Asp Thr Asp Tyr Ala Ser Trp Ala
1               5                   10                  15

Arg Gly

<210> SEQ ID NO 3
<211> LENGTH: 12
<212> TYPE: PRT
<213> ORGANISM: Artificial Sequence
<220> FEATURE:
<223> OTHER INFORMATION: artificial antibody-related sequence

<400> SEQUENCE: 3

Arg Val Asp Gly Phe Asp Ile Thr Tyr Phe Asp Leu
1               5                   10

<210> SEQ ID NO 4
<211> LENGTH: 6
<212> TYPE: PRT
<213> ORGANISM: Artificial Sequence
<220> FEATURE:
<223> OTHER INFORMATION: artificial antibody-related sequence

<400> SEQUENCE: 4

Ser Asp Tyr Trp Met Cys
1               5

<210> SEQ ID NO 5
<211> LENGTH: 18
<212> TYPE: PRT
<213> ORGANISM: Artificial Sequence
<220> FEATURE:
<223> OTHER INFORMATION: artificial antibody-related sequence

<400> SEQUENCE: 5

Cys Ile Tyr Ala Gly Asp Val Asp Asp Thr Asp Tyr Ala Ser Trp Ala
1               5                   10                  15

Arg Gly

<210> SEQ ID NO 6
```

```
<211> LENGTH: 11
<212> TYPE: PRT
<213> ORGANISM: Artificial Sequence
<220> FEATURE:
<223> OTHER INFORMATION: artificial antibody-related sequence

<400> SEQUENCE: 6

Val Asp Gly Phe Asp Ile Thr Tyr Phe Asp Leu
1               5                   10

<210> SEQ ID NO 7
<211> LENGTH: 8
<212> TYPE: PRT
<213> ORGANISM: Artificial Sequence
<220> FEATURE:
<223> OTHER INFORMATION: artificial antibody-related sequence

<400> SEQUENCE: 7

Gly Phe Ser Phe Ser Ser Asp Tyr
1               5

<210> SEQ ID NO 8
<211> LENGTH: 5
<212> TYPE: PRT
<213> ORGANISM: Artificial Sequence
<220> FEATURE:
<223> OTHER INFORMATION: artificial antibody-related sequence

<400> SEQUENCE: 8

Ala Gly Asp Val Asp
1               5

<210> SEQ ID NO 9
<211> LENGTH: 9
<212> TYPE: PRT
<213> ORGANISM: Artificial Sequence
<220> FEATURE:
<223> OTHER INFORMATION: artificial antibody-related sequence

<400> SEQUENCE: 9

Asp Gly Phe Asp Ile Thr Tyr Phe Asp
1               5

<210> SEQ ID NO 10
<211> LENGTH: 122
<212> TYPE: PRT
<213> ORGANISM: Artificial Sequence
<220> FEATURE:
<223> OTHER INFORMATION: artificial antibody-related sequence

<400> SEQUENCE: 10

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Ser Phe Ser Ser Asp
                20                  25                  30

Tyr Trp Met Cys Trp Val Arg Gln Ala Pro Gly Lys Gly Leu Glu Trp
            35                  40                  45

Ile Gly Cys Ile Tyr Ala Gly Asp Val Asp Thr Asp Tyr Ala Ser
        50                  55                  60

Trp Ala Arg Gly Arg Phe Thr Ile Ser Arg Asp Asn Ser Lys Asn Thr
65                  70                  75                  80

Val Tyr Leu Gln Met Asn Ser Leu Arg Ala Glu Asp Thr Ala Val Tyr
                85                  90                  95

Tyr Cys Ala Arg Val Asp Gly Phe Asp Ile Thr Tyr Phe Asp Leu Trp
```

100                 105                 110

Gly Gln Gly Thr Leu Val Thr Val Ser Ser
        115                 120

<210> SEQ ID NO 11
<211> LENGTH: 122
<212> TYPE: PRT
<213> ORGANISM: Artificial Sequence
<220> FEATURE:
<223> OTHER INFORMATION: artificial antibody-related sequence

<400> SEQUENCE: 11

Glu Val Gln Leu Val Glu Ser Gly Gly Gly Leu Val Lys Pro Glu Gly
1               5                   10                  15

Ser Leu Arg Leu Ser Cys Ala Ala Ser Gly Phe Ser Phe Ser Ser Asp
            20                  25                  30

Tyr Trp Met Cys Trp Val Arg Gln Ala Pro Gly Lys Gly Leu Glu Trp
        35                  40                  45

Ile Ala Cys Ile Tyr Ala Gly Asp Val Asp Thr Asp Tyr Ala Ser
    50                  55                  60

Trp Ala Arg Gly Arg Phe Thr Ile Ser Arg Asp Asn Ser Lys Asn Thr
65                  70                  75                  80

Val Tyr Leu Gln Met Asn Ser Leu Arg Ala Glu Asp Thr Ala Val Tyr
                85                  90                  95

Tyr Cys Ala Arg Val Asp Gly Phe Asp Ile Thr Tyr Phe Asp Leu Trp
                100                 105                 110

Gly Gln Gly Thr Leu Val Thr Val Ser Ser
        115                 120

<210> SEQ ID NO 12
<211> LENGTH: 11
<212> TYPE: PRT
<213> ORGANISM: Artificial Sequence
<220> FEATURE:
<223> OTHER INFORMATION: artificial antibody-related sequence

<400> SEQUENCE: 12

Gln Ala Ser Gln Thr Ile Asn Tyr Trp Leu Ala
1               5                   10

<210> SEQ ID NO 13
<211> LENGTH: 7
<212> TYPE: PRT
<213> ORGANISM: Artificial Sequence
<220> FEATURE:
<223> OTHER INFORMATION: artificial antibody-related sequence

<400> SEQUENCE: 13

Arg Ala Ser Thr Leu Ala Ser
1               5

<210> SEQ ID NO 14
<211> LENGTH: 12
<212> TYPE: PRT
<213> ORGANISM: Artificial Sequence
<220> FEATURE:
<223> OTHER INFORMATION: artificial antibody-related sequence

<400> SEQUENCE: 14

Gln Asn Tyr Tyr Tyr Ser Thr Ser Arg Ser Tyr Gly
1               5                   10

```
<210> SEQ ID NO 15
<211> LENGTH: 11
<212> TYPE: PRT
<213> ORGANISM: Artificial Sequence
<220> FEATURE:
<223> OTHER INFORMATION: artificial antibody-related sequence

<400> SEQUENCE: 15

Gln Ala Ser Gln Thr Ile Asn Tyr Trp Leu Ala
1               5                   10

<210> SEQ ID NO 16
<211> LENGTH: 7
<212> TYPE: PRT
<213> ORGANISM: Artificial Sequence
<220> FEATURE:
<223> OTHER INFORMATION: artificial antibody-related sequence

<400> SEQUENCE: 16

Arg Ala Ser Thr Leu Ala Ser
1               5

<210> SEQ ID NO 17
<211> LENGTH: 12
<212> TYPE: PRT
<213> ORGANISM: Artificial Sequence
<220> FEATURE:
<223> OTHER INFORMATION: artificial antibody-related sequence

<400> SEQUENCE: 17

Gln Asn Tyr Tyr Tyr Ser Thr Ser Arg Ser Tyr Gly
1               5                   10

<210> SEQ ID NO 18
<211> LENGTH: 7
<212> TYPE: PRT
<213> ORGANISM: Artificial Sequence
<220> FEATURE:
<223> OTHER INFORMATION: artificial antibody-related sequence

<400> SEQUENCE: 18

Ser Gln Thr Ile Asn Tyr Trp
1               5

<210> SEQ ID NO 19
<211> LENGTH: 3
<212> TYPE: PRT
<213> ORGANISM: Artificial Sequence
<220> FEATURE:
<223> OTHER INFORMATION: artificial antibody-related sequence

<400> SEQUENCE: 19

Arg Ala Ser
1

<210> SEQ ID NO 20
<211> LENGTH: 9
<212> TYPE: PRT
<213> ORGANISM: Artificial Sequence
<220> FEATURE:
<223> OTHER INFORMATION: artificial antibody-related sequence

<400> SEQUENCE: 20

Tyr Tyr Tyr Ser Thr Ser Arg Ser Tyr
1               5

<210> SEQ ID NO 21
```

<211> LENGTH: 111
<212> TYPE: PRT
<213> ORGANISM: Artificial Sequence
<220> FEATURE:
<223> OTHER INFORMATION: artificial antibody-related sequence

<400> SEQUENCE: 21

Asp Ile Gln Met Thr Gln Ser Pro Ser Ser Leu Ser Ala Ser Val Gly
1               5                   10                  15

Asp Arg Val Thr Ile Thr Cys Gln Ala Ser Gln Thr Ile Asn Tyr Trp
            20                  25                  30

Leu Ala Trp Tyr Gln Gln Lys Pro Gly Lys Ala Pro Lys Leu Leu Ile
        35                  40                  45

Tyr Arg Ala Ser Thr Leu Ala Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Asn Tyr Tyr Ser Thr Ser
                85                  90                  95

Arg Ser Tyr Gly Phe Gly Gly Gly Thr Lys Leu Thr Val Leu Gly
            100                 105                 110

<210> SEQ ID NO 22
<211> LENGTH: 111
<212> TYPE: PRT
<213> ORGANISM: Artificial Sequence
<220> FEATURE:
<223> OTHER INFORMATION: artificial antibody-related sequence

<400> SEQUENCE: 22

Asp Ile Gln Met Thr Gln Ser Pro Ser Ser Leu Ser Ala Ser Val Gly
1               5                   10                  15

Asp Arg Val Thr Ile Thr Cys Gln Ala Ser Gln Thr Ile Asn Tyr Trp
            20                  25                  30

Leu Ala Trp Tyr Gln Gln Lys Pro Gly Lys Pro Pro Lys Leu Leu Ile
        35                  40                  45

Tyr Arg Ala Ser Thr Leu Ala Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Asn Tyr Tyr Ser Thr Ser
                85                  90                  95

Arg Ser Tyr Gly Phe Gly Gly Gly Thr Lys Leu Thr Val Leu Gly
            100                 105                 110

<210> SEQ ID NO 23
<211> LENGTH: 20
<212> TYPE: PRT
<213> ORGANISM: Artificial Sequence
<220> FEATURE:
<223> OTHER INFORMATION: artificial antibody-related sequence

<400> SEQUENCE: 23

Gly Gly Gly Gly Ser Gly Gly Gly Gly Ser Gly Gly Gly Gly Ser Gly
1               5                   10                  15

Gly Gly Gly Ser
            20

<210> SEQ ID NO 24
<211> LENGTH: 253

<212> TYPE: PRT
<213> ORGANISM: Artificial Sequence
<220> FEATURE:
<223> OTHER INFORMATION: artificial antibody-related sequence

<400> SEQUENCE: 24

```
Asp Ile Gln Met Thr Gln Ser Pro Ser Ser Leu Ser Ala Ser Val Gly
1               5                   10                  15

Asp Arg Val Thr Ile Thr Cys Gln Ala Ser Gln Thr Ile Asn Tyr Trp
            20                  25                  30

Leu Ala Trp Tyr Gln Gln Lys Pro Gly Lys Ala Pro Lys Leu Leu Ile
        35                  40                  45

Tyr Arg Ala Ser Thr Leu Ala Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Asn Tyr Tyr Ser Thr Ser
                85                  90                  95

Arg Ser Tyr Gly Phe Gly Gly Thr Lys Leu Thr Val Leu Gly Gly
            100                 105                 110

Gly Gly Gly Ser Gly Gly Gly Ser Gly Gly Gly Ser Gly Gly
            115                 120                 125

Gly Gly Ser Glu Val Gln Leu Val Glu Ser Gly Gly Leu Val Gln
130                 135                 140

Pro Gly Gly Ser Leu Arg Leu Ser Cys Ala Ala Ser Gly Phe Ser Phe
145                 150                 155                 160

Ser Ser Asp Tyr Trp Met Cys Trp Val Arg Gln Ala Pro Gly Lys Gly
                165                 170                 175

Leu Glu Trp Ile Gly Cys Ile Tyr Ala Gly Asp Val Asp Thr Asp
            180                 185                 190

Tyr Ala Ser Trp Ala Arg Gly Arg Phe Thr Ile Ser Arg Asp Asn Ser
    195                 200                 205

Lys Asn Thr Val Tyr Leu Gln Met Asn Ser Leu Arg Ala Glu Asp Thr
210                 215                 220

Ala Val Tyr Tyr Cys Ala Arg Val Asp Gly Phe Asp Ile Thr Tyr Phe
225                 230                 235                 240

Asp Leu Trp Gly Gln Gly Thr Leu Val Thr Val Ser Ser
            245                 250
```

<210> SEQ ID NO 25
<211> LENGTH: 253
<212> TYPE: PRT
<213> ORGANISM: Artificial Sequence
<220> FEATURE:
<223> OTHER INFORMATION: artificial antibody-related sequence

<400> SEQUENCE: 25

```
Asp Ile Gln Met Thr Gln Ser Pro Ser Ser Leu Ser Ala Ser Val Gly
1               5                   10                  15

Asp Arg Val Thr Ile Thr Cys Gln Ala Ser Gln Thr Ile Asn Tyr Trp
            20                  25                  30

Leu Ala Trp Tyr Gln Gln Lys Pro Gly Lys Pro Pro Lys Leu Leu Ile
        35                  40                  45

Tyr Arg Ala Ser Thr Leu Ala Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80
```

Glu Asp Phe Ala Thr Tyr Tyr Cys Gln Asn Tyr Tyr Ser Thr Ser
                85                  90                  95

Arg Ser Tyr Gly Phe Gly Gly Gly Thr Lys Leu Thr Val Leu Gly
            100                 105                 110

Gly Gly Gly Ser Gly Gly Gly Ser Gly Gly Gly Ser Gly Gly
            115                 120                 125

Gly Gly Ser Glu Val Gln Leu Val Glu Ser Gly Gly Leu Val Lys
        130                 135                 140

Pro Glu Gly Ser Leu Arg Leu Ser Cys Ala Ala Ser Gly Phe Ser Phe
145                 150                 155                 160

Ser Ser Asp Tyr Trp Met Cys Trp Val Arg Gln Ala Pro Gly Lys Gly
                165                 170                 175

Leu Glu Trp Ile Ala Cys Ile Tyr Ala Gly Asp Val Asp Asp Thr Asp
                180                 185                 190

Tyr Ala Ser Trp Ala Arg Gly Arg Phe Thr Ile Ser Arg Asp Asn Ser
                195                 200                 205

Lys Asn Thr Val Tyr Leu Gln Met Asn Ser Leu Arg Ala Glu Asp Thr
            210                 215                 220

Ala Val Tyr Tyr Cys Ala Arg Val Asp Gly Phe Asp Ile Thr Tyr Phe
225                 230                 235                 240

Asp Leu Trp Gly Gln Gly Thr Leu Val Thr Val Ser Ser
                245                 250

<210> SEQ ID NO 26
<211> LENGTH: 11
<212> TYPE: PRT
<213> ORGANISM: Homo sapiens

<400> SEQUENCE: 26

Phe Gly Thr Gly Thr Lys Val Thr Val Leu Gly
1               5                   10

<210> SEQ ID NO 27
<211> LENGTH: 11
<212> TYPE: PRT
<213> ORGANISM: Homo sapiens

<400> SEQUENCE: 27

Phe Gly Gly Gly Thr Lys Leu Thr Val Leu Gly
1               5                   10

<210> SEQ ID NO 28
<211> LENGTH: 11
<212> TYPE: PRT
<213> ORGANISM: Homo sapiens

<400> SEQUENCE: 28

Phe Gly Gly Gly Thr Gln Leu Ile Ile Leu Gly
1               5                   10

<210> SEQ ID NO 29
<211> LENGTH: 11
<212> TYPE: PRT
<213> ORGANISM: Homo sapiens

<400> SEQUENCE: 29

Phe Gly Glu Gly Thr Glu Leu Thr Val Leu Gly
1               5                   10

-continued

```
<210> SEQ ID NO 30
<211> LENGTH: 11
<212> TYPE: PRT
<213> ORGANISM: Homo sapiens

<400> SEQUENCE: 30

Phe Gly Ser Gly Thr Lys Val Thr Val Leu Gly
1               5                   10

<210> SEQ ID NO 31
<211> LENGTH: 11
<212> TYPE: PRT
<213> ORGANISM: Homo sapiens

<400> SEQUENCE: 31

Phe Gly Gly Gly Thr Gln Leu Thr Val Leu Gly
1               5                   10

<210> SEQ ID NO 32
<211> LENGTH: 11
<212> TYPE: PRT
<213> ORGANISM: Homo sapiens

<400> SEQUENCE: 32

Phe Gly Gly Gly Thr Gln Leu Thr Ala Leu Gly
1               5                   10

<210> SEQ ID NO 33
<211> LENGTH: 155
<212> TYPE: PRT
<213> ORGANISM: Homo sapiens

<400> SEQUENCE: 33

Met Thr Pro Gly Lys Thr Ser Leu Val Ser Leu Leu Leu Leu Leu Ser
1               5                   10                  15

Leu Glu Ala Ile Val Lys Ala Gly Ile Ala Ile Pro Gln Asn Pro Gly
                20                  25                  30

Cys Pro Asn Ser Glu Asp Lys Asn Phe Pro Arg Thr Val Met Val Asn
            35                  40                  45

Leu Asn Ile His Asn Arg Asn Thr Asn Thr Asn Pro Lys Arg Ser Ser
        50                  55                  60

Asp Tyr Tyr Asn Arg Ser Thr Ser Pro Trp Asn Leu His Arg Asn Glu
65                  70                  75                  80

Asp Pro Glu Arg Tyr Pro Ser Val Ile Trp Glu Ala Lys Cys Arg His
                85                  90                  95

Leu Gly Cys Val Asn Ala Asp Gly Lys Val Asp Tyr His Met Asn Ser
            100                 105                 110

Val Pro Ile Gln Gln Glu Ile Leu Val Leu Arg Arg Glu Pro Pro His
        115                 120                 125

Cys Pro Asn Ser Phe Arg Leu Glu Lys Ile Leu Val Ser Val Gly Cys
    130                 135                 140

Thr Cys Val Thr Pro Ile Val His His Val Ser
145                 150                 155

<210> SEQ ID NO 34
<211> LENGTH: 180
<212> TYPE: PRT
<213> ORGANISM: Homo sapiens

<400> SEQUENCE: 34

Met Asp Trp Pro His Asn Leu Leu Phe Leu Leu Thr Ile Ser Ile Phe
```

```
            1               5                   10                  15
Leu Gly Leu Gly Gln Pro Arg Ser Pro Lys Ser Lys Arg Lys Gly Gln
                    20                  25                  30

Gly Arg Pro Gly Pro Leu Ala Pro Gly Pro His Gln Val Pro Leu Asp
            35                  40                  45

Leu Val Ser Arg Met Lys Pro Tyr Ala Arg Met Glu Glu Tyr Glu Arg
        50                  55                  60

Asn Ile Glu Glu Met Val Ala Gln Leu Arg Asn Ser Ser Glu Leu Ala
65                  70                  75                  80

Gln Arg Lys Cys Glu Val Asn Leu Gln Leu Trp Met Ser Asn Lys Arg
                    85                  90                  95

Ser Leu Ser Pro Trp Gly Tyr Ser Ile Asn His Asp Pro Ser Arg Ile
            100                 105                 110

Pro Val Asp Leu Pro Glu Ala Arg Cys Leu Cys Leu Gly Cys Val Asn
        115                 120                 125

Pro Phe Thr Met Gln Glu Asp Arg Ser Met Val Ser Val Pro Val Phe
    130                 135                 140

Ser Gln Val Pro Val Arg Arg Arg Leu Cys Pro Pro Pro Arg Thr
145                 150                 155                 160

Gly Pro Cys Arg Gln Arg Ala Val Met Glu Thr Ile Ala Val Gly Cys
                    165                 170                 175

Thr Cys Ile Phe
            180

<210> SEQ ID NO 35
<211> LENGTH: 197
<212> TYPE: PRT
<213> ORGANISM: Homo sapiens

<400> SEQUENCE: 35

Met Thr Leu Leu Pro Gly Leu Leu Phe Leu Thr Trp Leu His Thr Cys
1               5                   10                  15

Leu Ala His His Asp Pro Ser Leu Arg Gly His Pro His Ser His Gly
                    20                  25                  30

Thr Pro His Cys Tyr Ser Ala Glu Glu Leu Pro Leu Gly Gln Ala Pro
            35                  40                  45

Pro His Leu Leu Ala Arg Gly Ala Lys Trp Gly Gln Ala Leu Pro Val
        50                  55                  60

Ala Leu Val Ser Ser Leu Glu Ala Ala Ser His Arg Gly Arg His Glu
65                  70                  75                  80

Arg Pro Ser Ala Thr Thr Gln Cys Pro Val Leu Arg Pro Glu Glu Val
                    85                  90                  95

Leu Glu Ala Asp Thr His Gln Arg Ser Ile Ser Pro Trp Arg Tyr Arg
            100                 105                 110

Val Asp Thr Asp Glu Asp Arg Tyr Pro Gln Lys Leu Ala Phe Ala Glu
        115                 120                 125

Cys Leu Cys Arg Gly Cys Ile Asp Ala Arg Thr Gly Arg Glu Thr Ala
    130                 135                 140

Ala Leu Asn Ser Val Arg Leu Leu Gln Ser Leu Leu Val Leu Arg Arg
145                 150                 155                 160

Arg Pro Cys Ser Arg Asp Gly Ser Gly Leu Pro Thr Pro Gly Ala Phe
                    165                 170                 175

Ala Phe His Thr Glu Phe Ile His Val Pro Val Gly Cys Thr Cys Val
            180                 185                 190
```

```
Leu Pro Arg Ser Val
        195
```

<210> SEQ ID NO 36
<211> LENGTH: 202
<212> TYPE: PRT
<213> ORGANISM: Homo sapiens

<400> SEQUENCE: 36

```
Met Leu Val Ala Gly Phe Leu Leu Ala Leu Pro Pro Ser Trp Ala Ala
1               5                   10                  15

Gly Ala Pro Arg Ala Gly Arg Arg Pro Ala Arg Pro Arg Gly Cys Ala
            20                  25                  30

Asp Arg Pro Glu Glu Leu Leu Glu Gln Leu Tyr Gly Arg Leu Ala Ala
        35                  40                  45

Gly Val Leu Ser Ala Phe His His Thr Leu Gln Leu Gly Pro Arg Glu
    50                  55                  60

Gln Ala Arg Asn Ala Ser Cys Pro Ala Gly Gly Arg Pro Ala Asp Arg
65                  70                  75                  80

Arg Phe Arg Pro Pro Thr Asn Leu Arg Ser Val Ser Pro Trp Ala Tyr
                85                  90                  95

Arg Ile Ser Tyr Asp Pro Ala Arg Tyr Pro Arg Tyr Leu Pro Glu Ala
            100                 105                 110

Tyr Cys Leu Cys Arg Gly Cys Leu Thr Gly Leu Phe Gly Glu Glu Asp
        115                 120                 125

Val Arg Phe Arg Ser Ala Pro Val Tyr Met Pro Thr Val Val Leu Arg
    130                 135                 140

Arg Thr Pro Ala Cys Ala Gly Gly Arg Ser Val Tyr Thr Glu Ala Tyr
145                 150                 155                 160

Val Thr Ile Pro Val Gly Cys Thr Cys Val Pro Glu Pro Glu Lys Asp
                165                 170                 175

Ala Asp Ser Ile Asn Ser Ser Ile Asp Lys Gln Gly Ala Lys Leu Leu
            180                 185                 190

Leu Gly Pro Asn Asp Ala Pro Ala Gly Pro
        195                 200
```

<210> SEQ ID NO 37
<211> LENGTH: 177
<212> TYPE: PRT
<213> ORGANISM: Homo sapiens

<400> SEQUENCE: 37

```
Met Arg Glu Arg Pro Arg Leu Gly Glu Asp Ser Ser Leu Ile Ser Leu
1               5                   10                  15

Phe Leu Gln Val Val Ala Phe Leu Ala Met Val Met Gly Thr His Thr
            20                  25                  30

Tyr Ser His Trp Pro Ser Cys Cys Pro Ser Lys Gly Gln Asp Thr Ser
        35                  40                  45

Glu Glu Leu Leu Arg Trp Ser Thr Val Pro Val Pro Pro Leu Glu Pro
    50                  55                  60

Ala Arg Pro Asn Arg His Pro Glu Ser Cys Arg Ala Ser Glu Asp Gly
65                  70                  75                  80

Pro Leu Asn Ser Arg Ala Ile Ser Pro Trp Arg Tyr Glu Leu Asp Arg
                85                  90                  95

Asp Leu Asn Arg Leu Pro Gln Asp Leu Tyr His Ala Arg Cys Leu Cys
            100                 105                 110
```

```
Pro His Cys Val Ser Leu Gln Thr Gly Ser His Met Asp Pro Arg Gly
            115                 120                 125

Asn Ser Glu Leu Leu Tyr His Asn Gln Thr Val Phe Tyr Arg Arg Pro
130                 135                 140

Cys His Gly Glu Lys Gly Thr His Lys Gly Tyr Cys Leu Glu Arg Arg
145                 150                 155                 160

Leu Tyr Arg Val Ser Leu Ala Cys Val Cys Val Arg Pro Arg Val Met
                165                 170                 175

Gly

<210> SEQ ID NO 38
<211> LENGTH: 163
<212> TYPE: PRT
<213> ORGANISM: Homo sapiens

<400> SEQUENCE: 38

Met Thr Val Lys Thr Leu His Gly Pro Ala Met Val Lys Tyr Leu Leu
1               5                   10                  15

Leu Ser Ile Leu Gly Leu Ala Phe Leu Ser Glu Ala Ala Arg Lys
                20                  25                  30

Ile Pro Lys Val Gly His Thr Phe Phe Gln Lys Pro Glu Ser Cys Pro
            35                  40                  45

Pro Val Pro Gly Gly Ser Met Lys Leu Asp Ile Gly Ile Ile Asn Glu
        50                  55                  60

Asn Gln Arg Val Ser Met Ser Arg Asn Ile Glu Ser Arg Ser Thr Ser
65                  70                  75                  80

Pro Trp Asn Tyr Thr Val Thr Trp Asp Pro Asn Arg Tyr Pro Ser Glu
                85                  90                  95

Val Val Gln Ala Gln Cys Arg Asn Leu Gly Cys Ile Asn Ala Gln Gly
            100                 105                 110

Lys Glu Asp Ile Ser Met Asn Ser Val Pro Ile Gln Gln Glu Thr Leu
        115                 120                 125

Val Val Arg Arg Lys His Gln Gly Cys Ser Val Ser Phe Gln Leu Glu
130                 135                 140

Lys Val Leu Val Thr Val Gly Cys Thr Cys Val Thr Pro Val Ile His
145                 150                 155                 160

His Val Gln

<210> SEQ ID NO 39
<211> LENGTH: 11
<212> TYPE: PRT
<213> ORGANISM: Artificial Sequence
<220> FEATURE:
<223> OTHER INFORMATION: artificial antibody-related sequence

<400> SEQUENCE: 39

Gly Phe Ser Phe Ser Gly Phe Tyr Tyr Met Cys
1               5                   10

<210> SEQ ID NO 40
<211> LENGTH: 17
<212> TYPE: PRT
<213> ORGANISM: Artificial Sequence
<220> FEATURE:
<223> OTHER INFORMATION: artificial antibody-related sequence

<400> SEQUENCE: 40

Cys Ile Asp Thr Gly Asp Gly Thr Thr Tyr Tyr Ala Ser Trp Ala Lys
1               5                   10                  15
```

Gly

<210> SEQ ID NO 41
<211> LENGTH: 17
<212> TYPE: PRT
<213> ORGANISM: Artificial Sequence
<220> FEATURE:
<223> OTHER INFORMATION: artificial antibody-related sequence

<400> SEQUENCE: 41

Arg Asp Ala Ala Tyr Gly Gly Tyr Ala Tyr Pro Ala His Gly Met Asp
1               5                   10                  15

Leu

<210> SEQ ID NO 42
<211> LENGTH: 6
<212> TYPE: PRT
<213> ORGANISM: Artificial Sequence
<220> FEATURE:
<223> OTHER INFORMATION: artificial antibody-related sequence

<400> SEQUENCE: 42

Gly Phe Tyr Tyr Met Cys
1               5

<210> SEQ ID NO 43
<211> LENGTH: 17
<212> TYPE: PRT
<213> ORGANISM: Artificial Sequence
<220> FEATURE:
<223> OTHER INFORMATION: artificial antibody-related sequence

<400> SEQUENCE: 43

Cys Ile Asp Thr Gly Asp Gly Thr Thr Tyr Tyr Ala Ser Trp Ala Lys
1               5                   10                  15

Gly

<210> SEQ ID NO 44
<211> LENGTH: 16
<212> TYPE: PRT
<213> ORGANISM: Artificial Sequence
<220> FEATURE:
<223> OTHER INFORMATION: artificial antibody-related sequence

<400> SEQUENCE: 44

Asp Ala Ala Tyr Gly Gly Tyr Ala Tyr Pro Ala His Gly Met Asp Leu
1               5                   10                  15

<210> SEQ ID NO 45
<211> LENGTH: 8
<212> TYPE: PRT
<213> ORGANISM: Artificial Sequence
<220> FEATURE:
<223> OTHER INFORMATION: artificial antibody-related sequence

<400> SEQUENCE: 45

Gly Phe Ser Phe Ser Gly Phe Tyr
1               5

<210> SEQ ID NO 46
<211> LENGTH: 4
<212> TYPE: PRT
<213> ORGANISM: Artificial Sequence
<220> FEATURE:
<223> OTHER INFORMATION: artificial antibody-related sequence

```
<400> SEQUENCE: 46

Thr Gly Asp Gly
1

<210> SEQ ID NO 47
<211> LENGTH: 14
<212> TYPE: PRT
<213> ORGANISM: Artificial Sequence
<220> FEATURE:
<223> OTHER INFORMATION: artificial antibody-related sequence

<400> SEQUENCE: 47

Ala Ala Tyr Gly Gly Tyr Ala Tyr Pro Ala His Gly Met Asp
1               5                   10

<210> SEQ ID NO 48
<211> LENGTH: 126
<212> TYPE: PRT
<213> ORGANISM: Artificial Sequence
<220> FEATURE:
<223> OTHER INFORMATION: artificial antibody-related sequence

<400> SEQUENCE: 48

Glu Val Gln Leu Val Glu Ser Gly Gly Gly Leu Val Gln Pro Gly Gly
1               5                   10                  15

Ser Leu Arg Leu Ser Cys Ala Ser Gly Phe Ser Phe Ser Gly Phe
            20                  25                  30

Tyr Tyr Met Cys Trp Val Arg Gln Ala Pro Gly Lys Gly Leu Glu Trp
            35                  40                  45

Ile Gly Cys Ile Asp Thr Gly Asp Gly Thr Thr Tyr Tyr Ala Ser Trp
        50                  55                  60

Ala Lys Gly Arg Phe Thr Ile Ser Arg Asp Asn Ser Lys Asn Thr Val
65                  70                  75                  80

Tyr Leu Gln Met Asn Ser Leu Arg Ala Glu Asp Thr Ala Val Tyr Tyr
                85                  90                  95

Cys Ala Arg Asp Ala Ala Tyr Gly Gly Tyr Ala Tyr Pro Ala His Gly
            100                 105                 110

Met Asp Leu Trp Gly Gln Gly Thr Leu Val Thr Val Ser Ser
        115                 120                 125

<210> SEQ ID NO 49
<211> LENGTH: 126
<212> TYPE: PRT
<213> ORGANISM: Artificial Sequence
<220> FEATURE:
<223> OTHER INFORMATION: artificial antibody-related sequence

<400> SEQUENCE: 49

Glu Val Gln Leu Val Glu Ser Gly Gly Gly Leu Val Gln Pro Gly Gly
1               5                   10                  15

Ser Leu Thr Leu Ser Cys Ala Ser Gly Phe Ser Phe Ser Gly Phe
            20                  25                  30

Tyr Tyr Met Cys Trp Val Arg Gln Ala Pro Gly Lys Gly Leu Glu Trp
            35                  40                  45

Ile Gly Cys Ile Asp Thr Gly Asp Gly Thr Thr Tyr Tyr Ala Ser Trp
        50                  55                  60

Ala Lys Gly Arg Phe Thr Ile Ser Arg Asp Asn Ser Lys Asn Thr Val
65                  70                  75                  80

Tyr Leu Gln Met Asn Ser Leu Arg Ala Glu Asp Thr Ala Val Tyr Tyr
```

```
                     85                   90                   95
Cys Ala Arg Asp Ala Ala Tyr Gly Gly Tyr Ala Tyr Pro Ala His Gly
            100                 105                 110

Met Asp Leu Trp Gly Pro Gly Thr Leu Val Thr Val Ser Ser
        115                 120                 125

<210> SEQ ID NO 50
<211> LENGTH: 11
<212> TYPE: PRT
<213> ORGANISM: Artificial Sequence
<220> FEATURE:
<223> OTHER INFORMATION: artificial antibody-related sequence

<400> SEQUENCE: 50

Gln Ala Ser Glu Ser Ile Tyr Arg Tyr Leu Ser
1               5                   10

<210> SEQ ID NO 51
<211> LENGTH: 7
<212> TYPE: PRT
<213> ORGANISM: Artificial Sequence
<220> FEATURE:
<223> OTHER INFORMATION: artificial antibody-related sequence

<400> SEQUENCE: 51

Leu Ala Ser Thr Leu Thr Ser
1               5

<210> SEQ ID NO 52
<211> LENGTH: 14
<212> TYPE: PRT
<213> ORGANISM: Artificial Sequence
<220> FEATURE:
<223> OTHER INFORMATION: artificial antibody-related sequence

<400> SEQUENCE: 52

Gln Ser Asn Phe Gly Thr Ala Ser Thr Thr Tyr Tyr Asn Thr
1               5                   10

<210> SEQ ID NO 53
<211> LENGTH: 11
<212> TYPE: PRT
<213> ORGANISM: Artificial Sequence
<220> FEATURE:
<223> OTHER INFORMATION: artificial antibody-related sequence

<400> SEQUENCE: 53

Gln Ala Ser Glu Ser Ile Tyr Arg Tyr Leu Ser
1               5                   10

<210> SEQ ID NO 54
<211> LENGTH: 7
<212> TYPE: PRT
<213> ORGANISM: Artificial Sequence
<220> FEATURE:
<223> OTHER INFORMATION: artificial antibody-related sequence

<400> SEQUENCE: 54

Leu Ala Ser Thr Leu Thr Ser
1               5

<210> SEQ ID NO 55
<211> LENGTH: 14
<212> TYPE: PRT
<213> ORGANISM: Artificial Sequence
<220> FEATURE:
```

<223> OTHER INFORMATION: artificial antibody-related sequence

<400> SEQUENCE: 55

Gln Ser Asn Phe Gly Thr Ala Ser Thr Thr Tyr Tyr Asn Thr
1               5                   10

<210> SEQ ID NO 56
<211> LENGTH: 7
<212> TYPE: PRT
<213> ORGANISM: Artificial Sequence
<220> FEATURE:
<223> OTHER INFORMATION: artificial antibody-related sequence

<400> SEQUENCE: 56

Ser Glu Ser Ile Tyr Arg Tyr
1               5

<210> SEQ ID NO 57
<211> LENGTH: 3
<212> TYPE: PRT
<213> ORGANISM: Artificial Sequence
<220> FEATURE:
<223> OTHER INFORMATION: artificial antibody-related sequence

<400> SEQUENCE: 57

Leu Ala Ser
1

<210> SEQ ID NO 58
<211> LENGTH: 11
<212> TYPE: PRT
<213> ORGANISM: Artificial Sequence
<220> FEATURE:
<223> OTHER INFORMATION: artificial antibody-related sequence

<400> SEQUENCE: 58

Asn Phe Gly Thr Ala Ser Thr Thr Tyr Tyr Asn
1               5                   10

<210> SEQ ID NO 59
<211> LENGTH: 113
<212> TYPE: PRT
<213> ORGANISM: Artificial Sequence
<220> FEATURE:
<223> OTHER INFORMATION: artificial antibody-related sequence

<400> SEQUENCE: 59

Asp Ile Gln Met Thr Gln Ser Pro Ser Ser Leu Ser Ala Ser Val Gly
1               5                   10                  15

Asp Arg Val Thr Ile Thr Cys Gln Ala Ser Glu Ser Ile Tyr Arg Tyr
            20                  25                  30

Leu Ser Trp Tyr Gln Gln Lys Pro Gly Lys Ala Pro Lys Leu Leu Ile
        35                  40                  45

Tyr Leu Ala Ser Thr Leu Thr Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Ser Asn Phe Gly Thr Ala Ser
                85                  90                  95

Thr Thr Tyr Tyr Asn Thr Phe Gly Gly Gly Thr Lys Leu Thr Val Leu
                100                 105                 110

Gly

```
<210> SEQ ID NO 60
<211> LENGTH: 113
<212> TYPE: PRT
<213> ORGANISM: Artificial Sequence
<220> FEATURE:
<223> OTHER INFORMATION: artificial antibody-related sequence

<400> SEQUENCE: 60

Asp Ile Gln Met Thr Gln Ser Pro Ser Ser Leu Ser Ala Ser Val Gly
1               5                   10                  15

Asp Arg Val Thr Ile Thr Cys Gln Ala Ser Glu Ser Ile Tyr Arg Tyr
            20                  25                  30

Leu Ser Trp Tyr Gln Gln Lys Pro Gly Lys Ala Pro Lys Leu Leu Ile
        35                  40                  45

Tyr Leu Ala Ser Thr Leu Thr Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Ser Asn Phe Gly Thr Ala Ser
                85                  90                  95

Thr Thr Tyr Tyr Asn Thr Phe Gly Gly Gly Thr Lys Leu Thr Val Leu
            100                 105                 110

Gly

<210> SEQ ID NO 61
<211> LENGTH: 259
<212> TYPE: PRT
<213> ORGANISM: Artificial Sequence
<220> FEATURE:
<223> OTHER INFORMATION: artificial antibody-related sequence

<400> SEQUENCE: 61

Asp Ile Gln Met Thr Gln Ser Pro Ser Ser Leu Ser Ala Ser Val Gly
1               5                   10                  15

Asp Arg Val Thr Ile Thr Cys Gln Ala Ser Glu Ser Ile Tyr Arg Tyr
            20                  25                  30

Leu Ser Trp Tyr Gln Gln Lys Pro Gly Lys Ala Pro Lys Leu Leu Ile
        35                  40                  45

Tyr Leu Ala Ser Thr Leu Thr Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Ser Asn Phe Gly Thr Ala Ser
                85                  90                  95

Thr Thr Tyr Tyr Asn Thr Phe Gly Gly Gly Thr Lys Leu Thr Val Leu
            100                 105                 110

Gly Gly Gly Gly Ser Gly Gly Gly Ser Gly Gly Gly Ser
            115                 120                 125

Gly Gly Gly Ser Glu Val Gln Leu Val Glu Ser Gly Gly Gly Leu
        130                 135                 140

Val Gln Pro Gly Gly Ser Leu Arg Leu Ser Cys Ala Ala Ser Gly Phe
145                 150                 155                 160

Ser Phe Ser Gly Phe Tyr Tyr Met Cys Trp Val Arg Gln Ala Pro Gly
                165                 170                 175

Lys Gly Leu Glu Trp Ile Gly Cys Ile Asp Thr Gly Asp Gly Thr Thr
            180                 185                 190
```

```
Tyr Tyr Ala Ser Trp Ala Lys Gly Arg Phe Thr Ile Ser Arg Asp Asn
            195                 200                 205

Ser Lys Asn Thr Val Tyr Leu Gln Met Asn Ser Leu Arg Ala Glu Asp
    210                 215                 220

Thr Ala Val Tyr Tyr Cys Ala Arg Asp Ala Ala Tyr Gly Gly Tyr Ala
225                 230                 235                 240

Tyr Pro Ala His Gly Met Asp Leu Trp Gly Gln Gly Thr Leu Val Thr
                245                 250                 255

Val Ser Ser

<210> SEQ ID NO 62
<211> LENGTH: 259
<212> TYPE: PRT
<213> ORGANISM: Artificial Sequence
<220> FEATURE:
<223> OTHER INFORMATION: artificial antibody-related sequence

<400> SEQUENCE: 62

Asp Ile Gln Met Thr Gln Ser Pro Ser Ser Leu Ser Ala Ser Val Gly
1               5                   10                  15

Asp Arg Val Thr Ile Thr Cys Gln Ala Ser Glu Ser Ile Tyr Arg Tyr
            20                  25                  30

Leu Ser Trp Tyr Gln Gln Lys Pro Gly Lys Ala Pro Lys Leu Leu Ile
        35                  40                  45

Tyr Leu Ala Ser Thr Leu Thr Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Ser Asn Phe Gly Thr Ala Ser
                85                  90                  95

Thr Thr Tyr Tyr Asn Thr Phe Gly Gly Gly Thr Lys Leu Thr Val Leu
            100                 105                 110

Gly Gly Gly Gly Ser Gly Gly Gly Ser Gly Gly Gly Gly Gly Gly Ser
            115                 120                 125

Gly Gly Gly Gly Ser Glu Val Gln Leu Val Glu Ser Gly Gly Gly Leu
        130                 135                 140

Val Gln Pro Gly Gly Ser Leu Thr Leu Ser Cys Ala Ala Ser Gly Phe
145                 150                 155                 160

Ser Phe Ser Gly Phe Tyr Tyr Met Cys Trp Val Arg Gln Ala Pro Gly
                165                 170                 175

Lys Gly Leu Glu Trp Ile Gly Cys Ile Asp Thr Gly Asp Gly Thr Thr
            180                 185                 190

Tyr Tyr Ala Ser Trp Ala Lys Gly Arg Phe Thr Ile Ser Arg Asp Asn
            195                 200                 205

Ser Lys Asn Thr Val Tyr Leu Gln Met Asn Ser Leu Arg Ala Glu Asp
    210                 215                 220

Thr Ala Val Tyr Tyr Cys Ala Arg Asp Ala Ala Tyr Gly Gly Tyr Ala
225                 230                 235                 240

Tyr Pro Ala His Gly Met Asp Leu Trp Gly Pro Gly Thr Leu Val Thr
                245                 250                 255

Val Ser Ser

<210> SEQ ID NO 63
<211> LENGTH: 10
<212> TYPE: PRT
<213> ORGANISM: Artificial Sequence
```

<220> FEATURE:
<223> OTHER INFORMATION: artificial antibody-related sequence

<400> SEQUENCE: 63

Gly Ile Asp Phe Ser Thr Tyr Gly Ile Ser
1               5                   10

<210> SEQ ID NO 64
<211> LENGTH: 17
<212> TYPE: PRT
<213> ORGANISM: Artificial Sequence
<220> FEATURE:
<223> OTHER INFORMATION: artificial antibody-related sequence

<400> SEQUENCE: 64

Tyr Ile Tyr Pro Asp Tyr Gly Ile Thr Asp Tyr Ala Ser Trp Val Asn
1               5                   10                  15

Gly

<210> SEQ ID NO 65
<211> LENGTH: 17
<212> TYPE: PRT
<213> ORGANISM: Artificial Sequence
<220> FEATURE:
<223> OTHER INFORMATION: artificial antibody-related sequence

<400> SEQUENCE: 65

Arg Ser Gly Ser Tyr Tyr Ser Arg Gly Trp Gly Ala His Tyr Phe Asn
1               5                   10                  15

Leu

<210> SEQ ID NO 66
<211> LENGTH: 5
<212> TYPE: PRT
<213> ORGANISM: Artificial Sequence
<220> FEATURE:
<223> OTHER INFORMATION: artificial antibody-related sequence

<400> SEQUENCE: 66

Thr Tyr Gly Ile Ser
1               5

<210> SEQ ID NO 67
<211> LENGTH: 17
<212> TYPE: PRT
<213> ORGANISM: Artificial Sequence
<220> FEATURE:
<223> OTHER INFORMATION: artificial antibody-related sequence

<400> SEQUENCE: 67

Tyr Ile Tyr Pro Asp Tyr Gly Ile Thr Asp Tyr Ala Ser Trp Val Asn
1               5                   10                  15

Gly

<210> SEQ ID NO 68
<211> LENGTH: 16
<212> TYPE: PRT
<213> ORGANISM: Artificial Sequence
<220> FEATURE:
<223> OTHER INFORMATION: artificial antibody-related sequence

<400> SEQUENCE: 68

Ser Gly Ser Tyr Tyr Ser Arg Gly Trp Gly Ala His Tyr Phe Asn Leu
1               5                   10                  15

<210> SEQ ID NO 69
<211> LENGTH: 7
<212> TYPE: PRT
<213> ORGANISM: Artificial Sequence
<220> FEATURE:
<223> OTHER INFORMATION: artificial antibody-related sequence

<400> SEQUENCE: 69

Gly Ile Asp Phe Ser Thr Tyr
1               5

<210> SEQ ID NO 70
<211> LENGTH: 4
<212> TYPE: PRT
<213> ORGANISM: Artificial Sequence
<220> FEATURE:
<223> OTHER INFORMATION: artificial antibody-related sequence

<400> SEQUENCE: 70

Pro Asp Tyr Gly
1

<210> SEQ ID NO 71
<211> LENGTH: 14
<212> TYPE: PRT
<213> ORGANISM: Artificial Sequence
<220> FEATURE:
<223> OTHER INFORMATION: artificial antibody-related sequence

<400> SEQUENCE: 71

Gly Ser Tyr Tyr Ser Arg Gly Trp Gly Ala His Tyr Phe Asn
1               5                   10

<210> SEQ ID NO 72
<211> LENGTH: 125
<212> TYPE: PRT
<213> ORGANISM: Artificial Sequence
<220> FEATURE:
<223> OTHER INFORMATION: artificial antibody-related sequence

<400> SEQUENCE: 72

Glu Val Gln Leu Val Glu Ser Gly Gly Leu Val Gln Pro Gly Gly
1               5                   10                  15

Ser Leu Arg Leu Ser Cys Ala Ala Ser Gly Ile Asp Phe Ser Thr Tyr
            20                  25                  30

Gly Ile Ser Trp Val Arg Gln Ala Pro Gly Lys Gly Leu Glu Trp Ile
        35                  40                  45

Ala Tyr Ile Tyr Pro Asp Tyr Gly Ile Thr Asp Tyr Ala Ser Trp Val
    50                  55                  60

Asn Gly Arg Phe Thr Ile Ser Leu Asp Asn Ala Gln Asn Thr Val Tyr
65                  70                  75                  80

Leu Gln Met Asn Ser Leu Arg Ala Glu Asp Thr Ala Val Tyr Tyr Cys
                85                  90                  95

Ala Arg Ser Gly Ser Tyr Tyr Ser Arg Gly Trp Gly Ala His Tyr Phe
            100                 105                 110

Asn Leu Trp Gly Gln Gly Thr Leu Val Thr Val Ser Ser
        115                 120                 125

<210> SEQ ID NO 73
<211> LENGTH: 125
<212> TYPE: PRT
<213> ORGANISM: Artificial Sequence
<220> FEATURE:

<223> OTHER INFORMATION: artificial antibody-related sequence

<400> SEQUENCE: 73

Glu Val Gln Leu Val Glu Ser Gly Gly Gly Leu Val Gln Pro Gly Gly
1               5                   10                  15

Ser Leu Arg Leu Ser Cys Ala Ala Ser Gly Ile Asp Phe Ser Thr Tyr
            20                  25                  30

Gly Ile Ser Trp Val Arg Gln Ala Pro Gly Lys Gly Leu Glu Trp Ile
        35                  40                  45

Gly Tyr Ile Tyr Pro Asp Tyr Gly Ile Thr Asp Tyr Ala Ser Trp Val
    50                  55                  60

Asn Gly Arg Phe Thr Ile Ser Arg Asp Asn Ser Lys Asn Thr Val Tyr
65                  70                  75                  80

Leu Gln Met Asn Ser Leu Arg Ala Glu Asp Thr Ala Val Tyr Tyr Cys
                85                  90                  95

Ala Arg Ser Gly Ser Tyr Tyr Ser Arg Gly Trp Gly Ala His Tyr Phe
            100                 105                 110

Asn Leu Trp Gly Gln Gly Thr Leu Val Thr Val Ser Ser
        115                 120                 125

<210> SEQ ID NO 74
<211> LENGTH: 125
<212> TYPE: PRT
<213> ORGANISM: Artificial Sequence
<220> FEATURE:
<223> OTHER INFORMATION: artificial antibody-related sequence

<400> SEQUENCE: 74

Glu Val Gln Leu Val Glu Ser Gly Gly Gly Leu Val Gln Pro Gly Gly
1               5                   10                  15

Ser Leu Arg Leu Ser Cys Lys Ala Ser Gly Ile Asp Phe Ser Thr Tyr
            20                  25                  30

Gly Ile Ser Trp Val Arg Gln Ala Pro Gly Lys Gly Leu Glu Trp Ile
        35                  40                  45

Ala Tyr Ile Tyr Pro Asp Tyr Gly Ile Thr Asp Tyr Ala Ser Trp Val
    50                  55                  60

Asn Gly Arg Phe Thr Ile Ser Leu Asp Asn Ser Lys Asn Thr Val Tyr
65                  70                  75                  80

Leu Gln Met Asn Ser Leu Arg Ala Glu Asp Thr Ala Val Tyr Tyr Cys
                85                  90                  95

Ala Arg Ser Gly Ser Tyr Tyr Ser Arg Gly Trp Gly Ala His Tyr Phe
            100                 105                 110

Asn Leu Trp Gly Gln Gly Thr Leu Val Thr Val Ser Ser
        115                 120                 125

<210> SEQ ID NO 75
<211> LENGTH: 125
<212> TYPE: PRT
<213> ORGANISM: Artificial Sequence
<220> FEATURE:
<223> OTHER INFORMATION: artificial antibody-related sequence

<400> SEQUENCE: 75

Glu Val Gln Leu Val Glu Ser Gly Gly Gly Leu Val Gln Pro Gly Gly
1               5                   10                  15

Ser Leu Arg Leu Ser Cys Ala Ala Ser Gly Ile Asp Phe Ser Thr Tyr
            20                  25                  30

Gly Ile Ser Trp Val Arg Gln Ala Pro Gly Lys Gly Leu Glu Trp Ile

```
                35                  40                  45
Ala Tyr Ile Tyr Pro Asp Tyr Gly Ile Thr Asp Tyr Ala Ser Trp Val
         50                  55                  60

Asn Gly Arg Phe Thr Ile Ser Leu Asp Asn Ala Gln Asn Thr Val Tyr
 65                  70                  75                  80

Leu Gln Met Asn Ser Leu Arg Ala Glu Asp Thr Ala Val Tyr Tyr Cys
                 85                  90                  95

Ala Arg Ser Gly Ser Tyr Tyr Ser Arg Gly Trp Gly Ala His Tyr Phe
            100                 105                 110

Asn Leu Trp Gly Gln Gly Thr Leu Val Thr Val Ser Ser
            115                 120                 125
```

<210> SEQ ID NO 76
<211> LENGTH: 11
<212> TYPE: PRT
<213> ORGANISM: Artificial Sequence
<220> FEATURE:
<223> OTHER INFORMATION: artificial antibody-related sequence

<400> SEQUENCE: 76

```
Gln Ala Ser Glu Ser Ile Ser Ser Trp Leu Ala
 1               5                  10
```

<210> SEQ ID NO 77
<211> LENGTH: 7
<212> TYPE: PRT
<213> ORGANISM: Artificial Sequence
<220> FEATURE:
<223> OTHER INFORMATION: artificial antibody-related sequence

<400> SEQUENCE: 77

```
Lys Ala Ser Thr Leu Ala Ser
 1               5
```

<210> SEQ ID NO 78
<211> LENGTH: 13
<212> TYPE: PRT
<213> ORGANISM: Artificial Sequence
<220> FEATURE:
<223> OTHER INFORMATION: artificial antibody-related sequence

<400> SEQUENCE: 78

```
Gln Gly Tyr Tyr Leu Asp Ser Ser Val Asp Asp Asn Val
 1               5                  10
```

<210> SEQ ID NO 79
<211> LENGTH: 11
<212> TYPE: PRT
<213> ORGANISM: Artificial Sequence
<220> FEATURE:
<223> OTHER INFORMATION: artificial antibody-related sequence

<400> SEQUENCE: 79

```
Gln Ala Ser Glu Ser Ile Ser Ser Trp Leu Ala
 1               5                  10
```

<210> SEQ ID NO 80
<211> LENGTH: 7
<212> TYPE: PRT
<213> ORGANISM: Artificial Sequence
<220> FEATURE:
<223> OTHER INFORMATION: artificial antibody-related sequence

<400> SEQUENCE: 80

Lys Ala Ser Thr Leu Ala Ser
1               5

<210> SEQ ID NO 81
<211> LENGTH: 13
<212> TYPE: PRT
<213> ORGANISM: Artificial Sequence
<220> FEATURE:
<223> OTHER INFORMATION: artificial antibody-related sequence

<400> SEQUENCE: 81

Gln Gly Tyr Tyr Leu Asp Ser Ser Val Asp Asp Asn Val
1               5                   10

<210> SEQ ID NO 82
<211> LENGTH: 7
<212> TYPE: PRT
<213> ORGANISM: Artificial Sequence
<220> FEATURE:
<223> OTHER INFORMATION: artificial antibody-related sequence

<400> SEQUENCE: 82

Ser Glu Ser Ile Ser Ser Trp
1               5

<210> SEQ ID NO 83
<211> LENGTH: 3
<212> TYPE: PRT
<213> ORGANISM: Artificial Sequence
<220> FEATURE:
<223> OTHER INFORMATION: artificial antibody-related sequence

<400> SEQUENCE: 83

Lys Ala Ser
1

<210> SEQ ID NO 84
<211> LENGTH: 10
<212> TYPE: PRT
<213> ORGANISM: Artificial Sequence
<220> FEATURE:
<223> OTHER INFORMATION: artificial antibody-related sequence

<400> SEQUENCE: 84

Tyr Tyr Leu Asp Ser Ser Val Asp Asp Asn
1               5                   10

<210> SEQ ID NO 85
<211> LENGTH: 112
<212> TYPE: PRT
<213> ORGANISM: Artificial Sequence
<220> FEATURE:
<223> OTHER INFORMATION: artificial antibody-related sequence

<400> SEQUENCE: 85

Asp Ile Gln Met Thr Gln Ser Pro Ser Ser Leu Ser Ala Ser Val Gly
1               5                   10                  15

Asp Arg Val Thr Ile Asn Cys Gln Ala Ser Glu Ser Ile Ser Ser Trp
            20                  25                  30

Leu Ala Trp Tyr Gln Gln Lys Pro Gly Lys Arg Pro Lys Leu Leu Ile
        35                  40                  45

Tyr Lys Ala Ser Thr Leu Ala Ser Gly Val Pro Ser Arg Phe Ser Gly
    50                  55                  60

Ser Gly Ser Gly Thr Asp Tyr Thr Leu Thr Ile Ser Ser Leu Gln Pro
65                  70                  75                  80

```
Glu Asp Phe Ala Thr Tyr Tyr Cys Gln Gly Tyr Tyr Leu Asp Ser Ser
                85                  90                  95

Val Asp Asp Asn Val Phe Gly Gly Gly Thr Lys Leu Thr Val Leu Gly
            100                 105                 110
```

<210> SEQ ID NO 86
<211> LENGTH: 112
<212> TYPE: PRT
<213> ORGANISM: Artificial Sequence
<220> FEATURE:
<223> OTHER INFORMATION: artificial antibody-related sequence

<400> SEQUENCE: 86

```
Asp Ile Gln Met Thr Gln Ser Pro Ser Ser Leu Ser Ala Ser Val Gly
1               5                   10                  15

Asp Arg Val Thr Ile Thr Cys Gln Ala Ser Glu Ser Ile Ser Ser Trp
            20                  25                  30

Leu Ala Trp Tyr Gln Gln Lys Pro Gly Lys Ala Pro Lys Leu Leu Ile
        35                  40                  45

Tyr Lys Ala Ser Thr Leu Ala Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gly Tyr Tyr Leu Asp Ser Ser
                85                  90                  95

Val Asp Asp Asn Val Phe Gly Gly Gly Thr Lys Leu Thr Val Leu Gly
            100                 105                 110
```

<210> SEQ ID NO 87
<211> LENGTH: 112
<212> TYPE: PRT
<213> ORGANISM: Artificial Sequence
<220> FEATURE:
<223> OTHER INFORMATION: artificial antibody-related sequence

<400> SEQUENCE: 87

```
Asp Ile Gln Met Thr Gln Ser Pro Ser Ser Leu Ser Ala Ser Val Gly
1               5                   10                  15

Asp Arg Val Thr Ile Asn Cys Gln Ala Ser Glu Ser Ile Ser Ser Trp
            20                  25                  30

Leu Ala Trp Tyr Gln Gln Lys Pro Gly Lys Ala Pro Lys Leu Leu Ile
        35                  40                  45

Tyr Lys Ala Ser Thr Leu Ala Ser Gly Val Pro Ser Arg Phe Ser Gly
    50                  55                  60

Ser Gly Ser Gly Thr Glu Phe Thr Leu Thr Ile Ser Gly Leu Gln Pro
65                  70                  75                  80

Ala Asp Phe Ala Thr Tyr Tyr Cys Gln Gly Tyr Tyr Leu Asp Ser Ser
                85                  90                  95

Val Asp Asp Asn Val Phe Gly Gly Gly Thr Lys Leu Thr Val Leu Gly
            100                 105                 110
```

<210> SEQ ID NO 88
<211> LENGTH: 112
<212> TYPE: PRT
<213> ORGANISM: Artificial Sequence
<220> FEATURE:
<223> OTHER INFORMATION: artificial antibody-related sequence

<400> SEQUENCE: 88

```
Asp Ile Gln Met Thr Gln Ser Pro Ser Ser Leu Ser Ala Ser Val Gly
1               5                   10                  15

Asp Arg Val Thr Ile Asn Cys Gln Ala Ser Glu Ser Ile Ser Ser Trp
            20                  25                  30

Leu Ala Trp Tyr Gln Gln Lys Pro Gly Lys Arg Pro Lys Leu Leu Ile
        35                  40                  45

Tyr Lys Ala Ser Thr Leu Ala Ser Gly Val Pro Ser Arg Phe Ser Gly
    50                  55                  60

Ser Gly Ser Gly Thr Asp Tyr Thr Leu Thr Ile Ser Gly Leu Gln Pro
65                  70                  75                  80

Glu Asp Phe Ala Thr Tyr Tyr Cys Gln Gly Tyr Tyr Leu Asp Ser Ser
                85                  90                  95

Val Asp Asp Asn Val Phe Gly Thr Gly Thr Lys Val Thr Val Leu Gly
            100                 105                 110
```

<210> SEQ ID NO 89
<211> LENGTH: 112
<212> TYPE: PRT
<213> ORGANISM: Artificial Sequence
<220> FEATURE:
<223> OTHER INFORMATION: artificial antibody-related sequence

<400> SEQUENCE: 89

```
Asp Ile Gln Met Thr Gln Ser Pro Ser Ser Leu Ser Ala Ser Val Gly
1               5                   10                  15

Asp Arg Val Thr Ile Asn Cys Gln Ala Ser Glu Ser Ile Ser Ser Trp
            20                  25                  30

Leu Ala Trp Tyr Gln Gln Lys Pro Gly Gln Arg Pro Lys Leu Leu Ile
        35                  40                  45

Tyr Lys Ala Ser Thr Leu Ala Ser Gly Val Pro Ser Arg Phe Ser Gly
    50                  55                  60

Ser Gly Ser Gly Thr Asp Tyr Thr Leu Thr Ile Ser Ser Leu Gln Pro
65                  70                  75                  80

Glu Asp Phe Ala Thr Tyr Tyr Cys Gln Gly Tyr Tyr Leu Asp Ser Ser
                85                  90                  95

Val Asp Asp Asn Val Phe Gly Thr Gly Thr Lys Val Thr Val Leu Gly
            100                 105                 110
```

<210> SEQ ID NO 90
<211> LENGTH: 10
<212> TYPE: PRT
<213> ORGANISM: Artificial Sequence
<220> FEATURE:
<223> OTHER INFORMATION: artificial antibody-related sequence

<400> SEQUENCE: 90

```
Gly Phe Ser Leu Ser Ser Asn Ala Met Gly
1               5                   10
```

<210> SEQ ID NO 91
<211> LENGTH: 16
<212> TYPE: PRT
<213> ORGANISM: Artificial Sequence
<220> FEATURE:
<223> OTHER INFORMATION: artificial antibody-related sequence

<400> SEQUENCE: 91

```
Ile Ile Ser Val Gly Gly Phe Thr Tyr Tyr Ala Ser Trp Ala Lys Gly
1               5                   10                  15
```

```
<210> SEQ ID NO 92
<211> LENGTH: 14
<212> TYPE: PRT
<213> ORGANISM: Artificial Sequence
<220> FEATURE:
<223> OTHER INFORMATION: artificial antibody-related sequence

<400> SEQUENCE: 92

Arg Asp Arg His Gly Gly Asp Ser Ser Gly Ala Phe Tyr Leu
1               5                   10

<210> SEQ ID NO 93
<211> LENGTH: 5
<212> TYPE: PRT
<213> ORGANISM: Artificial Sequence
<220> FEATURE:
<223> OTHER INFORMATION: artificial antibody-related sequence

<400> SEQUENCE: 93

Ser Asn Ala Met Gly
1               5

<210> SEQ ID NO 94
<211> LENGTH: 16
<212> TYPE: PRT
<213> ORGANISM: Artificial Sequence
<220> FEATURE:
<223> OTHER INFORMATION: artificial antibody-related sequence

<400> SEQUENCE: 94

Ile Ile Ser Val Gly Gly Phe Thr Tyr Tyr Ala Ser Trp Ala Lys Gly
1               5                   10                  15

<210> SEQ ID NO 95
<211> LENGTH: 13
<212> TYPE: PRT
<213> ORGANISM: Artificial Sequence
<220> FEATURE:
<223> OTHER INFORMATION: artificial antibody-related sequence

<400> SEQUENCE: 95

Asp Arg His Gly Gly Asp Ser Ser Gly Ala Phe Tyr Leu
1               5                   10

<210> SEQ ID NO 96
<211> LENGTH: 7
<212> TYPE: PRT
<213> ORGANISM: Artificial Sequence
<220> FEATURE:
<223> OTHER INFORMATION: artificial antibody-related sequence

<400> SEQUENCE: 96

Gly Phe Ser Leu Ser Ser Asn
1               5

<210> SEQ ID NO 97
<211> LENGTH: 3
<212> TYPE: PRT
<213> ORGANISM: Artificial Sequence
<220> FEATURE:
<223> OTHER INFORMATION: artificial antibody-related sequence

<400> SEQUENCE: 97

Val Gly Gly
1

<210> SEQ ID NO 98
```

```
<211> LENGTH: 11
<212> TYPE: PRT
<213> ORGANISM: Artificial Sequence
<220> FEATURE:
<223> OTHER INFORMATION: artificial antibody-related sequence

<400> SEQUENCE: 98

Arg His Gly Gly Asp Ser Ser Gly Ala Phe Tyr
1               5                   10

<210> SEQ ID NO 99
<211> LENGTH: 121
<212> TYPE: PRT
<213> ORGANISM: Artificial Sequence
<220> FEATURE:
<223> OTHER INFORMATION: artificial antibody-related sequence

<400> SEQUENCE: 99

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Ser Leu Ser Ser Asn
            20                  25                  30

Ala Met Gly Trp Val Arg Gln Ala Pro Gly Lys Gly Leu Glu Tyr Ile
        35                  40                  45

Gly Ile Ile Ser Val Gly Gly Phe Thr Tyr Tyr Ala Ser Trp Ala Lys
    50                  55                  60

Gly Arg Phe Thr Ile Ser Arg Asp Asn Ser Lys Asn Thr Val Tyr Leu
65                  70                  75                  80

Gln Met Asn Ser Leu Arg Ala Glu Asp Thr Ala Thr Tyr Phe Cys Ala
                85                  90                  95

Arg Asp Arg His Gly Gly Asp Ser Ser Gly Ala Phe Tyr Leu Trp Gly
            100                 105                 110

Gln Gly Thr Leu Val Thr Val Ser Ser
        115                 120

<210> SEQ ID NO 100
<211> LENGTH: 13
<212> TYPE: PRT
<213> ORGANISM: Artificial Sequence
<220> FEATURE:
<223> OTHER INFORMATION: artificial antibody-related sequence

<400> SEQUENCE: 100

Gln Ser Ser Glu Ser Val Tyr Ser Asn Asn Gln Leu Ser
1               5                   10

<210> SEQ ID NO 101
<211> LENGTH: 7
<212> TYPE: PRT
<213> ORGANISM: Artificial Sequence
<220> FEATURE:
<223> OTHER INFORMATION: artificial antibody-related sequence

<400> SEQUENCE: 101

Asp Ala Ser Asp Leu Ala Ser
1               5

<210> SEQ ID NO 102
<211> LENGTH: 11
<212> TYPE: PRT
<213> ORGANISM: Artificial Sequence
<220> FEATURE:
<223> OTHER INFORMATION: artificial antibody-related sequence
```

```
<400> SEQUENCE: 102

Ala Gly Gly Phe Ser Ser Ser Ser Asp Thr Ala
1               5                   10

<210> SEQ ID NO 103
<211> LENGTH: 13
<212> TYPE: PRT
<213> ORGANISM: Artificial Sequence
<220> FEATURE:
<223> OTHER INFORMATION: artificial antibody-related sequence

<400> SEQUENCE: 103

Gln Ser Ser Glu Ser Val Tyr Ser Asn Asn Gln Leu Ser
1               5                   10

<210> SEQ ID NO 104
<211> LENGTH: 7
<212> TYPE: PRT
<213> ORGANISM: Artificial Sequence
<220> FEATURE:
<223> OTHER INFORMATION: artificial antibody-related sequence

<400> SEQUENCE: 104

Asp Ala Ser Asp Leu Ala Ser
1               5

<210> SEQ ID NO 105
<211> LENGTH: 11
<212> TYPE: PRT
<213> ORGANISM: Artificial Sequence
<220> FEATURE:
<223> OTHER INFORMATION: artificial antibody-related sequence

<400> SEQUENCE: 105

Ala Gly Gly Phe Ser Ser Ser Ser Asp Thr Ala
1               5                   10

<210> SEQ ID NO 106
<211> LENGTH: 9
<212> TYPE: PRT
<213> ORGANISM: Artificial Sequence
<220> FEATURE:
<223> OTHER INFORMATION: artificial antibody-related sequence

<400> SEQUENCE: 106

Ser Glu Ser Val Tyr Ser Asn Asn Gln
1               5

<210> SEQ ID NO 107
<211> LENGTH: 3
<212> TYPE: PRT
<213> ORGANISM: Artificial Sequence
<220> FEATURE:
<223> OTHER INFORMATION: artificial antibody-related sequence

<400> SEQUENCE: 107

Asp Ala Ser
1

<210> SEQ ID NO 108
<211> LENGTH: 8
<212> TYPE: PRT
<213> ORGANISM: Artificial Sequence
<220> FEATURE:
<223> OTHER INFORMATION: artificial antibody-related sequence

<400> SEQUENCE: 108
```

```
Gly Phe Ser Ser Ser Ser Asp Thr
1               5
```

```
<210> SEQ ID NO 109
<211> LENGTH: 112
<212> TYPE: PRT
<213> ORGANISM: Artificial Sequence
<220> FEATURE:
<223> OTHER INFORMATION: artificial antibody-related sequence

<400> SEQUENCE: 109

Asp Ile Gln Met Thr Gln Ser Pro Ser Ser Leu Ser Ala Ser Val Gly
1               5                   10                  15

Asp Arg Val Thr Ile Thr Cys Gln Ser Ser Glu Ser Val Tyr Ser Asn
            20                  25                  30

Asn Gln Leu Ser Trp Tyr Gln Gln Lys Pro Gly Gln Pro Pro Lys Leu
        35                  40                  45

Leu Ile Tyr Asp Ala Ser Asp Leu Ala Ser Gly Val Pro Ser Arg Phe
    50                  55                  60

Ser Gly Ser Gly Ser Gly Thr Asp Phe Thr Leu Thr Ile Ser Ser Leu
65                  70                  75                  80

Gln Pro Glu Asp Phe Ala Thr Tyr Tyr Cys Ala Gly Phe Ser Ser
                85                  90                  95

Ser Ser Asp Thr Ala Phe Gly Gly Gly Thr Lys Leu Thr Val Leu Gly
            100                 105                 110
```

```
<210> SEQ ID NO 110
<211> LENGTH: 253
<212> TYPE: PRT
<213> ORGANISM: Artificial Sequence
<220> FEATURE:
<223> OTHER INFORMATION: artificial antibody-related sequence

<400> SEQUENCE: 110

Asp Ile Gln Met Thr Gln Ser Pro Ser Ser Leu Ser Ala Ser Val Gly
1               5                   10                  15

Asp Arg Val Thr Ile Thr Cys Gln Ser Ser Glu Ser Val Tyr Ser Asn
            20                  25                  30

Asn Gln Leu Ser Trp Tyr Gln Gln Lys Pro Gly Gln Pro Pro Lys Leu
        35                  40                  45

Leu Ile Tyr Asp Ala Ser Asp Leu Ala Ser Gly Val Pro Ser Arg Phe
    50                  55                  60

Ser Gly Ser Gly Ser Gly Thr Asp Phe Thr Leu Thr Ile Ser Ser Leu
65                  70                  75                  80

Gln Pro Glu Asp Phe Ala Thr Tyr Tyr Cys Ala Gly Phe Ser Ser
                85                  90                  95

Ser Ser Asp Thr Ala Phe Gly Gly Gly Thr Lys Leu Thr Val Leu Gly
            100                 105                 110

Gly Gly Gly Gly Ser Gly Gly Gly Ser Gly Gly Gly Ser
        115                 120                 125

Gly Gly Gly Ser Glu Val Gln Leu Val Glu Ser Gly Gly Leu Val
        130                 135                 140

Gln Pro Gly Gly Ser Leu Arg Leu Ser Cys Ala Ala Ser Gly Phe Ser
145                 150                 155                 160

Leu Ser Ser Asn Ala Met Gly Trp Val Arg Gln Ala Pro Gly Lys Gly
            165                 170                 175

Leu Glu Tyr Ile Gly Ile Ile Ser Val Gly Gly Phe Thr Tyr Tyr Ala
```

```
                180             185             190
Ser Trp Ala Lys Gly Arg Phe Thr Ile Ser Arg Asp Asn Ser Lys Asn
            195             200             205

Thr Val Tyr Leu Gln Met Asn Ser Leu Arg Ala Glu Asp Thr Ala Thr
        210             215             220

Tyr Phe Cys Ala Arg Asp Arg His Gly Gly Asp Ser Ser Gly Ala Phe
225             230             235             240

Tyr Leu Trp Gly Gln Gly Thr Leu Val Thr Val Ser Ser
                245             250
```

<210> SEQ ID NO 111
<211> LENGTH: 11
<212> TYPE: PRT
<213> ORGANISM: Artificial Sequence
<220> FEATURE:
<223> OTHER INFORMATION: artificial antibody-related sequence

<400> SEQUENCE: 111

```
Gly Phe Ser Phe Ser Ser Ser Tyr Trp Ile Cys
1               5                   10
```

<210> SEQ ID NO 112
<211> LENGTH: 17
<212> TYPE: PRT
<213> ORGANISM: Artificial Sequence
<220> FEATURE:
<223> OTHER INFORMATION: artificial antibody-related sequence

<400> SEQUENCE: 112

```
Cys Val Phe Thr Gly Asp Gly Thr Thr Tyr Tyr Ala Ser Trp Ala Lys
1               5                   10                  15

Gly
```

<210> SEQ ID NO 113
<211> LENGTH: 12
<212> TYPE: PRT
<213> ORGANISM: Artificial Sequence
<220> FEATURE:
<223> OTHER INFORMATION: artificial antibody-related sequence

<400> SEQUENCE: 113

```
Arg Pro Val Ser Val Tyr Tyr Tyr Gly Met Asp Leu
1               5                   10
```

<210> SEQ ID NO 114
<211> LENGTH: 6
<212> TYPE: PRT
<213> ORGANISM: Artificial Sequence
<220> FEATURE:
<223> OTHER INFORMATION: artificial antibody-related sequence

<400> SEQUENCE: 114

```
Ser Ser Tyr Trp Ile Cys
1               5
```

<210> SEQ ID NO 115
<211> LENGTH: 17
<212> TYPE: PRT
<213> ORGANISM: Artificial Sequence
<220> FEATURE:
<223> OTHER INFORMATION: artificial antibody-related sequence

<400> SEQUENCE: 115

```
Cys Val Phe Thr Gly Asp Gly Thr Thr Tyr Tyr Ala Ser Trp Ala Lys
```

```
1               5                   10                  15
Gly

<210> SEQ ID NO 116
<211> LENGTH: 11
<212> TYPE: PRT
<213> ORGANISM: Artificial Sequence
<220> FEATURE:
<223> OTHER INFORMATION: artificial antibody-related sequence

<400> SEQUENCE: 116

Pro Val Ser Val Tyr Tyr Tyr Gly Met Asp Leu
1               5                   10

<210> SEQ ID NO 117
<211> LENGTH: 8
<212> TYPE: PRT
<213> ORGANISM: Artificial Sequence
<220> FEATURE:
<223> OTHER INFORMATION: artificial antibody-related sequence

<400> SEQUENCE: 117

Gly Phe Ser Phe Ser Ser Ser Tyr
1               5

<210> SEQ ID NO 118
<211> LENGTH: 4
<212> TYPE: PRT
<213> ORGANISM: Artificial Sequence
<220> FEATURE:
<223> OTHER INFORMATION: artificial antibody-related sequence

<400> SEQUENCE: 118

Thr Gly Asp Gly
1

<210> SEQ ID NO 119
<211> LENGTH: 9
<212> TYPE: PRT
<213> ORGANISM: Artificial Sequence
<220> FEATURE:
<223> OTHER INFORMATION: artificial antibody-related sequence

<400> SEQUENCE: 119

Val Ser Val Tyr Tyr Tyr Gly Met Asp
1               5

<210> SEQ ID NO 120
<211> LENGTH: 121
<212> TYPE: PRT
<213> ORGANISM: Artificial Sequence
<220> FEATURE:
<223> OTHER INFORMATION: artificial antibody-related sequence

<400> SEQUENCE: 120

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Ser Phe Ser Ser Ser
            20                  25                  30

Tyr Trp Ile Cys Trp Val Arg Gln Ala Pro Gly Lys Gly Leu Glu Trp
        35                  40                  45

Val Gly Cys Val Phe Thr Gly Asp Gly Thr Thr Tyr Tyr Ala Ser Trp
    50                  55                  60

Ala Lys Gly Arg Phe Thr Ile Ser Arg Asp Asn Ser Lys Asn Thr Val
```

```
            65                  70                  75                  80
Tyr Leu Gln Met Asn Ser Leu Arg Ala Glu Asp Thr Ala Thr Tyr Phe
                    85                  90                  95

Cys Ala Arg Pro Val Ser Val Tyr Tyr Gly Met Asp Leu Trp Gly
                100                 105                 110

Gln Gly Thr Leu Val Thr Val Ser Ser
        115                 120

<210> SEQ ID NO 121
<211> LENGTH: 11
<212> TYPE: PRT
<213> ORGANISM: Artificial Sequence
<220> FEATURE:
<223> OTHER INFORMATION: artificial antibody-related sequence

<400> SEQUENCE: 121

Gln Ala Ser Gln Ile Ile Ser Ser Arg Ser Ala
1               5                   10

<210> SEQ ID NO 122
<211> LENGTH: 7
<212> TYPE: PRT
<213> ORGANISM: Artificial Sequence
<220> FEATURE:
<223> OTHER INFORMATION: artificial antibody-related sequence

<400> SEQUENCE: 122

Gln Ala Ser Lys Leu Ala Ser
1               5

<210> SEQ ID NO 123
<211> LENGTH: 11
<212> TYPE: PRT
<213> ORGANISM: Artificial Sequence
<220> FEATURE:
<223> OTHER INFORMATION: artificial antibody-related sequence

<400> SEQUENCE: 123

Gln Cys Thr Tyr Ile Asp Ser Asn Phe Gly Ala
1               5                   10

<210> SEQ ID NO 124
<211> LENGTH: 11
<212> TYPE: PRT
<213> ORGANISM: Artificial Sequence
<220> FEATURE:
<223> OTHER INFORMATION: artificial antibody-related sequence

<400> SEQUENCE: 124

Gln Ala Ser Gln Ile Ile Ser Ser Arg Ser Ala
1               5                   10

<210> SEQ ID NO 125
<211> LENGTH: 7
<212> TYPE: PRT
<213> ORGANISM: Artificial Sequence
<220> FEATURE:
<223> OTHER INFORMATION: artificial antibody-related sequence

<400> SEQUENCE: 125

Gln Ala Ser Lys Leu Ala Ser
1               5

<210> SEQ ID NO 126
<211> LENGTH: 11
```

```
<212> TYPE: PRT
<213> ORGANISM: Artificial Sequence
<220> FEATURE:
<223> OTHER INFORMATION: artificial antibody-related sequence

<400> SEQUENCE: 126

Gln Cys Thr Tyr Ile Asp Ser Asn Phe Gly Ala
1               5                   10

<210> SEQ ID NO 127
<211> LENGTH: 7
<212> TYPE: PRT
<213> ORGANISM: Artificial Sequence
<220> FEATURE:
<223> OTHER INFORMATION: artificial antibody-related sequence

<400> SEQUENCE: 127

Ser Gln Ile Ile Ser Ser Arg
1               5

<210> SEQ ID NO 128
<211> LENGTH: 3
<212> TYPE: PRT
<213> ORGANISM: Artificial Sequence
<220> FEATURE:
<223> OTHER INFORMATION: artificial antibody-related sequence

<400> SEQUENCE: 128

Gln Ala Ser
1

<210> SEQ ID NO 129
<211> LENGTH: 8
<212> TYPE: PRT
<213> ORGANISM: Artificial Sequence
<220> FEATURE:
<223> OTHER INFORMATION: artificial antibody-related sequence

<400> SEQUENCE: 129

Thr Tyr Ile Asp Ser Asn Phe Gly
1               5

<210> SEQ ID NO 130
<211> LENGTH: 110
<212> TYPE: PRT
<213> ORGANISM: Artificial Sequence
<220> FEATURE:
<223> OTHER INFORMATION: artificial antibody-related sequence

<400> SEQUENCE: 130

Asp Val Val Met Thr Gln Ser Pro Ser Ser Leu Ser Ala Ser Val Gly
1               5                   10                  15

Asp Arg Val Thr Ile Thr Cys Gln Ala Ser Gln Ile Ile Ser Ser Arg
            20                  25                  30

Ser Ala Trp Tyr Gln Gln Lys Pro Gly Gln Pro Pro Lys Leu Leu Ile
        35                  40                  45

Tyr Gln Ala Ser Lys Leu Ala Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Cys Thr Tyr Ile Asp Ser Asn
                85                  90                  95

Phe Gly Ala Phe Gly Gly Gly Thr Lys Leu Thr Val Leu Gly
            100                 105                 110
```

<210> SEQ ID NO 131
<211> LENGTH: 251
<212> TYPE: PRT
<213> ORGANISM: Artificial Sequence
<220> FEATURE:
<223> OTHER INFORMATION: artificial antibody-related sequence

<400> SEQUENCE: 131

Asp Val Val Met Thr Gln Ser Pro Ser Ser Leu Ser Ala Ser Val Gly
1               5                   10                  15

Asp Arg Val Thr Ile Thr Cys Gln Ala Ser Gln Ile Ile Ser Ser Arg
                20                  25                  30

Ser Ala Trp Tyr Gln Gln Lys Pro Gly Gln Pro Pro Lys Leu Leu Ile
            35                  40                  45

Tyr Gln Ala Ser Lys Leu Ala Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Cys Thr Tyr Ile Asp Ser Asn
                85                  90                  95

Phe Gly Ala Phe Gly Gly Gly Thr Lys Leu Thr Val Leu Gly Gly Gly
            100                 105                 110

Gly Gly Ser Gly Gly Gly Ser Gly Gly Gly Ser Gly Gly Gly
            115                 120                 125

Gly Ser Glu Val Gln Leu Val Glu Ser Gly Gly Leu Val Gln Pro
130                 135                 140

Gly Gly Ser Leu Arg Leu Ser Cys Ala Ala Ser Gly Phe Ser Phe Ser
145                 150                 155                 160

Ser Ser Tyr Trp Ile Cys Trp Val Arg Gln Ala Pro Gly Lys Gly Leu
                165                 170                 175

Glu Trp Val Gly Cys Val Phe Thr Gly Asp Gly Thr Thr Tyr Tyr Ala
            180                 185                 190

Ser Trp Ala Lys Gly Arg Phe Thr Ile Ser Arg Asp Asn Ser Lys Asn
    195                 200                 205

Thr Val Tyr Leu Gln Met Asn Ser Leu Arg Ala Glu Asp Thr Ala Thr
210                 215                 220

Tyr Phe Cys Ala Arg Pro Val Ser Val Tyr Tyr Gly Met Asp Leu
225                 230                 235                 240

Trp Gly Gln Gly Thr Leu Val Thr Val Ser Ser
                245                 250

<210> SEQ ID NO 132
<211> LENGTH: 5
<212> TYPE: PRT
<213> ORGANISM: Artificial Sequence
<220> FEATURE:
<223> OTHER INFORMATION: artificial antibody-related sequence

<400> SEQUENCE: 132

Gly Gly Gly Gly Ser
1               5

<210> SEQ ID NO 133
<211> LENGTH: 4
<212> TYPE: PRT
<213> ORGANISM: Artificial Sequence
<220> FEATURE:
<223> OTHER INFORMATION: artificial antibody-related sequence

```
<220> FEATURE:
<221> NAME/KEY: Repeat
<222> LOCATION: (1)..(1)
<223> OTHER INFORMATION: generic linker sequence (GmS)n [GlyXaaSerXaa in
      the Sequence Listing], with m being selected from 2, 3 and 4
<220> FEATURE:
<221> NAME/KEY: Repeat
<222> LOCATION: (1)..(3)
<223> OTHER INFORMATION: generic linker sequence (GmS)n [GlyXaaSerXaa in
      the Sequence Listing], with n being selected from 2, 3, 4, 5 and 6
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: misc_feature
<222> LOCATION: (4)..(4)
<223> OTHER INFORMATION: Xaa can be any naturally occurring amino acid

<400> SEQUENCE: 133

Gly Xaa Ser Xaa
1

<210> SEQ ID NO 134
<211> LENGTH: 233
<212> TYPE: PRT
<213> ORGANISM: Homo sapiens

<400> SEQUENCE: 134

Met Ser Thr Glu Ser Met Ile Arg Asp Val Glu Leu Ala Glu Ala
1               5                   10                  15

Leu Pro Lys Lys Thr Gly Gly Pro Gln Gly Ser Arg Arg Cys Leu Phe
            20                  25                  30

Leu Ser Leu Phe Ser Phe Leu Ile Val Ala Gly Ala Thr Thr Leu Phe
        35                  40                  45

Cys Leu Leu His Phe Gly Val Ile Gly Pro Gln Arg Glu Glu Phe Pro
    50                  55                  60

Arg Asp Leu Ser Leu Ile Ser Pro Leu Ala Gln Ala Val Arg Ser Ser
65                  70                  75                  80

Ser Arg Thr Pro Ser Asp Lys Pro Val Ala His Val Val Ala Asn Pro
                85                  90                  95

Gln Ala Glu Gly Gln Leu Gln Trp Leu Asn Arg Arg Ala Asn Ala Leu
            100                 105                 110

Leu Ala Asn Gly Val Glu Leu Arg Asp Asn Gln Leu Val Val Pro Ser
        115                 120                 125

Glu Gly Leu Tyr Leu Ile Tyr Ser Gln Val Leu Phe Lys Gly Gln Gly
    130                 135                 140

Cys Pro Ser Thr His Val Leu Leu Thr His Thr Ile Ser Arg Ile Ala
145                 150                 155                 160

Val Ser Tyr Gln Thr Lys Val Asn Leu Leu Ser Ala Ile Lys Ser Pro
                165                 170                 175

Cys Gln Arg Glu Thr Pro Glu Gly Ala Glu Ala Lys Pro Trp Tyr Glu
            180                 185                 190

Pro Ile Tyr Leu Gly Gly Val Phe Gln Leu Glu Lys Gly Asp Arg Leu
        195                 200                 205

Ser Ala Glu Ile Asn Arg Pro Asp Tyr Leu Asp Phe Ala Glu Ser Gly
    210                 215                 220

Gln Val Tyr Phe Gly Ile Ile Ala Leu
225                 230

<210> SEQ ID NO 135
```

```
<211> LENGTH: 157
<212> TYPE: PRT
<213> ORGANISM: Homo sapiens

<400> SEQUENCE: 135

Val Arg Ser Ser Ser Arg Thr Pro Ser Asp Lys Pro Val Ala His Val
1               5                   10                  15

Val Ala Asn Pro Gln Ala Glu Gly Gln Leu Gln Trp Leu Asn Arg Arg
            20                  25                  30

Ala Asn Ala Leu Leu Ala Asn Gly Val Glu Leu Arg Asp Asn Gln Leu
        35                  40                  45

Val Val Pro Ser Glu Gly Leu Tyr Leu Ile Tyr Ser Gln Val Leu Phe
    50                  55                  60

Lys Gly Gln Gly Cys Pro Ser Thr His Val Leu Leu Thr His Thr Ile
65                  70                  75                  80

Ser Arg Ile Ala Val Ser Tyr Gln Thr Lys Val Asn Leu Leu Ser Ala
                85                  90                  95

Ile Lys Ser Pro Cys Gln Arg Glu Thr Pro Glu Gly Ala Glu Ala Lys
            100                 105                 110

Pro Trp Tyr Glu Pro Ile Tyr Leu Gly Gly Val Phe Gln Leu Glu Lys
        115                 120                 125

Gly Asp Arg Leu Ser Ala Glu Ile Asn Arg Pro Asp Tyr Leu Asp Phe
    130                 135                 140

Ala Glu Ser Gly Gln Val Tyr Phe Gly Ile Ile Ala Leu
145                 150                 155

<210> SEQ ID NO 136
<211> LENGTH: 488
<212> TYPE: PRT
<213> ORGANISM: Artificial Sequence
<220> FEATURE:
<223> OTHER INFORMATION: artificial antibody-related sequence

<400> SEQUENCE: 136

Asp Ile Gln Met Thr Gln Ser Pro Ser Ser Leu Ser Ala Ser Val Gly
1               5                   10                  15

Asp Arg Val Thr Ile Thr Cys Gln Ser Ser Gln Ser Val Tyr Ser Asn
            20                  25                  30

Asn Gln Leu Ser Trp Tyr Gln Gln Lys Pro Gly Gln Pro Pro Lys Leu
        35                  40                  45

Leu Ile Tyr Asp Ala Ser Asp Leu Ala Ser Gly Val Pro Ser Arg Phe
    50                  55                  60

Ser Gly Ser Gly Ser Gly Thr Asp Phe Thr Leu Thr Ile Ser Ser Leu
65                  70                  75                  80

Gln Pro Glu Asp Phe Ala Thr Tyr Tyr Cys Ala Gly Gly Phe Ser Ser
                85                  90                  95

Ser Ser Asp Thr Ala Phe Gly Gly Gly Thr Lys Leu Thr Val Leu Gly
            100                 105                 110

Arg Thr Arg Thr Val Ala Ala Pro Ser Val Phe Ile Phe Pro Pro Ser
        115                 120                 125

Asp Glu Gln Leu Lys Ser Gly Thr Ala Ser Val Val Cys Leu Leu Asn
    130                 135                 140

Asn Phe Tyr Pro Arg Glu Ala Lys Val Gln Trp Lys Val Asp Asn Ala
145                 150                 155                 160

Leu Gln Ser Gly Asn Ser Gln Glu Ser Val Thr Glu Gln Asp Ser Lys
                165                 170                 175
```

Asp Ser Thr Tyr Ser Leu Ser Ser Thr Leu Thr Leu Ser Lys Ala Asp
            180                 185                 190

Tyr Glu Lys His Lys Val Tyr Ala Cys Glu Val Thr His Gln Gly Leu
        195                 200                 205

Ser Ser Pro Val Thr Lys Ser Phe Asn Arg Gly Glu Cys Gly Gly Gly
    210                 215                 220

Gly Ser Gly Gly Gly Ser Asp Ile Gln Met Thr Gln Ser Pro Ser
225                 230                 235                 240

Ser Leu Ser Ala Ser Val Gly Asp Arg Val Thr Ile Asn Cys Gln Ala
                245                 250                 255

Ser Glu Ser Ile Ser Ser Trp Leu Ala Trp Tyr Gln Gln Lys Pro Gly
            260                 265                 270

Lys Arg Pro Lys Leu Leu Ile Tyr Lys Ala Ser Thr Leu Ala Ser Gly
        275                 280                 285

Val Pro Ser Arg Phe Ser Gly Ser Gly Ser Gly Thr Asp Tyr Thr Leu
    290                 295                 300

Thr Ile Ser Ser Leu Gln Pro Glu Asp Phe Ala Thr Tyr Tyr Cys Gln
305                 310                 315                 320

Gly Tyr Tyr Leu Asp Ser Ser Val Asp Asp Asn Val Phe Gly Gly Gly
                325                 330                 335

Thr Lys Leu Thr Val Leu Gly Gly Gly Gly Ser Gly Gly Gly Gly
            340                 345                 350

Ser Gly Gly Gly Gly Ser Gly Gly Gly Gly Ser Glu Val Gln Leu Val
        355                 360                 365

Glu Ser Gly Gly Gly Leu Val Gln Pro Gly Gly Ser Leu Arg Leu Ser
    370                 375                 380

Cys Ala Ala Ser Gly Ile Asp Phe Ser Thr Tyr Gly Ile Ser Trp Val
385                 390                 395                 400

Arg Gln Ala Pro Gly Lys Gly Leu Glu Trp Ile Ala Tyr Ile Tyr Pro
                405                 410                 415

Asp Tyr Gly Ile Thr Asp Tyr Ala Ser Trp Val Asn Gly Arg Phe Thr
            420                 425                 430

Ile Ser Leu Asp Asn Ala Gln Asn Thr Val Tyr Leu Gln Met Asn Ser
        435                 440                 445

Leu Arg Ala Glu Asp Thr Ala Val Tyr Tyr Cys Ala Arg Ser Gly Ser
    450                 455                 460

Tyr Tyr Ser Arg Gly Trp Gly Ala His Tyr Phe Asn Leu Trp Gly Gln
465                 470                 475                 480

Gly Thr Leu Val Thr Val Ser Ser
                485

<210> SEQ ID NO 137
<211> LENGTH: 487
<212> TYPE: PRT
<213> ORGANISM: Artificial Sequence
<220> FEATURE:
<223> OTHER INFORMATION: artificial antibody-related sequence

<400> SEQUENCE: 137

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Ser Leu Ser Ser Asn
            20                  25                  30

Ala Met Gly Trp Val Arg Gln Ala Pro Gly Lys Gly Leu Glu Tyr Ile
        35                  40                  45

```
Gly Ile Ile Ser Val Gly Gly Phe Thr Tyr Tyr Ala Ser Trp Ala Lys
 50                  55                  60
Gly Arg Phe Thr Ile Ser Arg Asp Asn Ser Lys Asn Thr Val Tyr Leu
 65                  70                  75                  80
Gln Met Asn Ser Leu Arg Ala Glu Asp Thr Ala Thr Tyr Phe Cys Ala
                 85                  90                  95
Arg Asp Arg His Gly Gly Asp Ser Ser Gly Ala Phe Tyr Leu Trp Gly
                100                 105                 110
Gln Gly Thr Leu Val Thr Val Ser Ala Ser Thr Lys Gly Pro Ser
                115                 120                 125
Val Phe Pro Leu Ala Pro Ser Ser Lys Ser Thr Ser Gly Gly Thr Ala
130                 135                 140
Ala Leu Gly Cys Leu Val Lys Asp Tyr Phe Pro Glu Pro Val Thr Val
145                 150                 155                 160
Ser Trp Asn Ser Gly Ala Leu Thr Ser Gly Val His Thr Phe Pro Ala
                165                 170                 175
Val Leu Gln Ser Ser Gly Leu Tyr Ser Leu Ser Ser Val Val Thr Val
                180                 185                 190
Pro Ser Ser Ser Leu Gly Thr Gln Thr Tyr Ile Cys Asn Val Asn His
                195                 200                 205
Lys Pro Ser Asn Thr Lys Val Asp Lys Lys Val Glu Pro Lys Ser Cys
210                 215                 220
Gly Gly Gly Gly Ser Gly Gly Gly Gly Ser Asp Ile Gln Met Thr Gln
225                 230                 235                 240
Ser Pro Ser Ser Leu Ser Ala Ser Val Gly Asp Arg Val Thr Ile Thr
                245                 250                 255
Cys Gln Ala Ser Gln Thr Ile Asn Tyr Trp Leu Ala Trp Tyr Gln Gln
                260                 265                 270
Lys Pro Gly Lys Ala Pro Lys Leu Leu Ile Tyr Arg Ala Ser Thr Leu
                275                 280                 285
Ala Ser Gly Val Pro Ser Arg Phe Ser Gly Ser Gly Ser Gly Thr Asp
                290                 295                 300
Phe Thr Leu Thr Ile Ser Ser Leu Gln Pro Glu Asp Phe Ala Thr Tyr
305                 310                 315                 320
Tyr Cys Gln Asn Tyr Tyr Ser Thr Ser Arg Ser Tyr Gly Phe Gly
                325                 330                 335
Gly Gly Thr Lys Leu Thr Val Leu Gly Gly Gly Gly Ser Gly Gly
                340                 345                 350
Gly Gly Ser Gly Gly Gly Ser Gly Gly Gly Gly Ser Glu Val Gln
                355                 360                 365
Leu Val Glu Ser Gly Gly Gly Leu Val Gln Pro Gly Gly Ser Leu Arg
                370                 375                 380
Leu Ser Cys Ala Ala Ser Gly Phe Ser Phe Ser Ser Asp Tyr Trp Met
385                 390                 395                 400
Cys Trp Val Arg Gln Ala Pro Gly Lys Gly Leu Glu Trp Ile Gly Cys
                405                 410                 415
Ile Tyr Ala Gly Asp Val Asp Thr Asp Tyr Ala Ser Trp Ala Arg
                420                 425                 430
Gly Arg Phe Thr Ile Ser Arg Asp Asn Ser Lys Asn Thr Val Tyr Leu
                435                 440                 445
Gln Met Asn Ser Leu Arg Ala Glu Asp Thr Ala Val Tyr Tyr Cys Ala
                450                 455                 460
Arg Val Asp Gly Phe Asp Ile Thr Tyr Phe Asp Leu Trp Gly Gln Gly
```

```
                465                 470                 475                 480
Thr Leu Val Thr Val Ser Ser
                485
```

<210> SEQ ID NO 138
<211> LENGTH: 487
<212> TYPE: PRT
<213> ORGANISM: Artificial Sequence
<220> FEATURE:
<223> OTHER INFORMATION: artificial antibody-related sequence

<400> SEQUENCE: 138

```
Asp Ile Gln Met Thr Gln Ser Pro Ser Ser Leu Ser Ala Ser Val Gly
1               5                   10                  15

Asp Arg Val Thr Ile Thr Cys Gln Ala Ser Gln Thr Ile Asn Tyr Trp
                20                  25                  30

Leu Ala Trp Tyr Gln Gln Lys Pro Gly Lys Ala Pro Lys Leu Leu Ile
            35                  40                  45

Tyr Arg Ala Ser Thr Leu Ala Ser Gly Val Pro Ser Arg Phe Ser Gly
        50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Asn Tyr Tyr Ser Thr Ser
                85                  90                  95

Arg Ser Tyr Gly Phe Gly Gly Thr Lys Leu Thr Val Leu Gly Arg
            100                 105                 110

Thr Arg Thr Val Ala Ala Pro Ser Val Phe Ile Phe Pro Pro Ser Asp
        115                 120                 125

Glu Gln Leu Lys Ser Gly Thr Ala Ser Val Val Cys Leu Leu Asn Asn
    130                 135                 140

Phe Tyr Pro Arg Glu Ala Lys Val Gln Trp Lys Val Asp Asn Ala Leu
145                 150                 155                 160

Gln Ser Gly Asn Ser Gln Glu Ser Val Thr Glu Gln Asp Ser Lys Asp
                165                 170                 175

Ser Thr Tyr Ser Leu Ser Ser Thr Leu Thr Leu Ser Lys Ala Asp Tyr
            180                 185                 190

Glu Lys His Lys Val Tyr Ala Cys Glu Val Thr His Gln Gly Leu Ser
        195                 200                 205

Ser Pro Val Thr Lys Ser Phe Asn Arg Gly Glu Cys Gly Gly Gly Gly
    210                 215                 220

Ser Gly Gly Gly Gly Ser Asp Ile Gln Met Thr Gln Ser Pro Ser Ser
225                 230                 235                 240

Leu Ser Ala Ser Val Gly Asp Arg Val Thr Ile Asn Cys Gln Ala Ser
                245                 250                 255

Glu Ser Ile Ser Ser Trp Leu Ala Trp Tyr Gln Gln Lys Pro Gly Lys
            260                 265                 270

Arg Pro Lys Leu Leu Ile Tyr Lys Ala Ser Thr Leu Ala Ser Gly Val
        275                 280                 285

Pro Ser Arg Phe Ser Gly Ser Gly Ser Gly Thr Asp Tyr Thr Leu Thr
    290                 295                 300

Ile Ser Ser Leu Gln Pro Glu Asp Phe Ala Thr Tyr Tyr Cys Gln Gly
305                 310                 315                 320

Tyr Tyr Leu Asp Ser Ser Val Asp Asp Asn Val Phe Gly Gly Gly Thr
                325                 330                 335

Lys Leu Thr Val Leu Gly Gly Gly Gly Ser Gly Gly Gly Gly Ser
```

```
                    340                 345                 350
Gly Gly Gly Gly Ser Gly Gly Gly Ser Glu Val Gln Leu Val Glu
                355                 360                 365

Ser Gly Gly Gly Leu Val Gln Pro Gly Gly Ser Leu Arg Leu Ser Cys
            370                 375                 380

Ala Ala Ser Gly Ile Asp Phe Ser Thr Tyr Gly Ile Ser Trp Val Arg
385                 390                 395                 400

Gln Ala Pro Gly Lys Gly Leu Glu Trp Ile Ala Tyr Ile Tyr Pro Asp
                405                 410                 415

Tyr Gly Ile Thr Asp Tyr Ala Ser Trp Val Asn Gly Arg Phe Thr Ile
                420                 425                 430

Ser Leu Asp Asn Ala Gln Asn Thr Val Tyr Leu Gln Met Asn Ser Leu
            435                 440                 445

Arg Ala Glu Asp Thr Ala Val Tyr Tyr Cys Ala Arg Ser Gly Ser Tyr
            450                 455                 460

Tyr Ser Arg Gly Trp Gly Ala His Tyr Phe Asn Leu Trp Gly Gln Gly
465                 470                 475                 480

Thr Leu Val Thr Val Ser Ser
                485
```

```
<210> SEQ ID NO 139
<211> LENGTH: 488
<212> TYPE: PRT
<213> ORGANISM: Artificial Sequence
<220> FEATURE:
<223> OTHER INFORMATION: artificial antibody-related sequence

<400> SEQUENCE: 139

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Ser Phe Ser Ser Asp
            20                  25                  30

Tyr Trp Met Cys Trp Val Arg Gln Ala Pro Gly Lys Gly Leu Glu Trp
        35                  40                  45

Ile Gly Cys Ile Tyr Ala Gly Asp Val Asp Asp Thr Asp Tyr Ala Ser
50                  55                  60

Trp Ala Arg Gly Arg Phe Thr Ile Ser Arg Asp Asn Ser Lys Asn Thr
65                  70                  75                  80

Val Tyr Leu Gln Met Asn Ser Leu Arg Ala Glu Asp Thr Ala Val Tyr
                85                  90                  95

Tyr Cys Ala Arg Val Asp Gly Phe Asp Ile Thr Tyr Phe Asp Leu Trp
            100                 105                 110

Gly Gln Gly Thr Leu Val Thr Val Ser Ser Ala Ser Thr Lys Gly Pro
        115                 120                 125

Ser Val Phe Pro Leu Ala Pro Ser Ser Lys Ser Thr Ser Gly Gly Thr
    130                 135                 140

Ala Ala Leu Gly Cys Leu Val Lys Asp Tyr Phe Pro Glu Pro Val Thr
145                 150                 155                 160

Val Ser Trp Asn Ser Gly Ala Leu Thr Ser Gly Val His Thr Phe Pro
                165                 170                 175

Ala Val Leu Gln Ser Ser Gly Leu Tyr Ser Leu Ser Ser Val Val Thr
            180                 185                 190

Val Pro Ser Ser Ser Leu Gly Thr Gln Thr Tyr Ile Cys Asn Val Asn
        195                 200                 205

His Lys Pro Ser Asn Thr Lys Val Asp Lys Lys Val Glu Pro Lys Ser
```

```
                      210                 215                 220
Cys Gly Gly Gly Ser Gly Gly Gly Ser Asp Ile Gln Met Thr
225                 230                 235                 240

Gln Ser Pro Ser Ser Leu Ser Ala Ser Val Gly Asp Arg Val Thr Ile
                245                 250                 255

Thr Cys Gln Ser Ser Glu Ser Val Tyr Ser Asn Asn Gln Leu Ser Trp
                260                 265                 270

Tyr Gln Gln Lys Pro Gly Gln Pro Pro Lys Leu Leu Ile Tyr Asp Ala
            275                 280                 285

Ser Asp Leu Ala Ser Gly Val Pro Ser Arg Phe Ser Gly Ser Gly Ser
        290                 295                 300

Gly Thr Asp Phe Thr Leu Thr Ile Ser Ser Leu Gln Pro Glu Asp Phe
305                 310                 315                 320

Ala Thr Tyr Tyr Cys Ala Gly Phe Ser Ser Ser Asp Thr Ala
                325                 330                 335

Phe Gly Gly Gly Thr Lys Leu Thr Val Leu Gly Gly Gly Gly Ser
                340                 345                 350

Gly Gly Gly Gly Ser Gly Gly Gly Ser Gly Gly Gly Gly Ser Glu
            355                 360                 365

Val Gln Leu Val Glu Ser Gly Gly Leu Val Gln Pro Gly Gly Ser
        370                 375                 380

Leu Arg Leu Ser Cys Ala Ala Ser Gly Phe Ser Leu Ser Ser Asn Ala
385                 390                 395                 400

Met Gly Trp Val Arg Gln Ala Pro Gly Lys Gly Leu Glu Tyr Ile Gly
                405                 410                 415

Ile Ile Ser Val Gly Gly Phe Thr Tyr Tyr Ala Ser Trp Ala Lys Gly
                420                 425                 430

Arg Phe Thr Ile Ser Arg Asp Asn Ser Lys Asn Thr Val Tyr Leu Gln
                435                 440                 445

Met Asn Ser Leu Arg Ala Glu Asp Thr Ala Thr Tyr Phe Cys Ala Arg
            450                 455                 460

Asp Arg His Gly Gly Asp Ser Ser Gly Ala Phe Tyr Leu Trp Gly Gln
465                 470                 475                 480

Gly Thr Leu Val Thr Val Ser Ser
                485
```

<210> SEQ ID NO 140
<211> LENGTH: 484
<212> TYPE: PRT
<213> ORGANISM: Artificial Sequence
<220> FEATURE:
<223> OTHER INFORMATION: artificial antibody-related sequence

<400> SEQUENCE: 140

```
Asp Ile Gln Met Thr Gln Ser Pro Ser Ser Leu Ser Ala Ser Val Gly
1               5                   10                  15

Asp Arg Val Thr Ile Asn Cys Gln Ala Ser Glu Ser Ile Ser Ser Trp
            20                  25                  30

Leu Ala Trp Tyr Gln Gln Lys Pro Gly Lys Arg Pro Lys Leu Leu Ile
        35                  40                  45

Tyr Lys Ala Ser Thr Leu Ala Ser Gly Val Pro Ser Arg Phe Ser Gly
    50                  55                  60

Ser Gly Ser Gly Thr Asp Tyr Thr Leu Thr Ile Ser Ser Leu Gln Pro
65                  70                  75                  80

Glu Asp Phe Ala Thr Tyr Tyr Cys Gln Gly Tyr Tyr Leu Asp Ser Ser
```

```
                85                  90                  95
Val Asp Asp Asn Val Phe Gly Gly Thr Lys Leu Thr Val Leu Gly
            100                 105                 110

Arg Thr Arg Thr Val Ala Ala Pro Ser Val Phe Ile Phe Pro Pro Ser
            115                 120                 125

Asp Glu Gln Leu Lys Ser Gly Thr Ala Ser Val Val Cys Leu Leu Asn
            130                 135                 140

Asn Phe Tyr Pro Arg Glu Ala Lys Val Gln Trp Lys Val Asp Asn Ala
145                 150                 155                 160

Leu Gln Ser Gly Asn Ser Gln Glu Ser Val Thr Glu Gln Asp Ser Lys
            165                 170                 175

Asp Ser Thr Tyr Ser Leu Ser Ser Thr Leu Thr Leu Ser Lys Ala Asp
            180                 185                 190

Tyr Glu Lys His Lys Val Tyr Ala Cys Glu Val Thr His Gln Gly Leu
            195                 200                 205

Ser Ser Pro Val Thr Lys Ser Phe Asn Arg Gly Glu Cys Gly Gly Gly
            210                 215                 220

Gly Ser Gly Gly Gly Gly Ser Asp Ile Gln Met Thr Gln Ser Pro Ser
225                 230                 235                 240

Ser Leu Ser Ala Ser Val Gly Asp Arg Val Thr Ile Thr Cys Gln Ser
            245                 250                 255

Ser Glu Ser Val Tyr Ser Asn Asn Gln Leu Ser Trp Tyr Gln Gln Lys
            260                 265                 270

Pro Gly Gln Pro Pro Lys Leu Leu Ile Tyr Asp Ala Ser Asp Leu Ala
            275                 280                 285

Ser Gly Val Pro Ser Arg Phe Ser Gly Ser Gly Ser Gly Thr Asp Phe
            290                 295                 300

Thr Leu Thr Ile Ser Ser Leu Gln Pro Glu Asp Phe Ala Thr Tyr Tyr
305                 310                 315                 320

Cys Ala Gly Gly Phe Ser Ser Ser Asp Thr Ala Phe Gly Gly Gly
            325                 330                 335

Thr Lys Leu Thr Val Leu Gly Gly Gly Gly Ser Gly Gly Gly Gly
            340                 345                 350

Ser Gly Gly Gly Gly Ser Gly Gly Gly Ser Glu Val Gln Leu Val
            355                 360                 365

Glu Ser Gly Gly Leu Val Gln Pro Gly Gly Ser Leu Arg Leu Ser
            370                 375                 380

Cys Ala Ala Ser Gly Phe Ser Leu Ser Ser Asn Ala Met Gly Trp Val
385                 390                 395                 400

Arg Gln Ala Pro Gly Lys Gly Leu Glu Tyr Ile Gly Ile Ile Ser Val
            405                 410                 415

Gly Gly Phe Thr Tyr Tyr Ala Ser Trp Ala Lys Gly Arg Phe Thr Ile
            420                 425                 430

Ser Arg Asp Asn Ser Lys Asn Thr Val Tyr Leu Gln Met Asn Ser Leu
            435                 440                 445

Arg Ala Glu Asp Thr Ala Thr Tyr Phe Cys Ala Arg Asp Arg His Gly
            450                 455                 460

Gly Asp Ser Ser Gly Ala Phe Tyr Leu Trp Gly Gln Gly Thr Leu Val
465                 470                 475                 480

Thr Val Ser Ser

<210> SEQ ID NO 141
<211> LENGTH: 491
```

```
<212> TYPE: PRT
<213> ORGANISM: Artificial Sequence
<220> FEATURE:
<223> OTHER INFORMATION: artificial antibody-related sequence

<400> SEQUENCE: 141
```

| | | | | | | | | | | | | | | |
|---|---|---|---|---|---|---|---|---|---|---|---|---|---|---|
| Glu | Val | Gln | Leu | Val | Glu | Ser | Gly | Gly | Gly | Leu | Val | Gln | Pro | Gly | Gly |
| 1 | | | | 5 | | | | | 10 | | | | | 15 | |
| Ser | Leu | Arg | Leu | Ser | Cys | Ala | Ala | Ser | Gly | Ile | Asp | Phe | Ser | Thr | Tyr |
| | | | 20 | | | | | 25 | | | | | 30 | | |
| Gly | Ile | Ser | Trp | Val | Arg | Gln | Ala | Pro | Gly | Lys | Gly | Leu | Glu | Trp | Ile |
| | | 35 | | | | | 40 | | | | | 45 | | | |
| Ala | Tyr | Ile | Tyr | Pro | Asp | Tyr | Gly | Ile | Thr | Asp | Tyr | Ala | Ser | Trp | Val |
| | 50 | | | | | 55 | | | | | 60 | | | | |
| Asn | Gly | Arg | Phe | Thr | Ile | Ser | Leu | Asp | Asn | Ala | Gln | Asn | Thr | Val | Tyr |
| 65 | | | | | 70 | | | | | 75 | | | | | 80 |
| Leu | Gln | Met | Asn | Ser | Leu | Arg | Ala | Glu | Asp | Thr | Ala | Val | Tyr | Tyr | Cys |
| | | | | 85 | | | | | 90 | | | | | 95 | |
| Ala | Arg | Ser | Gly | Ser | Tyr | Tyr | Ser | Arg | Gly | Trp | Gly | Ala | His | Tyr | Phe |
| | | | 100 | | | | | 105 | | | | | 110 | | |
| Asn | Leu | Trp | Gly | Gln | Gly | Thr | Leu | Val | Thr | Val | Ser | Ser | Ala | Ser | Thr |
| | | 115 | | | | | 120 | | | | | 125 | | | |
| Lys | Gly | Pro | Ser | Val | Phe | Pro | Leu | Ala | Pro | Ser | Ser | Lys | Ser | Thr | Ser |
| | 130 | | | | | 135 | | | | | 140 | | | | |
| Gly | Gly | Thr | Ala | Ala | Leu | Gly | Cys | Leu | Val | Lys | Asp | Tyr | Phe | Pro | Glu |
| 145 | | | | | 150 | | | | | 155 | | | | | 160 |
| Pro | Val | Thr | Val | Ser | Trp | Asn | Ser | Gly | Ala | Leu | Thr | Ser | Gly | Val | His |
| | | | | 165 | | | | | 170 | | | | | 175 | |
| Thr | Phe | Pro | Ala | Val | Leu | Gln | Ser | Ser | Gly | Leu | Tyr | Ser | Leu | Ser | Ser |
| | | | 180 | | | | | 185 | | | | | 190 | | |
| Val | Val | Thr | Val | Pro | Ser | Ser | Ser | Leu | Gly | Thr | Gln | Thr | Tyr | Ile | Cys |
| | | 195 | | | | | 200 | | | | | 205 | | | |
| Asn | Val | Asn | His | Lys | Pro | Ser | Asn | Thr | Lys | Val | Asp | Lys | Lys | Val | Glu |
| | 210 | | | | | 215 | | | | | 220 | | | | |
| Pro | Lys | Ser | Cys | Gly | Gly | Gly | Ser | Gly | Gly | Gly | Ser | Asp | Ile | | |
| 225 | | | | | 230 | | | | | 235 | | | | 240 | |
| Gln | Met | Thr | Gln | Ser | Pro | Ser | Ser | Leu | Ser | Ala | Ser | Val | Gly | Asp | Arg |
| | | | | 245 | | | | | 250 | | | | | 255 | |
| Val | Thr | Ile | Thr | Cys | Gln | Ala | Ser | Gln | Thr | Ile | Asn | Tyr | Trp | Leu | Ala |
| | | | 260 | | | | | 265 | | | | | 270 | | |
| Trp | Tyr | Gln | Gln | Lys | Pro | Gly | Lys | Ala | Pro | Lys | Leu | Leu | Ile | Tyr | Arg |
| | | 275 | | | | | 280 | | | | | 285 | | | |
| Ala | Ser | Thr | Leu | Ala | Ser | Gly | Val | Pro | Ser | Arg | Phe | Ser | Gly | Ser | Gly |
| | 290 | | | | | 295 | | | | | 300 | | | | |
| Ser | Gly | Thr | Asp | Phe | Thr | Leu | Thr | Ile | Ser | Ser | Leu | Gln | Pro | Glu | Asp |
| 305 | | | | | 310 | | | | | 315 | | | | | 320 |
| Phe | Ala | Thr | Tyr | Tyr | Cys | Gln | Asn | Tyr | Tyr | Ser | Thr | Ser | Arg | Ser | |
| | | | | 325 | | | | | 330 | | | | | 335 | |
| Tyr | Gly | Phe | Gly | Gly | Gly | Thr | Lys | Leu | Thr | Val | Leu | Gly | Gly | Gly | Gly |
| | | | 340 | | | | | 345 | | | | | 350 | | |
| Gly | Ser | Gly | Gly | Gly | Gly | Ser | Gly | Gly | Gly | Gly | Ser | Gly | Gly | Gly | Gly |
| | | 355 | | | | | 360 | | | | | 365 | | | |
| Ser | Glu | Val | Gln | Leu | Val | Glu | Ser | Gly | Gly | Gly | Leu | Val | Gln | Pro | Gly |
| | 370 | | | | | 375 | | | | | 380 | | | | |

```
Gly Ser Leu Arg Leu Ser Cys Ala Ala Ser Gly Phe Ser Phe Ser Ser
385                 390                 395                 400

Asp Tyr Trp Met Cys Trp Val Arg Gln Ala Pro Gly Lys Gly Leu Glu
            405                 410                 415

Trp Ile Gly Cys Ile Tyr Ala Gly Asp Val Asp Thr Asp Tyr Ala
            420                 425                 430

Ser Trp Ala Arg Gly Arg Phe Thr Ile Ser Arg Asp Asn Ser Lys Asn
        435                 440                 445

Thr Val Tyr Leu Gln Met Asn Ser Leu Arg Ala Glu Asp Thr Ala Val
        450                 455                 460

Tyr Tyr Cys Ala Arg Val Asp Gly Phe Asp Ile Thr Tyr Phe Asp Leu
465                 470                 475                 480

Trp Gly Gln Gly Thr Leu Val Thr Val Ser Ser
                485                 490

<210> SEQ ID NO 142
<211> LENGTH: 763
<212> TYPE: PRT
<213> ORGANISM: Artificial Sequence
<220> FEATURE:
<223> OTHER INFORMATION: artificial antibody-related sequence

<400> SEQUENCE: 142

Asp Ile Gln Met Thr Gln Ser Pro Ser Ser Leu Ser Ala Ser Val Gly
1               5                   10                  15

Asp Arg Val Thr Ile Thr Cys Gln Ala Ser Gln Thr Ile Asn Tyr Trp
            20                  25                  30

Leu Ala Trp Tyr Gln Gln Lys Pro Gly Lys Ala Pro Lys Leu Leu Ile
        35                  40                  45

Tyr Arg Ala Ser Thr Leu Ala Ser Gly Val Pro Ser Arg Phe Ser Gly
50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Asn Tyr Tyr Ser Thr Ser
                85                  90                  95

Arg Ser Tyr Gly Phe Gly Gly Gly Thr Lys Leu Thr Val Leu Gly Gly
            100                 105                 110

Gly Gly Gly Ser Glu Val Gln Leu Val Glu Ser Gly Gly Gly Leu Val
        115                 120                 125

Gln Pro Gly Gly Ser Leu Arg Leu Ser Cys Ala Ala Ser Gly Phe Ser
130                 135                 140

Leu Ser Ser Asn Ala Met Gly Trp Val Arg Gln Ala Pro Gly Lys Gly
145                 150                 155                 160

Leu Glu Tyr Ile Gly Ile Ile Ser Val Gly Gly Phe Thr Tyr Tyr Ala
            165                 170                 175

Ser Trp Ala Lys Gly Arg Phe Thr Ile Ser Arg Asp Asn Ser Lys Asn
        180                 185                 190

Thr Val Tyr Leu Gln Met Asn Ser Leu Arg Ala Glu Asp Thr Ala Thr
        195                 200                 205

Tyr Phe Cys Ala Arg Asp Arg His Gly Gly Asp Ser Ser Gly Ala Phe
210                 215                 220

Tyr Leu Trp Gly Gln Gly Thr Leu Val Thr Val Ser Ser Gly Gly
225                 230                 235                 240

Gly Ser Gly Gly Gly Gly Ser Gly Gly Gly Gly Ser Gly Gly Gly Gly
            245                 250                 255
```

```
Ser Asp Ile Gln Met Thr Gln Ser Pro Ser Ser Leu Ser Ala Ser Val
            260                 265                 270

Gly Asp Arg Val Thr Ile Thr Cys Gln Ser Ser Glu Ser Val Tyr Ser
            275                 280                 285

Asn Asn Gln Leu Ser Trp Tyr Gln Gln Lys Pro Gly Gln Pro Pro Lys
            290                 295                 300

Leu Leu Ile Tyr Asp Ala Ser Asp Leu Ala Ser Gly Val Pro Ser Arg
305                 310                 315                 320

Phe Ser Gly Ser Gly Ser Gly Thr Asp Phe Thr Leu Thr Ile Ser Ser
                325                 330                 335

Leu Gln Pro Glu Asp Phe Ala Thr Tyr Tyr Cys Ala Gly Gly Phe Ser
            340                 345                 350

Ser Ser Ser Asp Thr Ala Phe Gly Gly Gly Thr Lys Leu Thr Val Leu
            355                 360                 365

Gly Gly Gly Gly Ser Glu Val Gln Leu Val Glu Ser Gly Gly Gly
            370                 375                 380

Leu Val Gln Pro Gly Gly Ser Leu Arg Leu Ser Cys Ala Ala Ser Gly
385                 390                 395                 400

Phe Ser Phe Ser Ser Asp Tyr Trp Met Cys Trp Val Arg Gln Ala Pro
                405                 410                 415

Gly Lys Gly Leu Glu Trp Ile Gly Cys Ile Tyr Ala Gly Asp Val Asp
            420                 425                 430

Asp Thr Asp Tyr Ala Ser Trp Ala Arg Gly Arg Phe Thr Ile Ser Arg
            435                 440                 445

Asp Asn Ser Lys Asn Thr Val Tyr Leu Gln Met Asn Ser Leu Arg Ala
450                 455                 460

Glu Asp Thr Ala Val Tyr Tyr Cys Ala Arg Val Asp Gly Phe Asp Ile
465                 470                 475                 480

Thr Tyr Phe Asp Leu Trp Gly Gln Gly Thr Leu Val Thr Val Ser Ser
                485                 490                 495

Gly Gly Gly Gly Ser Gly Gly Gly Ser Asp Ile Gln Met Thr Gln
            500                 505                 510

Ser Pro Ser Ser Leu Ser Ala Ser Val Gly Asp Arg Val Thr Ile Asn
            515                 520                 525

Cys Gln Ala Ser Glu Ser Ile Ser Ser Trp Leu Ala Trp Tyr Gln Gln
530                 535                 540

Lys Pro Gly Lys Arg Pro Lys Leu Leu Ile Tyr Lys Ala Ser Thr Leu
545                 550                 555                 560

Ala Ser Gly Val Pro Ser Arg Phe Ser Gly Ser Gly Ser Gly Thr Asp
            565                 570                 575

Tyr Thr Leu Thr Ile Ser Ser Leu Gln Pro Glu Asp Phe Ala Thr Tyr
                580                 585                 590

Tyr Cys Gln Gly Tyr Tyr Leu Asp Ser Ser Val Asp Asp Asn Val Phe
            595                 600                 605

Gly Gly Gly Thr Lys Leu Thr Val Leu Gly Gly Gly Gly Ser Gly
            610                 615                 620

Gly Gly Ser Gly Gly Gly Ser Gly Gly Gly Ser Glu Val
625                 630                 635                 640

Gln Leu Val Glu Ser Gly Gly Leu Val Gln Pro Gly Gly Ser Leu
                645                 650                 655

Arg Leu Ser Cys Ala Ala Ser Gly Ile Asp Phe Ser Thr Tyr Gly Ile
            660                 665                 670

Ser Trp Val Arg Gln Ala Pro Gly Lys Gly Leu Glu Trp Ile Ala Tyr
```

```
                675                 680                 685
Ile Tyr Pro Asp Tyr Gly Ile Thr Asp Tyr Ala Ser Trp Val Asn Gly
            690                 695                 700

Arg Phe Thr Ile Ser Leu Asp Asn Ala Gln Asn Thr Val Tyr Leu Gln
705                 710                 715                 720

Met Asn Ser Leu Arg Ala Glu Asp Thr Ala Val Tyr Tyr Cys Ala Arg
                725                 730                 735

Ser Gly Ser Tyr Tyr Ser Arg Gly Trp Gly Ala His Tyr Phe Asn Leu
            740                 745                 750

Trp Gly Gln Gly Thr Leu Val Thr Val Ser Ser
        755                 760

<210> SEQ ID NO 143
<211> LENGTH: 763
<212> TYPE: PRT
<213> ORGANISM: Artificial Sequence
<220> FEATURE:
<223> OTHER INFORMATION: artificial antibody-related sequence

<400> SEQUENCE: 143

Asp Ile Gln Met Thr Gln Ser Pro Ser Ser Leu Ser Ala Ser Val Gly
1               5                   10                  15

Asp Arg Val Thr Ile Asn Cys Gln Ala Ser Glu Ser Ile Ser Ser Trp
            20                  25                  30

Leu Ala Trp Tyr Gln Gln Lys Pro Gly Lys Arg Pro Lys Leu Leu Ile
        35                  40                  45

Tyr Lys Ala Ser Thr Leu Ala Ser Gly Val Pro Ser Arg Phe Ser Gly
    50                  55                  60

Ser Gly Ser Gly Thr Asp Tyr Thr Leu Thr Ile Ser Ser Leu Gln Pro
65                  70                  75                  80

Glu Asp Phe Ala Thr Tyr Tyr Cys Gln Gly Tyr Tyr Leu Asp Ser Ser
                85                  90                  95

Val Asp Asp Asn Val Phe Gly Gly Gly Thr Lys Leu Thr Val Leu Gly
            100                 105                 110

Gly Gly Gly Gly Ser Glu Val Gln Leu Val Glu Ser Gly Gly Gly Leu
        115                 120                 125

Val Gln Pro Gly Gly Ser Leu Arg Leu Ser Cys Ala Ala Ser Gly Phe
    130                 135                 140

Ser Phe Ser Ser Asp Tyr Trp Met Cys Trp Val Arg Gln Ala Pro Gly
145                 150                 155                 160

Lys Gly Leu Glu Trp Ile Gly Cys Ile Tyr Ala Gly Asp Val Asp Asp
                165                 170                 175

Thr Asp Tyr Ala Ser Trp Ala Arg Gly Arg Phe Thr Ile Ser Arg Asp
            180                 185                 190

Asn Ser Lys Asn Thr Val Tyr Leu Gln Met Asn Ser Leu Arg Ala Glu
        195                 200                 205

Asp Thr Ala Val Tyr Tyr Cys Ala Arg Val Asp Gly Phe Asp Ile Thr
    210                 215                 220

Tyr Phe Asp Leu Trp Gly Gln Gly Thr Leu Val Thr Val Ser Ser Gly
225                 230                 235                 240

Gly Gly Gly Ser Gly Gly Gly Ser Gly Gly Gly Ser Gly Gly Gly Gly
                245                 250                 255

Gly Gly Ser Asp Ile Gln Met Thr Gln Ser Pro Ser Ser Leu Ser Ala
            260                 265                 270

Ser Val Gly Asp Arg Val Thr Ile Thr Cys Gln Ala Ser Gln Thr Ile
```

```
            275                 280                 285
Asn Tyr Trp Leu Ala Trp Tyr Gln Gln Lys Pro Gly Lys Ala Pro Lys
290                 295                 300

Leu Leu Ile Tyr Arg Ala Ser Thr Leu Ala Ser Gly Val Pro Ser Arg
305                 310                 315                 320

Phe Ser Gly Ser Gly Ser Gly Thr Asp Phe Thr Leu Thr Ile Ser Ser
                    325                 330                 335

Leu Gln Pro Glu Asp Phe Ala Thr Tyr Tyr Cys Gln Asn Tyr Tyr Tyr
            340                 345                 350

Ser Thr Ser Arg Ser Tyr Gly Phe Gly Gly Thr Lys Leu Thr Val
                355                 360                 365

Leu Gly Gly Gly Gly Ser Glu Val Gln Leu Val Glu Ser Gly Gly
370                 375                 380

Gly Leu Val Gln Pro Gly Gly Ser Leu Arg Leu Ser Cys Ala Ala Ser
385                 390                 395                 400

Gly Ile Asp Phe Ser Thr Tyr Gly Ile Ser Trp Val Arg Gln Ala Pro
                    405                 410                 415

Gly Lys Gly Leu Glu Trp Ile Ala Tyr Ile Tyr Pro Asp Tyr Gly Ile
            420                 425                 430

Thr Asp Tyr Ala Ser Trp Val Asn Gly Arg Phe Thr Ile Ser Leu Asp
                435                 440                 445

Asn Ala Gln Asn Thr Val Tyr Leu Gln Met Asn Ser Leu Arg Ala Glu
            450                 455                 460

Asp Thr Ala Val Tyr Tyr Cys Ala Arg Ser Gly Ser Tyr Tyr Ser Arg
465                 470                 475                 480

Gly Trp Gly Ala His Tyr Phe Asn Leu Trp Gly Gln Gly Thr Leu Val
                    485                 490                 495

Thr Val Ser Ser Gly Gly Gly Ser Gly Gly Gly Ser Asp Ile
            500                 505                 510

Gln Met Thr Gln Ser Pro Ser Ser Leu Ser Ala Ser Val Gly Asp Arg
                515                 520                 525

Val Thr Ile Thr Cys Gln Ser Ser Glu Ser Val Tyr Ser Asn Asn Gln
530                 535                 540

Leu Ser Trp Tyr Gln Gln Lys Pro Gly Gln Pro Pro Lys Leu Leu Ile
545                 550                 555                 560

Tyr Asp Ala Ser Asp Leu Ala Ser Gly Val Pro Ser Arg Phe Ser Gly
                    565                 570                 575

Ser Gly Ser Gly Thr Asp Phe Thr Leu Thr Ile Ser Ser Leu Gln Pro
            580                 585                 590

Glu Asp Phe Ala Thr Tyr Tyr Cys Ala Gly Gly Phe Ser Ser Ser Ser
                595                 600                 605

Asp Thr Ala Phe Gly Gly Gly Thr Lys Leu Thr Val Leu Gly Gly Gly
            610                 615                 620

Gly Gly Ser Gly Gly Gly Gly Ser Gly Gly Gly Gly Ser Gly Gly Gly
625                 630                 635                 640

Gly Ser Glu Val Gln Leu Val Glu Ser Gly Gly Gly Leu Val Gln Pro
                    645                 650                 655

Gly Gly Ser Leu Arg Leu Ser Cys Ala Ala Ser Gly Phe Ser Leu Ser
            660                 665                 670

Ser Asn Ala Met Gly Trp Val Arg Gln Ala Pro Gly Lys Gly Leu Glu
                675                 680                 685

Tyr Ile Gly Ile Ile Ser Val Gly Gly Phe Thr Tyr Tyr Ala Ser Trp
            690                 695                 700
```

```
Ala Lys Gly Arg Phe Thr Ile Ser Arg Asp Asn Ser Lys Asn Thr Val
705                 710                 715                 720

Tyr Leu Gln Met Asn Ser Leu Arg Ala Glu Asp Ala Thr Tyr Phe
            725                 730                 735

Cys Ala Arg Asp Arg His Gly Gly Asp Ser Ser Gly Ala Phe Tyr Leu
            740                 745                 750

Trp Gly Gln Gly Thr Leu Val Thr Val Ser Ser
        755                 760
```

<210> SEQ ID NO 144
<211> LENGTH: 763
<212> TYPE: PRT
<213> ORGANISM: Artificial Sequence
<220> FEATURE:
<223> OTHER INFORMATION: artificial antibody-related sequence

<400> SEQUENCE: 144

```
Asp Ile Gln Met Thr Gln Ser Pro Ser Ser Leu Ser Ala Ser Val Gly
1               5                   10                  15

Asp Arg Val Thr Ile Thr Cys Gln Ser Ser Glu Ser Val Tyr Ser Asn
            20                  25                  30

Asn Gln Leu Ser Trp Tyr Gln Gln Lys Pro Gly Gln Pro Pro Lys Leu
        35                  40                  45

Leu Ile Tyr Asp Ala Ser Asp Leu Ala Ser Gly Val Pro Ser Arg Phe
    50                  55                  60

Ser Gly Ser Gly Ser Gly Thr Asp Phe Thr Leu Thr Ile Ser Ser Leu
65                  70                  75                  80

Gln Pro Glu Asp Phe Ala Thr Tyr Tyr Cys Ala Gly Gly Phe Ser Ser
                85                  90                  95

Ser Ser Asp Thr Ala Phe Gly Gly Gly Thr Lys Leu Thr Val Leu Gly
            100                 105                 110

Gly Gly Gly Gly Ser Glu Val Gln Leu Val Glu Ser Gly Gly Gly Leu
        115                 120                 125

Val Gln Pro Gly Gly Ser Leu Arg Leu Ser Cys Ala Ala Ser Gly Ile
    130                 135                 140

Asp Phe Ser Thr Tyr Gly Ile Ser Trp Val Arg Gln Ala Pro Gly Lys
145                 150                 155                 160

Gly Leu Glu Trp Ile Ala Tyr Ile Tyr Pro Asp Tyr Gly Ile Thr Asp
                165                 170                 175

Tyr Ala Ser Trp Val Asn Gly Arg Phe Thr Ile Ser Leu Asp Asn Ala
            180                 185                 190

Gln Asn Thr Val Tyr Leu Gln Met Asn Ser Leu Arg Ala Glu Asp Thr
        195                 200                 205

Ala Val Tyr Tyr Cys Ala Arg Ser Gly Ser Tyr Tyr Ser Arg Gly Trp
    210                 215                 220

Gly Ala His Tyr Phe Asn Leu Trp Gly Gln Gly Thr Leu Val Thr Val
225                 230                 235                 240

Ser Ser Gly Gly Gly Gly Ser Gly Gly Gly Gly Ser Gly Gly Gly Gly
                245                 250                 255

Ser Gly Gly Gly Gly Ser Asp Ile Gln Met Thr Gln Ser Pro Ser Ser
            260                 265                 270

Leu Ser Ala Ser Val Gly Asp Arg Val Thr Ile Asn Cys Gln Ala Ser
        275                 280                 285

Glu Ser Ile Ser Ser Trp Leu Ala Trp Tyr Gln Gln Lys Pro Gly Lys
    290                 295                 300
```

```
Arg Pro Lys Leu Leu Ile Tyr Lys Ala Ser Thr Leu Ala Ser Gly Val
305                 310                 315                 320

Pro Ser Arg Phe Ser Gly Ser Gly Ser Gly Thr Asp Tyr Thr Leu Thr
            325                 330                 335

Ile Ser Ser Leu Gln Pro Glu Asp Phe Ala Thr Tyr Tyr Cys Gln Gly
            340                 345                 350

Tyr Tyr Leu Asp Ser Ser Val Asp Asp Asn Val Phe Gly Gly Gly Thr
            355                 360                 365

Lys Leu Thr Val Leu Gly Gly Gly Gly Ser Glu Val Gln Leu Val
370                 375                 380

Glu Ser Gly Gly Gly Leu Val Gln Pro Gly Gly Ser Leu Arg Leu Ser
385                 390                 395                 400

Cys Ala Ala Ser Gly Phe Ser Leu Ser Ser Asn Ala Met Gly Trp Val
            405                 410                 415

Arg Gln Ala Pro Gly Lys Gly Leu Glu Tyr Ile Gly Ile Ile Ser Val
            420                 425                 430

Gly Gly Phe Thr Tyr Tyr Ala Ser Trp Ala Lys Gly Arg Phe Thr Ile
            435                 440                 445

Ser Arg Asp Asn Ser Lys Asn Thr Val Tyr Leu Gln Met Asn Ser Leu
450                 455                 460

Arg Ala Glu Asp Thr Ala Thr Tyr Phe Cys Ala Arg Asp Arg His Gly
465                 470                 475                 480

Gly Asp Ser Ser Gly Ala Phe Tyr Leu Trp Gly Gln Gly Thr Leu Val
            485                 490                 495

Thr Val Ser Ser Gly Gly Gly Gly Ser Gly Gly Gly Gly Ser Asp Ile
            500                 505                 510

Gln Met Thr Gln Ser Pro Ser Ser Leu Ser Ala Ser Val Gly Asp Arg
            515                 520                 525

Val Thr Ile Thr Cys Gln Ala Ser Gln Thr Ile Asn Tyr Trp Leu Ala
530                 535                 540

Trp Tyr Gln Gln Lys Pro Gly Lys Ala Pro Lys Leu Leu Ile Tyr Arg
545                 550                 555                 560

Ala Ser Thr Leu Ala Ser Gly Val Pro Ser Arg Phe Ser Gly Ser Gly
            565                 570                 575

Ser Gly Thr Asp Phe Thr Leu Thr Ile Ser Ser Leu Gln Pro Glu Asp
            580                 585                 590

Phe Ala Thr Tyr Tyr Cys Gln Asn Tyr Tyr Ser Thr Ser Arg Ser
            595                 600                 605

Tyr Gly Phe Gly Gly Thr Lys Leu Thr Val Leu Gly Gly Gly Gly
            610                 615                 620

Gly Ser Gly Gly Gly Gly Ser Gly Gly Gly Ser Gly Gly Gly Gly
625                 630                 635                 640

Ser Glu Val Gln Leu Val Glu Ser Gly Gly Leu Val Gln Pro Gly
            645                 650                 655

Gly Ser Leu Arg Leu Ser Cys Ala Ala Ser Gly Phe Ser Phe Ser Ser
            660                 665                 670

Asp Tyr Trp Met Cys Trp Val Arg Gln Ala Pro Gly Lys Gly Leu Glu
            675                 680                 685

Trp Ile Gly Cys Ile Tyr Ala Gly Asp Val Asp Thr Asp Tyr Ala
            690                 695                 700

Ser Trp Ala Arg Gly Arg Phe Thr Ile Ser Arg Asp Asn Ser Lys Asn
705                 710                 715                 720
```

-continued

Thr Val Tyr Leu Gln Met Asn Ser Leu Arg Ala Glu Asp Thr Ala Val
                    725                 730                 735

Tyr Tyr Cys Ala Arg Val Asp Gly Phe Asp Ile Thr Tyr Phe Asp Leu
            740                 745                 750

Trp Gly Gln Gly Thr Leu Val Thr Val Ser Ser
        755                 760

<210> SEQ ID NO 145
<211> LENGTH: 763
<212> TYPE: PRT
<213> ORGANISM: Artificial Sequence
<220> FEATURE:
<223> OTHER INFORMATION: artificial antibody-related sequence

<400> SEQUENCE: 145

Asp Ile Gln Met Thr Gln Ser Pro Ser Ser Leu Ser Ala Ser Val Gly
1               5                   10                  15

Asp Arg Val Thr Ile Asn Cys Gln Ala Ser Glu Ser Ile Ser Ser Trp
            20                  25                  30

Leu Ala Trp Tyr Gln Gln Lys Pro Gly Lys Arg Pro Lys Leu Leu Ile
        35                  40                  45

Tyr Lys Ala Ser Thr Leu Ala Ser Gly Val Pro Ser Arg Phe Ser Gly
50                  55                  60

Ser Gly Ser Gly Thr Asp Tyr Thr Leu Thr Ile Ser Gly Leu Gln Pro
65                  70                  75                  80

Glu Asp Phe Ala Thr Tyr Tyr Cys Gln Gly Tyr Tyr Leu Asp Ser Ser
                85                  90                  95

Val Asp Asp Asn Val Phe Gly Thr Gly Thr Lys Val Thr Val Leu Gly
            100                 105                 110

Gly Gly Gly Gly Ser Glu Val Gln Leu Val Glu Ser Gly Gly Gly Leu
        115                 120                 125

Val Gln Pro Gly Gly Ser Leu Arg Leu Ser Cys Ala Ala Ser Gly Phe
130                 135                 140

Ser Phe Ser Ser Asp Tyr Trp Met Cys Trp Val Arg Gln Ala Pro Gly
145                 150                 155                 160

Lys Gly Leu Glu Trp Ile Gly Cys Ile Tyr Ala Gly Asp Val Asp Asp
                165                 170                 175

Thr Asp Tyr Ala Ser Trp Ala Arg Gly Arg Phe Thr Ile Ser Arg Asp
            180                 185                 190

Asn Ser Lys Asn Thr Val Tyr Leu Gln Met Asn Ser Leu Arg Ala Glu
        195                 200                 205

Asp Thr Ala Val Tyr Tyr Cys Ala Arg Val Asp Gly Phe Asp Ile Thr
210                 215                 220

Tyr Phe Asp Leu Trp Gly Gln Gly Thr Leu Val Thr Val Ser Ser Gly
225                 230                 235                 240

Gly Gly Gly Ser Gly Gly Gly Gly Ser Gly Gly Gly Gly Ser Gly Gly
                245                 250                 255

Gly Gly Ser Asp Ile Gln Met Thr Gln Ser Pro Ser Ser Leu Ser Ala
            260                 265                 270

Ser Val Gly Asp Arg Val Thr Ile Thr Cys Gln Ala Ser Gln Thr Ile
        275                 280                 285

Asn Tyr Trp Leu Ala Trp Tyr Gln Gln Lys Pro Gly Lys Ala Pro Lys
    290                 295                 300

Leu Leu Ile Tyr Arg Ala Ser Thr Leu Ala Ser Gly Val Pro Ser Arg
305                 310                 315                 320

```
Phe Ser Gly Ser Gly Ser Gly Thr Asp Phe Thr Leu Thr Ile Ser Ser
                325                 330                 335

Leu Gln Pro Glu Asp Phe Ala Thr Tyr Tyr Cys Gln Asn Tyr Tyr Tyr
            340                 345                 350

Ser Thr Ser Arg Ser Tyr Gly Phe Gly Gly Thr Lys Leu Thr Val
        355                 360                 365

Leu Gly Gly Gly Gly Ser Glu Val Gln Leu Val Glu Ser Gly Gly
    370                 375                 380

Gly Leu Val Gln Pro Gly Ser Leu Arg Leu Ser Cys Ala Ala Ser
385                 390                 395                 400

Gly Ile Asp Phe Ser Thr Tyr Gly Ile Ser Trp Val Arg Gln Ala Pro
                405                 410                 415

Gly Lys Gly Leu Glu Trp Ile Ala Tyr Ile Tyr Pro Asp Tyr Gly Ile
            420                 425                 430

Thr Asp Tyr Ala Ser Trp Val Asn Gly Arg Phe Thr Ile Ser Leu Asp
        435                 440                 445

Asn Ala Gln Asn Thr Val Tyr Leu Gln Met Asn Ser Leu Arg Ala Glu
    450                 455                 460

Asp Thr Ala Val Tyr Tyr Cys Ala Arg Ser Gly Ser Tyr Tyr Ser Arg
465                 470                 475                 480

Gly Trp Gly Ala His Tyr Phe Asn Leu Trp Gly Gln Gly Thr Leu Val
                485                 490                 495

Thr Val Ser Ser Gly Gly Gly Gly Ser Gly Gly Gly Gly Ser Asp Ile
            500                 505                 510

Gln Met Thr Gln Ser Pro Ser Ser Leu Ser Ala Ser Val Gly Asp Arg
        515                 520                 525

Val Thr Ile Thr Cys Gln Ser Ser Glu Ser Val Tyr Ser Asn Asn Gln
    530                 535                 540

Leu Ser Trp Tyr Gln Gln Lys Pro Gly Gln Pro Pro Lys Leu Leu Ile
545                 550                 555                 560

Tyr Asp Ala Ser Asp Leu Ala Ser Gly Val Pro Ser Arg Phe Ser Gly
                565                 570                 575

Ser Gly Ser Gly Thr Asp Phe Thr Leu Thr Ile Ser Ser Leu Gln Pro
            580                 585                 590

Glu Asp Phe Ala Thr Tyr Tyr Cys Ala Gly Gly Phe Ser Ser Ser Ser
        595                 600                 605

Asp Thr Ala Phe Gly Gly Gly Thr Lys Leu Thr Val Leu Gly Gly Gly
    610                 615                 620

Gly Gly Ser Gly Gly Gly Gly Ser Gly Gly Gly Gly Ser Gly Gly Gly
625                 630                 635                 640

Gly Ser Glu Val Gln Leu Val Glu Ser Gly Gly Gly Leu Val Gln Pro
                645                 650                 655

Gly Gly Ser Leu Arg Leu Ser Cys Ala Ala Ser Gly Phe Ser Leu Ser
            660                 665                 670

Ser Asn Ala Met Gly Trp Val Arg Gln Ala Pro Gly Lys Gly Leu Glu
        675                 680                 685

Tyr Ile Gly Ile Ile Ser Val Gly Gly Phe Thr Tyr Tyr Ala Ser Trp
    690                 695                 700

Ala Lys Gly Arg Phe Thr Ile Ser Arg Asp Asn Ser Lys Asn Thr Val
705                 710                 715                 720

Tyr Leu Gln Met Asn Ser Leu Arg Ala Glu Asp Thr Ala Thr Tyr Phe
                725                 730                 735

Cys Ala Arg Asp Arg His Gly Gly Asp Ser Ser Gly Ala Phe Tyr Leu
```

<210> SEQ ID NO 146
<211> LENGTH: 763
<212> TYPE: PRT
<213> ORGANISM: Artificial Sequence
<220> FEATURE:
<223> OTHER INFORMATION: artificial antibody-related sequence

<400> SEQUENCE: 146

```
Trp Gly Gln Gly Thr Leu Val Thr Val Ser Ser
            755                 760

Asp Ile Gln Met Thr Gln Ser Pro Ser Ser Leu Ser Ala Ser Val Gly
1               5                   10                  15

Asp Arg Val Thr Ile Asn Cys Gln Ala Ser Glu Ser Ile Ser Ser Trp
            20                  25                  30

Leu Ala Trp Tyr Gln Gln Lys Pro Gly Gln Arg Pro Lys Leu Leu Ile
        35                  40                  45

Tyr Lys Ala Ser Thr Leu Ala Ser Gly Val Pro Ser Arg Phe Ser Gly
    50                  55                  60

Ser Gly Ser Gly Thr Asp Tyr Thr Leu Thr Ile Ser Ser Leu Gln Pro
65                  70                  75                  80

Glu Asp Phe Ala Thr Tyr Tyr Cys Gln Gly Tyr Tyr Leu Asp Ser Ser
                85                  90                  95

Val Asp Asp Asn Val Phe Gly Thr Gly Thr Lys Val Thr Val Leu Gly
            100                 105                 110

Gly Gly Gly Gly Ser Glu Val Gln Leu Val Glu Ser Gly Gly Gly Leu
        115                 120                 125

Val Gln Pro Gly Gly Ser Leu Arg Leu Ser Cys Ala Ala Ser Gly Phe
    130                 135                 140

Ser Phe Ser Ser Asp Tyr Trp Met Cys Trp Val Arg Gln Ala Pro Gly
145                 150                 155                 160

Lys Gly Leu Glu Trp Ile Gly Cys Ile Tyr Ala Gly Asp Val Asp Asp
                165                 170                 175

Thr Asp Tyr Ala Ser Trp Ala Arg Gly Arg Phe Thr Ile Ser Arg Asp
            180                 185                 190

Asn Ser Lys Asn Thr Val Tyr Leu Gln Met Asn Ser Leu Arg Ala Glu
        195                 200                 205

Asp Thr Ala Val Tyr Tyr Cys Ala Arg Val Asp Gly Phe Asp Ile Thr
    210                 215                 220

Tyr Phe Asp Leu Trp Gly Gln Gly Thr Leu Val Thr Val Ser Ser Gly
225                 230                 235                 240

Gly Gly Gly Ser Gly Gly Gly Ser Gly Gly Gly Ser Gly Gly
                245                 250                 255

Gly Gly Ser Asp Ile Gln Met Thr Gln Ser Pro Ser Ser Leu Ser Ala
            260                 265                 270

Ser Val Gly Asp Arg Val Thr Ile Thr Cys Gln Ala Ser Gln Thr Ile
        275                 280                 285

Asn Tyr Trp Leu Ala Trp Tyr Gln Gln Lys Pro Gly Lys Ala Pro Lys
    290                 295                 300

Leu Leu Ile Tyr Arg Ala Ser Thr Leu Ala Ser Gly Val Pro Ser Arg
305                 310                 315                 320

Phe Ser Gly Ser Gly Ser Gly Thr Asp Phe Thr Leu Thr Ile Ser Ser
                325                 330                 335

Leu Gln Pro Glu Asp Phe Ala Thr Tyr Tyr Cys Gln Asn Tyr Tyr Tyr
```

```
            340                 345                 350
Ser Thr Ser Arg Ser Tyr Gly Phe Gly Gly Thr Lys Leu Thr Val
            355                 360                 365

Leu Gly Gly Gly Gly Ser Glu Val Gln Leu Val Glu Ser Gly Gly
            370                 375             380

Gly Leu Val Gln Pro Gly Gly Ser Leu Arg Leu Ser Cys Ala Ala Ser
385                 390                 395                 400

Gly Ile Asp Phe Ser Thr Tyr Gly Ile Ser Trp Val Arg Gln Ala Pro
                405                 410                 415

Gly Lys Gly Leu Glu Trp Ile Ala Tyr Ile Tyr Pro Asp Tyr Gly Ile
            420                 425                 430

Thr Asp Tyr Ala Ser Trp Val Asn Gly Arg Phe Thr Ile Ser Leu Asp
                435                 440             445

Asn Ala Gln Asn Thr Val Tyr Leu Gln Met Asn Ser Leu Arg Ala Glu
            450                 455                 460

Asp Thr Ala Val Tyr Tyr Cys Ala Arg Ser Gly Ser Tyr Tyr Ser Arg
465                 470                 475                 480

Gly Trp Gly Ala His Tyr Phe Asn Leu Trp Gly Gln Gly Thr Leu Val
                485                 490                 495

Thr Val Ser Ser Gly Gly Gly Gly Ser Gly Gly Gly Gly Ser Asp Ile
            500                 505                 510

Gln Met Thr Gln Ser Pro Ser Ser Leu Ser Ala Ser Val Gly Asp Arg
            515                 520                 525

Val Thr Ile Thr Cys Gln Ser Ser Glu Ser Val Tyr Ser Asn Asn Gln
            530                 535                 540

Leu Ser Trp Tyr Gln Gln Lys Pro Gly Gln Pro Pro Lys Leu Leu Ile
545                 550                 555                 560

Tyr Asp Ala Ser Asp Leu Ala Ser Gly Val Pro Ser Arg Phe Ser Gly
                565                 570                 575

Ser Gly Ser Gly Thr Asp Phe Thr Leu Thr Ile Ser Ser Leu Gln Pro
            580                 585                 590

Glu Asp Phe Ala Thr Tyr Tyr Cys Ala Gly Gly Phe Ser Ser Ser Ser
            595                 600                 605

Asp Thr Ala Phe Gly Gly Gly Thr Lys Leu Thr Val Leu Gly Gly Gly
            610                 615             620

Gly Gly Ser Gly Gly Gly Gly Ser Gly Gly Gly Gly Ser Gly Gly Gly
625                 630                 635                 640

Gly Ser Glu Val Gln Leu Val Glu Ser Gly Gly Gly Leu Val Gln Pro
                645                 650                 655

Gly Gly Ser Leu Arg Leu Ser Cys Ala Ala Ser Gly Phe Ser Leu Ser
            660                 665                 670

Ser Asn Ala Met Gly Trp Val Arg Gln Ala Pro Gly Lys Gly Leu Glu
            675                 680                 685

Tyr Ile Gly Ile Ile Ser Val Gly Gly Phe Thr Tyr Tyr Ala Ser Trp
            690                 695             700

Ala Lys Gly Arg Phe Thr Ile Ser Arg Asp Asn Ser Lys Asn Thr Val
705                 710                 715                 720

Tyr Leu Gln Met Asn Ser Leu Arg Ala Glu Asp Thr Ala Thr Tyr Phe
                725                 730                 735

Cys Ala Arg Asp Arg His Gly Gly Asp Ser Ser Gly Ala Phe Tyr Leu
            740                 745                 750

Trp Gly Gln Gly Thr Leu Val Thr Val Ser Ser
            755                 760
```

<210> SEQ ID NO 147
<211> LENGTH: 761
<212> TYPE: PRT
<213> ORGANISM: Artificial Sequence
<220> FEATURE:
<223> OTHER INFORMATION: artificial antibody-related sequence

<400> SEQUENCE: 147

```
Asp Ile Gln Met Thr Gln Ser Pro Ser Ser Leu Ser Ala Ser Val Gly
1               5                   10                  15

Asp Arg Val Thr Ile Asn Cys Gln Ala Ser Glu Ser Ile Ser Ser Trp
            20                  25                  30

Leu Ala Trp Tyr Gln Gln Lys Pro Gly Lys Arg Pro Lys Leu Leu Ile
        35                  40                  45

Tyr Lys Ala Ser Thr Leu Ala Ser Gly Val Pro Ser Arg Phe Ser Gly
50                  55                  60

Ser Gly Ser Gly Thr Asp Tyr Thr Leu Thr Ile Ser Gly Leu Gln Pro
65                  70                  75                  80

Glu Asp Phe Ala Thr Tyr Tyr Cys Gln Gly Tyr Tyr Leu Asp Ser Ser
                85                  90                  95

Val Asp Asp Asn Val Phe Gly Thr Gly Thr Lys Val Thr Val Leu Gly
            100                 105                 110

Gly Gly Gly Gly Ser Glu Val Gln Leu Val Glu Ser Gly Gly Gly Leu
        115                 120                 125

Val Gln Pro Gly Gly Ser Leu Arg Leu Ser Cys Ala Ala Ser Gly Phe
130                 135                 140

Ser Phe Ser Ser Asp Tyr Trp Met Cys Trp Val Arg Gln Ala Pro Gly
145                 150                 155                 160

Lys Gly Leu Glu Trp Ile Gly Cys Ile Tyr Ala Gly Asp Val Asp Asp
                165                 170                 175

Thr Asp Tyr Ala Ser Trp Ala Arg Gly Arg Phe Thr Ile Ser Arg Asp
            180                 185                 190

Asn Ser Lys Asn Thr Val Tyr Leu Gln Met Asn Ser Leu Arg Ala Glu
        195                 200                 205

Asp Thr Ala Val Tyr Tyr Cys Ala Arg Val Asp Gly Phe Asp Ile Thr
210                 215                 220

Tyr Phe Asp Leu Trp Gly Gln Gly Thr Leu Val Thr Val Ser Ser Gly
225                 230                 235                 240

Gly Gly Gly Ser Gly Gly Gly Ser Gly Gly Gly Ser Gly Gly
                245                 250                 255

Gly Gly Ser Ile Gln Met Thr Gln Ser Pro Ser Ser Leu Ser Ala Ser
        260                 265                 270

Val Gly Asp Arg Val Thr Ile Thr Cys Gln Ala Ser Gln Thr Ile Asn
275                 280                 285

Tyr Trp Leu Ala Trp Tyr Gln Gln Lys Pro Gly Lys Ala Pro Lys Leu
            290                 295                 300

Leu Ile Tyr Arg Ala Ser Thr Leu Ala Ser Gly Val Pro Ser Arg Phe
305                 310                 315                 320

Ser Gly Ser Gly Ser Gly Thr Asp Phe Thr Leu Thr Ile Ser Ser Leu
                325                 330                 335

Gln Pro Glu Asp Phe Ala Thr Tyr Tyr Cys Gln Asn Tyr Tyr Tyr Ser
            340                 345                 350

Thr Ser Arg Ser Tyr Gly Phe Gly Gly Gly Thr Lys Leu Thr Val Leu
        355                 360                 365
```

Gly Gly Gly Gly Gly Ser Glu Val Gln Leu Val Glu Ser Gly Gly Gly
            370                 375                 380

Leu Val Gln Pro Gly Gly Ser Leu Arg Leu Ser Cys Ala Ala Ser Gly
385                 390                 395                 400

Ile Asp Phe Ser Thr Tyr Gly Ile Ser Trp Val Arg Gln Ala Pro Gly
                405                 410                 415

Lys Gly Leu Glu Trp Ile Ala Tyr Ile Tyr Pro Asp Tyr Gly Ile Thr
            420                 425                 430

Asp Tyr Ala Ser Trp Val Asn Gly Arg Phe Thr Ile Ser Leu Asp Asn
        435                 440                 445

Ala Gln Asn Thr Val Tyr Leu Gln Met Asn Ser Leu Arg Ala Glu Asp
    450                 455                 460

Thr Ala Val Tyr Tyr Cys Ala Arg Ser Gly Ser Tyr Tyr Ser Arg Gly
465                 470                 475                 480

Trp Gly Ala His Tyr Phe Asn Leu Trp Gly Gln Gly Thr Leu Val Thr
                485                 490                 495

Val Ser Ser Gly Gly Gly Gly Ser Gly Gly Gly Gly Ser Ile Gln Met
            500                 505                 510

Thr Gln Ser Pro Ser Ser Leu Ser Ala Ser Val Gly Asp Arg Val Thr
        515                 520                 525

Ile Thr Cys Gln Ser Ser Glu Ser Val Tyr Ser Asn Asn Gln Leu Ser
    530                 535                 540

Trp Tyr Gln Gln Lys Pro Gly Gln Pro Pro Lys Leu Leu Ile Tyr Asp
545                 550                 555                 560

Ala Ser Asp Leu Ala Ser Gly Val Pro Ser Arg Phe Ser Gly Ser Gly
                565                 570                 575

Ser Gly Thr Asp Phe Thr Leu Thr Ile Ser Ser Leu Gln Pro Glu Asp
            580                 585                 590

Phe Ala Thr Tyr Tyr Cys Ala Gly Gly Phe Ser Ser Ser Asp Thr
        595                 600                 605

Ala Phe Gly Gly Gly Thr Lys Leu Thr Val Leu Gly Gly Gly Gly
    610                 615                 620

Ser Gly Gly Gly Gly Ser Gly Gly Gly Ser Gly Gly Gly Gly Ser
625                 630                 635                 640

Glu Val Gln Leu Val Glu Ser Gly Gly Gly Leu Val Gln Pro Gly Gly
                645                 650                 655

Ser Leu Arg Leu Ser Cys Ala Ala Ser Gly Phe Ser Leu Ser Ser Asn
            660                 665                 670

Ala Met Gly Trp Val Arg Gln Ala Pro Gly Lys Gly Leu Glu Tyr Ile
        675                 680                 685

Gly Ile Ile Ser Val Gly Gly Phe Thr Tyr Tyr Ala Ser Trp Ala Lys
    690                 695                 700

Gly Arg Phe Thr Ile Ser Arg Asp Asn Ser Lys Asn Thr Val Tyr Leu
705                 710                 715                 720

Gln Met Asn Ser Leu Arg Ala Glu Asp Thr Ala Thr Tyr Phe Cys Ala
                725                 730                 735

Arg Asp Arg His Gly Gly Asp Ser Ser Gly Ala Phe Tyr Leu Trp Gly
            740                 745                 750

Gln Gly Thr Leu Val Thr Val Ser Ser
        755                 760

<210> SEQ ID NO 148
<211> LENGTH: 761

<212> TYPE: PRT
<213> ORGANISM: Artificial Sequence
<220> FEATURE:
<223> OTHER INFORMATION: artificial antibody-related sequence

<400> SEQUENCE: 148

Asp Ile Gln Met Thr Gln Ser Pro Ser Ser Leu Ser Ala Ser Val Gly
1               5                   10                  15

Asp Arg Val Thr Ile Asn Cys Gln Ala Ser Glu Ser Ile Ser Ser Trp
            20                  25                  30

Leu Ala Trp Tyr Gln Gln Lys Pro Gly Gln Arg Pro Lys Leu Leu Ile
        35                  40                  45

Tyr Lys Ala Ser Thr Leu Ala Ser Gly Val Pro Ser Arg Phe Ser Gly
50                  55                  60

Ser Gly Ser Gly Thr Asp Tyr Thr Leu Thr Ile Ser Ser Leu Gln Pro
65                  70                  75                  80

Glu Asp Phe Ala Thr Tyr Tyr Cys Gln Gly Tyr Tyr Leu Asp Ser Ser
                85                  90                  95

Val Asp Asp Asn Val Phe Gly Thr Gly Thr Lys Val Thr Val Leu Gly
            100                 105                 110

Gly Gly Gly Ser Glu Val Gln Leu Val Glu Ser Gly Gly Gly Leu
        115                 120                 125

Val Gln Pro Gly Gly Ser Leu Arg Leu Ser Cys Ala Ala Ser Gly Phe
130                 135                 140

Ser Phe Ser Ser Asp Tyr Trp Met Cys Trp Val Arg Gln Ala Pro Gly
145                 150                 155                 160

Lys Gly Leu Glu Trp Ile Gly Cys Ile Tyr Ala Gly Asp Val Asp Asp
            165                 170                 175

Thr Asp Tyr Ala Ser Trp Ala Arg Gly Arg Phe Thr Ile Ser Arg Asp
        180                 185                 190

Asn Ser Lys Asn Thr Val Tyr Leu Gln Met Asn Ser Leu Arg Ala Glu
    195                 200                 205

Asp Thr Ala Val Tyr Tyr Cys Ala Arg Val Asp Gly Phe Asp Ile Thr
        210                 215                 220

Tyr Phe Asp Leu Trp Gly Gln Gly Thr Leu Val Thr Val Ser Ser Gly
225                 230                 235                 240

Gly Gly Gly Ser Gly Gly Gly Ser Gly Gly Gly Ser Gly Gly
            245                 250                 255

Gly Gly Ser Ile Gln Met Thr Gln Ser Pro Ser Ser Leu Ser Ala Ser
        260                 265                 270

Val Gly Asp Arg Val Thr Ile Thr Cys Gln Ala Ser Gln Thr Ile Asn
            275                 280                 285

Tyr Trp Leu Ala Trp Tyr Gln Gln Lys Pro Gly Lys Ala Pro Lys Leu
        290                 295                 300

Leu Ile Tyr Arg Ala Ser Thr Leu Ala Ser Gly Val Pro Ser Arg Phe
305                 310                 315                 320

Ser Gly Ser Gly Ser Gly Thr Asp Phe Thr Leu Thr Ile Ser Ser Leu
            325                 330                 335

Gln Pro Glu Asp Phe Ala Thr Tyr Tyr Cys Gln Asn Tyr Tyr Tyr Ser
        340                 345                 350

Thr Ser Arg Ser Tyr Gly Phe Gly Gly Gly Thr Lys Leu Thr Val Leu
            355                 360                 365

Gly Gly Gly Gly Gly Ser Glu Val Gln Leu Val Glu Ser Gly Gly Gly
        370                 375                 380

```
Leu Val Gln Pro Gly Gly Ser Leu Arg Leu Ser Cys Ala Ala Ser Gly
385                 390                 395                 400

Ile Asp Phe Ser Thr Tyr Gly Ile Ser Trp Val Arg Gln Ala Pro Gly
                405                 410                 415

Lys Gly Leu Glu Trp Ile Ala Tyr Ile Tyr Pro Asp Tyr Gly Ile Thr
            420                 425                 430

Asp Tyr Ala Ser Trp Val Asn Gly Arg Phe Thr Ile Ser Leu Asp Asn
        435                 440                 445

Ala Gln Asn Thr Val Tyr Leu Gln Met Asn Ser Leu Arg Ala Glu Asp
    450                 455                 460

Thr Ala Val Tyr Tyr Cys Ala Arg Ser Gly Ser Tyr Tyr Ser Arg Gly
465                 470                 475                 480

Trp Gly Ala His Tyr Phe Asn Leu Trp Gly Gln Gly Thr Leu Val Thr
                485                 490                 495

Val Ser Ser Gly Gly Gly Gly Ser Gly Gly Gly Gly Ser Ile Gln Met
            500                 505                 510

Thr Gln Ser Pro Ser Ser Leu Ser Ala Ser Val Gly Asp Arg Val Thr
        515                 520                 525

Ile Thr Cys Gln Ser Ser Glu Ser Val Tyr Ser Asn Asn Gln Leu Ser
530                 535                 540

Trp Tyr Gln Gln Lys Pro Gly Gln Pro Pro Lys Leu Leu Ile Tyr Asp
545                 550                 555                 560

Ala Ser Asp Leu Ala Ser Gly Val Pro Ser Arg Phe Ser Gly Ser Gly
                565                 570                 575

Ser Gly Thr Asp Phe Thr Leu Thr Ile Ser Ser Leu Gln Pro Glu Asp
            580                 585                 590

Phe Ala Thr Tyr Tyr Cys Ala Gly Gly Phe Ser Ser Ser Asp Thr
        595                 600                 605

Ala Phe Gly Gly Gly Thr Lys Leu Thr Val Leu Gly Gly Gly Gly Gly
610                 615                 620

Ser Gly Gly Gly Gly Ser Gly Gly Gly Ser Gly Gly Gly Gly Ser
625                 630                 635                 640

Glu Val Gln Leu Val Glu Ser Gly Gly Gly Leu Val Gln Pro Gly Gly
                645                 650                 655

Ser Leu Arg Leu Ser Cys Ala Ala Ser Gly Phe Ser Leu Ser Ser Asn
            660                 665                 670

Ala Met Gly Trp Val Arg Gln Ala Pro Gly Lys Gly Leu Glu Tyr Ile
        675                 680                 685

Gly Ile Ile Ser Val Gly Gly Phe Thr Tyr Tyr Ala Ser Trp Ala Lys
690                 695                 700

Gly Arg Phe Thr Ile Ser Arg Asp Asn Ser Lys Asn Thr Val Tyr Leu
705                 710                 715                 720

Gln Met Asn Ser Leu Arg Ala Glu Asp Thr Ala Thr Tyr Phe Cys Ala
                725                 730                 735

Arg Asp Arg His Gly Asp Ser Gly Ala Phe Tyr Leu Trp Gly
            740                 745                 750

Gln Gly Thr Leu Val Thr Val Ser Ser
        755                 760

<210> SEQ ID NO 149
<211> LENGTH: 500
<212> TYPE: PRT
<213> ORGANISM: Artificial Sequence
<220> FEATURE:
<223> OTHER INFORMATION: artificial antibody-related sequence
```

<400> SEQUENCE: 149

```
Asp Ile Gln Met Thr Gln Ser Pro Ser Ser Leu Ser Ala Ser Val Gly
1               5                   10                  15

Asp Arg Val Thr Ile Asn Cys Gln Ala Ser Glu Ser Ile Ser Ser Trp
            20                  25                  30

Leu Ala Trp Tyr Gln Gln Lys Pro Gly Lys Arg Pro Lys Leu Leu Ile
        35                  40                  45

Tyr Lys Ala Ser Thr Leu Ala Ser Gly Val Pro Ser Arg Phe Ser Gly
50                  55                  60

Ser Gly Ser Gly Thr Asp Tyr Thr Leu Thr Ile Ser Ser Leu Gln Pro
65                  70                  75                  80

Glu Asp Phe Ala Thr Tyr Tyr Cys Gln Gly Tyr Tyr Leu Asp Ser Ser
                85                  90                  95

Val Asp Asp Asn Val Phe Gly Gly Thr Lys Leu Thr Val Leu Gly
            100                 105                 110

Gly Gly Gly Gly Ser Glu Val Gln Leu Val Glu Ser Gly Gly Gly Leu
            115                 120                 125

Val Gln Pro Gly Gly Ser Leu Arg Leu Ser Cys Ala Ala Ser Gly Phe
130                 135                 140

Ser Leu Ser Ser Asn Ala Met Gly Trp Val Arg Gln Ala Pro Gly Lys
145                 150                 155                 160

Gly Leu Glu Tyr Ile Gly Ile Ile Ser Val Gly Gly Phe Thr Tyr Tyr
                165                 170                 175

Ala Ser Trp Ala Lys Gly Arg Phe Thr Ile Ser Arg Asp Asn Ser Lys
            180                 185                 190

Asn Thr Val Tyr Leu Gln Met Asn Ser Leu Arg Ala Glu Asp Thr Ala
        195                 200                 205

Thr Tyr Phe Cys Ala Arg Asp Arg His Gly Gly Asp Ser Ser Gly Ala
210                 215                 220

Phe Tyr Leu Trp Gly Gln Gly Thr Leu Val Thr Val Ser Ser Gly Gly
225                 230                 235                 240

Gly Gly Ser Gly Gly Gly Gly Ser Gly Gly Gly Gly Ser Gly Gly Gly
                245                 250                 255

Gly Ser Asp Ile Gln Met Thr Gln Ser Pro Ser Ser Leu Ser Ala Ser
            260                 265                 270

Val Gly Asp Arg Val Thr Ile Thr Cys Gln Ser Ser Glu Ser Val Tyr
        275                 280                 285

Ser Asn Asn Gln Leu Ser Trp Tyr Gln Gln Lys Pro Gly Gln Pro Pro
290                 295                 300

Lys Leu Leu Ile Tyr Asp Ala Ser Asp Leu Ala Ser Gly Val Pro Ser
305                 310                 315                 320

Arg Phe Ser Gly Ser Gly Ser Gly Thr Asp Phe Thr Leu Thr Ile Ser
                325                 330                 335

Ser Leu Gln Pro Glu Asp Phe Ala Thr Tyr Tyr Cys Ala Gly Gly Phe
            340                 345                 350

Ser Ser Ser Ser Asp Thr Ala Phe Gly Gly Gly Thr Lys Leu Thr Val
        355                 360                 365

Leu Gly Gly Gly Gly Ser Glu Val Gln Leu Val Glu Ser Gly Gly
    370                 375                 380

Gly Leu Val Gln Pro Gly Gly Ser Leu Arg Leu Ser Cys Ala Ala Ser
385                 390                 395                 400

Gly Ile Asp Phe Ser Thr Tyr Gly Ile Ser Trp Val Arg Gln Ala Pro
```

-continued

```
                405                 410                 415
Gly Lys Gly Leu Glu Trp Ile Ala Tyr Ile Tyr Pro Asp Tyr Gly Ile
            420                 425                 430

Thr Asp Tyr Ala Ser Trp Val Asn Gly Arg Phe Thr Ile Ser Leu Asp
        435                 440                 445

Asn Ala Gln Asn Thr Val Tyr Leu Gln Met Asn Ser Leu Arg Ala Glu
    450                 455                 460

Asp Thr Ala Val Tyr Tyr Cys Ala Arg Ser Gly Ser Tyr Tyr Ser Arg
465                 470                 475                 480

Gly Trp Gly Ala His Tyr Phe Asn Leu Trp Gly Gln Gly Thr Leu Val
                485                 490                 495

Thr Val Ser Ser
            500
```

MULTISPECIFIC ANTIBODIES HAVING SPECIFICITY FOR TNFα AND IL-17A, ANTIBODIES TARGETING IL-17A, AND METHODS OF USE THEREOF

CROSS-REFERENCE TO RELATED APPLICATIONS

This application is a 371 National Phase of International Patent Application No. PCT/EP2020/052481 filed on Jan. 31, 2020, which claims priority to EP 19154852.8 filed on Jan. 31, 2019; EP 19154846.0 filed on Jan. 31, 2019; and EP 19154850.2 filed on Jan. 31, 2019, the content of each of which applications is incorporated herein by reference.

INCORPORATION OF SEQUENCE LISTING

This application contains a sequence listing submitted electronically via EFS-web, which serves as both the paper copy and the computer readable form (CRF) and consists of a file entitled "WRN19NP_seqlist.txt", which was created on Jul. 30, 2021, which is 149,736 bytes in size, and which is herein incorporated by reference in its entirety.

FIELD OF THE INVENTION

The present invention relates to an isolated multispecific antibody comprising a first domain specifically binding TNFα and a second domain specifically binding IL-17A and, optionally, a third domain specifically binding human serum albumin. The present invention further relates to methods of use of said antibody, pharmaceutical compositions and methods of use thereof, and a kit comprising said antibody. The present invention also relates to a nucleic acid comprising a nucleotide sequence encoding said antibody, a vector comprising said nucleic acid, a host cell comprising said nucleic acid or said vector, and a method of producing said antibody.

The present invention furthermore relates to an isolated antibody which specifically binds human IL-17A, a multi-specific molecule comprising said isolated antibody of the invention, pharmaceutical compositions and methods of use thereof. The present invention further relates to a kit comprising said antibody, a nucleic acid comprising a nucleotide sequence encoding said antibody, a vector comprising said nucleic acid, a host cell comprising said nucleic acid or said vector, and a method of producing said antibody.

BACKGROUND OF THE INVENTION

TNFα is a homo-trimeric pro-inflammatory cytokine that is released by and interacts with cells of the immune system. TNFα is found as a soluble protein as well as a precursor form called transmembrane TNFα that is expressed as a cell surface type II polypeptide. Transmembrane TNFα is processed by metalloproteinases such as TNFα-converting enzyme (TACE) between residues Ala76 and Val77, resulting in the release of the soluble form of TNFα of 157 amino acid residues. Soluble TNFα is a homotrimer of 17-kDa cleaved monomers. Transmembrane TNFα also exists as a homotrimer of 26-kD uncleaved monomers. Both membrane and soluble TNFα are biologically active. TNFα can bind to two receptors, TNF receptor 1 (TNFR1) and 2 (TNFR2), wherein the transmembrane TNFα acts predominantly via TNFR2. TNFR1 is widely expressed on a variety of cells and its engagement triggers pro-inflammatory responses. TNFR2 expression is almost exclusively restricted to immune cells and its binding promotes cell survival and proliferation (Bazzoni F, Beutler B, N Engl J Med (1996) 334(26):1717-25; Locksley R M, et al., Cell (2001) 104(4): 487-501; Cabal-Hierro L, Lazo P S, Cell Signal (2012) 24(6):1297-305; Brenner D, et al., Nat Rev Immunol (2015) 15(6):362-74).

TNFα has been shown to be up-regulated in a number of human diseases, such as inflammatory and autoimmune disorders, including chronic diseases such as rheumatoid arthritis, Crohn's disease, ulcerative colitis and multiple sclerosis. Antibodies to TNFα have been proposed for the prophylaxis and treatment of endotoxic shock (Beutler et al., Science, 234, 470-474, 1985). Bodmer et al., (Critical Care Medicine, 21, S441-S446, 1993) and Wherry et al., (Critical Care Medicine, 21, S436-S440, 1993) discuss the therapeutic potential of anti-TNFα antibodies in the treatment of septic shock. The use of anti-TNFα antibodies in the treatment of septic shock is also discussed by Kirschenbaum et al., (Critical Care Medicine, 26, 1625-1626, 1998). Collagen-induced arthritis can be treated effectively using an anti-TNFα monoclonal antibody (Williams et al. (Proc. Natl. Acad. Sci. U.S.A. 89, 9784-9788, 1992)). The use of anti-TNFα antibodies in the treatment of rheumatoid arthritis and Crohn's disease is discussed in Feldman et al. (Transplantation Proceedings, 30, 4126-4127, 1998), Adorini et al. (Trends in Immunology Today, 18, 209-211, 1997) and in Feldman et al. (Advances in Immunology, 64, 283-350, 1997). The antibodies to TNFα previously used in such treatments are generally chimeric antibodies, such as those described in U.S. Pat. No. 5,919,452.

Monoclonal antibodies against TNFα have been described in the prior art. Meager et al. (Hybridoma, 6, 305-311, 1987) describe murine monoclonal antibodies against recombinant TNFα. Fendly et al. (Hybridoma, 6, 359-370, 1987) describe the use of murine monoclonal antibodies against recombinant TNFα in defining neutralizing epitopes on TNFα. Furthermore, in International Patent Application WO 92/11383, recombinant antibodies, including CDR-grafted antibodies, specific for TNFα are disclosed. Rankin et al. (British J. Rheumatology, 34, 334-342, 1995) describe the use of such CDR-grafted antibodies in the treatment of rheumatoid arthritis. U.S. Pat. No. 5,919, 452 discloses anti-TNFα chimeric antibodies and their use in treating pathologies associated with the presence of TNFα. Further anti-TNFα antibodies are disclosed in Stephens et al. (Immunology, 85, 668-674, 1995), GB-A-2 246 570, GB-A-2 297 145, U.S. Pat. No. 8,673,310, US 2014/ 0193400, EP 2 390 267 B1, U.S. Pat. Nos. 8,293,235, 8,697,074, WO 2009/155723 A2 and WO 2006/131013 A2.

Currently approved anti-TNFα biotherapeutics include (i) infliximab, a chimeric IgG anti-human monoclonal antibody (Remicade®; Wiekowski M et al: "Infliximab (Remicade)", Handbook of Therapeutic Antibodies, WILEY-VCH; Weinheim, 2007-01-01, p. 885-904); (ii) etanercept, a TNFR2 dimeric fusion protein, with an IgG1 Fc (Enbrel®); (iii) adalimumab, a fully human monoclonal antibody (mAb) (Humira®; Kupper H et al: "Adalimumab (Humira)", Handbook of Therapeutic Antibodies, WILEY-VCH; Weinheim, 2007-01-01, p. 697-732); (iv) certolizumab, a PEGylated Fab fragment (Cimzia®; Melmed G Y et al: "Certolizumab pegol", Nature Reviews. Drug Discovery, Nature Publishing Group, GB, Vol. 7, No. 8, 2008-08-01, p. 641-642); (v) Golimumab, a human IgG1K monoclonal antibody (Simponi®; Mazumdar S et al: "Golimumab", mAbs, Landes Bioscience, US, Vol. 1, No. 5, 2009-09-01, p. 422-431).

However, anti-TNFα treatment was shown to have certain limitations. Not all patients achieve sufficient clinical response or maintain clinical response to anti-TNFα over time, resulting in a need to switch to a new therapy to control their disease. For example upon anti-TNFα treatment of rheumatoid arthritis (RA) patients, approximately 40% of patients never respond, and only 20% of patients experience a major reduction in disease activity. Hence, there continues to be a considerable unmet clinical need for treatments regarding more effective suppression of progression of such disorders as inflammation and autoimmune disorders.

Activation of a complementary biological pathway in patients after anti-TNFα treatment, may be one of the reasons why many patients fail to respond to the anti-TNFα therapy or have only partial response. Recently emerged body of evidence indicates on the role of IL-17A in the pathogenesis of inflammatory and autoimmune disorders, for example in RA.

The interleukin 17 (IL-17) family in human and in mice is composed of six cytokines, IL-17A, IL-17B, IL-17C, IL-17D, IL-17E (also called IL-25) and IL-17F, and plays roles in acute and chronic inflammatory responses. The interleukin 17 receptor (IL-17R) family consists of five members, namely IL-17RA, IL-17RB, IL-17RC, IL-17RD and IL-17RE.

Interleukin-17A (IL-17A or IL17A, synonymous with IL-17 or cytotoxic T-lymphocyte-associated antigen-8 (CTLA-8)) is a homodimeric pro-inflammatory cytokine. IL-17A is produced by a subset of memory CD4+ T cells (termed Th17), CD8+ T cells (Tc17), invariant NKT cells, γδ T cells, non-T non-B lymphocytes (termed type 3 innate lymphoid cells) and neutrophils. IL-17A and IL-17F form a distinct subgroup within the IL-17 family. They share the greatest sequence homology and identity within IL-17 family, while other members of the IL-17 family have a significantly lower sequence identity to IL-17A (Starnes, T., et al., J Immunol. 167(8):4137-40 (2001); Aggarwal, S. and Gurney, A. L., J. Leukoc Biol, 71(1): 1-8 (2002)). Both IL-17A and IL-17F signal through a heterodimeric receptor complex composed of IL-17RA and IL-17RC (Toy D., et al., J Immunol. 2006; Wright J F., et al., J Immunol. 2008; 181(4):2799-2805). IL-17A and IL-17F can form IL-17A/A or IL-17F/F disulphide linked homodimers and IL-17A/F disulphide linked heterodimers (Wright J F. et al., J Immunol. 2008; 181(4):2799-2805; Liang S C. et al., J Immunol. 2007; 179(11):7791-7799). IL-17A as well as IL-17F induces expression of pro-inflammatory cytokines and anti-microbial peptides.

Human IL-17A (CTLA-8, Swiss Prot Q 16552, also referred to as IL-17 or IL17; SEQ ID NO: 33) is implicated in various inflammatory conditions such as autoimmune diseases, metabolic disorders and cancer (Ouyang W., et al., Immunity. 2008; 28(4):454-467; Milner J D., Curr Opin Immunol. 2011; 23(6):784-788; Kuchroo V K., et al., Nat Med. 2012; 18(1):42-47; Ahmed M. and Gaffen S L., Cytokine Growth Factor Rev. 2010; 21(6):449-453; Trinchieri G., Annu Rev Immunol. 2012; 30:677-706; Gallimore A M, Godkin A., N Engl J Med. 2013; 368(3):282-284; Ye P., et al., J Exp Med. 2001; 194(4):519-527; Chung D R., et al., J Immunol. 2003; 170(4):1958-1963; Huang W., et al., J Infect Dis. 2004; 190(3):624-631; Ishigame H., et al., Immunity. 2009; 30(1):108-119; see for review Gu C., et al., Cytokine. 2013 November 64(2)). IL-17A plays a role in the induction of other inflammatory cytokines and chemokines for neutrophil recruitment, acute phase proteins, anti-microbial peptides, mucins, matrix metalloproteinases and adhesion molecules. IL-17A also synergizes with other cytokines including TNFα and IL-1 beta to further induce chemokine expression (Chabaud M., et al., J. Immunol. 161(1):409-14 (1998)).

Pathological production of IL-17A leads to excessive inflammation and tissue damage (see for review Gu et al., Cytokine. 2013 November; 64(2)). High IL-17A levels were found in multiple sclerosis (MS), psoriasis, asthma, Crohn's disease and rheumatoid arthritis patients. Treatment of animals with IL-17A neutralizing antibodies decreases disease incidence and severity in autoimmune encephalomyelitis (Komiyama, Y. et al, J. Immunol. 177 (2006) 566-573). In addition, IL-17A neutralizing antibodies reduce severity and incidence of mouse rheumatoid arthritis model of collagen induced arthritis, and high levels of IL-17A can be detected in the synovial fluid of inflamed joints from rheumatoid arthritis patients (Ziolkowska, M. et al, J. Immunol. 164 (2000) 2832-2838; Kotake, S. et al, J. Clin. Invest. 103 (1999) 1345-1352; Hellings P. W. et al, Am. J. Resp. Cell Mol. Biol. 28 (2003) 42-50).

A large body of experimental evidence in human and animal models has supported the development of IL-17A-targeted therapies. Several anti-IL-17 antibodies were developed including AIN457 (secukinumab; see U.S. Pat. No. 7,807,155 and WO 2006/013107), LY2439821 (ixekizumab; see U.S. Pat. Nos. 7,838,638 and 8,110,191 and WO 2007/070750), SCH900117 (Merck), RG4943 (Roche), etc. Examples of anti-IL-17A antibodies are disclosed in WO 2006/013107, WO 2006/054059, WO 2007/070750, WO 2007/149032, WO 2008/001063, WO 2008/021156, WO 2010/034443, WO 2010/102251, WO 2012/018767, WO 2014/161570, WO 2014/001368, WO 2014/122613, WO 2015/070697, WO 2015/137843, WO 2016/048188, WO 2016/113557, WO 2016/138842, WO 2017/068472.

Several clinical trials with various molecules blocking IL-17A signaling have been conducted or are still ongoing. The biologics targeting either IL-17A or its receptor and their efficacies are being evaluated in the setting of inflammatory or autoimmune disorders, such as rheumatoid arthritis, ankylosing spondyloarthropathy, Crohn's disease, psoriasis, multiple sclerosis and ozone-induced neutrophilia.

For example, secukinumab, a fully human IgG1κ anti-IL-17A monoclonal antibody (U.S. Pat. No. 7,807,155 and WO 2006/013107), is now approved for the treatment of psoriasis, psoriatic arthritis and ankylosing spondylitis behavior (see for review Wang et al., Eur J Rheumatol 2017 (4) 272-7). In phase III studies assessing the long-term efficacy and safety of secukinumab in subjects with psoriatic arthritis (FUTURE I and FUTURE II), secukinumab was significantly more effective than placebo in improving the signs and symptoms of psoriatic arthritis (Mease P J. et al. N Engl J Med 2015; 373: 1329-39; McInnes I B. et al. The Lancet; 386:1137-46).

Ixekizumab, a humanized anti-IL-17A monoclonal antibody (U.S. Pat. Nos. 7,838,638 and 8,110,191 and WO 2007/070750), was studied in biologic-naive patients with active psoriatic arthritis in a 24-week phase III trial (SPIRIT-P1) (Mease P J. Et al., Ann Rheum Dis. 2017 January; 76(1):79-87). It was demonstrated that in biologic-naive patients with active psoriatic arthritis, ixekizumab treatment resulted in improvements in disease activity and physical function, as well as in the inhibition of structural damage progression. Ixekizumab was also shown to be effective in treating patients with moderate-to-severe plaque psoriasis (Griffiths C E M, et al., The Lancet; 386: 541-51).

Brodalumab is a fully human IL-17 receptor (IL-17RA) monoclonal antibody (see U.S. Pat. No. 7,767,206), and has been proven effective in the treatment of psoriasis (Papp K A. et al. N Engl J Med 2012; 366: 1181-9). It also showed significant and sustained response in psoriatic arthritis patients in a placebo-controlled phase II study (Mease P J. et al., N Engl J Med 2014; 370: 2295-306). However, treatment with brodalumab has been coupled to strong adverse events, such as upper respiratory tract infection, fatigue, diarrhea, and reported suicidal thoughts and behavior (see for review Wang et al., Eur J Rheumatol 2017 (4) 272-7).

Accordingly, IL-17A is a promising target in the therapy of inflammatory and autoimmune disorders. Although a number of anti-IL-17A antibodies have been identified up to date, there is still a need for the development of improved therapeutic antibodies being able to effectively reduce or eliminate IL-17A activity in inflammatory responses and autoimmune diseases, and at the same time having improved safety profile and being suitable for development. The therapeutic antibodies should have, in addition to beneficial affinity, efficacy and immunogenicity, improved biophysical properties leading to better developability, producibility in high yields and protein stability. A treatment whereby both the TNFα and IL-17A biological pathways are simultaneously blocked, has the potential to significantly improve response rates and address the unmet need in the treatment of disorders mediated by TNFα and IL-17A. Several biologic therapeutics that specifically bind IL-17 and TNFα have been proposed up to date. WO 2010/102251 (Abbvie Inc.) discloses dual-specific tetravalent antibodies which bind to both TNFα and IL-17. WO 2013/063110 (Abbvie Inc.) discloses a multivalent DVD-Ig binding protein capable of binding TNF and IL-17. WO 2014/044758 (Covagen ACJ) discloses a fusion construct capable of inhibiting glycosylated IL-17A and binding TNFα. Also, WO 2014/137961 (Eli Lilly and Company) and WO 2017/132457 (Janssen Biotech) disclose anti-TNF and anti-IL-17A bispecific antibodies. WO 2017/102830 (UCB Biopharma) discloses a multispecific antibody, which is capable of inhibiting TNFα, IL-17A and IL-17F, in particular, comprising a binding domain specific to human TNFα and a binding domain specific to human IL-17A and human IL-17F. Xu et al., Oncotarget, 8 (2017) 81860-81872, generated an IgG-like bispecific antibody (bsAb), wherein the two arms of the IgG-like molecules are directed against TNFα and IL-17A, respectively. Interestingly, WO 2015/014979 (Roche, see also Fischer et al., Arthritis & Rheumatology 67 (2015) 51-62) discloses bispecific tetravalent IL-17AxTNF antibody constructs, which are either bivalent ("2+2" construct) or monovalent ("2+2" construct) for each of the two antigens. According to WO 2015/014979, the bivalent construct is to be preferred over the monovalent alternative.

However, there still remains a need for improved anti-inflammatory drugs that can effectively neutralize the activity of both IL-17A and TNFα for the treatment of disorders such as inflammatory and autoimmune disease, for example rheumatoid arthritis, in which a significant portion of patients still do not respond adequately to therapy. There is still a need for the development of improved therapeutic antibodies effectively neutralizing the activity of both IL-17A and TNFα, having beneficial affinity and efficacy, and improved safety profile, e.g., lower immunogenicity. Furthermore, the therapeutic antibodies should have improved biophysical properties leading to better developability, producibility in high yields and superior antibody stability.

SUMMARY OF THE INVENTION

It is an object of the present invention to provide a medicament to improve treatment of inflammatory and autoimmune disorders.

The antibody of the invention provides a new treatment option for patients with an unmet medical need. The present invention provides a novel multispecific antibody, which is capable of simultaneously inhibiting IL-17A and TNFα, and which has further improved properties beneficial for use in therapies, such as higher affinity, improved efficacy, selectivity, safety, e.g., low immunogenicity, and improved biophysical properties, such as developability, and stability.

In one aspect, the present disclosure relates to isolated multispecific antibody comprising a first domain specifically binding IL-17A and a second domain specifically binding TNFα, and, optionally, a third domain specifically binding human serum albumin.

In one aspect, the present disclosure relates to a pharmaceutical composition comprising the multispecific antibody of the invention and a pharmaceutically acceptable carrier.

In a further aspect, the present disclosure provides the multispecific antibody of the invention or the pharmaceutical composition of the invention for use as a medicament.

In a further aspect, the present disclosure provides the multispecific antibody of the invention or the pharmaceutical composition of the invention for use in treatment of a disorder mediated by IL-17A and/or TNFα or a disorder that can be treated by inhibiting Gro-α secretion, in particular for use in the treatment of an inflammatory condition or an autoimmune disease.

In one aspect, the present disclosure provides use of the multispecific antibody of the invention or the pharmaceutical composition of the invention for the treatment of a disorder mediated by IL-17A and/or TNFα or a disorder that can be treated by inhibiting Gro-α secretion, in particular for use in the treatment of an inflammatory condition or an autoimmune disease.

In one aspect, the present disclosure provides use of the multispecific antibody of the invention or the pharmaceutical composition of the invention in the manufacture of a medicament for treatment of a disorder mediated by IL-17A and/or TNFα or a disorder that can be treated by inhibiting Gro-α secretion, in particular for use in the treatment of an inflammatory condition or an autoimmune disease.

In yet another aspect, the present disclosure provides a method of treating a disorder mediated by IL-17A and/or TNFα, said method comprising administering an effective amount of the multispecific antibody of the invention or the pharmaceutical composition of the invention to a subject in need thereof.

In one aspect, the present disclosure provides a kit comprising the multispecific antibody of the invention, or the pharmaceutical composition of the invention.

In a further aspect, the present disclosure provides a nucleic acid comprising a nucleotide sequence encoding the multispecific antibody of the invention. In a further aspect, the present disclosure provides a vector comprising said nucleic acid. In a further aspect, the present disclosure provides a host cell comprising said nucleic acid or said vector.

In yet another aspect, the present disclosure provides a method of producing the multispecific antibody of the invention or a binding domain thereof or a fragment thereof, the method comprising the step of culturing a host cell comprising a nucleic acid or a vector encoding the multispecific antibody of the invention or a binding domain thereof or a fragment thereof.

The aspects, advantageous features and preferred embodiments of the present disclosure, summarized in the following items, respectively alone or in combination, further contribute to solving the object of the invention:

1. An isolated multispecific antibody comprising a first domain specifically binding IL-17A and a second domain specifically binding TNFα.
2. The multispecific antibody of item 1, wherein said antibody comprises only one domain specifically binding IL-17A and/or only one domain specifically binding TNFα.
3. The multispecific antibody of item 1 or item 2, wherein said antibody is capable of neutralizing the biological activity of human TNFα and human IL-17A.
4. The multispecific antibody of any one of the preceding items, wherein said antibody selectively binds to human IL-17A over human IL-17B, IL-17C, IL-17D, IL-17E and IL-17F as measured by ELISA.
5. The multispecific antibody of any one of the preceding items further comprising a third domain having a specificity against an antigen other than IL-17A or TNFα.
6. The multispecific antibody of item 5, wherein said antibody comprises a third domain specifically binding to human serum albumin (HSA), preferably said antibody comprising only one domain specifically binding human serum albumin.
7. The multispecific antibody of any one of the preceding items, wherein said domains are capable of binding to their respective antigen or receptor simultaneously.
8. The multispecific antibody of any one of the preceding items, wherein said first domain and said second domain, and, optionally said third domain, are independently selected from the group consisting of a Fab, an Fv, an scFv, dsFv, an scAb, STAB, a single domain antibody (sdAb or dAb), a single domain heavy chain antibody, and a single domain light chain antibody, a VHH, a VNAR, single domain antibodies based on the VNAR structure from shark, and binding domains based on alternative scaffolds including but limited to ankyrin-based domains, fynomers, avimers, anticalins, fibronectins, and binding sites being built into constant regions of antibodies (e.g. F-star's Modular Antibody Technology™), preferably from the group consisting of a Fab, Fv and an scFv, more preferably wherein said first domain and/or said second domain and/or said third domain is/are Fv or scFv.
9. The multispecific antibody of any one of the preceding items, wherein said multispecific antibody is in a format selected from the group consisting of a single-chain diabody (scDb), a tandem scDb (Tandab), a linear dimeric scDb (LD-scDb), a circular dimeric scDb (CD-scDb), a bispecific T-cell engager (BiTE; tandem di-scFv), a tandem tri-scFv, a tribody (Fab-(scFv)$_2$) or bibody (Fab-(scFv)$_1$), Fab, Fab-Fv$_2$, Morrison (IgG CH3-scFv fusion (Morrison L) or IgG CL-scFv fusion (Morrison H)), triabody, scDb-scFv, bispecific Fab$_2$, di-miniantibody, tetrabody, scFv-Fc-scFv fusion, scFv-HSA-scFv fusion, di-diabody, DVD-Ig, COVD, IgG-scFab, scFab-dsscFv, Fv$_2$-Fc, IgG-scFv fusions, such as bsAb (scFv linked to C-terminus of light chain), Bs1Ab (scFv linked to N-terminus of light chain), Bs2Ab (scFv linked to N-terminus of heavy chain), Bs3Ab (scFv linked to C-terminus of heavy chain), Ts1Ab (scFv linked to N-terminus of both heavy chain and light chain), Ts2Ab (dsscFv linked to C-terminus of heavy chain), bispecific antibodies based on heterodimeric Fc domains, such as Knob-into-Hole antibodies (KiHs); an Fv, scFv, scDb, tandem-di-scFv, tandem tri-scFv, Fab-(scFv)$_2$, Fab-(scFv)$_1$, Fab, Fab-Fv$_2$, COVD fused to the N- and/or the C-terminus of either chain of a heterodimeric Fc domain or any other heterodimerization domain, a MATCH and DuoBodies, preferably is tribody or scDb-scFv.
10. The multispecific antibody of any one of the preceding items, wherein said antibody does not comprise an immunoglobulin Fc region polypeptide, and, optionally, does not comprise CH1 and/or CL regions.
11. The multispecific antibody of any one of the preceding items, wherein said antibody is a tribody.
12. The multispecific antibody of item 11, wherein said first domain, said second domain and said third domain are independently selected from the group consisting of Fab and scFv, preferably wherein said second domain is Fab and said first and third domains are scFvs.
13. The multispecific antibody of item 9, wherein said antibody is an scDb-scFv, preferably wherein said scFv moiety is C-terminally fused to the scDb, more preferably wherein said first domain and said second domain form an scDb and said third domain is an scFv.
14. The multispecific antibody of item 13, wherein said antibody is represented by the formula:
   VLA-L1-VHC-L2-VLC-L3-VHA-L4-VLB-L5-VHB
   or
   VLB-L1-VHA-L2-VLA-L3-VHB-L4-VLC-L5-VHC
   or
   VLC-L1-VHB-L2-VLB-L3-VHC-L4-VLA-L5-VHA
   or
   VLA-L1-VHB-L2-VLB-L3-VHA-L4-VLC-L5-VHC,
   preferably VLB-L1-VHA-L2-VLA-L3-VHB-L4-VLC-L5-VHC or VLA-L1-VHB-L2-VLB-L3-VHA-L4-VLC-L5-VHC,
   more preferably VLB-L1-VHA-L2-VLA-L3-VHB-L4-VLC-L5-VHC,
       wherein VLA and VHA are a light chain variable region and a heavy chain variable region of the first domain, respectively; and VLB and VHB are a light chain variable region and a heavy chain variable region of the second domain, respectively; and VLC and VHC are a light chain variable region and a heavy chain variable region of the third domain, respectively, and wherein L1, L2, L3, L4 and L5 are polypeptide linkers.
15. The multispecific antibody of item 14, wherein said L1 and L3 are as set forth in SEQ ID NO: 132.
16. The multispecific antibody of any one of items 14 to 15, wherein said L2, L4 and L5 are as set forth in SEQ ID NO: 23.
17. The multispecific antibody of any one of the preceding items, wherein said antibody has the following properties
   (a) has the ability to neutralize IL-17A with a potency relative to that of secukinumab (relative potency), determined by measuring Gro-α secretion in an HT-29 assay, greater than 2, e.g., greater than 5, greater than 10, greater than 15, greater than 20, greater than 25, greater than 30, greater than 35, greater than 40, greater than 45, preferably greater than 50, and wherein said relative potency is the ratio of the IC$_{50}$ value in ng/mL of secukinumab as measured in the HT-29 assay to the $IC_{50}$ value in ng/mL of said multispecific antibody as measured in the HT-29 assay; and
(b) has the ability to neutralize TNFα with a potency relative to that of an scDb according to SEQ ID NO: 149 (A13) (relative potency), determined by measuring Gro-α secretion in an HT-29 assay, of at least 1, e.g., greater than 1, greater than 1.5, greater than 2, greater than 2.5, greater than 3, greater than 3.5, preferably greater than 4, more preferably greater than 4.5, and wherein said relative potency is the ratio of the $IC_{50}$ value in nM of said scDb according to SEQ ID NO: 149 as measured in the HT-29 assay to the $IC_{50}$ value in nM of said multispecific antibody as measured in the HT-29 assay; and
(c) optionally, has a the ability to block interaction between IL-17A and IL-17RA with a potency relative to that of secukinumab (relative potency), determined in ELISA assay, greater than 2, e.g., greater than 3, greater than 4, greater than 5, greater than 6, greater than 7, greater than 8, greater than 9, preferably greater than 10, and wherein said relative potency is the ratio of the $IC_{50}$ value in ng/mL of secukinumab as measured by ELISA to the $IC_{50}$ value in ng/mL of said multispecific antibody as measured by ELISA; and
(d) optionally, has the ability to neutralize TNFα with a potency relative to that of an scDb according to SEQ ID NO: 149 (A13) (relative potency), determined in L929 assay, of at least 0.4, e.g., at least 0.5, preferably at least 1, and wherein said relative potency is the ratio of the $IC_{50}$ value in nM of said scDb according to SEQ ID NO: 149 as measured in the L929 assay to the $IC_{50}$ value in nM of said multispecific antibody as measured in the L929 assay; and/or
(e) binds to human IL-17A with a dissociation constant ($K_D$) of less than 5 nM, e.g., less than 4 nM, less than 3 nM, less than 2 nM, than 1 nM, preferably less than 0.5 nM, as measured by surface plasmon resonance; and optionally, binds to cynomolgus IL-17A with a $K_D$ of less than 5 nM, e.g., less than 4 nM, less than 3 nM, less than 2 nM, than 1 nM, preferably less than 0.5 nM as measured by surface plasmon resonance;
(f) binds to human TNFα with a dissociation constant ($K_D$) of less than 5 nM, e.g., less than 4 nM, less than 3 nM, less than 2 nM, less than 1 nM, preferably less than 0.5 nM, more preferably less than 0.25 nM, as measured by surface plasmon resonance; and
(g) optionally, binds to human serum albumin with a dissociation constant ($K_D$) of less than 5 nM, e.g., less than 4 nM, less than 3 nM, preferably less than 2 nM, as measured by surface plasmon resonance, and optionally, binds to cynomolgus serum albumin with a dissociation constant ($K_D$) of less than 5 nM, e.g., less than 4 nM, less than 3 nM, preferably less than 2 nM as measured by surface plasmon resonance.

18. The multispecific antibody of any one of the preceding items, wherein said antibody has the following properties
(a) has a melting temperature (Tm), determined by differential scanning fluorimetry, of at least 55° C., preferably of at least 58° C., more preferably at least 60° C. in phosphate-citrate buffer at pH 6.4, 150 mM NaCl;
(b) has a loss in monomer content, after five consecutive freeze-thaw cycles, of less than 5%, e.g., less than 4%, less than 3%, less than 2%, preferably 1% or less, when said multispecific antibody is at a starting concentration of 10 mg/ml in phosphate buffered saline (PBS), pH 7.4;
(c) has a loss in monomer content, after storage for at least two weeks, particularly for at least four weeks, at 4° C., of less than 10%, preferably less than 5%, when said multispecific antibody is at a starting concentration of 10 mg/ml in phosphate buffered saline (PBS), pH 7.4; and/or
(d) has a loss in monomer content, after storage for at least two weeks, particularly for at least four weeks, at 37° C., of less than 20%, preferably less than 15%, when said multispecific antibody is at a starting concentration of 10 mg/ml in phosphate buffered saline (PBS), pH 7.4.

19. The multispecific antibody of any one of the preceding items wherein each domain comprises a heavy chain variable region (VH) and a light chain variable region (VL), wherein:
(a) said VH comprises, in sequence, the three complementary determining regions HCDR1, HCDR2 and HCDR3, and
(b) said VL comprises, in sequence, the three complementary determining regions LCDR1, LCDR2 and LCDR3.

20. The multispecific antibody of any one of the preceding items, wherein said first domain specifically binding IL-17A comprises a set of CDRs: HCDR1, HCDR2, HCDR3, LCDR1, LCDR2 and LCDR3, wherein the set of CDRs has 10 or fewer amino acid substitutions from a set of CDRs in which (i) HCDR1' is as set forth in SEQ ID NO: 1; HCDR2' is as set forth in SEQ ID NO: 2; HCDR3' is as set forth in SEQ ID NO: 3; LCDR1' is as set forth in SEQ ID NO: 12; LCDR2' is as set forth in SEQ ID NO: 13; LCDR3' is as set forth in SEQ ID NO: 14, or (ii) HCDR1' is as set forth in SEQ ID NO: 39; HCDR2' is as set forth in SEQ ID NO: 40; HCDR3' is as set forth in SEQ ID NO: 41; LCDR1' is as set forth in SEQ ID NO: 50; LCDR2' is as set forth in SEQ ID NO: 51; LCDR3' is as set forth in SEQ ID NO: 52.

21. The multispecific antibody of item 20 wherein
(i)
(a) said HCDR1 is as set forth in the amino acid sequence selected from any one of SEQ ID Nos: 1, 4, and 7;
(b) said HCDR2 is as set forth in the amino acid sequence selected from any one of SEQ ID Nos: 2, 5, and 8;
(c) said HCDR3 is as set forth in the amino acid sequence selected from any one of SEQ ID Nos: 3, 6, and 9;
(d) said LCDR1 is as set forth in the amino acid sequence selected from any one of SEQ ID Nos: 12, 15, and 18;
(e) said LCDR2 is as set forth in the amino acid sequence selected from any one of SEQ ID Nos: 13, 16, and 19; and
(f) said LCDR3 is as set forth in the amino acid sequence selected from any one of SEQ ID Nos: 14, 17, and 20; or
(ii)
(a) said HCDR1 is as set forth in the amino acid sequence selected from any one of SEQ ID Nos: 39, 42, and 45;

(b) said HCDR2 is as set forth in the amino acid sequence selected from any one of SEQ ID Nos: 40, 43, and 46;
(c) said HCDR3 is as set forth in the amino acid sequence selected from any one of SEQ ID Nos: 41, 44, and 47;
(d) said LCDR1 is as set forth in the amino acid sequence selected from any one of SEQ ID Nos: 50, 53, and 56;
(e) said LCDR2 is as set forth in the amino acid sequence selected from any one of SEQ ID Nos: 51, 54, and 57; and
(f) said LCDR3 is as set forth in the amino acid sequence selected from any one of SEQ ID Nos: 52, 55, and 58.

22. The multispecific antibody of item 21 comprising (i) HCDR1, HCDR2, and HCDR3 sequences of SEQ ID NOs: 1, 2, and 3, respectively, and LCDR1, LCDR2, and LCDR3 sequences of SEQ ID NOs: 12, 13, and 14, respectively, or (ii) (i) HCDR1, HCDR2, and HCDR3 sequences of SEQ ID NOs: 39, 40, and 41, respectively, and LCDR1, LCDR2, and LCDR3 sequences of SEQ ID NOs: 50, 51, and 52, respectively.

23. The multispecific antibody of any one of the preceding items, wherein said first domain specifically binding IL-17A comprises a heavy chain variable region VHA and wherein said VHA is VH3 or VH4, preferably VH3.

24. The multispecific antibody of any one of the preceding items, wherein said first domain specifically binding IL-17A comprises a light chain variable region VLA and wherein said VLA comprises Vκ frameworks FR1, FR2 and FR3, particularly Vκ1 or Vκ3 FR1 to FR3, preferably Vκ1 FR1 to FR3, and a framework FR4, which is selected from a Vκ FR4, particularly Vκ1 FR4, Vκ3 FR4, and Vλ FR4, particularly Vλ FR4 comprising the amino acid sequence having at least 60, 70, 80, 90 percent identity to an amino acid sequence selected from any of SEQ ID NO: 26 to SEQ ID NO: 32, preferably Vλ FR4 as set forth in any of SEQ ID NO: 26 to SEQ ID NO: 32, preferably Vλ FR4 as set forth in SEQ ID NO: 26 or 27, more preferably Vλ FR4 as set forth in SEQ ID NO: 27.

25. The multispecific antibody of any one of items 23 to 24, wherein said VHA comprises an amino acid sequence that is (i) at least 90 percent identical to the amino acid sequence SEQ ID NO: 10; and/or said VLA comprises an amino acid sequence that is at least 90 percent identical to the amino acid sequence SEQ ID NO: 21, or (ii) at least 90 percent identical to the amino acid sequence SEQ ID NO: 48; and/or said VLA comprises an amino acid sequence that is at least 90 percent identical to the amino acid sequence SEQ ID NO: 59.

26. The multispecific antibody of item 25, wherein said VHA comprises an amino acid sequence (i) selected from the group consisting of SEQ ID NOs: 10 and 11; and/or said VLA comprises an amino acid sequence selected from the group consisting of SEQ ID NOs: 21 and 22, or (ii) selected from the group consisting of SEQ ID NOs: 48 and 49; and/or said VLA comprises an amino acid sequence selected from the group consisting of SEQ ID NOs: 59 and 60.

27. The multispecific antibody of item 26, comprising (i) a VHA sequence of SEQ ID NO: 10 and/or a VLA sequence of SEQ ID NO: 21, or (ii) a VHA sequence of SEQ ID NO: 48 and/or a VLA sequence of SEQ ID NO: 59.

28. The multispecific antibody of any one of the preceding items, wherein said second domain specifically binding TNFα comprises a set of CDRs: HCDR1, HCDR2, HCDR3, LCDR1, LCDR2 and LCDR3, wherein the set of CDRs has 10 or fewer amino acid substitutions from a set of CDRs in which HCDR1' is as set forth in SEQ ID NO: 63; HCDR2' is as set forth in SEQ ID NO: 64; HCDR3' is as set forth in SEQ ID NO: 65; LCDR1' is as set forth in SEQ ID NO: 76; LCDR2' is as set forth in SEQ ID NO: 77; LCDR3' is as set forth in SEQ ID NO: 78.

29. The multispecific antibody of item 28, wherein
(a) said HCDR1 is as set forth in the amino acid sequence selected from any one of SEQ ID Nos: 63, 66, and 69;
(b) said HCDR2 is as set forth in the amino acid sequence selected from any one of SEQ ID Nos: 64, 67, and 70;
(c) said HCDR3 is as set forth in the amino acid sequence selected from any one of SEQ ID Nos: 65, 68, and 71;
(d) said LCDR1 is as set forth in the amino acid sequence selected from any one of SEQ ID Nos: 76, 79, and 82;
(e) said LCDR2 is as set forth in the amino acid sequence selected from any one of SEQ ID Nos: 77, 80, and 83; and
(f) said LCDR3 is as set forth in the amino acid sequence selected from any one of SEQ ID Nos: 78, 81, and 84.

30. The multispecific antibody of item 29 comprising HCDR1, HCDR2, and HCDR3 sequences of SEQ ID NOs: 63, 64, and 65, respectively, and LCDR1, LCDR2, and LCDR3 sequences of SEQ ID NOs: 76, 77, and 78, respectively.

31. The multispecific antibody of any one of the preceding items, wherein said second domain specifically binding TNFα comprises a heavy chain variable region VHB and wherein said VHB is VH3 or VH4, preferably VH3.

32. The multispecific antibody of any one of the preceding items, wherein said second domain specifically binding TNFα comprises a light chain variable region VLB and wherein said VLB comprises Vκ frameworks FR1, FR2 and FR3, particularly Vκ1 or Vκ3 FR1 to FR3, preferably Vκ1 FR1 to FR3, and a framework FR4, which is selected from a Vκ FR4, particularly Vκ1 FR4, Vκ3 FR4, and Vλ FR4, particularly Vλ FR4 comprising the amino acid sequence having at least 60, 70, 80, 90 percent identity to an amino acid sequence selected from any of SEQ ID NO: 26 to SEQ ID NO: 32, preferably Vλ FR4 as set forth in any of SEQ ID NO: 26 to SEQ ID NO: 32, preferably Vλ FR4 as set forth in SEQ ID NO: 26 or 27, more preferably Vλ FR4 as set forth in SEQ ID NO: 27.

33. The multispecific antibody of any one of items 31 to 32, wherein said VHB comprises an amino acid sequence that is at least 90 percent identical to the amino acid sequence selected from the group consisting of SEQ ID NOs: 72, 73, 74 and 75, preferably at least 90 percent identical to SEQ ID NO: 72; and/or said VLB comprises an amino acid sequence that is at least 90 percent identical to the amino acid sequence selected from the group consisting of SEQ ID NOs: 85, 86, 87, 88 and 89, preferably at least 90 percent identical to SEQ ID NO: 85.

34. The multispecific antibody of item 33, wherein said VHB comprises an amino acid sequence selected from the group consisting of SEQ ID NOs: 72, 73, 74 and 75; and/or said VLB comprises an amino acid sequence selected from the group consisting of SEQ ID NOs: 85, 86, 87, 88 and 89.

35. The multispecific antibody of item 34, comprising (i) a VHB sequence of SEQ ID NO: 72 and/or a VLB sequence of SEQ ID NO: 85; or (ii) a VHB sequence of SEQ ID NO: 75 and/or a VLB sequence of SEQ ID NO: 88; or (iii) a VHB sequence of SEQ ID NO: 75 and/or a VLB sequence of SEQ ID NO: 89.

36. The multispecific antibody of any one of items 6 to 35, wherein said third domain specifically binding HSA comprises a set of CDRs: HCDR1, HCDR2, HCDR3, LCDR1, LCDR2 and LCDR3, wherein the set of CDRs has 10 or fewer amino acid substitutions from a set of CDRs in which
   (a) HCDR1' is as set forth in SEQ ID NO: 90; HCDR2' is as set forth in SEQ ID NO: 91; HCDR3' is as set forth in SEQ ID NO: 92; LCDR1' is as set forth in SEQ ID NO: 100; LCDR2' is as set forth in SEQ ID NO: 101; LCDR3' is as set forth in SEQ ID NO: 102; or
   (b) HCDR1' is as set forth in SEQ ID NO: 111; HCDR2' is as set forth in SEQ ID NO: 112; HCDR3' is as set forth in SEQ ID NO: 113; LCDR1' is as set forth in SEQ ID NO: 120; LCDR2' is as set forth in SEQ ID NO: 121; LCDR3' is as set forth in SEQ ID NO: 122.

37. The multispecific antibody of item 36, wherein
   (a) said HCDR1 is as set forth in the amino acid sequence selected from any one of SEQ ID Nos: 90, 93, and 96; said HCDR2 is as set forth in the amino acid sequence selected from any one of SEQ ID Nos: 91, 94, and 97; said HCDR3 is as set forth in the amino acid sequence selected from any one of SEQ ID Nos: 92, 95, and 98; said LCDR1 is as set forth in the amino acid sequence selected from any one of SEQ ID Nos: 100, 103, and 106; said LCDR2 is as set forth in the amino acid sequence selected from any one of SEQ ID Nos: 101, 104, and 107; and said LCDR3 is as set forth in the amino acid sequence selected from any one of SEQ ID Nos: 102, 105, and 108; or
   (b) said HCDR1 is as set forth in the amino acid sequence selected from any one of SEQ ID Nos: 111, 114, and 117; said HCDR2 is as set forth in the amino acid sequence selected from any one of SEQ ID Nos: 112, 115, and 118; said HCDR3 is as set forth in the amino acid sequence selected from any one of SEQ ID Nos: 113, 116, and 119; said LCDR1 is as set forth in the amino acid sequence selected from any one of SEQ ID Nos: 121, 124, and 127; said LCDR2 is as set forth in the amino acid sequence selected from any one of SEQ ID Nos: 122, 125, and 128; and said LCDR3 is as set forth in the amino acid sequence selected from any one of SEQ ID Nos: 123, 126, and 129.

38. The multispecific antibody of item 37 comprising
   (a) HCDR1, HCDR2, and HCDR3 sequences of SEQ ID NOs: 90, 91, and 92, respectively, and LCDR1, LCDR2, and LCDR3 sequences of SEQ ID NOs: 100, 101, and 102, respectively; or
   (b) HCDR1, HCDR2, and HCDR3 sequences of SEQ ID NOs: 111, 112, and 113, respectively, and LCDR1, LCDR2, and LCDR3 sequences of SEQ ID NOs: 121, 122, and 123, respectively.

39. The multispecific antibody of any one of items 6 to 38, wherein said third domain specifically binding HSA comprises a heavy chain variable region VHC and wherein said VHC is VH3 or VH4, preferably VH3.

40. The multispecific antibody of any one of items 6 to 39, wherein said third domain specifically binding HSA comprises a light chain variable region VLC and wherein said VLC comprises Vκ frameworks FR1, FR2 and FR3, particularly Vκ1 or Vκ3 FR1 to FR3, preferably Vκ1 FR1 to FR3, and a framework FR4, which is selected from a Vκ FR4, particularly Vκ1 FR4, Vκ3 FR4, and Vλ FR4, particularly Vλ FR4 comprising the amino acid sequence having at least 60, 70, 80, 90 percent identity to an amino acid sequence selected from any of SEQ ID NO: 26 to SEQ ID NO: 32, preferably Vλ FR4 as set forth in any of SEQ ID NO: 26 to SEQ ID NO: 32, preferably Vλ FR4 as set forth in SEQ ID NO: 26 or 27, more preferably Vλ FR4 as set forth in SEQ ID NO: 27.

41. The multispecific antibody of any one of items 39 to 40, wherein said VHC comprises an amino acid sequence that is at least 90 percent identical to the amino acid sequence SEQ ID NO: 99; and/or said VLC comprises an amino acid sequence that is at least 90 percent identical to the amino acid sequence SEQ ID NO: 109.

42. The multispecific antibody of item 41, comprising a VHC sequence of SEQ ID NO: 99 and/or a VLC sequence of SEQ ID NO: 109.

43. The multispecific antibody of any one of items 39 to 40, wherein said VHC comprises an amino acid sequence that is at least 90 percent identical to the amino acid sequence SEQ ID NO: 110; and/or said VLC comprises an amino acid sequence that is at least 90 percent identical to the amino acid sequence SEQ ID NO: 120.

44. The multispecific antibody of item 43, comprising a VHC sequence of SEQ ID NO: 110 and/or a VLC sequence of SEQ ID NO: 120.

45. The multispecific antibody of any one of the preceding items, wherein the antibody is humanized.

46. The multispecific antibody of any of the preceding items, wherein the antibody comprises an amino acid sequence having at least 80% identity, preferably at least 90% identity, to the sequence selected from any of SEQ ID NOs: 136, 137, 138, 139, 140, 141, 142, 143, 144, 145, 146, 147, and 148, preferably 143, wherein CDRs have the sequences according to items 22, 30 and 38(a).

47. The multispecific antibody of any of the preceding items, wherein the antibody comprises an amino acid sequence selected from any of SEQ ID NOs: 136, 137, 138, 139, 140, 141, 142, 143, 144, 145, 146, 147, and 148, preferably 143.

48. A pharmaceutical composition comprising the multispecific antibody of any one of the preceding items and a pharmaceutically acceptable carrier.

49. The multispecific antibody of any one of items 1 to 47, or the pharmaceutical composition of item 48 for use as a medicament.

50. The multispecific antibody of any one of items 1 to 47, or the pharmaceutical composition of item 48 for use in the treatment of a disorder mediated by IL-17A and/or TNFα or a disorder that can be treated by inhibiting Gro-α secretion.

51. The multispecific antibody of any one of items 1 to 47, or the pharmaceutical composition of item 48 for use in the treatment of an inflammatory condition or an autoimmune disease.
52. The multispecific antibody of any one of items 1 to 47, or the pharmaceutical composition of item 48 for use in the treatment of a cancer, arthritis, rheumatoid arthritis, osteoarthritis, reactive arthritis, psoriasis, chronic obstructive pulmonary disease, systemic lupus erythematosus (SLE), lupus nephritis, an autoimmune inflammatory bowel disease, asthma, multiple sclerosis, or cystic fibrosis, bone loss, airways hypersensitivity, a demyelinating disorder, dermal hypersensitivity, acute transplant rejection, allograft rejection, graft-versus host disease, systemic sclerosis, an urological inflammatory disorder, a cardiovascular disease, vasculitis, a periodic fever, a glucose metabolism disorder, a pulmonary disease, peridontitis, hepatic stromal keratitis, an allergy, inflammatory pain, a spondyloarthropathy, septicaemia, septic or endotoxic shock, meningitis, surgical trauma, an autoimmune haematological disorder, Alzheimer's disease, sarcoidosis, cirrhosis, hepatitis, glomerulonephritis or dislipidemia.
53. Use of the multispecific antibody of any one of items 1 to 47, or the pharmaceutical composition of item 48 in the manufacture of a medicament for use in the treatment of a disorder mediated by IL-17A and/or TNFα or a disorder that can be treated by inhibiting Gro-α secretion.
54. Use of the multispecific antibody of any one of items 1 to 47, or the pharmaceutical composition of item 48 in the manufacture of a medicament for use in the treatment of an inflammatory condition or an autoimmune disease.
55. Use of the multispecific antibody of any one of items 1 to 47, or the pharmaceutical composition of item 48 in the manufacture of a medicament for use in the treatment of a cancer, arthritis, rheumatoid arthritis, osteoarthritis, reactive arthritis, psoriasis, chronic obstructive pulmonary disease, systemic lupus erythematosus (SLE), lupus nephritis, an autoimmune inflammatory bowel disease, asthma, multiple sclerosis, cystic fibrosis, bone loss, airways hypersensitivity, a demyelinating disorder, dermal hypersensitivity, acute transplant rejection, allograft rejection, graft-versus host disease, systemic sclerosis, an urological inflammatory disorder, a cardiovascular disease, vasculitis, a periodic fever, a glucose metabolism disorder, a pulmonary disease, peridontitis, hepatic stromal keratitis, an allergy, inflammatory pain, a spondyloarthropathy, septicaemia, septic or endotoxic shock, meningitis, surgical trauma, an autoimmune haematological disorder, Alzheimer's disease, sarcoidosis, cirrhosis, hepatitis, glomerulonephritis or dislipidemia.
56. A method of treating a disorder mediated by IL-17A and/or TNFα, said method comprising administering an effective amount of the multispecific antibody of any one of items 1 to 47, or the pharmaceutical composition of item 48, such that the condition is alleviated.
57. The method according to item 56, wherein the disorder mediated by IL-17A and/or TNFα is inflammatory condition or an autoimmune disease.
58. The method according to item 56, wherein the disorder mediated by IL-17A and/or TNFα is a cancer, arthritis, rheumatoid arthritis, osteoarthritis, reactive arthritis, psoriasis, chronic obstructive pulmonary disease, systemic lupus erythematosus (SLE), lupus nephritis, an autoimmune inflammatory bowel disease, asthma, multiple sclerosis, cystic fibrosis, bone loss, airways hypersensitivity, a demyelinating disorder, dermal hypersensitivity, acute transplant rejection, allograft rejection, graft-versus host disease, systemic sclerosis, an urological inflammatory disorder, a cardiovascular disease, vasculitis, a periodic fever, a glucose metabolism disorder, a pulmonary disease, peridontitis, hepatic stromal keratitis, an allergy, inflammatory pain, a spondyloarthropathy, septicaemia, septic or endotoxic shock, meningitis, surgical trauma, an autoimmune haematological disorder, Alzheimer's disease, sarcoidosis, cirrhosis, hepatitis, glomerulonephritis or dislipidemia.
59. A nucleic acid encoding the multispecific antibody of any one of items 1 to 47 or a fragment thereof.
60. A vector comprising the nucleic acid of item 59.
61. A host cell comprising the nucleic acid of item 59 or the vector of item 60.
62. A method of producing the multispecific antibody of any one of items 1 to 47, the method comprising the step of culturing a host cell comprising a nucleic acid or a vector encoding the multispecific antibody of any one of items 1 to 47 or a fragment thereof.
63. A kit comprising the multispecific antibody of any one of items 1 to 47, or the pharmaceutical composition of item 48.

It is another object of the present invention to provide an anti-IL-17A antibody with improved affinity, efficacy and improved biophysical properties, e.g. improved solubility, developability and stability.

Anti-IL-17A antibodies of the present invention have improved properties beneficial for use in therapies, such as higher affinity, improved efficacy, selectivity, improved biophysical properties, such as solubility, developability, and stability.

Therefore, in one aspect, the disclosure provides an isolated antibody having a binding specificity for human IL-17A, in particular which comprises a set of CDRs: HCDR1, HCDR2, HCDR3, LCDR1, LCDR2 and LCDR3, wherein the set of CDRs has 10 or fewer, preferably 0, amino acid substitutions from a set of CDRs in which HCDR1' is amino acid sequence selected from any one of SEQ ID Nos: 1, 4, and 7; HCDR2' is amino acid sequence selected from any one of SEQ ID Nos: 2, 5, and 8; HCDR3' is amino acid sequence selected from any one of SEQ ID Nos: 3, 6, and 9; LCDR1' is amino acid sequence selected from any one of SEQ ID Nos: 12, 15, and 18; LCDR2' is amino acid sequence selected from any one of SEQ ID Nos: 13, 16, and 19; LCDR3' having the amino acid sequence selected from any one of SEQ ID Nos: 14, 17, and 20. In one aspect, the present disclosure relates to a multispecific molecule comprising the isolated antibody of the disclosure.

In another aspect, the disclosure provides an isolated antibody having a binding specificity for human IL-17A, in particular which comprises a set of CDRs: HCDR1, HCDR2, HCDR3, LCDR1, LCDR2 and LCDR3, wherein the set of CDRs has 10 or fewer, preferably 0, amino acid substitutions from a set of CDRs in which HCDR1' is amino acid sequence selected from any one of SEQ ID Nos: 39, 42, and 45; HCDR2' is amino acid sequence selected from any one of SEQ ID Nos: 40, 43, and 46; HCDR3' is amino acid sequence selected from any one of SEQ ID Nos: 41, 44, and 47; LCDR1' is amino acid sequence selected from any one of SEQ ID Nos: 50, 53, and 56; LCDR2' is amino acid sequence selected from any one of SEQ ID Nos: 51, 54, and 57; LCDR3' having the amino acid sequence selected from any one of SEQ ID Nos: 52, 55, and 58. In one aspect, the present disclosure relates to a multispecific molecule comprising the isolated antibody of the disclosure.

In one aspect, the present disclosure relates to a pharmaceutical composition comprising the isolated antibody of the disclosure, or the multispecific molecule comprising the isolated antibody of the disclosure, and a pharmaceutically acceptable carrier.

In another aspect, the present disclosure relates to the antibody of the disclosure or the multispecific molecule comprising said isolated antibody, or the pharmaceutical composition of the disclosure for use as a medicament.

In one aspect, the present disclosure relates to the antibody, or the multispecific molecule comprising said isolated antibody, or the pharmaceutical composition of the disclosure for use in the treatment of a disorder mediated by IL-17A or a disorder that can be treated by inhibiting GRO-α secretion.

In one aspect, the present disclosure relates to use of the antibody of the disclosure or the multispecific molecule comprising said isolated antibody, or the pharmaceutical composition of the disclosure in the manufacture of a medicament for use in the treatment of a disorder mediated by IL-17A or a disorder that can be treated by inhibiting GRO-α secretion.

In another aspect, the present disclosure relates to a method of treating a disorder mediated by IL-17A, said method comprising administering an effective amount of the antibody of the disclosure, or the multispecific molecule of the disclosure, or the pharmaceutical composition of the disclosure to a subject in need thereof. In yet another aspect, the present disclosure relates to a nucleic acid encoding the antibody of the disclosure. In a further aspect, the present disclosure relates to a vector comprising said nucleic acid. In a further aspect, the present disclosure relates to a host cell comprising said nucleic acid or said vector.

In another aspect, the present disclosure relates to a method of producing the antibody of the disclosure, the method comprising the step of culturing a host cell comprising a nucleic acid or a vector encoding the antibody of the disclosure.

The aspects, advantageous features and preferred embodiments of the present disclosure summarized in the following items, respectively alone or in combination, further contribute to solving the object of the invention:

1. An antibody having a binding specificity for human IL-17A, comprising a set of CDRs: HCDR1, HCDR2, HCDR3, LCDR1, LCDR2 and LCDR3, wherein the set of CDRs has 10 or fewer amino acid substitutions from a set of CDRs in which
   (i) HCDR1' is amino acid sequence selected from any one of SEQ ID Nos: 1, 4, and 7;
   HCDR2' is amino acid sequence selected from any one of SEQ ID Nos: 2, 5, and 8;
   HCDR3' is amino acid sequence selected from any one of SEQ ID Nos: 3, 6, and 9;
   LCDR1' is amino acid sequence selected from any one of SEQ ID Nos: 12, 15, and 18;
   LCDR2' is amino acid sequence selected from any one of SEQ ID Nos: 13, 16, and 19;
   LCDR3' having the amino acid sequence selected from any one of SEQ ID Nos: 14, 17, and 20; or
   (ii) HCDR1' is amino acid sequence selected from any one of SEQ ID Nos: 39, 42, and 45;
   HCDR2' is amino acid sequence selected from any one of SEQ ID Nos: 40, 43, and 46;
   HCDR3' is amino acid sequence selected from any one of SEQ ID Nos: 41, 44, and 47;
   LCDR1' is amino acid sequence selected from any one of SEQ ID Nos: 50, 53, and 56;
   LCDR2' is amino acid sequence selected from any one of SEQ ID Nos: 51, 54, and 57;
   LCDR3' having the amino acid sequence selected from any one of SEQ ID Nos: 52, 55, and 58.

2. The antibody of item 1, comprising a set of CDRs: HCDR1, HCDR2, HCDR3, LCDR1, LCDR2 and LCDR3, wherein the set of CDRs has 10 or fewer amino acid substitutions from a set of CDRs in which
   (i) HCDR1' is as set forth in SEQ ID Nos: 1;
   HCDR2' is as set forth in SEQ ID Nos: 2;
   HCDR3' is as set forth in SEQ ID Nos: 3;
   LCDR1' is as set forth in SEQ ID Nos: 12;
   LCDR2' is as set forth in SEQ ID Nos: 13;
   LCDR3' is as set forth in SEQ ID Nos: 14; or
   (ii) HCDR1' is as set forth in SEQ ID Nos: 39;
   HCDR2' is as set forth in SEQ ID Nos: 40;
   HCDR3' is as set forth in SEQ ID Nos: 41;
   LCDR1' is as set forth in SEQ ID Nos: 50;
   LCDR2' is as set forth in SEQ ID Nos: 51;
   LCDR3' is as set forth in SEQ ID Nos: 52.

3. The antibody of item 1 or item 2, which comprises a heavy chain variable region (VH) and a light chain variable region (VL), wherein:
   (c) said VH comprises, in sequence, the three complementary determining regions HCDR1, HCDR2 and HCDR3, and
   (d) said VL comprises, in sequence, the three complementary determining regions LCDR1, LCDR2 and LCDR3.

4. The antibody of item 3, wherein
   (i)
   (g) said HCDR1 is as set forth in the amino acid sequence selected from any one of SEQ ID Nos: 1, 4, and 7;
   (h) said HCDR2 is as set forth in the amino acid sequence selected from any one of SEQ ID Nos: 2, 5, and 8;
   (i) said HCDR3 is as set forth in the amino acid sequence selected from any one of SEQ ID Nos: 3, 6, and 9;
   (j) said LCDR1 is as set forth in the amino acid sequence selected from any one of SEQ ID Nos: 12, 15, and 18;
   (k) said LCDR2 is as set forth in the amino acid sequence selected from any one of SEQ ID Nos: 13, 16, and 19; and
   (l) said LCDR3 is as set forth in the amino acid sequence selected from any one of SEQ ID Nos: 14, 17, and 20; or
   (ii)
   (a) said HCDR1 is as set forth in the amino acid sequence selected from any one of SEQ ID Nos: 39, 42, and 45;
   (b) said HCDR2 is as set forth in the amino acid sequence selected from any one of SEQ ID Nos: 40, 43, and 46;
   (c) said HCDR3 is as set forth in the amino acid sequence selected from any one of SEQ ID Nos: 41, 44, and 47;
   (d) said LCDR1 is as set forth in the amino acid sequence selected from any one of SEQ ID Nos: 50, 53, and 56;

(e) said LCDR2 is as set forth in the amino acid sequence selected from any one of SEQ ID Nos: 51, 54, and 57; and (f) said LCDR3 is as set forth in the amino acid sequence selected from any one of SEQ ID Nos: 52, 55, and 58.

5. The antibody of item 4, wherein the antibody comprises (i) HCDR1, HCDR2, and HCDR3 sequences of SEQ ID NOs: 1, 2, and 3, respectively, and LCDR1, LCDR2, and LCDR3 sequences of SEQ ID NOs: 12, 13, and 14, respectively; or (ii) HCDR1, HCDR2, and HCDR3 sequences of SEQ ID NOs: 39, 40, and 41, respectively, and LCDR1, LCDR2, and LCDR3 sequences of SEQ ID NOs: 50, 51, and 52, respectively.

6. The antibody of any one of items 3 to 5, wherein said VH is VH3 or VH4, preferably VH3.

7. The antibody of any one of items 3 to 6, wherein said VL comprises Vκ frameworks FR1, FR2 and FR3, particularly Vκ1 or Vκ3 FR1 to FR3, preferably Vκ1 FR1 to FR3, and a framework FR4, which is selected from a Vκ FR4, particularly Vκ1 FR4, Vκ3 FR4, and Vλ FR4, particularly Vλ FR4 comprising the amino acid sequence having at least 60, 70, 80, 90 percent identity to an amino acid sequence selected from any of SEQ ID NO: 26 to SEQ ID NO: 32, preferably Vλ FR4 as set forth in any of SEQ ID NO: 26 to SEQ ID NO: 32, preferably Vλ FR4 as set forth in SEQ ID NO: 26 or 27, more preferably Vλ FR4 as set forth in SEQ ID NO: 27.

8. The antibody of any one of items 3 to 7, wherein (i) said VH comprises an amino acid sequence that is at least 90 percent identical to the amino acid sequence SEQ ID NO: 10; and/or said VL comprises an amino acid sequence that is at least 90 percent identical to the amino acid sequence SEQ ID NO: 21; or (i) said VH comprises an amino acid sequence that is at least 90 percent identical to the amino acid sequence SEQ ID NO: 48; and/or said VL comprises an amino acid sequence that is at least 90 percent identical to the amino acid sequence SEQ ID NO: 59.

9. The antibody of item 8, wherein (i) said VH comprises an amino acid sequence selected from the group consisting of SEQ ID NOs: 10 and 11; and/or said VL comprises an amino acid sequence selected from the group consisting of SEQ ID NOs: 21 and 22; or (ii) said VH comprises an amino acid sequence selected from the group consisting of SEQ ID NOs: 48 and 49; and/or said VL comprises an amino acid sequence selected from the group consisting of SEQ ID NOs: 59 and 60.

10. The antibody of item 9, comprising (i) a VH sequence of SEQ ID NO: 10 and/or a VL sequence of SEQ ID NO: 21; or (ii) a VH sequence of SEQ ID NO: 48 and/or a VL sequence of SEQ ID NO: 59.

11. The antibody of item 9, comprising (i) a VH sequence of SEQ ID NO: 11 and/or a VL sequence of SEQ ID NO: 49; or (ii) a VH sequence of SEQ ID NO: 11 and/or a VL sequence of SEQ ID NO: 60.

12. The antibody of any one of the preceding items, wherein the antibody has a binding specificity for cynomolgus monkey IL-17A.

13. The antibody of any one of the preceding items, wherein said antibody selectively binds to human IL-17A over human IL-17B, IL-17C, IL-17D, IL-17E and IL-17F as measured by ELISA.

14. The antibody of any one of the preceding items, wherein binding to IL-17A (a) inhibits or blocks binding between IL-17A and its receptor (IL-17RA), and (b) reduces or neutralizes IL-17A activity.

15. The antibody of item 14, wherein said antibody is capable of inhibiting GRO-α secretion when assessed in vitro in HT-29 assay.

16. The antibody of any of the preceding items, wherein said antibody:

(h) has the ability to block interaction between IL-17A and IL-17RA with a potency relative to that of secukinumab (relative potency), determined in ELISA assay, greater than 5, preferably greater than 10, more preferably greater than 15, even more preferably greater than 20, and wherein said relative potency is the ratio of the $IC_{50}$ value in ng/mL of secukinumab as measured by ELISA to the $IC_{50}$ value in ng/mL of the antibody of the invention in the scFv format as measured by ELISA; and/or (i) has the ability to neutralize IL-17A with a potency relative to that of secukinumab (relative potency), determined by measuring GRO-α secretion in an HT-29 assay, greater than 50, preferably greater than 100, more preferably greater than 150, and wherein said relative potency is the ratio of the $IC_{50}$ value in ng/mL of secukinumab as measured in the HT-29 assay to the $IC_{50}$ value in ng/mL of the antibody of the invention in the scFv format as measured in the HT-29 assay; and/or (j) capable of inhibiting the activity of 1 ng human IL-17A at a concentration of 1 ng/mL or less, preferably 0.5 ng/mL or less, more preferably 0.2 ng/mL or less, by 50%, said inhibitory activity is determined by measuring GRO-α secretion induced by human IL-17A in HT-29 assay in the presence of 50 pg/ml TNFα.

17. The antibody of any of the preceding items, wherein said antibody:

(a) binds to human IL-17A with a dissociation constant ($K_D$) of less than 5 nM, particularly less than 1 nM, less than 0.5 nM, less than 0.2 nM, more particularly less than 100 pM, more particularly less than 50 pM, as measured by surface plasmon resonance, particularly as measured by surface plasmon resonance in a direct setup; and (b) optionally, binds to Cynomolgus IL-17A with a $K_D$ of less than 10 nM, particularly less than 7 nM, less than 5 nM, less than 2 nM, less than 1 nM, more particularly less than 0.5 nM as measured by surface plasmon resonance, particularly as measured by surface plasmon resonance in a capture setup.

18. The antibody of item 17, wherein said antibody binds to human IL-17A with a dissociation constant ($K_D$) of less than 0.5 nM, less than 0.2 nM, less than 100 pM, particularly less than 50 pM as measured by surface plasmon resonance, in particular as measured by surface plasmon resonance in a direct set-up.

19. The antibody of any of the preceding items, wherein said antibody:

(e) when in scFv format, has a melting temperature (Tm), determined by differential scanning fluorimetry, of at least 60° C., particularly of at least 62° C., of at least 65° C., more particularly of at least 70° C., in particular wherein said antibody is in phosphate-citrate buffer at pH 6.4, 150 mM NaCl;

(f) when in scFv format, has a loss in monomer content, after five consecutive freeze-thaw cycles, of less than 5%, particularly less than 3%, more particularly less than 1%, when the antibody of the invention is at a starting concentration of 10 mg/ml, in particular wherein said antibody is in phosphate buffered saline (PBS), pH 7.4;
- (g) when in scFv format, has a loss in monomer content, after storage for at least two weeks, particularly for at least four weeks, at 4° C., of 5% or less, particularly less than 4%, less than 3%, less than 2%, more particularly less than 1%, when the antibody of the invention is at a starting concentration of 10 mg/ml, in particular wherein said antibody is in phosphate buffered saline (PBS), pH 7.4; and/or
- (h) has a loss in monomer content, after storage for at least two weeks, particularly for at least four weeks, at 37° C., of less than 5%, when the antibody of the invention is at a starting concentration of 10 mg/ml.

20. The antibody of any of the preceding items, wherein the antibody is selected from the group consisting of: a monoclonal antibody, a chimeric antibody, a Fab, an Fv, an scFv, dsFv, an scAb, STAB, a single domain antibody (sdAb or dAb), a single domain heavy chain antibody, and a single domain light chain antibody, a VHH, a VNAR, single domain antibodies based on the VNAR structure from shark, and binding domains based on alternative scaffolds including but limited to ankyrin-based domains, fynomers, avimers, anticalins, fibronectins, and binding sites being built into constant regions of antibodies (e.g. F-star's Modular Antibody Technology™), preferably scFv.

21. The antibody of item 20, wherein said scFv has the amino acid sequence selected from (i) the group consisting of SEQ ID NO:24 and SEQ ID NO: 25, preferably wherein said scFv has the amino acid sequence of SEQ ID NO: 24; or (ii) the group consisting of SEQ ID NO:61 and SEQ ID NO: 62, preferably wherein said scFv has the amino acid sequence of SEQ ID NO: 61.

22. The isolated antibody of item 20, wherein the antibody is an IgG selected from the group consisting of an IgG1, an IgG2, an IgG3 and an IgG4, preferably wherein the antibody is an IgG1 or IgG4.

23. The isolated antibody of any of the preceding items, wherein the antibody is humanized.

24. The antibody of any one of items 1 to 23 which is a multispecific molecule.

25. The antibody of item 24, wherein said antibody is in a format selected from the group consisting of a single-chain diabody (scDb), a tandem scDb (Tandab), a linear dimeric scDb (LD-scDb), a circular dimeric scDb (CD-scDb), a bispecific T-cell engager (BiTE; tandem di-scFv), a tandem tri-scFv, a tribody (Fab-(scFv)$_2$) or bibody (Fab-(scFv)$_1$), Fab, Fab-Fv$_2$, Morrison (IgG CH$_3$-scFv fusion (Morrison L) or IgG CL-scFv fusion (Morrison H)), triabody, scDb-scFv, bispecific Fab$_2$, di-miniantibody, tetrabody, scFv-Fc-scFv fusion, scFv-HSA-scFv fusion, di-diabody, DVD-Ig, COVD, IgG-scFab, scFab-dsscFv, Fv$_2$-Fc, IgG-scFv fusions, such as bsAb (scFv linked to C-terminus of light chain), Bs1Ab (scFv linked to N-terminus of light chain), Bs2Ab (scFv linked to N-terminus of heavy chain), Bs3Ab (scFv linked to C-terminus of heavy chain), Ts1Ab (scFv linked to N-terminus of both heavy chain and light chain), Ts2Ab (dsscFv linked to C-terminus of heavy chain), bispecific antibodies based on heterodimeric Fc domains, such as Knob-into-Hole antibodies (KiHs); an Fv, scFv, scDb, tandem-di-scFv, tandem tri-scFv, Fab-(scFv)$_2$, Fab-(scFv)$_1$, Fab, Fab-Fv$_2$, COVD fused to the N- and/or the C-terminus of either chain of a heterodimeric Fc domain or any other heterodimerization domain, a MATCH and DuoBodies.

26. A pharmaceutical composition comprising the antibody of any one of items 1 to 25, and a pharmaceutically acceptable carrier.

27. The antibody of any one of items 1 to 25, or the pharmaceutical composition of item 26 for use as a medicament.

28. The antibody of any one of items 1 to 25, or the pharmaceutical composition of item 26 for use in the treatment of a disorder mediated by IL-17A or a disorder that can be treated by inhibiting GRO-α secretion.

29. The antibody of any one of items 1 to 25, or the pharmaceutical composition of item 26 for use in the treatment of an inflammatory condition or an autoimmune disease.

30. The antibody of any one of items 1 to 25, or the pharmaceutical composition of item 26 for use in the treatment of a cancer, arthritis, rheumatoid arthritis, osteoarthritis, reactive arthritis, psoriasis, chronic obstructive pulmonary disease, systemic lupus erythematosus (SLE), lupus nephritis, an autoimmune inflammatory bowel disease, asthma, multiple sclerosis, or cystic fibrosis, bone loss, airways hypersensitivity, a demyelinating disorder, dermal hypersensitivity, acute transplant rejection, allograft rejection, graft-versus host disease, systemic sclerosis, an urological inflammatory disorder, a cardiovascular disease, vasculitis, a periodic fever, a glucose metabolism disorder, a pulmonary disease, peridontitis, hepatic stromal keratitis, an allergy, inflammatory pain, a spondyloarthropathy, septicaemia, septic or endotoxic shock, meningitis, surgical trauma, an autoimmune haematological disorder, Alzheimer's disease, sarcoidosis, cirrhosis, hepatitis, glomerulonephritis or dislipidemia.

31. Use of the antibody of any one of items 1 to 25, or the pharmaceutical composition of item 26 in the manufacture of a medicament for use in the treatment of a disorder mediated by IL-17A or a disorder that can be treated by inhibiting GRO-α secretion.

32. Use of the antibody of any one of items 1 to 25, or the pharmaceutical composition of item 26 in the manufacture of a medicament for use in the treatment of an inflammatory condition or an autoimmune disease.

33. Use of the antibody of any one of items 1 to 25, or the pharmaceutical composition of item 26 in the manufacture of a medicament for use in the treatment of a cancer, arthritis, rheumatoid arthritis, osteoarthritis, reactive arthritis, psoriasis, chronic obstructive pulmonary disease, systemic lupus erythematosus (SLE), lupus nephritis, an autoimmune inflammatory bowel disease, asthma, multiple sclerosis, cystic fibrosis, bone loss, airways hypersensitivity, a demyelinating disorder, dermal hypersensitivity, acute transplant rejection, allograft rejection, graft-versus host disease, systemic sclerosis, an urological inflammatory disorder, a cardiovascular disease, vasculitis, a periodic fever, a glucose metabolism disorder, a pulmonary disease, peridontitis, hepatic stromal keratitis, an allergy, inflammatory pain, a spondyloarthropathy, septicaemia, septic or endotoxic shock, meningitis, surgical trauma, an autoimmune haematological disorder, Alzheimer's disease, sarcoidosis, cirrhosis, hepatitis, glomerulonephritis or dislipidemia.

34. A method of treating a disorder mediated by IL-17A, said method comprising administering an effective amount of the antibody of any one of items 1 to 25, or the pharmaceutical composition of item 26, such that the condition is alleviated.

35. The method according to item 34, wherein the disorder mediated by IL-17A is inflammatory condition or an autoimmune disease.
36. The method according to item 34, wherein the disorder mediated by IL-17A is a cancer, arthritis, rheumatoid arthritis, osteoarthritis, reactive arthritis, psoriasis, chronic obstructive pulmonary disease, systemic lupus erythematosus (SLE), lupus nephritis, an autoimmune inflammatory bowel disease, asthma, multiple sclerosis, cystic fibrosis, bone loss, airways hypersensitivity, a demyelinating disorder, dermal hypersensitivity, acute transplant rejection, allograft rejection, graft-versus host disease, systemic sclerosis, an urological inflammatory disorder, a cardiovascular disease, vasculitis, a periodic fever, a glucose metabolism disorder, a pulmonary disease, peridontitis, hepatic stromal keratitis, an allergy, inflammatory pain, a spondyloarthropathy, septicaemia, septic or endotoxic shock, meningitis, surgical trauma, an autoimmune haematological disorder, Alzheimer's disease, sarcoidosis, cirrhosis, hepatitis, glomerulonephritis or dislipidemia.
37. A nucleic acid encoding the antibody of items 1-25.
38. A vector comprising the nucleic acid of item 37.
39. A host cell comprising the nucleic acid of item 37 or the vector of item 38.
40. A method of producing the antibody of items 1-25, the method comprising the step of culturing a host cell comprising a nucleic acid or a vector encoding the antibody of items 1-25.
41. A kit comprising the antibody of any one of items 1 to 25, or the pharmaceutical composition of item 26.

The disclosure contemplates all combinations of any one or more of the foregoing aspects and/or embodiments, as well as combinations with any one or more of the embodiments set forth in the detailed description and examples.

Other features, objects, and advantages of the compositions and methods herein will be apparent from the description and drawings, and from the claims.

BRIEF DESCRIPTION OF THE DRAWINGS

FIG. 2 shows the potencies of 27-07-G02 rabbit IgG (A), and 27-31-004 IgG (B), to neutralize IL-17A in the HT-29 assay.

FIG. 3 shows the potencies of 27-07-G02 rabbit IgG (A), and 27-31-004 IgG (B), to inhibit the interaction between IL-17A and IL-17RA.

FIG. 4 shows the potencies of the humanized scFvs A1 and A2 (A), and PRO571 and PRO592 (B), to neutralize IL-17A in the HT-29 assay.

FIG. 5 shows the potencies of anti-IL-17A scFv A1 and A2 (A), and PRO571 and PRO592 (B), to inhibit the interaction between human IL-17A and IL-17RA (ELISA).

FIG. 6 shows the target specificity of the scFv A1 (A), and scFvs PRO571 and PRO592 (B), is shown. The potential to inhibit the interaction of biotinylated IL-17A with the scFvs by IL-17B to IL-17F was analyzed by competition ELISA. Dose-dependent effects of IL-17A and IL-17B to IL-17F are shown.

FIG. 7 shows the thermal unfolding curves from DSF measurements of the scFvs A1 and A2 (A), and the scFv PRO571 and PRO592 (B). The resulting Tm values have been determined by fitting the data to a Boltzmann equation to obtain the midpoint of transition.

FIG. 9 shows the monitoring of monomeric content of the scFv A1 (A), and scFvs PRO571 and PRO592 (B), over 5 repeated freezing and thawing cycles.

FIG. 10 shows trispecific formats. A, Three domain permutation variants of Fab-(scFv)$_2$ molecules were designed. ScFv fusions at positions CL and CH1 of the tribody format are considered as equivalent, resulting in three variants of this format. B, three scDb-scFv domain permutation variants were designed. Domain specificities are indicated at the bottom. Gly-Ser linkers joining variable domains and inter-domain disulfide bonds are indicated by a grey bracket.

FIG. 14 shows the concomitant blockade of TNF-α and IL-17A in HT-29 assay in presence of HSA. In vitro concomitant blockade of TNFα and IL-17A by six trispecific molecules A3-A8 was analyzed using the HT-29 cell-based assay in presence of 1 mg/ml of HSA. Secukinumab (IL-17A blocker) and A13 (parental bispecific, HSA binder and TNFα blocker) were used as references. GRO-α secretion data obtained are presented in function of molecule concentrations in nM (A, C and E) and in ng/ml (B, D and F). "No TNFα" shows the GRO-α secretion upon addition of only IL-17A and corresponds to the maximum effect by TNFα blockade. "No IL17a" shows the GRO-α secretion upon addition of only TNFα and corresponds to the maximum effect by IL-17A blockade. "No IL17a, no TNFα" shows the background GRO-α secretion when no IL-17A and TNFα is added and corresponds to the maximum effect by concomitant TNFα and IL-17A blockade.

Figure 15:
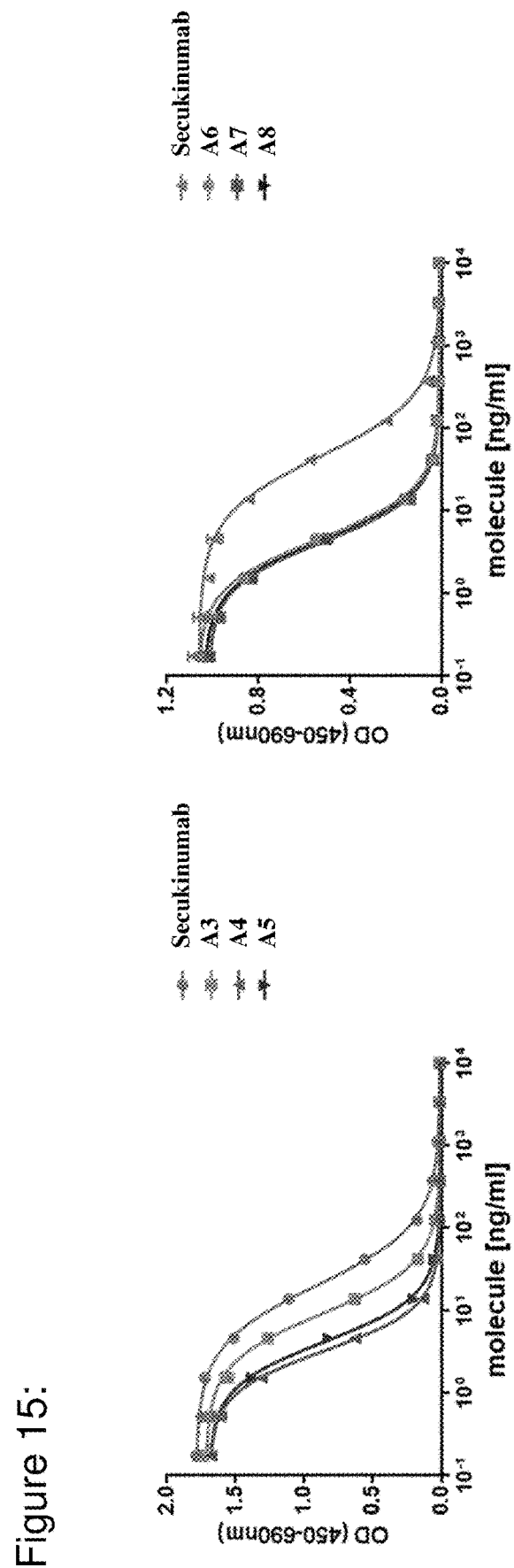

FIG. 15 shows the neutralization of IL-17A binding to IL-17RA in competitive ELISA. Absorbance measured in the competitive ELISA assessing IL-17A binding to IL-17RA are presented in function of increasing concentrations of the six trispecific molecules (A3-A8). Secukinumab (IL-17A blocker) was used as references.

Figure 16:
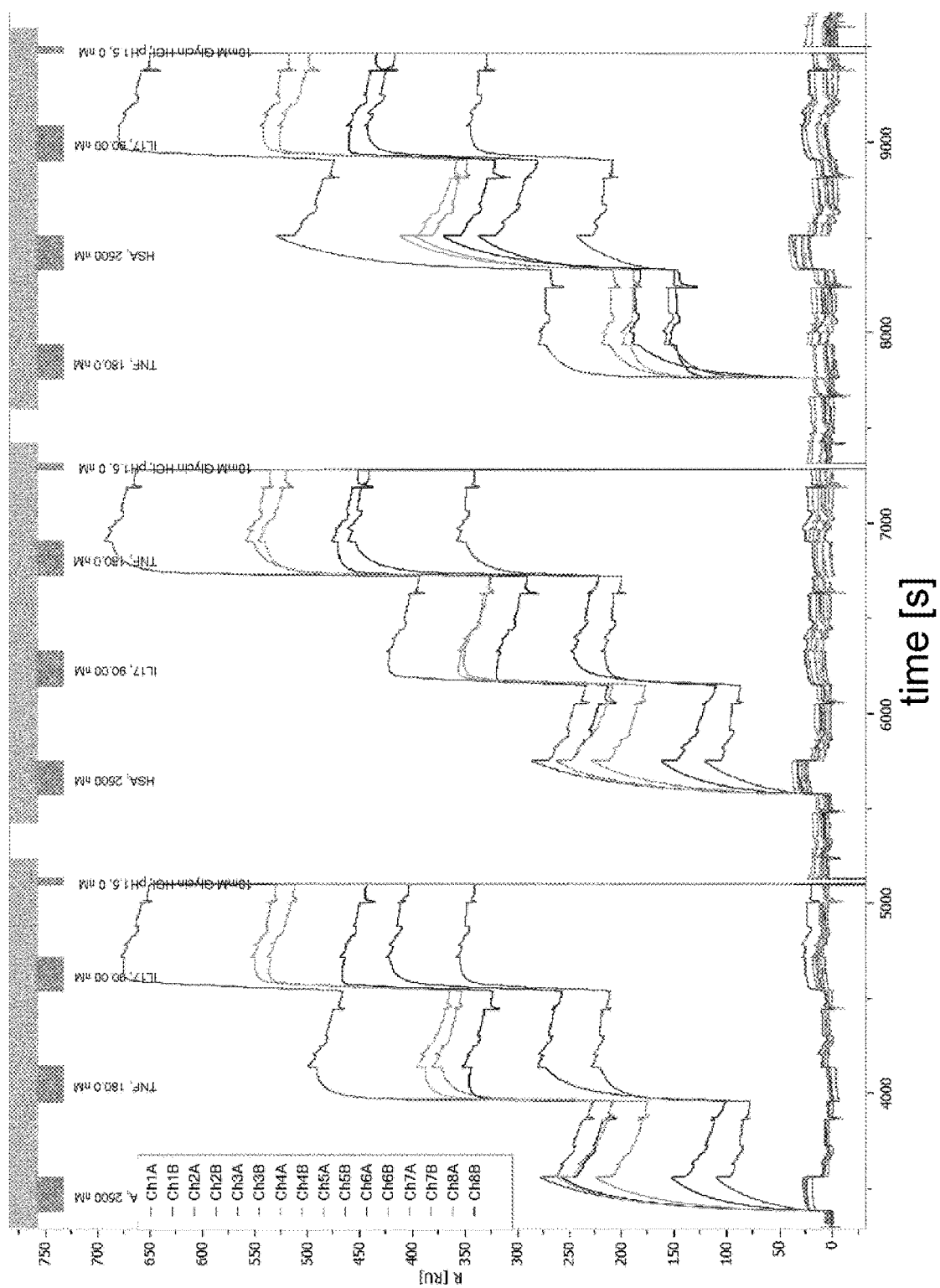

FIG. 16 shows the simultaneous binding to human TNFα, human IL-17A and HSA by SPR. The six possible sequences of injections of the different analytes (human TNFα, human IL-17A and HSA) were performed on a MASS-1 SPR device and the obtained sensorgrams are shown. The trispecific molecules were immobilized on the sensor chip (A3 on channel 1B, Ch1B, A4 on channel 2B, Ch2B, A5 on channel 3B, Ch3B, A6 on channel 4B, Ch4B, A7 on channel 5B, Ch5B, A8 on channel 6B, Ch6B) and antigens were injected sequentially.

FIG. 17 shows a storage stability study performed at temperatures of 37° C., 4° C. and −80° C. at a protein concentration of 10 mg/mL for 4 weeks. Course of % monomeric content and % monomeric loss over time was recorded at d0, d2, d7, d14, d21 and d28.

Figure 18:
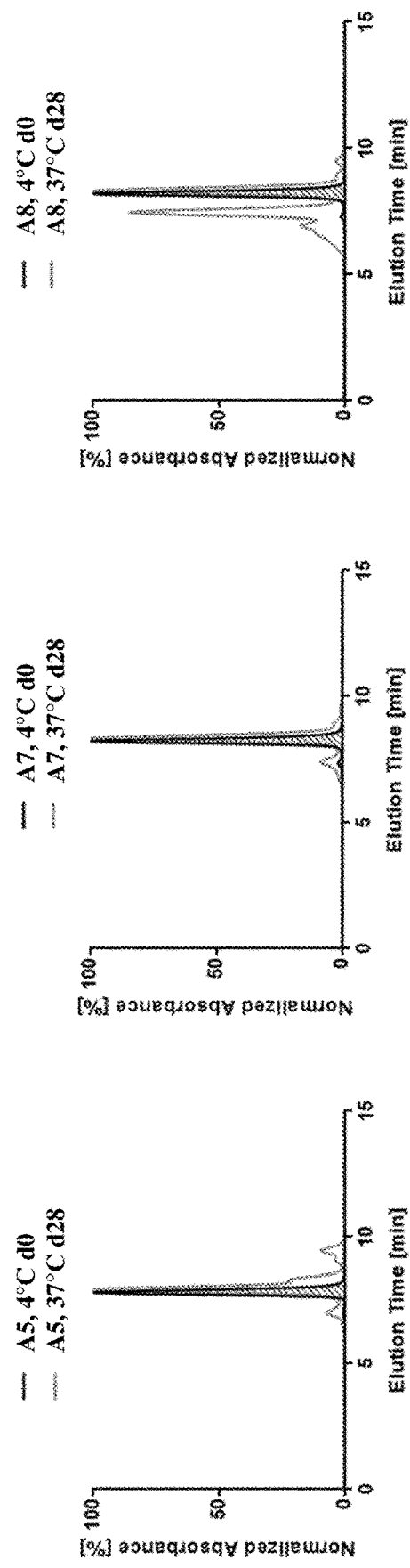

FIG. 18 shows overlays of SE-HPLC traces of d0 (black, shaded) and d28 (grey) stability samples of A5 (left), A7 (middle) and A8 (right).

Figure 19:
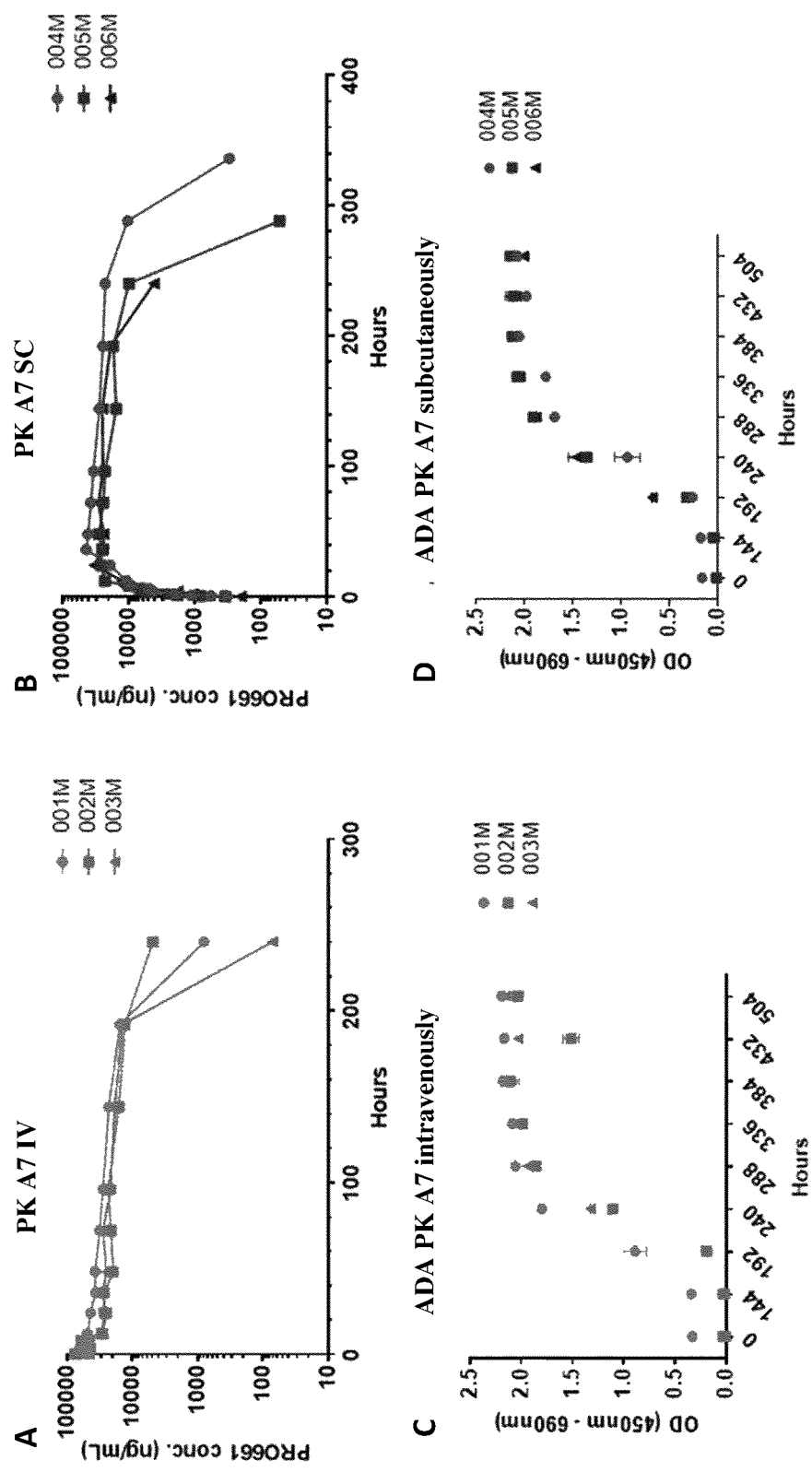

FIG. 19 shows the pharmacokinetic profile of A7 in cynomolgus monkey after intravenous (n=3) and subcutaneous (n=3) administration and ADA analysis.

Figure 20:
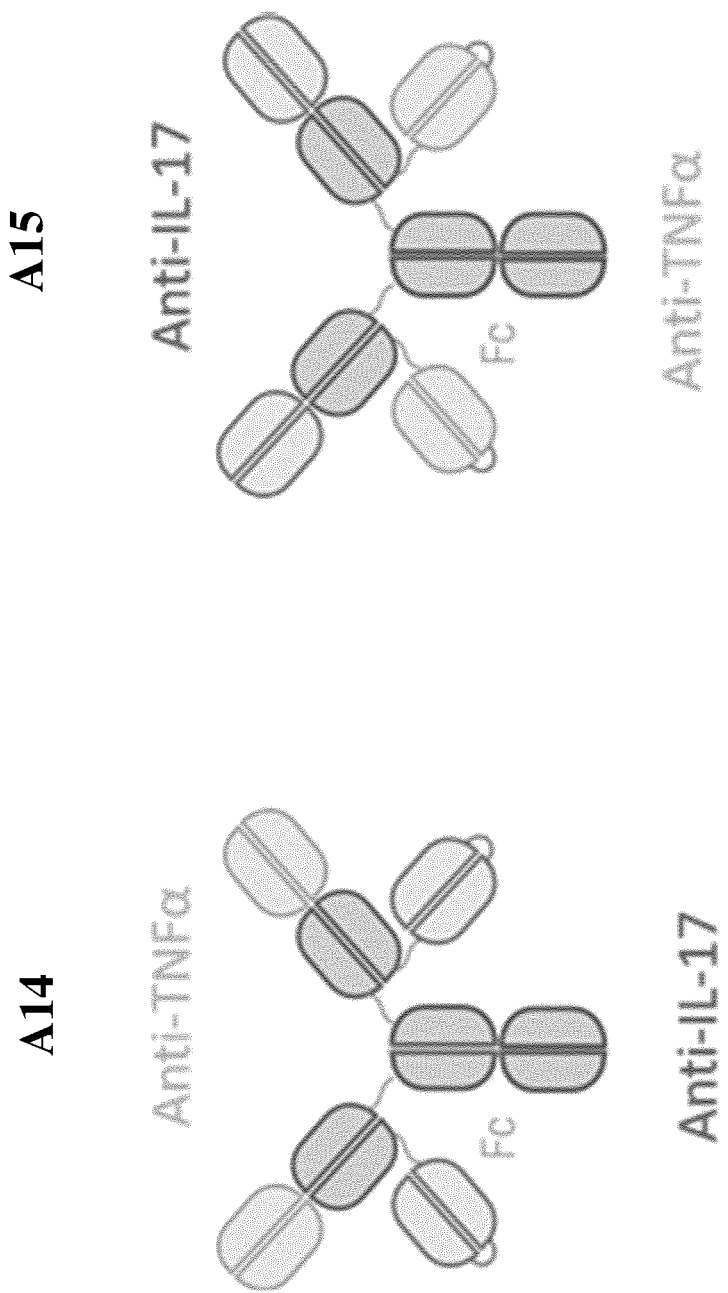

FIG. 20 shows the schematic structure of Morrison L constructs A14 and A15.

Figure 21:
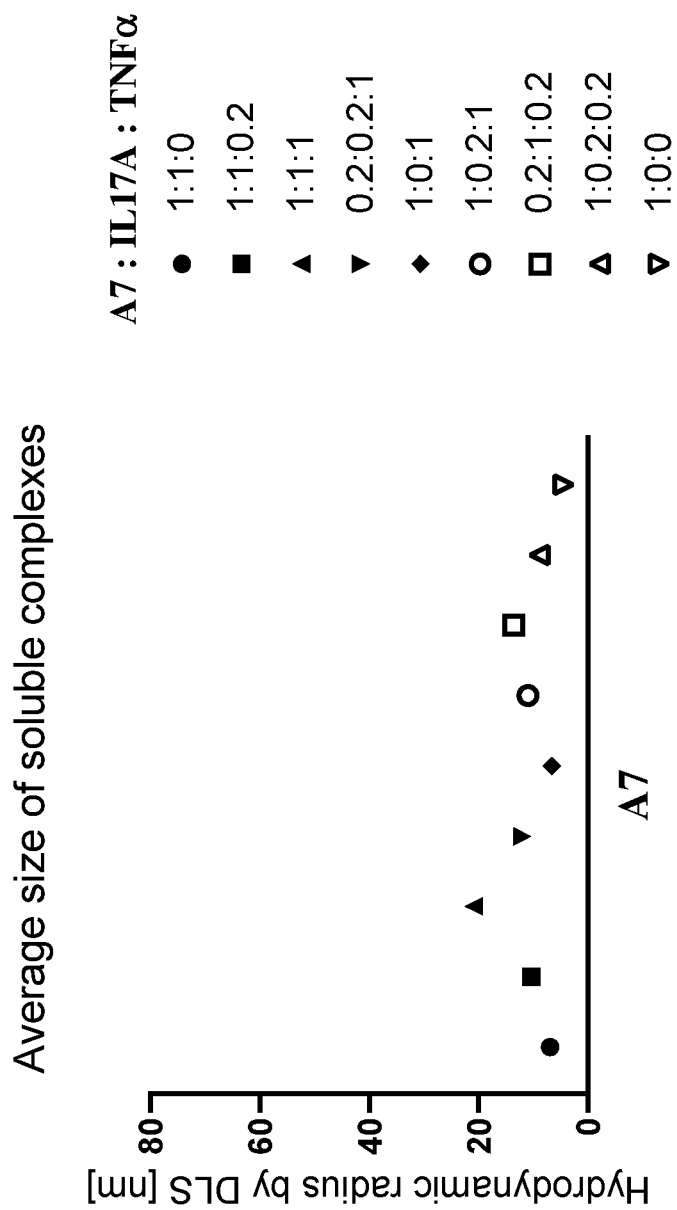

FIG. 21 shows the average Size of soluble complexes determined by Dynamic Light Scattering for scDb-scFv A7.

Figure 22:
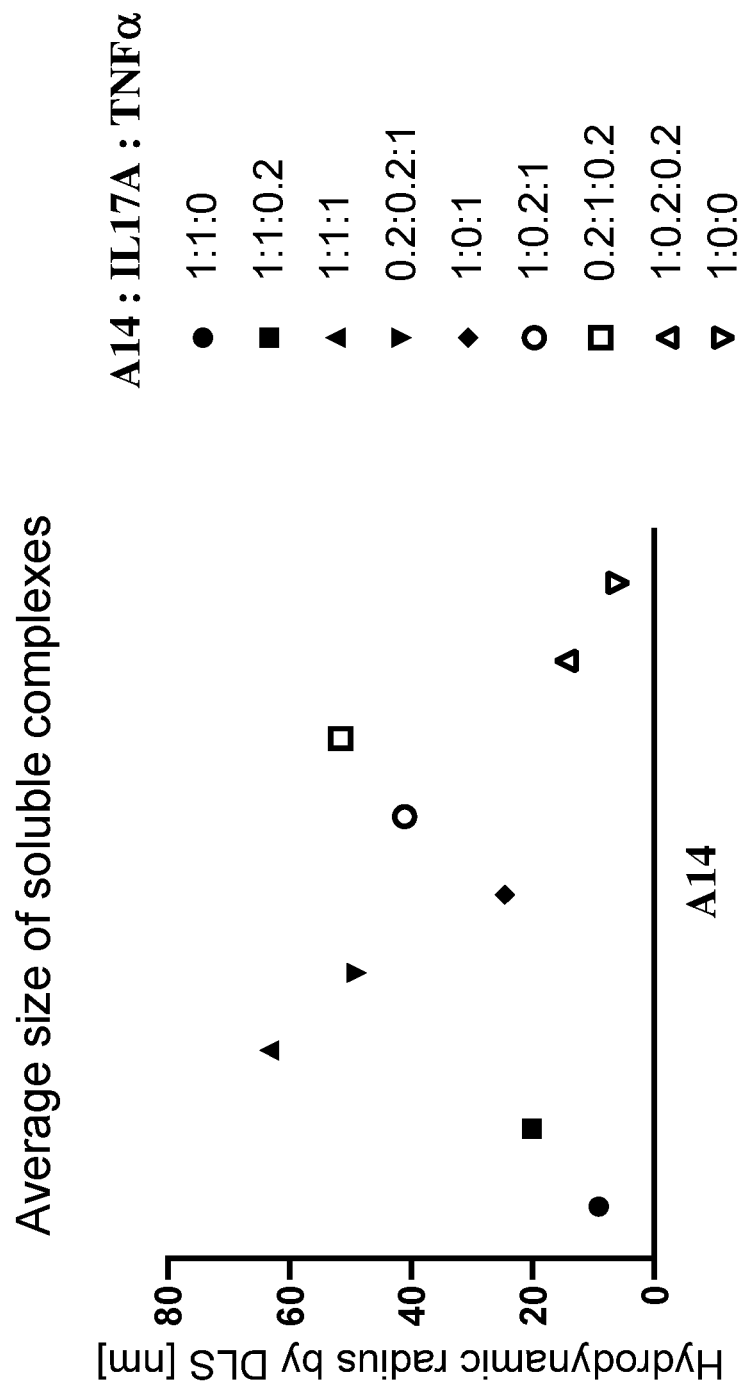

FIG. 22 shows the average Size of soluble complexes determined by Dynamic Light Scattering for A14.

Figure 23:
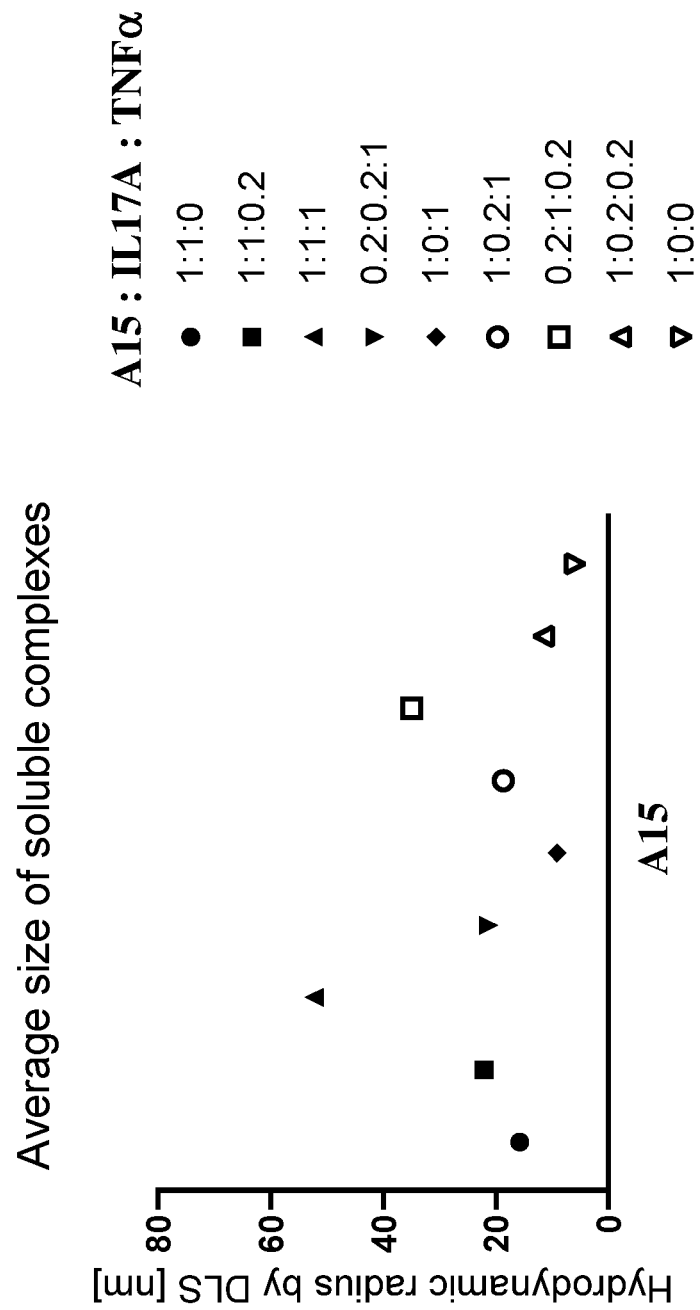

FIG. 23 shows the average Size of soluble complexes determined by Dynamic Light Scattering for A15.

Figure 24:
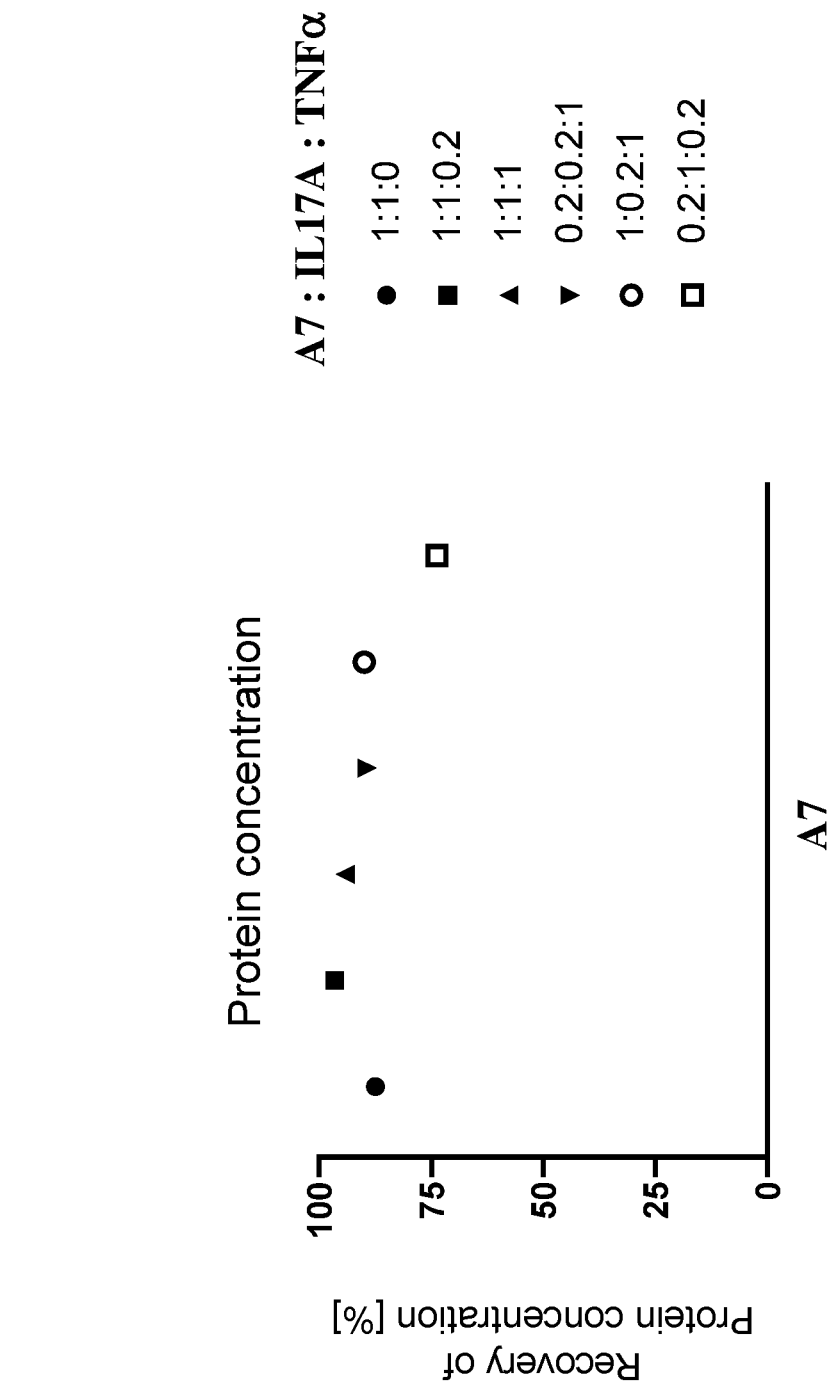

FIG. 24 shows the protein concentration recovery of soluble complexes for scDb-scFv A7.

Figure 25:
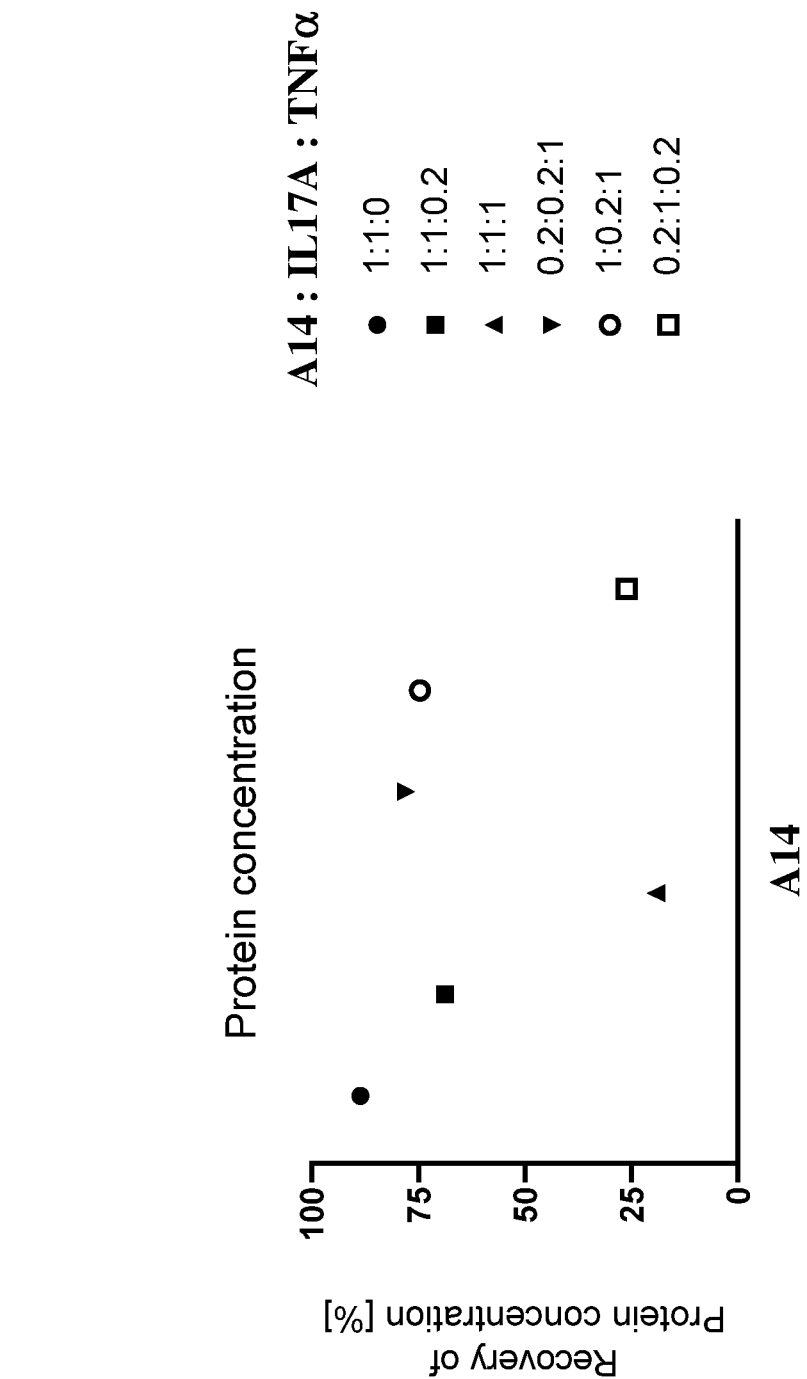

FIG. 25 shows the protein concentration recovery of soluble complexes for A14.

Figure 26:
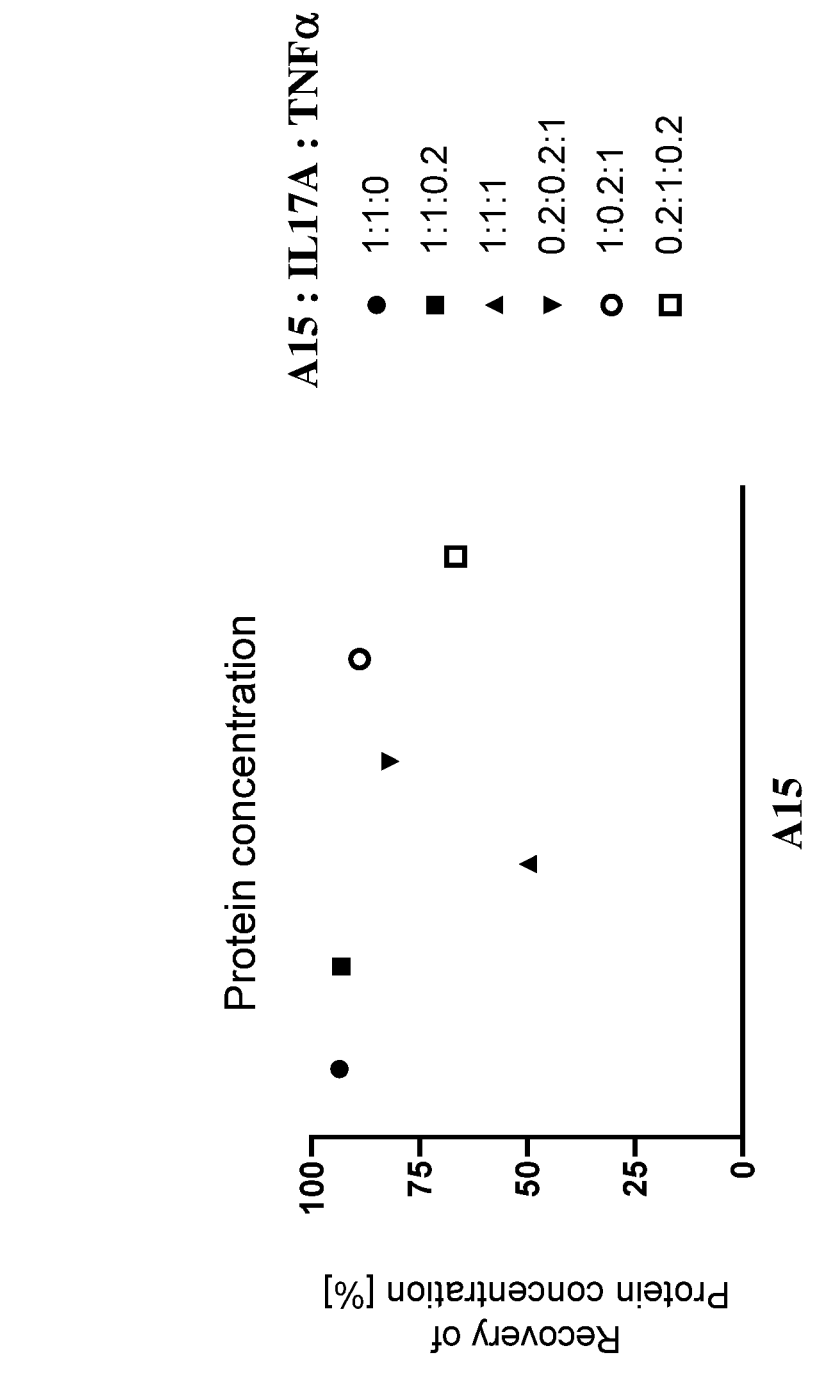

FIG. 26 shows the protein concentration recovery of soluble complexes for A15.

DETAILED DESCRIPTION OF THE INVENTION

The present disclosure is based on the discovery of multispecific antibody molecules that specifically bind to IL-17A and TNFα and have improved affinity, efficacy, and selectivity. In addition, the multispecific antibody of the disclosure has improved safety profile, as the inventors have demonstrated that said antibody does not form immune complexes with TNFα, and thus has potentially low immunogenicity. Due to the bivalent binding of other multispecifics (e.g. Covagen, Abbvie, etc.) there is a high probability of immune complex formation that may result in immunogenicity or other adverse effects. In contrast, monovalent bi- and trispecific constructs of the present disclosure have a reduced potential to form such complexes, and therefore a lower probability to lead to anti-drug antibodies and immune-related adverse effects. Moreover, the multispecific antibody of the present disclosure has improved biophysical properties, e.g., developability and producibility in high amount with relatively low impurities, and superior stability.

The present disclosure furthermore provides antibodies that specifically bind to human IL-17A protein, and pharmaceutical compositions, production methods, and methods of use of such antibodies and pharmaceutical compositions.

Unless defined otherwise, all technical and scientific terms used herein have the same meaning as commonly understood by those of ordinary skill in the art to which this invention pertains.

The terms "comprising" and "including" are used herein in their open-ended and non-limiting sense unless otherwise noted. With respect to such latter embodiments, the term "comprising" thus includes the narrower term "consisting of".

The terms "a" and "an" and "the" and similar references in the context of describing the invention (especially in the context of the following claims) are to be construed to cover both the singular and the plural, unless otherwise indicated herein or clearly contradicted by context. For example, the term "a cell" includes a plurality of cells, including mixtures thereof. Where the plural form is used for compounds, salts, and the like, this is taken to mean also a single compound, salt, or the like.

Multispecific Antibodies of the Present Disclosure

In one aspect, the disclosure provides an isolated multispecific antibody comprising a first domain specifically binding IL-17A and a second domain specifically binding TNFα.

The term "TNFα" or "TNF-α" or "tumor necrosis factor" refers in particular to human TNFα. TNFα is found as a soluble protein as well as a precursor form called transmembrane TNFα that is expressed as a cell surface type II polypeptide. Transmembrane TNFα is processed by metalloproteinases such as TNFα-converting enzyme (TACE) between residues Ala76 and Val77, resulting in the release of the soluble form of TNFα of 157 amino acid residues. Soluble TNFα is a homotrimer of 17-kDa cleaved monomers. Transmembrane TNFα also exists as a homotrimer of 26-kD uncleaved monomers. The term "TNFα" as used herein encompasses both the soluble and the transmembrane forms. The term "TNFα" refers in particular to human transmembrane TNFα with UniProt ID number P01375 reproduced herein as SEQ ID NO: 134. The term "TNFα" refers in particular to soluble transmembrane TNFα with UniProt ID number P01375 reproduced herein as SEQ ID NO: 135.

Suitably, the antibody of the disclosure is an isolated antibody. The term "isolated antibody", as used herein, refers to an antibody that is substantially free of other antibodies having different antigenic specificities (e.g., an isolated antibody that specifically binds only IL-17A and TNFα is substantially free of antibodies that specifically bind antigens other than IL-17A and TNFα). An isolated antibody that specifically binds IL-17A and TNFα may, however, have cross-reactivity to other antigens, such IL-17A and TNFα molecules from other species. Moreover, an isolated antibody may be substantially free of other cellular material and/or chemicals.

Suitably, the antibody of the disclosure is a monoclonal antibody. The term "monoclonal antibody" or "monoclonal antibody composition" as used herein refers to antibodies that are substantially identical to amino acid sequence or are derived from the same genetic source. A monoclonal antibody composition displays a binding specificity and affinity for a particular epitope, or binding specificities and affinities for specific epitopes.

Antibodies of the disclosure include, but are not limited to, the chimeric, and humanized.

The term "chimeric antibody" is an antibody molecule in which (a) the constant region, or a portion thereof, is altered, replaced or exchanged so that the antigen binding site (variable region) is linked to a constant region of a different or altered class, effector function and/or species, or an entirely different molecule which confers new properties to the chimeric antibody, e.g., an enzyme, toxin, hormone, growth factor, drug, etc.; or (b) the variable region, or a portion thereof, is altered, replaced or exchanged with a variable region having a different or altered antigen specificity. For example, a mouse antibody can be modified by replacing its constant region with the constant region from a human immunoglobulin. Due to the replacement with a human constant region, the chimeric antibody can retain its specificity in recognizing the antigen while having reduced antigenicity in human as compared to the original mouse antibody.

A "humanized" antibody, as used herein, is an antibody that retains the reactivity of a non-human antibody while being less immunogenic in humans. This can be achieved, for instance, by retaining the non-human CDRs and replacing the remaining parts of the antibody with their human counterparts (i.e., the constant region as well as the framework portions of the variable region). Additional framework region modifications may be made within the human framework sequences as well as within the CDR sequences derived from the germline of another mammalian species. The humanized antibodies of the disclosure may include amino acid residues not encoded by human sequences (e.g., mutations introduced by random or site-specific mutagenesis in vitro or by somatic mutation in vivo, or a conservative substitution to promote stability or manufacturing). See, e.g., Morrison et al., Proc. Natl. Acad. Sci. USA, 81:6851-6855, 1984; Morrison and Oi, Adv. Immunol., 44:65-92, 1988; Verhoeyen et al., Science, 239: 1534-1536, 1988; Padlan, Molec. Immun., 28:489-498, 1991; and Padlan, Molec. Immun., 31: 169-217, 1994. Other examples of human engineering technology include, but is not limited to Xoma technology disclosed in U.S. Pat. No. 5,766,886.

The term "recombinant humanized antibody", as used herein, includes all humanized antibodies of the disclosure that are prepared, expressed, created or isolated by recombinant means, such as antibodies isolated from an animal (e.g. a rabbit); antibodies expressed using a recombinant expression vector transfected into a host cell, antibodies isolated from a recombinant, combinatorial human antibody library, or antibodies prepared, expressed, created or isolated by any other means that involves splicing of human immunoglobulin gene sequences to other DNA sequences. Such recombinant human antibodies have variable and constant regions (if present) derived from human germline immunoglobulin sequence. Such antibodies can, however, be subjected to in vitro mutagenesis (or, when an animal transgenic for human Ig sequences is used, in vivo somatic mutagenesis) and thus the amino acid sequences of the VH (antibody heavy chain variable region) and VL (antibody light chain variable region) of the recombinant antibodies are sequences that, while derived from and related to human germline VH and VL sequences, may not naturally exist within the human antibody germline.

Suitably, the antibody of the disclosure or a binding domain thereof is humanized. Suitably, the antibody of the disclosure or a binding domain thereof is humanized and comprises rabbit-derived CDRs.

The term "multispecific antibody" as used herein, refers to an antibody that binds to two or more different epitopes on at least two or more different targets (e.g., IL-17A and TNFα), or binds to two or more different epitopes of the same target. The "multispecific antibody" of the disclosure has two or more binding domains, for example two or three binding domains. The term "multispecific antibody" includes bispecific, trispecific, tetraspecific, pentaspecific and hexaspecific. The term "bispecific antibody" as used herein, refers to an antibody that binds to two different epitopes, e.g., on two different targets (e.g., IL-17A and TNFα), or on the same target. The term "trispecific antibody" as used herein, refers to an antibody that binds to three different epitopes, e.g., on three different targets (e.g., IL-17A, TNFα and HSA), or on the same target.

The term "multivalent antibody" refers to a single binding molecule with more than one valency, where "valency" is described as the number of antigen-binding moieties that binds to epitopes on identical target molecules. "Valent" refers to the presence of a specified number of binding domains specific for an antigen in a molecule. As such, the terms "monovalent", "bivalent", "tetravalent", and "hexavalent" refer to the presence of one, two, four and six binding domains, respectively, specific for an antigen in a molecule. The term "monovalent antibody", as used herein, refers to an antibody that has a single antigen-binding moiety that binds to a single epitope on a target molecule, such as IL-17A or TNFα. The term "bivalent antibody" as used herein, refers to an antibody that has two antigen binding moieties, each of which binds to an identical epitope.

The multispecific antibody of the present disclosure may be monovalent or multivalent, e.g., bivalent, trivalent or tetravalent, preferably, monovalent, for binding to IL-17A.

The multispecific antibody of the present disclosure may be monovalent or multivalent, e.g., bivalent, trivalent or tetravalent, preferably, monovalent, for binding to TNFα. Since TNFα forms a trimer, it is, potentially, trivalent and can form three dimensional immune complexes with an antibody having several domains specifically binding to TNFα, e.g., a bivalent, trivalent or multivalent antibody for binding to TNFα. To illustrate, a study of the size of immune complex formed between TNF and infliximab (a chimeric TNFα IgG antibody) and etanercept (a TNFR2 dimeric fusion protein with an IgG1 Fc), at differing antigen/antibody ratios, showed that each antibody generated immune complexes with a unique size profile (Kim M S, et al., J Mol Biol. 2007; 374:1374-1388). Thus, potential high immunogenicity is one of the concerns for therapeutic antibodies targeting TNFα. Hence, in a preferred embodiment, the multispecific antibody of the present disclosure is monovalent for binding to TNFα.

Suitably, the multispecific antibody of the disclosure comprises only one domain specifically binding IL-17A and/or only one domain specifically binding TNFα. In a preferred embodiment, the multispecific antibody of the disclosure comprises only one domain specifically binding TNFα. Suitably, the multispecific antibody of the disclosure comprises only one domain specifically binding IL-17A and only one domain specifically binding TNFα. In a specific embodiment, the multispecific antibody of the present disclosure consists of a first domain specifically binding IL-17A, a second domain specifically binding TNFα, and, optionally, a polypeptide linker between the two domains. In a particular embodiment, the optional polypeptide linker is present and consists of a polypeptide having from 4 to 25 amino acid residues.

Suitably, the multispecific antibody of the present disclosure is advantageously capable of neutralizing the biological activity of human TNFα and human IL-17A. It will be appreciated that the term "neutralizing" as used herein refers to a reduction in biological signaling activity which may be partial or complete. Suitable assays for determining neutralization are known in the art and certain of such assays are provided in the Examples herein.

In one embodiment, the antibody of the present disclosure or the first domain thereof selectively binds to human IL-17A over human IL-17B, IL-17C, IL-17D, IL-17E and IL-17F, in particular as measured by ELISA. As used herein, the terms "selectively binds to" shall mean that the antibody, composition, formulation, etc. does not significantly bind to IL-17B/C/D/E/F, but does bind to IL-17A. Selective binding is characterized by a high affinity (or low $K_D$) and a low to moderate $IC_{50}$ as distinguished from nonspecific binding which usually has a low affinity (or high $K_D$) with a moderate to high $IC_{50}$. Typically, binding is considered selective when the antibody binds with a $K_D$ of less than $10^{-7}$ M. Suitably, the antibody of the present disclosure or the first domain thereof binds to human IL-17A with a higher affinity or with a lower $K_D$ than it binds to human IL-17B, IL-17C, IL-17D, IL-17E and IL-17F as measured by SPR. Suitably, the antibody of the present disclosure or the first domain thereof has $IC_{50}$ values to IL-17B, IL-17C, IL-17D, IL-17E, and IL-17F of at least 100× greater, e.g., at least 200× greater, at least 300× greater, at least 400× greater, than the $IC_{50}$ to IL-17A as measured by ELISA. In one embodiment, the antibody of the present disclosure or the first domain thereof binds to human IL-17A, but does not bind to human IL-17B, IL-17C, IL-17D, IL-17E and IL-17F, in particular as measured by SPR and/or ELISA.

In a further embodiment, the multispecific antibody of the disclosure further comprises a third domain having a specificity against a different antigen than IL-17A and TNFα. Suitably, the multispecific antibody of the disclosure is a trispecific antibody. "Trispecific antibody" as used herein refers to an antibody molecule with three antigen binding domains, for example, wherein one binding domain binds human TNFα, another binding domain binds human IL-17A, and yet another binding domain binds an antigen capable of extending the half-life of the antibody molecule, e.g., human serum albumin.

In particular, the multispecific antibody of the disclosure further comprises a third domain specifically binding to human serum albumin (HSA).

The inventors have surprisingly found that an addition of a third domain specifically binding to human serum albumin to the multispecific antibody of the disclosure comprising a first domain specifically binding IL-17A and a second domain specifically binding to TNFα has the following beneficial effects:

(i) increased serum half-life of the multispecific antibody of the disclosure comprising at least one domain specifically binding to human serum albumin; and (ii) addition of a human serum albumin binding domain to the multispecific antibody of the disclosure is compatible with the functionalities of other binding domains, e.g., neutralizing activity of Il-17A and TNFα binding domains.

The term "HSA" refers in particular to human serum albumin with UniProt ID number P02768. Human Serum Albumin (HSA) is a 66.4 kDa abundant protein in human serum (50% of total protein) composed of 585 amino acids (Sugio, Protein Eng, Vol. 12, 1999, 439-446). Multifunctional HSA protein is associated with its structure that allowed binding and transporting a number of metabolites such as fatty acids, metal ions, bilirubin and some drugs (Fanali, Molecular Aspects of Medicine, Vol. 33, 2012, 209-290). HSA concentration in serum is around 3.5-5 g/dL. Albumin binding antibodies may be used for example, for extending the in vivo serum half-life of drugs or proteins conjugated thereto.

Suitably, in one embodiment the multispecific antibody of the present disclosure comprises a first domain specifically binding IL-17A and a second domain specifically binding TNFα, and a third domain specifically binding human serum albumin. The multispecific antibody of the present disclosure may be monovalent or multivalent, e.g., bivalent, trivalent or tetravalent, preferably monovalent, for binding to human serum albumin. Suitably, the multispecific antibody of the disclosure comprises only one domain specifically binding IL-17A and only one domain specifically binding TNFα, and only one domain specifically binding human serum albumin. In a specific embodiment, the multispecific antibody of the present disclosure consists of a first domain specifically binding IL-17A, a second domain specifically binding TNFα, a third domain specifically binding human serum albumin, and, optionally, a polypeptide linker between the two domains. In a particular embodiment, the optional polypeptide linker is present and consists of a polypeptide having from 4 to 25 amino acid residues.

Advantageously, the multispecific antibody of the present disclosure comprises a first domain specifically binding IL-17A and a second domain specifically binding TNFα, and, optionally, a third domain specifically binding human serum albumin, wherein said domains are capable of binding to their respective antigen(s) or receptor(s) simultaneously.

The domains of the multispecific antibody of the present disclosure, e.g., said first domain, said second domain, said third domain, are independently selected from the group consisting of a Fab, an Fv, an scFv, a dsFv, an scAb, STAB, a single domain antibody (sdAb or dAb), a single domain heavy chain antibody, and a single domain light chain antibody, a VHH, a VNAR, single domain antibodies based on the VNAR structure from shark, and binding domains based on alternative scaffolds including but limited to ankyrin-based domains, fynomers, avimers, anticalins, fibronectins, and binding sites being built into constant regions of antibodies (e.g. F-star's Modular Antibody Technology™), preferably from the group consisting of a Fab, Fv and an scFv, more preferably wherein said first domain and/or said second domain and/or said third domain is/are Fv or scFv.

The multispecific antibody of the present disclosure can be in any suitable format. In one embodiment, the multispecific antibody of the disclosure is in a format selected from the group consisting of a single-chain diabody (scDb), a tandem scDb (Tandab), a linear dimeric scDb (LD-scDb), a circular dimeric scDb (CD-scDb), a bispecific T-cell engager (BiTE; tandem di-scFv), a tandem tri-scFv, a tribody (Fab-(scFv)$_2$) or bibody (Fab-(scFv)$_1$), Fab, Fab-Fv$_2$, Morrison (IgG CH3-scFv fusion (Morrison L) or IgG CL-scFv fusion (Morrison H)), triabody, scDb-scFv, bispecific Fab$_2$, di-miniantibody, tetrabody, scFv-Fc-scFv fusion, scFv-HSA-scFv fusion, di-diabody, DVD-Ig, COVD, IgG-scFab, scFab-dsscFv, Fv$_2$-Fc, IgG-scFv fusions, such as bsAb (scFv linked to C-terminus of light chain), Bs1Ab (scFv linked to N-terminus of light chain), Bs2Ab (scFv linked to N-terminus of heavy chain), Bs3Ab (scFv linked to C-terminus of heavy chain), Ts1Ab (scFv linked to N-terminus of both heavy chain and light chain), Ts2Ab (dsscFv linked to C-terminus of heavy chain), Bispecific antibodies based on heterodimeric Fc domains, such as Knob-into-Hole antibodies (KiHs); an Fv, scFv, scDb, tandem-di-scFv, tandem tri-scFv, Fab-(scFv)$_2$, Fab-(scFv)$_1$, Fab, Fab-Fv$_2$, COVD fused to the N- and/or the C-terminus of either chain of a heterodimeric Fc domain or any other heterodimerization domain, a MATCH and DuoBodies, preferably is tribody or scDb-scFv.

The term "diabodies" refers to antibody fragments with two antigen-binding sites, which fragments comprise a VH connected to VL in the same polypeptide chain (VH-VL). By using a linker that is too short to allow pairing between the two domains on the same chain, the domains are forced to pair with the complementary domains of another chain to create two antigen-binding sites. Diabodies may be bivalent or bispecific. Diabodies are described more fully in, for example, EP404097, WO 93/01161, Hudson et al., Nat. Med. 9:129-134 (2003), and Holliger et al., Proc. Natl. Acad. Sci. U.S.A. 90: 6444-6448 (1993). Triabodies and tetrabodies are also described in Hudson et al., Nat. Med. 9:129-134 (2003). The bispecific scDb, in particular the bispecific monomeric scDb, particularly comprises two variable heavy chain domains (VH) or fragments thereof and two variable light chain domains (VL) or fragments thereof connected by linkers L1, L2 and L3 in the order VHA-L1-VLB-L2-VHB-L3-VLA, VHA-L1-VHB-L2-VLB-L3-VLA, VLA-L1-VLB-L2-VHB-L3-VHA, VLA-L1-VHB-L2-VLB-L3-VHA, VHB-L1-VLA-L2-VHA-L3-VLB, VHB-L1-VHA-L2-VLA-L3-VLB, VLB-L1-VLA-L2-VHA-L3-VHB or VLB-L1-VHA-L2-VLA-L3-VHB, wherein the VLA and VHA domains jointly form the antigen binding site for the first antigen, and VLB and VHB jointly form the antigen binding site for the second antigen. The linker L1 particularly is a peptide of 2-10 amino acids, more particularly 3-7 amino acids, and most particularly 5 amino acids, and linker L3 particularly is a peptide of 1-10 amino acids, more particularly 2-7 amino acids, and most particularly 5 amino acids. The middle linker L2 particularly is a peptide of 10-40 amino acids, more particularly 15-30 amino acids, and most particularly 20-25 amino acids.

In one embodiment, the multispecific antibody of the disclosure comprises an immunoglobulin Fc region polypeptide. The term "Fc region" herein is used to define a C-terminal region of an immunoglobulin heavy chain, including native-sequence Fc regions and variant Fc regions. Suitable native-sequence Fc regions include human IgG1, IgG2 (IgG2A, IgG2B), IgG3 and IgG4. "Fc receptor" or "FcR" describes a receptor that binds to the Fc region of an antibody. The preferred FcR is a native sequence human FcR. Moreover, a preferred FcR is one which binds an IgG antibody (a gamma receptor) and includes receptors of the FcγRI, FcγRII, and FcγRIII subclasses, including allelic variants and alternatively spliced forms of these receptors, FcγRII receptors include FcγRIIA (an "activating receptor") and FcγRIIB (an "inhibiting receptor"), which have similar amino acid sequences that differ primarily in the cytoplasmic domains thereof. Activating receptor FcγRIIA contains an immunoreceptor tyrosine-based activation motif (ITAM) in its cytoplasmic domain. Inhibiting receptor FcγRIIB contains an immunoreceptor tyrosine-based inhibition motif (ITIM) in its cytoplasmic domain, (see M. Daeron, Annu. Rev. Immunol. 5:203-234 (1997). FcRs are reviewed in Ravetch and Kinet, Annu. Rev. Immunol. 9: 457-92 (1991); Capet et al, Immunomethods 4: 25-34 (1994); and de Haas et al, J. Lab. Clin. Med. 126: 330-41 (1995). Other FcRs, including those to be identified in the future, are encompassed by the term "FcR" herein. The term "Fc receptor" or "FcR" also includes the neonatal receptor, FcRn, which is responsible for the transfer of maternal IgGs to the fetus. Guyer et al, J. Immunol. 117: 587 (1976) and Kim et al., J. Immunol. 24: 249 (1994). Methods of measuring binding to FcRn are known (see, e.g., Ghetie and Ward, Immunol. Today 18: (12): 592-8 (1997); Ghetie et al, Nature Biotechnology 15 (7): 637-40 (1997); Hinton et al, J. Biol. Chem. TJI (8): 6213-6 (2004); WO 2004/92219 (Hinton et al). Binding to FcRn in vivo and serum half-life of human FcRn high-affinity binding polypeptides can be assayed, e.g., in transgenic mice or transfected human cell lines expressing human FcRn, or in primates to which the polypeptides having a variant Fc region are administered. WO 2004/42072 (Presta) describes antibody variants which improved or diminished binding to FcRs. See also, e.g., Shields et al, J. Biol. Chem. 9(2): 6591-6604 (2001).

In order to increase the number of specificities/functionalities at the same or lower molecular weight, it is advantageous to use antibodies comprising antibody fragments, such as Fv, Fab, Fab' and F(ab')$_2$ fragments and other antibody fragments. These smaller molecules retain the antigen binding activity of the whole antibody and can also exhibit improved tissue penetration and pharmacokinetic properties in comparison to the whole immunoglobulin molecules. Whilst such fragments appear to exhibit a number of advantages over whole immunoglobulins, they also suffer from an increased rate of clearance from serum since they lack the Fc domain that imparts a long half-life in vivo (Medasan et al., 1997, J. Immunol. 158:2211-2217). Molecules with lower molecular weights penetrate more efficiently into target tissues (e.g. solid cancers) and thus hold the promise for improved efficacy at the same or lower dose. Suitably, the antibody of the disclosure does not comprise an immunoglobulin Fc region polypeptide, and, optionally, does not comprise CH1 and CL regions, in particular, when said multispecific antibody comprises a third domain specifically binding human serum albumin.

Suitably, the antibody of the disclosure can be in a tribody format (Fab-(scFv)$_2$). Suitably, the first domain and/or the second domain and/or the third domain is/are Fab or scFv domain. In particular, the multispecific antibody of the present disclosure has one Fab domain and two scFv domains, in particular wherein scFv domains are fused to the carboxy terminus of each chain of the Fab domain. The inventors have tested the optimal relative location of the individual binding domains in trispecific formats in terms of pharmacodynamic and biophysical properties, and have surprisingly found that the multispecific antibody of the disclosure, when in tribody format, has advantageous properties when the second domain specifically binding to TNFα is a Fab domain and the first and third domains, binding specifically to IL-17A and HSA, respectively, are scFv domains fused to said Fab domain.

Preferably, the antibody of the disclosure is in an scDb-scFv format. The term "scDb-scFv" refers to an antibody format, wherein a single-chain Fv (scFv) fragment is fused by a flexible Gly-Ser linker to a single-chain diabody (scDb). Suitably, the first domain and/or the second domain and/or the third domain is/are Fv or scFv domain. In particular, the multispecific antibody of the present disclosure, when in scDb-scFv format, has one scFv domain which is C-terminally fused to the scDb comprising of the other two domains. The multispecific antibody of the present disclosure, when in scDb-Fv format, may be represented by the formula:

VLA-L1-VHC-L2-VLC-L3-VHA-L4-VLB-L5-VHB or
VLB-L1-VHA-L2-VLA-L3-VHB-L4-VLC-L5-VHC or
VLC-L1-VHB-L2-VLB-L3-VHC-L4-VLA-L5-VHA or
VLA-L1-VHB-L2-VLB-L3-VHA-L4-VLC-L5-VHC, preferably VLB-L1-VHA-L2-VLA-L3-VHB-L4-VLC-L5-VHC or VLA-L1-VHB-L2-VLB-L3-VHA-L4-VLC-L5-VHC, more preferably VLB-L1-VHA-L2-VLA-L3-VHB-L4-VLC-L5-VHC, wherein VLA and VHA are a light chain variable region and a heavy chain variable region of the first domain (specifically binds to IL-17A), respectively; and VLB and VHB are a light chain variable region and a heavy chain variable region of the second domain (specifically binds to TNFα), respectively; and VLC and VHC are a light chain variable region and a heavy chain variable region of the third domain (specifically binds to HSA), respectively, and wherein L1, L2, L3, L4 and L5 are polypeptide linkers.

In the context of the present disclosure, the term "polypeptide linker" refers to a linker consisting of a chain of amino acid residues linked by peptide bonds that is connecting two domains, each being attached to one end of the linker. The polypeptide linker should have a length that is adequate to link two molecules in such a way that they assume the correct conformation relative to one another so that they retain the desired activity. In particular embodiments, the polypeptide linker has a continuous chain of between 2 and 30 amino acid residues (e.g., 2, 3, 4, 5, 6, 7, 8, 9, 10, 11, 12, 13, 14, 15, 16, 17, 18, 19, 20, 21, 22, 23, 24, 25, 26, 27, 28, 29, or 30 amino acid residues). In addition, the amino acid residues selected for inclusion in the polypeptide linker should exhibit properties that do not interfere significantly with the activity of the polypeptide. Thus, the linker peptide on the whole should not exhibit a charge that would be inconsistent with the activity of the polypeptide, or interfere with internal folding, or form bonds or other interactions with amino acid residues in one or more of the monomers that would seriously impede the binding of monomer domains. In particular embodiments, the polypeptide linker is non-structured polypeptide. Useful linkers include glycine-serine, or GS linkers. By "Gly-Ser" or "GS" linkers is meant a polymer of glycines and serines in series (including, for example, (Gly-Ser)n, (GSGGS)n (GGGGS)n and (GGGS)n, where n is an integer of at least one), glycine-alanine polymers, alanine-serine polymers, and other flexible linkers such as the tether for the shaker potassium channel, and a large variety of other flexible linkers, as will be appreciated by those in the art. Glycine-serine polymers are preferred since both of these amino acids are relatively unstructured, and therefore may be able to serve as a neutral tether between components. Secondly, serine is hydrophilic and therefore able to solubilize what could be a globular glycine chain. Third, similar chains have been shown to be effective in joining subunits of recombinant proteins such as single chain antibodies.

Suitably, said L1 and L3 of the present disclosure are as set forth in SEQ ID NO: 132. Suitably, said L2, L4 and L5 of the present disclosure are as set forth in SEQ ID NO: 23.

The inventors have tested the optimal relative location of the individual binding domains in trispecific formats in terms of pharmacodynamic and biophysical properties, and have surprisingly found that the multispecific antibody of the disclosure, when in scDb-scFv format, has advantageous properties when first domain and said second domain, binding specifically to IL-17A and TNFα, respectively, form scDb and said third domain specifically binding to HSA is scFv.

The multispecific antibody of the present disclosure has the following advantageous properties:

(a) has the ability to neutralize IL-17A with a potency relative to that of secukinumab (relative potency), determined by measuring Gro-α secretion in an HT-29 assay, greater than 2, e.g. greater than 5, greater than 10, greater than 15, greater than 20, greater than 25, greater than 30, greater than 35, greater than 40, greater than 45, preferably greater than 50, and wherein said relative potency is the ratio of the $IC_{50}$ value in ng/mL of secukinumab as measured in the HT-29 assay to the $IC_{50}$ value in ng/mL of said multispecific antibody as measured in the HT-29 assay; and (b) has the ability to neutralize TNFα with a potency relative to that of an scDb according to SEQ ID NO: 149 (A13) (relative potency), determined by measuring Gro-α secretion in an HT-29 assay, of at least 1, e.g., greater than 1, greater than 1.5, greater than 2, greater than 2.5, greater than 3, greater than 3.5, preferably greater than 4, more preferably greater than 4.5, and wherein said relative potency is the ratio of the $IC_{50}$ value in nM of said scDb according to SEQ ID NO: 149 as measured in the HT-29 assay to the $IC_{50}$ value in nM of said multispecific antibody as measured in the HT-29 assay; and (c) optionally, has the ability to block interaction between IL-17A and IL-17RA with a potency relative to that of secukinumab (relative potency), determined in ELISA assay, greater than 2, e.g., greater than 3, greater than 4, greater than 5, greater than 6, greater than 7, greater than 8, greater than 9, preferably greater than 10, and wherein said relative potency is the ratio of the $IC_{50}$ value in ng/mL of secukinumab as measured by ELISA to the $IC_{50}$ value in ng/mL of said multispecific antibody as measured by ELISA; and (d) optionally, has the ability to neutralize TNFα with a potency relative to that of an scDb according to SEQ ID NO: 149 (A13) (relative potency), determined in L929 assay, of at least 0.4, e.g., at least 0.5, preferably at least 1, and wherein said relative potency is the ratio of the $IC_{50}$ value in nM of said scDb according to SEQ ID NO: 149 as measured in the L929 assay to the $IC_{50}$ value in nM of said multispecific antibody as measured in the L929 assay; and/or (e) binds to human IL-17A with a dissociation constant ($K_D$) of less than 5 nM, e.g., less than 4 nM, less than 3 nM, less than 2 nM, than 1 nM, preferably less than 0.5 nM, as measured by surface plasmon resonance; and optionally, binds to cynomolgus IL-17A with a $K_D$ of less than 5 nM, e.g., less than 4 nM, less than 3 nM, less than 2 nM, than 1 nM, preferably less than 0.5 nM as measured by surface plasmon resonance;

(f) binds to human TNFα with a dissociation constant ($K_D$) of less than 5 nM, e.g., less than 4 nM, less than 3 nM, less than 2 nM, less than 1 nM, preferably less than 0.5 nM, more preferably less than 0.25 nM, as measured by surface plasmon resonance; and (g) optionally, binds to human serum albumin with a dissociation constant ($K_D$) of less than 5 nM, e.g., less than 4 nM, less than 3 nM, preferably less than 2 nM, as measured by surface plasmon resonance, and optionally, binds to cynomolgus serum albumin with a dissociation constant ($K_D$) of less than 5 nM, e.g., less than 4 nM, less than 3 nM, preferably less than 2 nM as measured by surface plasmon resonance.

As used herein, the term "affinity" refers to the strength of interaction between antibody and antigen at single antigenic sites. Within each antigenic site, the variable region of the antibody "arm" interacts through weak non-covalent forces with antigen at numerous sites; the more interactions, the stronger the affinity.

"Binding affinity" generally refers to the strength of the sum total of non-covalent interactions between a single binding site of a molecule (e.g., of an antibody) and its binding partner (e.g., an antigen). Unless indicated otherwise, as used herein, "binding affinity", "bind to", "binds to" or "binding to" refers to intrinsic binding affinity that reflects a 1:1 interaction between members of a binding pair (e.g., an antibody and antigen). The affinity of a molecule X for its partner Y can generally be represented by the dissociation constant ($K_D$). Affinity can be measured by common methods known in the art, including those described herein. Low-affinity antibodies generally bind antigen slowly and tend to dissociate readily, whereas high-affinity antibodies generally bind antigen faster and tend to remain bound longer. A variety of methods of measuring binding affinity are known in the art, any of which can be used for purposes of the present disclosure. Specific illustrative and exemplary embodiments for measuring binding affinity, i.e. binding strength are described in the following.

The term "$k_{assoc}$", "ka" or "$k_{on}$", as used herein, is intended to refer to the association rate of a particular antibody-antigen interaction, whereas the term "$k_{dis}$", "kd" or "$k_{off}$", as used herein, is intended to refer to the dissociation rate of a particular antibody-antigen interaction. In one embodiment, the term "$K_D$", as used herein, is intended to refer to the dissociation constant, which is obtained from the ratio of kd to ka (i.e. kd/ka) and is expressed as a molar concentration (M). The "$K_D$" or "$K_D$ value" or "KD" or "KD value" according to this disclosure is in one embodiment measured by using surface-plasmon resonance assays using a MASS-1 SPR instrument (Sierra Sensors) as described in Examples. The binding affinity of an antibody may be determined, for example, by the dissociation constant ($K_D$). A stronger affinity is represented by a lower $K_D$, while a weaker affinity is represented by a higher $K_D$.

Thus, in a suitable embodiment, the antibody of the disclosure binds to human IL-17A with a dissociation constant ($K_D$) of between 1 pM and 10 nM, 1 pM and 7 nM, 1 pM and 5 nM, 1 pM and 4 nM, 1 pM and 3 nM, 1 pM and 2.5 nM, 1 pM and 2 nM, 1 pM and 1.5 nM, 1 pM and 1 nM, preferably 1 pM and 0.5 nM, as measured by surface plasmon resonance. In a suitable embodiment, the antibody of the disclosure of the disclosure binds to human IL-17A with a dissociation constant ($K_D$) of between 1 and 500 pM as measured by surface plasmon resonance. In a suitable embodiment, the antibody of the disclosure binds to human IL-17A with a dissociation constant ($K_D$) of less than 5 nM, less than 4 nM, less than 3 nM, less than 2 nM, less than 1 nM, preferably less than 0.5 nM, as measured by surface plasmon resonance. Suitably, the antibody of the disclosure binds to human IL-17A with a dissociation constant ($K_D$) of less than 1 nM. Suitably, the antibody of the disclosure binds to human IL-17A with a dissociation constant ($K_D$) of less than 0.5 nM. In a further embodiment, the antibody of the disclosure binds to Cynomolgus IL-17A with a $K_D$ of less than 10 nM, e.g. less than 7 nM, less than 5 nM, than 4 nM, less than 3 nM, less than 2 nM, less than 1 nM, preferably less than 0.5 nM as measured by surface plasmon resonance (SPR).

Suitably, the antibody of the disclosure binds to human TNFα with a dissociation constant ($K_D$) of between 1 pM and 10 nM, 1 pM and 7 nM, 1 pM and 5 nM, 1 pM and 4 nM, 1 pM and 3 nM, 1 pM and 2.5 nM, 1 pM and 2 nM, 1 pM and 1.5 nM, 1 pM and 1 nM, preferably 1 pM and 0.5 nM, more preferably 1 pM and 0.25 nM, as measured by surface plasmon resonance. In a suitable embodiment, the antibody of the disclosure binds to human TNFα with a dissociation constant ($K_D$) of between 1 and 500 pM, preferably 1 and 250 pM, as measured by surface plasmon resonance. In a suitable embodiment, the antibody of the disclosure binds to human TNFα with a dissociation constant ($K_D$) of less than 5 nM, less than 4 nM, less than 3 nM, less than 2 nM, less than 1 nM, preferably less than 0.5 nM, more preferably less than 0.25 nM, as measured by surface plasmon resonance. Suitably, the antibody of the disclosure binds to human TNFα with a dissociation constant ($K_D$) of less than 0.5 nM. Suitably, the antibody of the disclosure binds to human TNFα with a dissociation constant ($K_D$) of less than 0.25 nM.

In a suitable embodiment, the antibody of the disclosure binds to human serum albumin with a dissociation constant ($K_D$) of between 1 pM and 10 nM, 1 pM and 7 nM, 1 pM and 5 nM, 1 pM and 4 nM, 1 pM and 3 nM, preferably 1 pM and 2 nM, as measured by surface plasmon. In a suitable embodiment, the antibody of the disclosure binds to human serum albumin with a dissociation constant ($K_D$) of between 1 and 2000 pM as measured by surface plasmon resonance. In a suitable embodiment, the antibody of the disclosure binds to human serum albumin with a dissociation constant ($K_D$) of less than 5 nM, less than 4 nM, less than 3 nM, preferably less than 2 nM, as measured by surface plasmon resonance. Suitably, the antibody of the disclosure binds to human serum albumin with a dissociation constant ($K_D$) of less than 2 nM. In a further embodiment, the antibody of the disclosure binds to Cynomolgus serum albumin with a $K_D$ of less than 10 nM, e.g. less than 7 nM, less than 5 nM, than 4 nM, less than 3 nM, preferably less than 2 nM as measured by surface plasmon resonance (SPR).

Suitably, the antibody of the disclosure has beneficial biophysical properties.
(a) has a melting temperature (Tm), determined by differential scanning fluorimetry, of at least 55° C., preferably of at least 58° C., more preferably at least 60° C. in phosphate-citrate buffer at pH 6.4, 150 mM NaCl;
(b) has a loss in monomer content, after five consecutive freeze-thaw cycles, of less than 5%, e.g., less than 4%, less than 3%, less than 2%, preferably 1% or less, when said multispecific antibody is at a starting concentration of 10 mg/ml in phosphate buffered saline (PBS), pH 7.4;
(c) has a loss in monomer content, after storage for at least two weeks, particularly for at least four weeks, at 4° C., of less than 10%, preferably less than 5%, when said multispecific antibody is at a starting concentration of 10 mg/ml in phosphate buffered saline (PBS), pH 7.4; and/or
(d) has a loss in monomer content, after storage for at least two weeks, particularly for at least four weeks, at 37° C., of less than 20%, preferably less than 15%, when said multispecific antibody is at a starting concentration of 10 mg/ml in phosphate buffered saline (PBS), pH 7.4.

The melting (Tm) is determined by differential scanning fluorimetry (DSF) as described earlier (Egan, et al., MAbs, 9(1) (2017), 68-84; Niesen, et al., Nature Protocols, 2(9) (2007) 2212-2221). The midpoint of transition for the thermal unfolding is determined by Differential Scanning Fluorimetry (DSF) using the fluorescence dye SYPRO® Orange (see Wong & Raleigh, Protein Science 25 (2016) 1834-1840). Samples in phosphate-citrate buffer at pH 6.4 are prepared at a final protein concentration of 50 μg/mL and a final concentration of 5×SYPRO® Orange in a total volume of 100 μl. Twenty-five microliters of prepared samples are added in triplicate to white-walled AB gene PCR plates. The assay is performed in a qPCR machine used as a thermal cycler, and the fluorescence emission is detected using the software's custom dye calibration routine. The PCR plate containing the test samples is subjected to a temperature ramp from 25° C. to 96° C. in increments of 1° C. with 30 s pauses after each temperature increment. The total assay time is about two hours. The Tm is calculated by the software GraphPad Prism using a mathematical second derivative method to calculate the inflection point of the curve. The reported Tm is an average of three measurements.

The loss in monomer content is determined by SE-HPLC. SE-HPLC is a separation technique based on a solid stationary phase and a liquid mobile phase as outlined by the USP chapter 621. This method separates molecules based on their size and shape utilizing a hydrophobic stationary phase and aqueous mobile phase. The separation of molecules is occurring between the void volume (V0) and the total permeation volume (VT) of a specific column. Measurements by SE-HPLC are performed on a Chromaster HPLC system (Hitachi High-Technologies Corporation) equipped with automated sample injection and a UV detector set to the detection wavelength of 280 nm. The equipment is controlled by the software EZChrom Elite (Agilent Technologies, Version 3.3.2 SP2) which also supports analysis of resulting chromatograms. Protein samples are cleared by centrifugation and kept at a temperature of 6° C. in the autosampler prior to injection. For the analysis of scFv samples the column Shodex KW403-4F (Showa Denko Inc., #F6989202) is employed with a standardized buffered saline mobile phase (50 mM sodium-phosphate pH 6.5, 300 mM sodium chloride) at the recommended flow rate of 0.35 mL/min. The target sample load per injection was 5 μg. Samples are detected by an UV detector at a wavelength of 280 nm and the data recorded by a suitable software suite. The resulting chromatograms are analyzed in the range of V0 to VT thereby excluding matrix associated peaks with >10 min elution time.

Exemplary Domains Specifically Binding to IL-17A

The multispecific antibody of the disclosure comprises a first domain specifically binding IL-17A, wherein said domain comprises a heavy chain variable region (VH) and a light chain variable region (VL), and wherein: (a) said VH comprises, in sequence, the three complementary determining regions HCDR1, HCDR2 and HCDR3, and (b) said VL comprises, in sequence, the three complementary determining regions LCDR1, LCDR2 and LCDR3.

Suitable domains specifically binding IL-17A for use in the multispecific antibody of the present disclosure include, but are not limited to:

the humanized monoclonal antibodies or binding domains thereof presented below in Section "Anti-IL-17A antibodies of the disclosure", whose sequences are listed in TABLE 1;

AIN457 (also referred to as secukinumab; disclosed in U.S. Pat. No. 7,807,155 and WO 2006/013107, which are incorporated herein by reference in their entirety) or an antigen-binding fragment thereof;

LY2439821 (also referred to as ixekizumab; disclosed in U.S. Pat. Nos. 7,838,638 and 8,110,191 and WO 2007/070750, which are incorporated herein by reference in their entirety) or an antigen-binding fragment thereof;

SCH900117 or an antigen-binding fragment thereof (Merck);

RG4943 or an antigen-binding fragment thereof (Roche);

anti-IL-17A antibodies or antigen-binding fragments thereof are disclosed in WO 2006/013107, WO 2006/054059, WO 2007/070750, WO 2007/149032, WO 2008/001063, WO 2008/021156, WO 2010/034443, WO 2010/102251, WO 2012/018767, WO 2014/161570, WO 2014/001368, WO 2014/122613, WO 2015/070697, WO 2015/137843, WO 2016/048188, WO 2016/113557, WO 2016/138842, WO 2017/068472, which are incorporated herein by reference in their entirety.

Preferred domains specifically binding IL-17A for use in the multispecific antibody of the present disclosure include, but are not limited to, the humanized monoclonal antibodies or binding domains thereof presented below, whose sequences are listed in TABLE 1.

Thus, in one embodiment, the disclosure provides the multispecific antibody comprising a first domain specifically binding IL-17A and a second domain specifically binding TNFα, wherein said first domain comprises a set of CDRs: HCDR1, HCDR2, HCDR3, LCDR1, LCDR2 and LCDR3, wherein the set of CDRs has 10 or fewer amino acid substitutions, e.g., 9 or fewer amino acid substitutions, 8 or fewer amino acid substitutions, 7 or fewer amino acid substitutions, 6 or fewer amino acid substitutions, 5 or fewer amino acid substitutions, 4 or fewer amino acid substitutions, 3 or fewer amino acid substitutions, 2 or fewer amino acid substitutions, 1 or 0 amino acid substitutions, preferably 0 amino acid substitutions, from a set of CDRs (i) in which HCDR1' is amino acid sequence selected from any one of SEQ ID Nos: 1, 4, and 7, preferably SEQ ID NO: 1; HCDR2' is amino acid sequence selected from any one of SEQ ID Nos: 2, 5, and 8, preferably SEQ ID NO: 2; HCDR3' is amino acid sequence selected from any one of SEQ ID Nos: 3, 6, and 9, preferably SEQ ID NO: 3; LCDR1' is amino acid sequence selected from any one of SEQ ID Nos: 12, 15, and 18, preferably SEQ ID NO: 12; LCDR2' is amino acid sequence selected from any one of SEQ ID Nos: 13, 16, and 19, preferably SEQ ID NO: 13; and LCDR3' having the amino acid sequence selected from any one of SEQ ID Nos: 14, 17, and 20, preferably SEQ ID NO: 14; or (ii) in which HCDR1' is amino acid sequence selected from any one of SEQ ID Nos: 39, 42, and 45, preferably SEQ ID NO: 39; HCDR2' is amino acid sequence selected from any one of SEQ ID Nos: 40, 43, and 46, preferably SEQ ID NO: 40; HCDR3' is amino acid sequence selected from any one of SEQ ID Nos: 41, 44, and 47, preferably SEQ ID NO: 41; LCDR1' is amino acid sequence selected from any one of SEQ ID Nos: 50, 53, and 56, preferably SEQ ID NO: 50; LCDR2' is amino acid sequence selected from any one of SEQ ID Nos: 51, 54, and 57, preferably SEQ ID NO: 51; and LCDR3' having the amino acid sequence selected from any one of SEQ ID Nos: 52, 55, and 58, preferably SEQ ID NO: 52.

In particular, the present disclosure provides the multispecific antibody comprising a first domain specifically binding IL-17A and a second domain specifically binding TNFα, wherein said first domain comprises a VH CDR having an amino acid sequence of any one of the VH CDRs listed in TABLE 1. In particular, said domain comprises (or alternatively, consisting of) one, two, three, or more VH CDRs having an amino acid sequence of any of the VH CDRs listed in TABLE 1.

Suitably, the first domain specifically binding IL-17A comprises a heavy chain variable region (VH), wherein said VH comprises, in sequence, (i) the three complementary determining regions HCDR1, HCDR2 and HCDR3, said HCDR1 having the amino acid sequence selected from any one of SEQ ID Nos: 1, 4, and 7, said HCDR2 having the amino acid sequence selected from any one of SEQ ID Nos: 2, 5, and 8, said HCDR3 having the amino acid sequence selected from any one of SEQ ID Nos: 3, 6, and 9. In particular, the disclosure provides antibodies that have a binding specificity for human IL-17A and comprises HCDR1, HCDR2, and HCDR3 sequences of SEQ ID NOs: 1, 2, and 3, respectively; or (ii) the three complementary determining regions HCDR1, HCDR2 and HCDR3, said HCDR1 having the amino acid sequence selected from any one of SEQ ID Nos: 39, 42, and 45, said HCDR2 having the amino acid sequence selected from any one of SEQ ID Nos: 40, 43, and 46, said HCDR3 having the amino acid sequence selected from any one of SEQ ID Nos: 41, 44, and 47. In particular, the disclosure provides antibodies that have a binding specificity for human IL-17A and comprises HCDR1, HCDR2, and HCDR3 sequences of SEQ ID NOs: 39, 40, and 41, respectively.

The present disclosure also provides the multispecific antibody comprising a first domain specifically binding IL-17A and a second domain specifically binding TNFα, wherein said first domain comprises a VL CDR having an amino acid sequence of any one of the VL CDRs listed in TABLE 1. In particular, the first domain specifically binding IL-17A comprises (or alternatively, consisting of) one, two, three or more VL CDRs having an amino acid sequence of any of the VL CDRs listed in TABLE 1.

Suitably, said first domain specifically binding IL-17A comprises a light chain variable region (VL), wherein said VL comprises, in sequence, (i) the three complementary determining regions LCDR1, LCDR2 and LCDR3, said LCDR1 having the amino acid sequence selected from any one of SEQ ID Nos: 12, 15, and 18, said LCDR2 having the amino acid sequence selected from any one of SEQ ID Nos: 13, 16, and 19, said LCDR3 having the amino acid sequence selected from any one of SEQ ID Nos: 14, 17, and 20. In particular, the disclosure provides antibodies that have a binding specificity for human IL-17A and comprises LCDR1, LCDR2, and LCDR3 sequences of SEQ ID NOs: 12, 13, and 14, respectively; or (ii) the three complementary determining regions LCDR1, LCDR2 and LCDR3, said LCDR1 having the amino acid sequence selected from any one of SEQ ID Nos: 50, 53, and 56, said LCDR2 having the amino acid sequence selected from any one of SEQ ID Nos: 51, 54, and 57, said LCDR3 having the amino acid sequence selected from any one of SEQ ID Nos: 52, 55, and 58. In particular, the disclosure provides antibodies that have a binding specificity for human IL-17A and comprises LCDR1, LCDR2, and LCDR3 sequences of SEQ ID NOs: 50, 51, and 52, respectively.

Suitably, the present disclosure provides the multispecific antibody comprising a first domain specifically binding IL-17A and a second domain specifically binding TNFα, wherein said first domain comprises a heavy chain variable region (VH) and a light chain variable region (VL),
  (i) wherein
    (a) said VH comprises, in sequence, the three complementary determining regions HCDR1, HCDR2 and HCDR3, said HCDR1 having the amino acid sequence selected from any one of SEQ ID Nos: 1, 4, and 7, said HCDR2 having the amino acid sequence selected from any one of SEQ ID Nos: 2, 5, and 8, said HCDR3 having the amino acid sequence selected from any one of SEQ ID Nos: 3, 6, and 9; and
    (b) said VL comprises, in sequence, the three complementary determining regions LCDR1, LCDR2 and LCDR3, said LCDR1 having the amino acid sequence selected from any one of SEQ ID Nos: 12, 15, and 18, said LCDR2 having the amino acid sequence selected from any one of SEQ ID Nos: 13, 16, and 19, said LCDR3 having the amino acid sequence selected from any one of SEQ ID Nos: 14, 17, and 20; or
  (ii) wherein
    (a) said VH comprises, in sequence, the three complementary determining regions HCDR1, HCDR2 and HCDR3, said HCDR1 having the amino acid sequence selected from any one of SEQ ID Nos: 39, 42, and 45, said HCDR2 having the amino acid sequence selected from any one of SEQ ID Nos: 40, 43, and 46, said HCDR3 having the amino acid sequence selected from any one of SEQ ID Nos: 41, 44, and 47; and
    (b) said VL comprises, in sequence, the three complementary determining regions LCDR1, LCDR2 and LCDR3, said LCDR1 having the amino acid sequence selected from any one of SEQ ID Nos: 50, 53, and 56, said LCDR2 having the amino acid sequence selected from any one of SEQ ID Nos: 51, 54, and 57, said LCDR3 having the amino acid sequence selected from any one of SEQ ID Nos: 52, 55, and 58.

In particular, the disclosure provides the multispecific antibody comprising a first domain specifically binding IL-17A and a second domain specifically binding TNFα, wherein said first domain comprises (i) (a) HCDR1, HCDR2, and HCDR3 sequences of SEQ ID NOs: 1, 2, and 3, respectively, and (b) LCDR1, LCDR2, and LCDR3 sequences of SEQ ID NOs: 12, 13, and 14, respectively; or (ii) (a) HCDR1, HCDR2, and HCDR3 sequences of SEQ ID NOs: 39, 40, and 41, respectively, and (b) LCDR1, LCDR2, and LCDR3 sequences of SEQ ID NOs: 50, 51, and 52, respectively.

Other domains of the disclosure specifically binding IL-17A include amino acids that have been mutated, yet have at least 60, 70, 80, 90, 91, 92, 93, 94, 95, 96, 97, 98 or 99 percent identity in the CDR regions with the CDR regions depicted in the sequences described in TABLE 1. Suitably, other domains of the disclosure specifically binding IL-17A include mutant amino acid sequences wherein no more than 1, 2, 3, 4, 5 or 10 amino acids have been mutated by amino acid deletion, insertion or substitution in the CDR regions when compared with the CDR regions depicted in the sequences described in TABLE 1. Mutations, e.g., substitutions, may potentially be made at any residue within the set of CDRs, and may be within CDR1, CDR2 and/or CDR3.

The term "amino acid" refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, gamma-carboxyglutamate, and O-phosphoserine. The terms "polypeptide" and "protein" are used interchangeably herein to refer to a polymer of amino acid residues. The terms apply to amino acid polymers in which one or more amino acid residue is an artificial chemical mimetic of a corresponding naturally occurring amino acid, as well as to naturally occurring amino acid polymers and non-naturally occurring amino acid polymer. Unless otherwise indicated, a particular polypeptide sequence also implicitly encompasses conservatively modified variants thereof.

The techniques required to make mutations, e.g., substitutions, within amino acid sequences of CDRs, antibody VH or VL domains and antibodies generally are available in the art. Variant sequences may be made, with mutations, e.g., substitutions, that may or may not be predicted to have a minimal or beneficial effect on activity, and tested for ability to bind and/or neutralize IL-17A, or, alternatively, TNFα or human serum albumin, and/or for any other desired property. Suitable mutations, e.g., substitutions, within CDRs do not result in loss of function, so an antibody of the disclosure or a binding domain thereof comprising a thus-mutated amino acid sequence retains an ability to bind and/or neutralize IL-17A, or, alternatively, TNFα or human serum albumin. For example, it may retain the same quantitative binding and/or neutralizing ability as a domain of the disclosure in which the alteration is not made, e.g., as measured in the assays described herein. Suitably, a domain of the disclosure of antigen-binding fragment comprising a thus-mutated amino acid sequence may have an improved ability to bind and/or neutralize IL-17A, or, alternatively, TNFα or human serum albumin. Suitably, a first domain of the disclosure specifically binding IL-17A and comprising a thus-mutated amino acid sequence has the ability to neutralize IL-17A with a potency relative to that of secukinumab (relative potency), determined by measuring Gro-α secretion in an HT-29 assay, greater than 2, e.g., greater than 5, greater than 10, greater than 15, greater than 20, greater than 25, greater than 30, greater than 35, greater than 40, greater than 45, preferably greater than 50, and wherein said relative potency is the ratio of the $IC_{50}$ value in ng/mL of secukinumab as measured in the HT-29 assay to the $IC_{50}$ value in ng/mL of said multispecific antibody as measured in the HT-29 assay.

In addition, suitable mutations, e.g., substitutions, within CDRs do not result in loss in solubility, stability, and producibility in high yields of the multispecific antibody of the disclosure, so the multispecific antibody of the disclosure or a binding domain thereof comprising a thus-mutated amino acid sequence retains the biophysical characteristics. For example, it may retain the same producibility in high yields and/or stability as the multispecific antibody of the disclosure in which the alteration is not made, e.g., as measured in the assays described herein. Suitably, the multispecific antibody or a binding domain thereof comprising a thus-mutated amino acid sequence may have improved biophysical characteristics.

The terms "identical" or percent "identity", in the context of two or more nucleic acids or polypeptide sequences, refer to two or more sequences or subsequences that are the same. "Percent (%) amino acid sequence identity" and "homology" with respect to nucleic acid, a peptide, polypeptide or antibody sequence are defined as the percentage of amino acid residues in a candidate sequence that are identical with the amino acid residues in the specific peptide or polypeptide sequence, after aligning the sequences and introducing gaps, if necessary, to achieve the maximum percent sequence identity, and not considering any conservative substitutions as part of the sequence identity. Alignment for purposes of determining percent amino acid sequence identity can be achieved in various ways that are within the skill in the art, for instance, using publicly available computer software such as BLAST, BLAST-2 or ALIGN software. Those skilled in the art can determine appropriate parameters for measuring alignment, including any algorithms needed to achieve maximal alignment over the full length of the sequences being compared.

For sequence comparison, typically one sequence acts as a reference sequence, to which test sequences are compared. When using a sequence comparison algorithm, test and reference sequences are entered into a computer, subsequence coordinates are designated, if necessary, and sequence algorithm program parameters are designated. Default program parameters can be used, or alternative parameters can be designated. The sequence comparison algorithm then calculates the percent sequence identities for the test sequences relative to the reference sequence, based on the program parameters.

Two examples of algorithms that are suitable for determining percent sequence identity and sequence similarity are the BLAST and BLAST 2.0 algorithms, which are described in Altschul et al., Nuc Acids Res. 25:3389-3402, 1977; and Altschul et al., J. Mol. Biol. 215:403-410, 1990, respectively. Software for performing BLAST analyses is publicly available through the National Center for Biotechnology Information.

The percent identity between two amino acid sequences can also be determined using the algorithm of E. Meyers and W. Miller (Comput. Appl. Biosci., 4: 11-17, 1988) which has been incorporated into the ALIGN program (version 2.0), using a PAM120 weight residue table, a gap length penalty of 12 and a gap penalty of 4. In addition, the percent identity between two amino acid sequences can be determined using the Needleman and Wunsch (J. Mol, Biol. 48:444-453, 1970) algorithm which has been incorporated into the GAP program in the GCG software package (available at www.gcg.com), using either a Blossom 62 matrix or a PAM250 matrix, and a gap weight of 16, 14, 12, 10, 8, 6, or 4 and a length weight of 1, 2, 3, 4, 5, or 6.

Suitably, a first domain specifically binding IL-17A of the multispecific antibody of the present disclosure comprises a heavy chain variable region (VH) and a light chain variable region (VL), wherein:

(i)

(a) said VH comprises, in sequence, the three complementary determining regions HCDR1, HCDR2 and HCDR3,
   said HCDR1 having the amino acid sequence having at least 60, 70, 80, 90, 91, 92, 93, 94, 95, 96, 97, 98 or 99 percent identity to any one of SEQ ID NOs: 1, 4, and 7, preferably SEQ ID NO: 1;
   said HCDR2 having the amino acid sequence having at least 60, 70, 80, 90, 91, 92, 93, 94, 95, 96, 97, 98 or 99 percent identity to any one of SEQ ID NOs: 2, 5, and 8, preferably SEQ ID NO: 2;
   said HCDR3 having the amino acid sequence having at least 60, 70, 80, 90, 91, 92, 93, 94, 95, 96, 97, 98 or 99 percent identity to any one of SEQ ID NOs: 3, 6, and 9, preferably SEQ ID NO: 3; and/or (b) said VL comprises, in sequence, the three complementary determining regions LCDR1, LCDR2 and LCDR3,
   said LCDR1 having the amino acid sequence having at least 60, 70, 80, 90, 91, 92, 93, 94, 95, 96, 97, 98 or 99 percent identity to any one of SEQ ID NOs: 12, 15, and 18, preferably SEQ ID NO: 12;
   said LCDR2 having the amino acid sequence having at least 60, 70, 80, 90, 91, 92, 93, 94, 95, 96, 97, 98 or 99 percent identity to any one of SEQ ID NOs: 13, 16, and 19, preferably SEQ ID NO: 13;
   said LCDR3 having the amino acid sequence having at least 60, 70, 80, 90, 91, 92, 93, 94, 95, 96, 97, 98 or 99 percent identity to any one of SEQ ID NOs: 14, 17, and 20, preferably SEQ ID NO: 14; or (ii)

(a) said VH comprises, in sequence, the three complementary determining regions HCDR1, HCDR2 and HCDR3,
   said HCDR1 having the amino acid sequence having at least 60, 70, 80, 90, 91, 92, 93, 94, 95, 96, 97, 98 or 99 percent identity to any one of SEQ ID NOs: 39, 42, and 45, preferably SEQ ID NO: 39;

said HCDR2 having the amino acid sequence having at least 60, 70, 80, 90, 91, 92, 93, 94, 95, 96, 97, 98 or 99 percent identity to any one of SEQ ID NOs: 40, 43, and 46, preferably SEQ ID NO: 40;

said HCDR3 having the amino acid sequence having at least 60, 70, 80, 90, 91, 92, 93, 94, 95, 96, 97, 98 or 99 percent identity to any one of SEQ ID NOs: 41, 44, and 47, preferably SEQ ID NO: 41; and/or (b) said VL comprises, in sequence, the three complementary determining regions LCDR1, LCDR2 and LCDR3, said LCDR1 having the amino acid sequence having at least 60, 70, 80, 90, 91, 92, 93, 94, 95, 96, 97, 98 or 99 percent identity to any one of SEQ ID NOs: 50, 53, and 56, preferably SEQ ID NO: 50;

said LCDR2 having the amino acid sequence having at least 60, 70, 80, 90, 91, 92, 93, 94, 95, 96, 97, 98 or 99 percent identity to any one of SEQ ID NOs: 51, 54, and 57, preferably SEQ ID NO: 51;

said LCDR3 having the amino acid sequence having at least 60, 70, 80, 90, 91, 92, 93, 94, 95, 96, 97, 98 or 99 percent identity to any one of SEQ ID NOs: 52, 55, and 58, preferably SEQ ID NO: 52.

Suitably, the first domain specifically binding IL-17A comprises: (i) HCDR1, HCDR2, and HCDR3 having at least 60, 70, 80, 90, 91, 92, 93, 94, 95, 96, 97, 98 or 99 percent identity to sequences of SEQ ID NOs: 1, 2, and 3, respectively, and/or LCDR1, LCDR2, and LCDR3 having at least 60, 70, 80, 90, 91, 92, 93, 94, 95, 96, 97, 98 or 99 percent identity to sequences of SEQ ID NOs: 12, 13, and 14, respectively; or (ii) HCDR1, HCDR2, and HCDR3 having at least 60, 70, 80, 90, 91, 92, 93, 94, 95, 96, 97, 98 or 99 percent identity to sequences of SEQ ID NOs: 39, 40, and 41, respectively, and/or LCDR1, LCDR2, and LCDR3 having at least 60, 70, 80, 90, 91, 92, 93, 94, 95, 96, 97, 98 or 99 percent identity to sequences of SEQ ID NOs: 50, 51, and 52, respectively.

In a further embodiment, the first domain specifically binding IL-17A comprises a heavy chain variable region VHA and a light chain variable region VLA.

In the context of the present disclosure the terms "VH" (variable heavy chain or heavy chain variable region), "VL" (variable light chain or light chain variable region), "Vκ" and "Vλ" refer to families of antibody heavy and light chain sequences that are grouped according to sequence identity and homology. Methods for the determination of sequence homologies, for example by using a homology search matrix such as BLOSUM (Henikoff, S. & Henikoff, J. G., Proc. Natl. Acad. Sci. U.S.A. 89 (1992) 10915-10919), and methods for the grouping of sequences according to homologies are well known to one of ordinary skill in the art. For VH, Vκ and Vλ different subfamilies can be identified, as shown, for example, in Knappik et al., J. Mol. Biol. 296 (2000) 57-86, which groups VH in VH1A, VH1B and VH2 to VH6, Vκ in Vκ1 to Vκ4 and Vλ in Vλ 1 to Vλ3. In vivo, antibody Vκ chains, Vλ chains, and VH chains are the result of the random rearrangement of germline κ chain V and J segments, germline λ chain V and J segments, and heavy chain V, D and J segments, respectively. To which subfamily a given antibody variable chain belongs is determined by the corresponding V segment, and in particular by the framework regions FR1 to FR3. Thus, any VH sequence that is characterized in the present application by a particular set of framework regions HFR1 to HFR3 only, may be combined with any HFR4 sequence, for example a HFR4 sequence taken from one of the heavy chain germline J segments, or a HFR4 sequence taken from a rearranged VH sequence.

Suitably, the first domain specifically binding IL-17A of the multispecific antibody of the present disclosure comprises a heavy chain variable region VHA and wherein said VHA is VH1A, VH1B, VH3 or VH4. In one embodiment, said first domain specifically binding IL-17A of the present disclosure comprises a heavy chain variable region VHA, wherein said VHA is VH4. In a preferred embodiment, said first domain specifically binding IL-17A of the present disclosure comprises a heavy chain variable region VHA, wherein said VHA is VH3.

Suitably, the first domain specifically binding IL-17A of the multispecific antibody of the present disclosure comprises a light chain variable region VLA and wherein said VLA comprises Vκ frameworks FR1, FR2 and FR3, particularly Vκ1 or Vκ3 FR1 to FR3, preferably Vκ1 frameworks FR1 to FR3, and a framework FR4, which is selected from a Vκ FR4, particularly Vκ1 FR4, Vκ3 FR4, and a Vλ FR4. Suitable Vλ FR4 are as set forth in SEQ ID NO: 26 to SEQ ID NO: 32. In one embodiment, said first domain specifically binding IL-17A comprises Vλ FR4 comprising the amino acid sequence having at least 60, 70, 80, 90 percent identity to an amino acid sequence selected from any of SEQ ID NO: 26 to SEQ ID NO: 32, preferably to SEQ ID NO: 26 or SEQ ID NO: 27, more preferably to SEQ ID NO: 27. Suitably, said first domain specifically binding IL-17A comprises Vλ FR4 comprising the amino acid sequence selected from any of SEQ ID NO: 26 to SEQ ID NO: 32, preferably Vλ FR4 as set forth in SEQ ID NO: 26 or 27, more preferably Vλ FR4 as set forth in SEQ ID NO: 27.

Thus, in one embodiment, the disclosure provides the multispecific antibody comprising a first domain specifically binding IL-17A and a second domain specifically binding TNFα, wherein said first domain comprises:

(i)(a) the HCDR1, HCDR2, and HCDR3 sequences of SEQ ID NOs: 1, 2, and 3, respectively, and the LCDR1, LCDR2, and LCDR3 sequences of SEQ ID NOs: 12, 13, and 14, respectively; or (i)(b) the HCDR1, HCDR2, and HCDR3 sequences of SEQ ID NOs: 39, 40, and 41, respectively, and the LCDR1, LCDR2, and LCDR3 sequences of SEQ ID NOs: 50, 51, and 52, respectively;

(ii) a VH3 or VH4 domain, preferably VH3 domain; and (iii) a VL domain comprising a VL framework comprising Vκ frameworks FR1, FR2 and FR3, particularly Vκ1 or Vκ3 FR1 to FR3, preferably Vκ1 FR1 to FR3, and a framework FR4, which is selected from a Vκ FR4, particularly Vκ1 FR4, Vκ3 FR4, and a Vλ FR4, particularly Vλ FR4 comprising the amino acid sequence having at least 60, 70, 80, 90 percent identity to an amino acid sequence selected from any of SEQ ID NO: 26 to SEQ ID NO: 32, preferably Vλ FR4 as set forth in amino acid sequence selected from any one of SEQ ID NO: 26 to SEQ ID NO: 32, more preferably Vλ FR4 as set forth in SEQ ID NO: 27.

Suitably, the present disclosure provides the multispecific antibody comprising a first domain specifically binding IL-17A and a second domain specifically binding TNFα, wherein said first domain comprises a VH listed in TABLE 1. Suitably, the present disclosure also provides the multispecific antibody comprising a first domain specifically binding IL-17A and a second domain specifically binding TNFα, wherein said first domain comprises (or alternatively, consisting of) a VH amino acid sequence listed in TABLE 1, wherein no more than about 20 amino acids, preferably no more than about 10 amino acids, in a framework sequence (for example, a sequence which is not a CDR) have been mutated (wherein a mutation is, as various non-limiting examples, an addition, substitution or deletion). Other domains of the disclosure specifically binding IL-17A include amino acids that have been mutated, yet have at least 60, 70, 80, 90, 91, 92, 93, 94, 95, 96, 97, 98 or 99 percent identity in the VH regions with the VH regions depicted in the sequences described in TABLE 1.

Suitably, the present disclosure provides the multispecific antibody comprising a first domain specifically binding IL-17A and a second domain specifically binding TNFα, wherein said first domain comprises a VL domain listed in TABLE 1. Suitably, the present disclosure also provides the multispecific antibody comprising a first domain specifically binding IL-17A and a second domain specifically binding TNFα, wherein said first domain comprises (or alternatively, consisting of) a VL amino acid sequence listed in TABLE 1, wherein no more than about 20 amino acids, preferably no more than about 10 amino acids, in a framework sequence (for example, a sequence which is not a CDR) have been mutated (wherein a mutation is, as various non-limiting examples, an addition, substitution or deletion). Other domains of the disclosure specifically binding to IL-17A include amino acids that have been mutated, yet have at least 60, 70, 80, 90, 91, 92, 93, 94, 95, 96, 97, 98 or 99 percent identity in the VL regions with the VL regions depicted in the sequences described in TABLE 1.

In one embodiment, the disclosure provides the multispecific antibody a first domain specifically binding IL-17A and a second domain specifically binding TNFα, wherein said first domain comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 10 or SEQ ID NO: 11, preferably SEQ ID NO: 10, and in particular wherein said domain comprises HCDR1, HCDR2, and HCDR3 sequences of SEQ ID NOs: 1, 2, and 3, respectively. In a further embodiment, the first domain specifically binding IL-17A comprises a heavy chain variable region comprising an amino acid sequence that is at least 90 percent identical to the amino acid sequence SEQ ID NO: 11 and wherein said heavy chain variable region comprises Q14K, G16E, and G56A (AHo numbering).

In another embodiment, the disclosure provides the multispecific antibody a first domain specifically binding IL-17A and a second domain specifically binding TNFα, wherein said first domain comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 48 or SEQ ID NO: 49, preferably SEQ ID NO: 48, and in particular wherein said antibody comprises HCDR1, HCDR2, and HCDR3 sequences of SEQ ID NOs: 39, 40, and 41, respectively. In a further embodiment, the disclosure provides an isolated antibody that specifically binds human IL-17A wherein said antibody comprises a heavy chain variable region comprising an amino acid sequence that is at least 90 percent identical to the amino acid sequence SEQ ID NO: 49 and wherein said heavy chain variable region comprises R20T and Q141P (AHo numbering).

In another embodiment, the disclosure provides the multispecific antibody a first domain specifically binding IL-17A and a second domain specifically binding TNFα, wherein said first domain (i) comprises a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 21 or SEQ ID NO: 22, preferably SEQ ID NO: 21, and in particular wherein said antibody comprises LCDR1, LCDR2, and LCDR3 sequences of SEQ ID NOs: 12, 13, and 14, respectively; or (ii) comprises a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 59 or SEQ ID NO: 60, preferably SEQ ID NO: 59, and in particular wherein said antibody comprises LCDR1, LCDR2, and LCDR3 sequences of SEQ ID NOs: 50, 51, and 52, respectively.

In another embodiment, the disclosure provides the multispecific antibody a first domain specifically binding IL-17A and a second domain specifically binding TNFα, wherein said first domain comprises a light chain variable region comprising an amino acid sequence that is at least 90 percent identical to the amino acid sequence SEQ ID NO: 22 and wherein said light chain variable region comprises A51P (AHo numbering).

In a further embodiment, the disclosure provides the multispecific antibody comprising a first domain specifically binding IL-17A and a second domain specifically binding TNFα, wherein said first domain (i) comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 10; and a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 21; or (ii) comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 48; and a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 59.

Preferably, said first domain specifically binding IL-17A of the multispecific antibody of the present disclosure comprises a heavy chain variable region comprising an amino acid sequence that is (i) at least 60, 70, 80, 90, 91, 92, 93, 94, 95, 96, 97, 98 or 99 percent, preferably at least 90 percent, identical to the amino acid sequence SEQ ID NO: 10; and a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 21, and wherein the antibody comprises HCDR1, HCDR2, and HCDR3 sequences of SEQ ID NOs: 1, 2, and 3, respectively, and/or LCDR1, LCDR2, and LCDR3 sequences of SEQ ID NOs: 12, 13, and 14, respectively; particularly, wherein the antibody comprises HCDR1, HCDR2, and HCDR3 sequences of SEQ ID NOs: 1, 2, and 3, respectively, and LCDR1, LCDR2, and LCDR3 sequences of SEQ ID NOs: 12, 13, and 14, respectively; or (ii) at least 60, 70, 80, 90, 91, 92, 93, 94, 95, 96, 97, 98 or 99 percent, preferably at least 90 percent, identical to the amino acid sequence SEQ ID NO: 48; and a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 59, and wherein the antibody comprises HCDR1, HCDR2, and HCDR3 sequences of SEQ ID NOs: 39, 40, and 41, respectively, and/or LCDR1, LCDR2, and LCDR3 sequences of SEQ ID NOs: 50, 51, and 52, respectively; particularly, wherein the antibody comprises HCDR1, HCDR2, and HCDR3 sequences of SEQ ID NOs: 39, 40, and 41, respectively, and LCDR1, LCDR2, and LCDR3 sequences of SEQ ID NOs: 39, 40, and 41, respectively.

In a specific embodiment, the disclosure provides the multispecific antibody comprising a first domain specifically binding IL-17A and a second domain specifically binding TNFα, wherein said first domain comprises (i) a VH comprising an amino acid sequence selected from the group consisting of SEQ ID NOs: 10 and 11; and/or a VL thereof comprising an amino acid sequence selected from the group consisting of SEQ ID NOs: 21 and 22, or (ii)) a VH comprising an amino acid sequence selected from the group consisting of SEQ ID NOs: 48 and 19; and/or a VL thereof comprising an amino acid sequence selected from the group consisting of SEQ ID NOs: 59 and 60.

In particular embodiment, the first domain specifically binding IL-17A comprises (i) a VH sequence of SEQ ID NO: 10 and a VL sequence of SEQ ID NO: 21 or (ii) a VH sequence of SEQ ID NO: 48 and a VL sequence of SEQ ID NO: 59. In yet another particular embodiment, the first domain specifically binding IL-17A comprises (i) a VH sequence of SEQ ID NO: 11 and a VL sequence of SEQ ID NO: 22 or (ii) a VH sequence of SEQ ID NO: 49 and a VL sequence of SEQ ID NO: 60.

In one embodiment, a domain that specifically binds to human IL-17A is a domain that is described in TABLE 1. In one embodiment, a domain that specifically binds to human IL-17A comprises an amino acid sequence that is at least 60, 70, 80, 90, 91, 92, 93, 94, 95, 96, 97, 98 or 99 percent, preferably at least 90 percent, identical to (i) the amino acid sequence selected from the group consisting of SEQ ID NOs: 24 and 25, preferably SEQ ID NO: 24, or (ii) the amino acid sequence selected from the group consisting of SEQ ID NOs: 61 and 62, preferably SEQ ID NO: 61. In one embodiment, a domain that specifically binds to human IL-17A is as set forth (i) in SEQ ID NO: 24 or SEQ ID NO: 25, preferably SEQ ID NO: 24, or (ii) in SEQ ID NO: 61 or SEQ ID NO: 62, preferably SEQ ID NO: 61.

Other domains of the disclosure having a binding specificity for human IL-17A include those wherein the amino acids or nucleic acids encoding the amino acids have been mutated, yet have at least 60, 70, 80, 90 or 95 percent identity to the sequences described in TABLE 1. In one embodiment, it includes mutant amino acid sequences wherein no more than 1, 2, 3, 4 or 5 amino acids have been mutated in the variable regions when compared with the variable regions depicted in the sequence described in TABLE 1, while retaining substantially the same activity. The term "substantially the same activity" as used herein refers to the activity as indicated by substantially the same activity being at least 50%, at least 60%, at least 70%, at least 80%, at least 90%, at least 95%, at least 98% or even at least 100% or at least 110%, or at least 120%, or at least 130%, or at least 140%, or at least 150%, or at least 160%, or at least 170%, or at least 180%, or at least 190%, e.g. up to 200% of the activity as determined for the parent antibody, e.g., the multispecific antibody of the disclosure, in particular the multispecific antibody of the disclosure comprising a first domain that specifically binds to human IL-17A described in Table 1 and/or a second domain that specifically binds to human TNFα described in TABLE 1.

In yet another embodiment, the present disclosure provides the multispecific antibody comprising a first domain specifically binding IL-17A and a second domain specifically binding TNFα, wherein said first domain comprises amino acid sequences that are homologous to the sequences described in Table 1, and said first domain binds to human IL-17A, and retains the desired functional properties of those domains described in TABLE 1.

In one embodiment, a domain of the disclosure specifically binding IL-17A has a heavy chain variable region comprising HCDR1, HCDR2, and HCDR3 sequences and a light chain variable region comprising LCDR1, LCDR2, and LCDR3 sequences, wherein one or more of these CDR sequences have specified amino acid sequences based on the domains described herein or conservative modifications thereof, and wherein the domains retain the desired functional properties of the antibodies of the disclosure.

The term "conservatively modified variant" or "conservative variants" applies to both amino acid and nucleic acid sequences. With respect to particular nucleic acid sequences, conservatively modified variants refer to those nucleic acids which encode identical or essentially identical amino acid sequences, or where the nucleic acid does not encode an amino acid sequence, to essentially identical sequences. Because of the degeneracy of the genetic code, a large number of functionally identical nucleic acids encode any given protein. For instance, the codons GCA, GCC, GCG and GCU all encode the amino acid alanine. Thus, at every position where an alanine is specified by a codon, the codon can be altered to any of the corresponding codons described without altering the encoded polypeptide. Such nucleic acid variations are "silent variations", which are one species of conservatively modified variations. Every nucleic acid sequence herein which encodes a polypeptide also describes every possible silent variation of the nucleic acid. One of skill will recognize that each codon in a nucleic acid (except AUG, which is ordinarily the only codon for methionine, and TGG, which is ordinarily the only codon for tryptophan) can be modified to yield a functionally identical molecule. Accordingly, each silent variation of a nucleic acid that encodes a polypeptide is implicit in each described sequence.

For polypeptide sequences, "conservatively modified variants" or "conservative variants" include individual substitutions, deletions or additions to a polypeptide sequence which result in the substitution of an amino acid with a chemically similar amino acid. Conservative substitution tables providing functionally similar amino acids are well known in the art. Such conservatively modified variants (i.e. having one or more "conservative modifications") are in addition to and do not exclude polymorphic variants, interspecies homologs, and alleles of the disclosure. The following eight groups contain amino acids that are conservative substitutions for one another: 1) Alanine (A), Glycine (G); 2) Aspartic acid (D), Glutamic acid (E); 3) Asparagine (N), Glutamine (Q); 4) Arginine (R), Lysine (K); 5) Isoleucine (I), Leucine (L), Methionine (M), Valine (V); 6) Phenylalanine (F), Tyrosine (Y), Tryptophan (W); 7) Serine (S), Threonine (T); and 8) Cysteine (C), Methionine (M) (see, e.g., Creighton, Proteins (1984)). In one embodiment, the term "conservative sequence modifications" are used to refer to amino acid modifications that do not significantly affect or alter the binding characteristics of the antibody containing the amino acid sequence.

Accordingly, the disclosure provides the multispecific antibody comprising a first domain specifically binding IL-17A and a second domain specifically binding TNFα, wherein said first domain comprises (or consists of):
(i)
a heavy chain variable region (VH) comprising, in sequence, the three complementary determining regions HCDR1, HCDR2 and HCDR3, wherein said HCDR1 is amino acid sequence SEQ ID No: 1, or a conservative variant thereof; said HCDR2 is amino acid sequence SEQ ID No: 2, or a conservative variant thereof; said HCDR3 is amino acid sequence selected from any one of SEQ ID No: 3, or a conservative variant thereof; and a light chain variable region (VL) comprising, in sequence, the three complementary determining regions LCDR1, LCDR2 and LCDR3, wherein said LCDR1 is amino acid sequence SEQ ID No: 12, or a conservative variant thereof; said LCDR2 is amino acid sequence SEQ ID No: 13, or a conservative variant thereof; said LCDR3 having the amino acid sequence SEQ ID No: 14, or a conservative variant thereof; or (ii)

a heavy chain variable region (VH) comprising, in sequence, the three complementary determining regions HCDR1, HCDR2 and HCDR3, wherein said HCDR1 is amino acid sequence SEQ ID No: 39, or a conservative variant thereof; said HCDR2 is amino acid sequence SEQ ID No: 40, or a conservative variant thereof; said HCDR3 is amino acid sequence selected from any one of SEQ ID No: 41, or a conservative variant thereof; and a light chain variable region (VL) comprising, in sequence, the three complementary determining regions LCDR1, LCDR2 and LCDR3, wherein said LCDR1 is amino acid sequence SEQ ID No: 50, or a conservative variant thereof; said LCDR2 is amino acid sequence SEQ ID No: 51, or a conservative variant thereof; said LCDR3 having the amino acid sequence SEQ ID No: 52, or a conservative variant thereof, wherein the antibody specifically binds to human IL-17A and/or neutralize IL-17A.

Anti-IL-17A Antibodies of the Disclosure

The present disclosure is based on the discovery of antibody molecules that specifically bind to human IL-17A and have improved affinity, efficacy, and selectivity. Moreover, the antibody of the present disclosure has improved biophysical properties, e.g. improved solubility, developability and producibility in high with relatively low impurities (>98%, in particular >99% monomer as detected by SE-HPLC), and stability.

In one aspect, the disclosure provides an isolated antibody having a binding specificity for human IL-17A, comprising a set of CDRs: HCDR1, HCDR2, HCDR3, LCDR1, LCDR2 and LCDR3, wherein the set of CDRs has 10 or fewer amino acid substitutions, e.g., 9 or fewer amino acid substitutions, 8 or fewer amino acid substitutions, 7 or fewer amino acid substitutions, 6 or fewer amino acid substitutions, 5 or fewer amino acid substitutions, 4 or fewer amino acid substitutions, 3 or fewer amino acid substitutions, 2 or fewer amino acid substitutions, 1 or 0 amino acid substitutions, preferably 0 amino acid substitutions, from a set of CDRs (i) in which HCDR1' is amino acid sequence selected from any one of SEQ ID Nos: 1, 4, and 7, preferably SEQ ID NO: 1; HCDR2' is amino acid sequence selected from any one of SEQ ID Nos: 2, 5, and 8, preferably SEQ ID NO: 2; HCDR3' is amino acid sequence selected from any one of SEQ ID Nos: 3, 6, and 9, preferably SEQ ID NO: 3; LCDR1' is amino acid sequence selected from any one of SEQ ID Nos: 12, 15, and 18, preferably SEQ ID NO: 12; LCDR2' is amino acid sequence selected from any one of SEQ ID Nos: 13, 16, and 19, preferably SEQ ID NO: 13; and LCDR3' having the amino acid sequence selected from any one of SEQ ID Nos: 14, 17, and 20, preferably SEQ ID NO: 14; or (ii) in which HCDR1' is amino acid sequence selected from any one of SEQ ID Nos: 39, 42, and 45, preferably SEQ ID NO: 39; HCDR2' is amino acid sequence selected from any one of SEQ ID Nos: 40, 43, and 46, preferably SEQ ID NO: 40; HCDR3' is amino acid sequence selected from any one of SEQ ID Nos: 41, 44, and 47, preferably SEQ ID NO: 41; LCDR1' is amino acid sequence selected from any one of SEQ ID Nos: 50, 53, and 56, preferably SEQ ID NO: 50; LCDR2' is amino acid sequence selected from any one of SEQ ID Nos: 51, 54, and 57, preferably SEQ ID NO: 51; and LCDR3' having the amino acid sequence selected from any one of SEQ ID Nos: 52, 55, and 58, preferably SEQ ID NO: 52.

The term "IL-17A" or "IL17A" refers in particular to human IL-17A with UniProt ID number Q16552 reproduced herein as SEQ ID NO: 33. The term "cynomolgus IL-17A" or "cynomolgus monkey IL-17A" refers to *Macaca fascicularis* IL-17A with UniProt ID number G1QUS7.

The term "IL-17B" refers in particular to human IL-17B with UniProt ID number Q9UHF5 reproduced herein as SEQ ID NO: 34. The term "IL-17C" refers in particular to human IL-17C with UniProt ID number Q9P0M4 reproduced herein as SEQ ID NO: 35. The term "IL-17D" refers in particular to human IL-17D with UniProt ID number Q8TAD2 reproduced herein as SEQ ID NO: 36. The term "IL-17E" refers in particular to human IL-17E with UniProt ID number Q9H293 reproduced herein as SEQ ID NO: 37. The term "IL-17F" refers in particular to human IL-17F with UniProt ID number Q96PD4 reproduced herein as SEQ ID NO: 38.

The term "epitope" refers to a localized region of an antigen to which an antibody can specifically bind. An epitope can be, for example, contiguous amino acids of a polypeptide, or an epitope can, for example, come together from two or more non-contiguous regions of a polypeptide or polypeptides.

The term "antibody" and the like, as used herein, includes: whole antibodies; any antigen-binding fragments (i.e., "antigen-binding portions") or single chains of whole antibodies; and molecules comprising antibody CDRs, VH regions or VL regions (including without limitation multispecific antibodies). A naturally occurring "whole antibody" is a glycoprotein comprising at least two heavy (H) chains and two light (L) chains inter-connected by disulfide bonds. Each heavy chain is comprised of a heavy chain variable region (abbreviated herein as VH) and a heavy chain constant region. The heavy chain constant region is comprised of three domains, CH1, CH2 and CH3. Each light chain is comprised of a light chain variable region (abbreviated herein as VL) and a light chain constant region. The light chain constant region is comprised of one domain, CL. The VH and VL regions can be further subdivided into regions of hypervariability, termed complementarity determining regions (CDR), interspersed with regions that are more conserved, termed framework regions (FR). Each VH and VL is composed of three CDRs and four FRs arranged from amino terminus to carboxy terminus in the following order: FR1, CDR1, FR2, CDR2, FR3, CDR3, FR4. The variable regions of the heavy and light chains contain a binding domain that interacts with an antigen. The constant regions of the antibodies may mediate the binding of the immunoglobulin to host tissues or factors, including various cells of the immune system (e.g., effector cells) and the first component (Clq) of the classical complement system.

The term "isotype", as used herein, refers to the antibody class (e.g., IgM, IgE, IgD, IgA, IgY, and IgG, such as IgG1 or IgG4) that is provided by the heavy chain constant region genes. Isotype also includes modifies versions of one of these classes, where modifications have been made to alter the Fc function, for example, to enhance or reduce effector functions or binding to Fc receptors. Suitably, the antibody of the disclosure is an IgG selected from the group consisting of an IgG1, an IgG2, an IgG3 and an IgG4. More suitably, the antibody of the disclosure is an IgG1 or IgG4.

The terms "antigen-binding fragment", "antigen binding portion", and the like, as used herein, refer to one or more fragments of an intact whole antibody that retain the ability to specifically bind to a given antigen (e.g., IL-17A). Examples of binding fragments encompassed within the term "antigen binding portion" of an antibody include a Fab fragment, a monovalent fragment consisting of the VL, VH, CL and CH1 domains; a F(ab)$_2$ fragment, a bivalent fragment comprising two Fab fragments linked by a disulfide bridge at the hinge region; an Fd fragment consisting of the VH and CH1 domains; an Fv fragment consisting of the VL and VH domains of a single arm of an antibody; a single domain antibody (dAb) fragment (Ward et al., 1989 Nature 341:544-546), which consists of a VH domain; an isolated complementarity determining region (CDR), dsFv, an scAb, STAB, a single domain antibody (sdAb or dAb), a single domain heavy chain antibody, and a single domain light chain antibody, a VHH, a VNAR, single domain antibodies based on the VNAR structure from shark, and binding domains based on alternative scaffolds including but limited to ankyrin-based domains, fynomers, avimers, anticalins, fibronectins, and binding sites being built into constant regions of antibodies (e.g. F-star's Modular Antibody Technology™).

The term "Complementarity Determining Regions" ("CDRs") are amino acid sequences with boundaries determined using any of a number of well-known schemes, including those described by Kabat et al. (1991), "Sequences of Proteins of Immunological Interest," 5th Ed. Public Health Service, National Institutes of Health, Bethesda, MD ("Kabat" numbering scheme), A1-Lazikani et al., (1997) JMB 273, 927-948 ("Chothia" numbering scheme), ImMunoGenTics (IMGT) numbering (Lefranc, M.-P., The Immunologist, 7, 132-136 (1999); Lefranc, M.-P. et al., Dev. Comp. Immunol., 27, 55-77 (2003) ("IMGT" numbering scheme) and numbering scheme described in Honegger & Plückthun, J. Mol. Biol. 309 (2001) 657-670 ("AHo" numbering). For example, for classic formats, under Kabat, the CDR amino acid residues in the heavy chain variable domain (VH) are numbered 31-35 (HCDR1), 50-65 (HCDR2), and 95-102 (HCDR3); and the CDR amino acid residues in the light chain variable domain (VL) are numbered 24-34 (LCDR1), 50-56 (LCDR2), and 89-97 (LCDR3). Under Chothia the CDR amino acids in the VH are numbered 26-32 (HCDR1), 52-56 (HCDR2), and 95-102 (HCDR3); and the amino acid residues in VL are numbered 24-34 (LCDR1), 50-56 (LCDR2), and 89-97 (LCDR3). By combining the CDR definitions of both Kabat and Chothia, the CDRs consist of amino acid residues 26-35 (HCDR1), 50-65 (HCDR2), and 95-102 (HCDR3) in human VH and amino acid residues 24-34 (LCDR1), 50-56 (LCDR2), and 89-97 (LCDR3) in human VL. Under IMGT the CDR amino acid residues in the VH are numbered approximately 26-35 (HCDR1), 51-57 (HCDR2) and 93-102 (HCDR3), and the CDR amino acid residues in the VL are numbered approximately 27-32 (LCDR1), 50-52 (LCDR2), and 89-97 (LCDR3) (numbering according to "Kabat"). Under IMGT, the CDRs of an antibody can be determined using the program IMGT/DomainGap Align.

In the context of the present disclosure, the numbering system suggested by Honegger & Plückthun ("AHo") is used (Honegger & Plückthun, J. Mol. Biol. 309 (2001) 657-670), unless specifically mentioned otherwise. Furthermore, the following residues are defined as CDRs according to AHo numbering scheme: LCDR1 (also referred to as CDR-L1): L24-L42; LCDR2 (also referred to as CDR-L2): L58-L72; LCDR3 (also referred to as CDR-L3): L107-L138; HCDR1 (also referred to as CDR-H1): H27-H42; HCDR2 (also referred to as CDR-H2): H57-H76; HCDR3 (also referred to as CDR-H3): H108-H138. For the sake of clarity, the numbering system according to Honegger & Plückthun takes the length diversity into account that is found in naturally occurring antibodies, both in the different VH and VL subfamilies and, in particular, in the CDRs, and provides for gaps in the sequences. Thus, in a given antibody variable domain usually not all positions 1 to 149 will be occupied by an amino acid residue.

Preferably, the "antigen-binding region" comprises at least amino acid residues 4 to 138 of the variable light (VL) chain and 5 to 138 of the variable heavy (VH) chain (in each case numbering according to Honegger & Plückthun), more preferably amino acid residues 3 to 144 of VL and 4 to 144 of VH, and particularly preferred are the complete VL and VH chains (amino acid positions 1 to 149 of VL and 1 to 149 of VH). Antigen-binding portions can also be incorporated into single domain antibodies, maxibodies, minibodies, intrabodies, diabodies, triabodies, tetrabodies, v-NAR and bis-scFv (see, e.g., Holliger and Hudson, 2005, Nature Biotechnology, 23, 9, 1 Hel 136). Antigen binding portions of antibodies can be grafted into scaffolds based on polypeptides such as Fibronectin type III (Fn3) (see U.S. Pat. No. 6,703,199, which describes fibronectin polypeptide monobodies). Antigen binding portions can be incorporated into single chain molecules comprising a pair of tandem Fv segments (VH-CH1-VH-CH1) which, together with complementary light chain polypeptides, form a pair of antigen binding regions (Zapata et al., 1995 Protein Eng. 8 (10): 1057-1062; and U.S. Pat. No. 5,641,870).

The terms "domain" or "domain specifically binding X" or "binding domain", "antigen-binding fragment thereof", "antigen binding portion" of an antibody, and the like, as used herein, refer to one or more fragments of an intact whole antibody that retain the ability to specifically bind to a given antigen (e.g., IL-17A, TNFα, HSA). Antigen binding functions of an antibody can be performed by fragments of an intact antibody. In some embodiments, a binding domain of a multispecific antibody of the present disclosure is selected from the group consisting of a Fab fragment, a monovalent fragment consisting of the VL, VH, CL and CH1 domains; a F(ab)$_2$ fragment, a bivalent fragment comprising two Fab fragments linked by a disulfide bridge at the hinge region; an Fd fragment consisting of the VH and CH1 domains; an Fv fragment consisting of the VL and VH domains of a single arm of an antibody; a single domain antibody (dAb) fragment (Ward et al., 1989 Nature 341: 544-546), which consists of a VH domain; an isolated complementarity determining region (CDR), dsFv, an scAb, STAB, a single domain antibody (sdAb or dAb), a single domain heavy chain antibody, and a single domain light chain antibody, a VHH, a VNAR, single domain antibodies based on the VNAR structure from shark, and binding domains based on alternative scaffolds including but limited to ankyrin-based domains, fynomers, avimers, anticalins, fibronectins, and binding sites being built into constant regions of antibodies (e.g. F-star's Modular Antibody Technology™). Suitably, a binding domain of the present disclosure is an Fv fragment (Fv). Suitably, a binding domain of the present disclosure is a single-chain Fv fragment (scFv). Suitably, a binding domain of the present disclosure is a Fab fragment.

Preferably, the "domain" or "domain specifically binding X" or "binding domain", "antigen-binding fragment thereof", "antigen binding portion" comprises at least amino acid residues 4 to 138 of the variable light (VL) chain and 5 to 138 of the variable heavy (VH) chain (in each case numbering according to Honegger & Plückthun), more preferably amino acid residues 3 to 144 of VL and 4 to 144 of VH, and particularly preferred are the complete VL and VH chains (amino acid positions 1 to 149 of VL and 1 to 149 of VH). Antigen-binding portions can also be incorporated into single domain antibodies, maxibodies, minibodies, intrabodies, diabodies, triabodies, tetrabodies, v-NAR and bis-scFv (see, e.g., Holliger and Hudson, 2005, Nature Biotechnology, 23, 9, 1 Hel 136). Antigen binding portions of antibodies can be grafted into scaffolds based on polypeptides such as Fibronectin type III (Fn3) (see U.S. Pat. No. 6,703,199, which describes fibronectin polypeptide monobodies). Antigen binding portions can be incorporated into single chain molecules comprising a pair of tandem Fv segments (VH-CH1-VH-CH1) which, together with complementary light chain polypeptides, form a pair of antigen binding regions (Zapata et al., 1995 Protein Eng. 8 (10): 1057-1062; and U.S. Pat. No. 5,641,870).

The term "binding specificity", or "specifically binding", as used herein, refers to the ability of an individual antibody or antibody domain to react with one antigenic determinant and not with a different antigenic determinant. As used herein, the term "specifically binds to" or is "specific for" refers to measurable and reproducible interactions such as binding between a target and an antibody, or an antibody domain, which is determinative of the presence of the target in the presence of a heterogeneous population of molecules including biological molecules. For example, an antibody or an antibody domain that specifically binds to a target (which can be an epitope) is an antibody or an antibody domain that binds this target with greater affinity, avidity, more readily, and/or with greater duration than it binds to other targets. In its most general form (and when no defined reference is mentioned), "specific binding" is referring to the ability of the antibody or an antibody domain to discriminate between the target of interest and an unrelated molecule, as determined, for example, in accordance with a specificity assay methods known in the art. Such methods comprise, but are not limited to Western blots, ELISA, RIA, ECL, IRMA, SPR (Surface plasmon resonance) tests and peptide scans. For example, a standard ELISA assay can be carried out. The scoring may be carried out by standard colour development (e.g. secondary antibody with horseradish peroxide and tetramethyl benzidine with hydrogen peroxide). The reaction in certain wells is scored by the optical density, for example, at 450 nm. Typical background (=negative reaction) may be about 0.1 OD; typical positive reaction may be about 1 OD. This means the ratio between a positive and a negative score can be 10-fold or higher. In a further example, an SPR assay can be carried out, wherein at least 10-fold, preferably at least 100-fold difference between a background and signal indicates on specific binding. Typically, determination of binding specificity is performed by using not a single reference molecule, but a set of about three to five unrelated molecules, such as milk powder, transferrin or the like. Particular antibodies or antibody domains of the disclosure have a binding specificity for human IL-17A or for human TNFα.

The multispecific antibody of the disclosure comprises a first domain specifically binding IL-17A and a second domain specifically binding TNFα, and thus has a binding specificity to IL-17A and TNFα, in particular has a binding specificity for human IL-17A and human TNFα. In one embodiment, the antibody of the disclosure has a binding specificity for human IL-17A and *Macaca fascicularis* (also known as Cynomolgus monkey or "Cynomolgus") IL-17A. In one embodiment, the antibody of the disclosure has a binding specificity for human TNFα and *Macaca fascicularis* (also known as Cynomolgus monkey or "Cynomolgus") TNFα.

In another aspect, the disclosure relates to an antibody or an antibody domain that has a binding specificity for human IL-17A and *Macaca fascicularis* (also known as Cynomolgus monkey or "Cynomolgus") IL-17A.

Suitably, the anti-IL-17A antibody of the disclosure is an isolated antibody.

Suitably, the anti-IL-17A antibody of the disclosure is a monoclonal antibody.

Anti-IL-17A antibodies of the disclosure include, but are not limited to, chimeric, and humanized antibodies.

Suitably, the anti-IL-17A antibody of the disclosure is humanized. Suitably, the anti-IL-17A antibody of the disclosure is humanized and comprises rabbit-derived CDRs.

Antibodies of the disclosure include, but are not limited to, the humanized monoclonal antibodies isolated as described herein, including in the Examples. Examples of such anti-human IL-17A antibodies are antibodies whose sequences are listed in TABLE 1. Additional details regarding the generation and characterization of the antibodies described herein are provided in the Examples.

The isolated antibody of the disclosure having a binding specificity for human IL-17A comprises a heavy chain variable region (VH) and a light chain variable region (VL), wherein: (a) said VH comprises, in sequence, the three complementary determining regions HCDR1, HCDR2 and HCDR3, and (b) said VL comprises, in sequence, the three complementary determining regions LCDR1, LCDR2 and LCDR3.

The present disclosure provides antibodies that specifically bind to IL-17A protein, said antibodies comprising a VH CDR having an amino acid sequence of any one of the VH CDRs listed in TABLE 1. In particular, the disclosure provides antibodies that specifically bind to IL-17A protein, said antibodies comprising one, two, three, or more VH CDRs having an amino acid sequence of any of the VH CDRs listed in TABLE 1.

The present disclosure provides an antibody having a binding specificity for human IL-17A, which comprises a heavy chain variable region (VH), wherein said VH comprises, in sequence, (i) the three complementary determining regions HCDR1, HCDR2 and HCDR3, said HCDR1 having the amino acid sequence selected from any one of SEQ ID Nos: 1, 4, and 7, said HCDR2 having the amino acid sequence selected from any one of SEQ ID Nos: 2, 5, and 8, said HCDR3 having the amino acid sequence selected from any one of SEQ ID Nos: 3, 6, and 9. In particular, the disclosure provides antibodies that have a binding specificity for human IL-17A and comprises HCDR1, HCDR2, and HCDR3 sequences of SEQ ID NOs: 1, 2, and 3, respectively; or (ii) the three complementary determining regions HCDR1, HCDR2 and HCDR3, said HCDR1 having the amino acid sequence selected from any one of SEQ ID Nos: 39, 42, and 45, said HCDR2 having the amino acid sequence selected from any one of SEQ ID Nos: 40, 43, and 46, said HCDR3 having the amino acid sequence selected from any one of SEQ ID Nos: 41, 44, and 47. In particular, the disclosure provides antibodies that have a binding specificity for human IL-17A and comprises HCDR1, HCDR2, and HCDR3 sequences of SEQ ID NOs: 39, 40, and 41, respectively.

The present disclosure also provides antibodies that specifically bind to IL-17A protein, said antibodies comprising a VL CDR having an amino acid sequence of any one of the VL CDRs listed in TABLE 1. In particular, the disclosure provides antibodies that specifically bind to IL-17A protein, said antibodies comprising one, two, three or more VL CDRs having an amino acid sequence of any of the VL CDRs listed in TABLE 1.

The present disclosure provides an antibody having a binding specificity for human IL-17A, which comprises a light chain variable region (VL), wherein said VL comprises, in sequence, (i) the three complementary determining regions LCDR1, LCDR2 and LCDR3, said LCDR1 having the amino acid sequence selected from any one of SEQ ID Nos: 12, 15, and 18, said LCDR2 having the amino acid sequence selected from any one of SEQ ID Nos: 13, 16, and 19, said LCDR3 having the amino acid sequence selected from any one of SEQ ID Nos: 14, 17, and 20. In particular, the disclosure provides antibodies that have a binding specificity for human IL-17A and comprises LCDR1, LCDR2, and LCDR3 sequences of SEQ ID NOs: 12, 13, and 14, respectively; or (ii) the three complementary determining regions LCDR1, LCDR2 and LCDR3, said LCDR1 having the amino acid sequence selected from any one of SEQ ID Nos: 50, 53, and 56, said LCDR2 having the amino acid sequence selected from any one of SEQ ID Nos: 51, 54, and 57, said LCDR3 having the amino acid sequence selected from any one of SEQ ID Nos: 52, 55, and 58. In particular, the disclosure provides antibodies that have a binding specificity for human IL-17A and comprises LCDR1, LCDR2, and LCDR3 sequences of SEQ ID NOs: 50, 51, and 52, respectively.

Suitably, the present disclosure provides an antibody having a binding specificity for human IL-17A, which comprises a heavy chain variable region (VH) and a light chain variable region (VL),
(i) wherein
(a) said VH comprises, in sequence, the three complementary determining regions HCDR1, HCDR2 and HCDR3, said HCDR1 having the amino acid sequence selected from any one of SEQ ID Nos: 1, 4, and 7, said HCDR2 having the amino acid sequence selected from any one of SEQ ID Nos: 2, 5, and 8, said HCDR3 having the amino acid sequence selected from any one of SEQ ID Nos: 3, 6, and 9; and
(b) said VL comprises, in sequence, the three complementary determining regions LCDR1, LCDR2 and LCDR3, said LCDR1 having the amino acid sequence selected from any one of SEQ ID Nos: 12, 15, and 18, said LCDR2 having the amino acid sequence selected from any one of SEQ ID Nos: 13, 16, and 19, said LCDR3 having the amino acid sequence selected from any one of SEQ ID Nos: 14, 17, and 20; or
(ii) wherein
(a) said VH comprises, in sequence, the three complementary determining regions HCDR1, HCDR2 and HCDR3, said HCDR1 having the amino acid sequence selected from any one of SEQ ID Nos: 39, 42, and 45, said HCDR2 having the amino acid sequence selected from any one of SEQ ID Nos: 40, 43, and 46, said HCDR3 having the amino acid sequence selected from any one of SEQ ID Nos: 41, 44, and 47; and
(b) said VL comprises, in sequence, the three complementary determining regions LCDR1, LCDR2 and LCDR3, said LCDR1 having the amino acid sequence selected from any one of SEQ ID Nos: 50, 53, and 56, said LCDR2 having the amino acid sequence selected from any one of SEQ ID Nos: 51, 54, and 57, said LCDR3 having the amino acid sequence selected from any one of SEQ ID Nos: 52, 55, and 58.

In particular, the disclosure provides antibodies that have a binding specificity for human IL-17A and comprises (i) (a) HCDR1, HCDR2, and HCDR3 sequences of SEQ ID NOs: 1, 2, and 3, respectively, and (b) LCDR1, LCDR2, and LCDR3 sequences of SEQ ID NOs: 12, 13, and 14, respectively; or (ii) (a) HCDR1, HCDR2, and HCDR3 sequences of SEQ ID NOs: 39, 40, and 41, respectively, and (b) LCDR1, LCDR2, and LCDR3 sequences of SEQ ID NOs: 50, 51, and 52, respectively.

Other antibodies of the disclosure include amino acids that have been mutated, yet have at least 60, 70, 80, 90, 91, 92, 93, 94, 95, 96, 97, 98 or 99 percent identity in the CDR regions with the CDR regions depicted in the sequences described in TABLE 1. Suitably, other antibodies of the disclosure includes mutant amino acid sequences wherein no more than 1, 2, 3, 4, 5 or 10 amino acids have been mutated by amino acid deletion, insertion or substitution in the CDR regions when compared with the CDR regions depicted in the sequences described in TABLE 1. Mutations, e.g., substitutions, may potentially be made at any residue within the set of CDRs, and may be within CDR1, CDR2 and/or CDR3.

Suitably, an antibody of the disclosure comprising a mutated amino acid sequence is capable of inhibiting the activity of 1 ng human IL-17A at a concentration of 50 ng/ml, preferably 20 ng/ml, preferably 10 ng/ml, preferably 5 ng/ml more preferably 1 ng/ml, more preferably 0.5 ng/ml, even more preferably 0.2 ng/ml or less of said antibody by 50%, said inhibitory activity is determined by measuring GRO-α secretion induced by human IL-17A in HT-29 assay in the presence of 50 pg/ml TNFα.

Suitably, the isolated antibody of the disclosure having a binding specificity for human IL-17A comprises: a heavy chain variable region (VH) and a light chain variable region (VL), wherein:
(i)
(a) said VH comprises, in sequence, the three complementary determining regions HCDR1, HCDR2 and HCDR3,
said HCDR1 having the amino acid sequence having at least 60, 70, 80, 90, 91, 92, 93, 94, 95, 96, 97, 98 or 99 percent identity to any one of SEQ ID NOs: 1, 4, and 7, preferably SEQ ID NO: 1;
said HCDR2 having the amino acid sequence having at least 60, 70, 80, 90, 91, 92, 93, 94, 95, 96, 97, 98 or 99 percent identity to any one of SEQ ID NOs: 2, 5, and 8, preferably SEQ ID NO: 2;
said HCDR3 having the amino acid sequence having at least 60, 70, 80, 90, 91, 92, 93, 94, 95, 96, 97, 98 or 99 percent identity to any one of SEQ ID NOs: 3, 6, and 9, preferably SEQ ID NO: 3; and/or
(b) said VL comprises, in sequence, the three complementary determining regions LCDR1, LCDR2 and LCDR3,
said LCDR1 having the amino acid sequence having at least 60, 70, 80, 90, 91, 92, 93, 94, 95, 96, 97, 98 or 99 percent identity to any one of SEQ ID NOs: 12, 15, and 18, preferably SEQ ID NO: 12;

said LCDR2 having the amino acid sequence having at least 60, 70, 80, 90, 91, 92, 93, 94, 95, 96, 97, 98 or 99 percent identity to any one of SEQ ID NOs: 13, 16, and 19, preferably SEQ ID NO: 13;
said LCDR3 having the amino acid sequence having at least 60, 70, 80, 90, 91, 92, 93, 94, 95, 96, 97, 98 or 99 percent identity to any one of SEQ ID NOs: 14, 17, and 20, preferably SEQ ID NO: 14; or (ii)
(a) said VH comprises, in sequence, the three complementary determining regions HCDR1, HCDR2 and HCDR3,
said HCDR1 having the amino acid sequence having at least 60, 70, 80, 90, 91, 92, 93, 94, 95, 96, 97, 98 or 99 percent identity to any one of SEQ ID NOs: 39, 42, and 45, preferably SEQ ID NO: 39;
said HCDR2 having the amino acid sequence having at least 60, 70, 80, 90, 91, 92, 93, 94, 95, 96, 97, 98 or 99 percent identity to any one of SEQ ID NOs: 40, 43, and 46, preferably SEQ ID NO: 40;
said HCDR3 having the amino acid sequence having at least 60, 70, 80, 90, 91, 92, 93, 94, 95, 96, 97, 98 or 99 percent identity to any one of SEQ ID NOs: 41, 44, and 47, preferably SEQ ID NO: 41; and/or
(b) said VL comprises, in sequence, the three complementary determining regions LCDR1, LCDR2 and LCDR3,
said LCDR1 having the amino acid sequence having at least 60, 70, 80, 90, 91, 92, 93, 94, 95, 96, 97, 98 or 99 percent identity to any one of SEQ ID NOs: 50, 53, and 56, preferably SEQ ID NO: 50;
said LCDR2 having the amino acid sequence having at least 60, 70, 80, 90, 91, 92, 93, 94, 95, 96, 97, 98 or 99 percent identity to any one of SEQ ID NOs: 51, 54, and 57, preferably SEQ ID NO: 51;
said LCDR3 having the amino acid sequence having at least 60, 70, 80, 90, 91, 92, 93, 94, 95, 96, 97, 98 or 99 percent identity to any one of SEQ ID NOs: 52, 55, and 58, preferably SEQ ID NO: 52.

Suitably, the isolated antibody of the disclosure having a binding specificity for human IL-17A comprises: (i) HCDR1, HCDR2, and HCDR3 having at least 60, 70, 80, 90, 91, 92, 93, 94, 95, 96, 97, 98 or 99 percent identity to sequences of SEQ ID NOs: 1, 2, and 3, respectively, and/or LCDR1, LCDR2, and LCDR3 having at least 60, 70, 80, 90, 91, 92, 93, 94, 95, 96, 97, 98 or 99 percent identity to sequences of SEQ ID NOs: 12, 13, and 14, respectively; or (ii) HCDR1, HCDR2, and HCDR3 having at least 60, 70, 80, 90, 91, 92, 93, 94, 95, 96, 97, 98 or 99 percent identity to sequences of SEQ ID NOs: 39, 40, and 41, respectively, and/or LCDR1, LCDR2, and LCDR3 having at least 60, 70, 80, 90, 91, 92, 93, 94, 95, 96, 97, 98 or 99 percent identity to sequences of SEQ ID NOs: 50, 51, and 52, respectively.

In a further embodiment, the disclosure provides an antibody that specifically binds human IL-17A, wherein said antibody comprises a VH domain and a VL domain.

Suitably, the present disclosure provides an antibody that specifically binds human IL-17A, wherein said antibody comprises a VH1A, VH1B, VH3 or VH4. In one embodiment, an isolated antibody of the present disclosure comprises VH4 domain. In a preferred embodiment, an isolated antibody of the present disclosure comprises VH3 domain.

Suitably, the present disclosure provides an isolated antibody that specifically binds human IL-17A, wherein said antibody comprises Vκ frameworks FR1, FR2 and FR3, particularly Vκ1 or Vκ3 FR1 to FR3, preferably Vκ1 frameworks FR1 to FR3, and a framework FR4, which is selected from a Vκ FR4, particularly Vκ1 FR4, Vκ3 FR4, and a Vλ FR4. Suitable Vλ FR4 are as set forth in SEQ ID NO: 26 to SEQ ID NO: 32. In one embodiment the present disclosure provides an isolated antibody that specifically binds human IL-17A, wherein said antibody comprises Vλ FR4 comprising the amino acid sequence having at least 60, 70, 80, 90 percent identity to an amino acid sequence selected from any of SEQ ID NO: 26 to SEQ ID NO: 32, preferably to SEQ ID NO: 26 or SEQ ID NO:27, more preferably to SEQ ID NO: 27. Suitably, the present disclosure provides an isolated antibody that specifically binds human IL-17A, wherein said antibody comprises Vλ FR4 comprising the amino acid sequence selected from any of SEQ ID NO: 26 to SEQ ID NO: 32, preferably Vλ FR4 as set forth in SEQ ID NO: 26 or SEQ ID NO:27, more preferably Vλ FR4 as set forth in SEQ ID NO: 27.

Thus, in one embodiment, the disclosure provides an antibody comprising:
(i)(a) the HCDR1, HCDR2, and HCDR3 sequences of SEQ ID NOs: 1, 2, and 3, respectively, and the LCDR1, LCDR2, and LCDR3 sequences of SEQ ID NOs: 12, 13, and 14, respectively; or (i)(b) the HCDR1, HCDR2, and HCDR3 sequences of SEQ ID NOs: 39, 40, and 41, respectively, and the LCDR1, LCDR2, and LCDR3 sequences of SEQ ID NOs: 50, 51, and 52, respectively;
(ii) a VH3 or VH4 domain, preferably VH3 domain; and
(iii) a VL domain comprising a VL framework comprising Vκ frameworks FR1, FR2 and FR3, particularly Vκ1 or Vκ3 FR1 to FR3, preferably Vκ1 FR1 to FR3, and a framework FR4, which is selected from a Vκ FR4, particularly Vκ1 FR4, Vκ3 FR4, and a Vλ FR4, particularly Vλ FR4 comprising the amino acid sequence having at least 60, 70, 80, 90 percent identity to an amino acid sequence selected from any of SEQ ID NO: 26 to SEQ ID NO: 32, preferably Vλ FR4 as set forth in amino acid sequence selected from any one of SEQ ID NO: 26 to SEQ ID NO: 32, more preferably Vλ FR4 as set forth in SEQ ID NO: 27.

Suitably, the present disclosure provides an isolated antibody that specifically binds human IL-17A, wherein said antibody comprises a VH domain listed in TABLE 1.

Suitably, the present disclosure also provides an isolated antibody that specifically binds human IL-17A, wherein said antibody comprises a VH amino acid sequence listed in TABLE 1, wherein no more than about 10 amino acids in a framework sequence (for example, a sequence which is not a CDR) have been mutated (wherein a mutation is, as various non-limiting examples, an addition, substitution or deletion).

Suitably, the present disclosure also provides an isolated antibody that specifically binds human IL-17A, wherein said antibody comprises a VH amino acid sequence listed in TABLE 1, wherein no more than about 20 amino acids in a framework sequence (for example, a sequence which is not a CDR) have been mutated (wherein a mutation is, as various non-limiting examples, an addition, substitution or deletion).

Other antibodies of the disclosure include amino acids that have been mutated, yet have at least 60, 70, 80, 90, 91, 92, 93, 94, 95, 96, 97, 98 or 99 percent identity in the VH regions with the VH regions depicted in the sequences described in TABLE 1.

Suitably, the present disclosure provides an isolated antibody that specifically binds human IL-17A, wherein said antibody comprises a VL domain listed in TABLE 1.

Suitably, the present disclosure also provides an isolated antibody that specifically binds human IL-17A, wherein said antibody comprises a VL amino acid sequence listed in TABLE 1, wherein no more than about 10 amino acids in a framework sequence (for example, a sequence which is not a CDR) have been mutated (wherein a mutation is, as various non-limiting examples, an addition, substitution or deletion).

Suitably, the present disclosure also provides an isolated antibody that specifically binds human IL-17A, wherein said antibody comprises a VL amino acid sequence listed in TABLE 1, wherein no more than about 20 amino acids in a framework sequence (for example, a sequence which is not a CDR) have been mutated (wherein a mutation is, as various non-limiting examples, an addition, substitution or deletion).

Other antibodies of the disclosure include amino acids that have been mutated, yet have at least 60, 70, 80, 90, 91, 92, 93, 94, 95, 96, 97, 98 or 99 percent identity in the VL regions with the VL regions depicted in the sequences described in TABLE 1.

In one embodiment, the disclosure provides an isolated antibody that specifically binds human IL-17A wherein said antibody comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 10 or SEQ ID NO: 11, preferably SEQ ID NO: 10, and in particular wherein said antibody comprises HCDR1, HCDR2, and HCDR3 sequences of SEQ ID NOs: 1, 2, and 3, respectively. In a further embodiment, the disclosure provides an isolated antibody that specifically binds human IL-17A wherein said antibody comprises a heavy chain variable region comprising an amino acid sequence that is at least 90 percent identical to the amino acid sequence SEQ ID NO: 11 and wherein said heavy chain variable region comprises Q14K, G16E, and G56A (AHo numbering).

In another embodiment, the disclosure provides an isolated antibody that specifically binds human IL-17A wherein said antibody comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 48 or SEQ ID NO: 49, preferably SEQ ID NO: 48, and in particular wherein said antibody comprises HCDR1, HCDR2, and HCDR3 sequences of SEQ ID NOs: 39, 40, and 41, respectively. In a further embodiment, the disclosure provides an isolated antibody that specifically binds human IL-17A wherein said antibody comprises a heavy chain variable region comprising an amino acid sequence that is at least 90 percent identical to the amino acid sequence SEQ ID NO: 49 and wherein said heavy chain variable region comprises R20T and Q141P (AHo numbering).

In another embodiment, the disclosure provides an isolated antibody that specifically binds human IL-17A wherein said antibody (i) comprises a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 21 or SEQ ID NO: 22, preferably SEQ ID NO: 21, and in particular wherein said antibody comprises LCDR1, LCDR2, and LCDR3 sequences of SEQ ID NOs: 12, 13, and 14, respectively; or (ii) comprises a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 59 or SEQ ID NO: 60, preferably SEQ ID NO: 59, and in particular wherein said antibody comprises LCDR1, LCDR2, and LCDR3 sequences of SEQ ID NOs: 50, 51, and 52, respectively.

In a further embodiment, the disclosure provides an isolated antibody that specifically binds human IL-17A wherein said antibody comprises a light chain variable region comprising an amino acid sequence that is at least 90 percent identical to the amino acid sequence SEQ ID NO: 22 and wherein said light chain variable region comprises A51P (AHo numbering).

In a further embodiment, the disclosure provides an antibody that specifically binds human IL-17A wherein (i) said antibody comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 10; and a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 21; or (ii) said antibody comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 48; and a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 59.

Thus, the present disclosure provides an isolated antibody that specifically binds human IL-17A, wherein (i) said antibody comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 10; and a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 21, and wherein the antibody comprises HCDR1, HCDR2, and HCDR3 sequences of SEQ ID NOs: 1, 2, and 3, respectively, and/or LCDR1, LCDR2, and LCDR3 sequences of SEQ ID NOs: 12, 13, and 14, respectively; particularly, wherein the antibody comprises HCDR1, HCDR2, and HCDR3 sequences of SEQ ID NOs: 1, 2, and 3, respectively, and LCDR1, LCDR2, and LCDR3 sequences of SEQ ID NOs: 12, 13, and 14, respectively; or (ii) said antibody comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 48; and a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 59, and wherein the antibody comprises HCDR1, HCDR2, and HCDR3 sequences of SEQ ID NOs: 39, 40, and 41, respectively, and/or LCDR1, LCDR2, and LCDR3 sequences of SEQ ID NOs: 50, 51, and 52, respectively; particularly, wherein the antibody comprises HCDR1, HCDR2, and HCDR3 sequences of SEQ ID NOs: 39, 40, and 41, respectively, and LCDR1, LCDR2, and LCDR3 sequences of SEQ ID NOs: 39, 40, and 41, respectively.

In a further embodiment, the disclosure provides an isolated antibody that specifically binds human IL-17A wherein said antibody comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 49; and a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 60, particularly wherein said heavy chain variable region comprises R20T and Q141P (AHo numbering).

Thus, the present disclosure provides an isolated antibody that specifically binds human IL-17A, wherein said antibody comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 49; and a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 60, particularly wherein said heavy chain variable region comprises R20T and Q141P (AHo numbering), and wherein the antibody comprises HCDR1, HCDR2, and HCDR3 sequences of SEQ ID NOs: 39, 40, and 41, respectively, and/or LCDR1, LCDR2, and LCDR3 sequences of SEQ ID NOs: 50, 51, and 52, respectively; particularly, wherein the antibody comprises HCDR1, HCDR2, and HCDR3 sequences of SEQ ID NOs: 39, 40, and 41, respectively, and LCDR1, LCDR2, and LCDR3 sequences of SEQ ID NOs: 50, 51, and 52, respectively.

In a specific embodiment, the disclosure provides an isolated antibody that specifically binds human IL-17A and comprises (i) a VH comprising an amino acid sequence selected from the group consisting of SEQ ID NOs: 10 and 11; and/or a VL thereof comprising an amino acid sequence selected from the group consisting of SEQ ID NOs: 21 and 22; or (ii) a VH comprising an amino acid sequence selected from the group consisting of SEQ ID NOs: 48 and 49; and/or a VL thereof comprising an amino acid sequence selected from the group consisting of SEQ ID NOs: 59 and 60. In particular embodiment, the antibody of the present disclosure comprises (i) a VH sequence of SEQ ID NO: 10 and a VL sequence of SEQ ID NO: 21; or (ii) a VH sequence of SEQ ID NO: 48 and a VL sequence of SEQ ID NO: 59. In yet another particular embodiment, the antibody of the present disclosure comprises (i) a VH sequence of SEQ ID NO: 11 and a VL sequence of SEQ ID NO: 22; or (ii) a VH sequence of SEQ ID NO: 49 and a VL sequence of SEQ ID NO: 60.

In one embodiment, an antibody that specifically binds to human IL-17A is an antibody that is described in TABLE 1. In one embodiment, an antibody that specifically binds to human IL-17A comprises an amino acid sequence that is at least 60, 70, 80, 90, 91, 92, 93, 94, 95, 96, 97, 98 or 99 percent, preferably at least 90 percent, identical to the amino acid sequence selected from the group consisting of (i) SEQ ID NOs: 24 and 25, preferably SEQ ID NO: 24; or (ii) SEQ ID NOs: 61 and 62, preferably SEQ ID NO: 61. In one embodiment, an antibody that specifically binds to human IL-17A is as set forth in (i) SEQ ID NO: 24 or SEQ ID NO: 25, preferably SEQ ID NO: 24; or (ii) SEQ ID NO: 61 or SEQ ID NO: 62, preferably SEQ ID NO: 61.

Other antibodies of the disclosure having a binding specificity for human IL-17A include those wherein the amino acids or nucleic acids encoding the amino acids have been mutated, yet have at least 60, 70, 80, 90 or 95 percent identity to the sequences described in TABLE 1. In one embodiment, it includes mutant amino acid sequences wherein no more than 1, 2, 3, 4 or 5 amino acids have been mutated in the variable regions when compared with the variable regions depicted in the sequence described in TABLE 1, while retaining substantially the same activity. The term "substantially the same activity" as used herein refers to the activity as indicated by substantially the same activity being at least 50%, at least 60%, at least 70%, at least 80%, at least 90%, at least 95%, at least 98% or even at least 100% or at least 110%, or at least 120%, or at least 130%, or at least 140%, or at least 150%, or at least 160%, or at least 170%, or at least 180%, or at least 190%, e.g. up to 200% of the activity as determined for the parent antibody, e.g., the antibody of the disclosure, in particular the antibody of the disclosure described in TABLE 1.

In yet another embodiment, the present disclosure provides an antibody comprising amino acid sequences that are homologous to the sequences described in TABLE 1, and said antibody binds to human IL-17A, and retains the desired functional properties of those antibodies described in TABLE 1.

In one embodiment, an antibody of the disclosure has a heavy chain variable region comprising CDR1, CDR2, and CDR3 sequences and a light chain variable region comprising CDR1, CDR2, and CDR3 sequences, wherein one or more of these CDR sequences have specified amino acid sequences based on the antibodies described herein or conservative modifications thereof, and wherein the antibodies retain the desired functional properties of the antibodies of the disclosure.

Accordingly, the disclosure provides a monoclonal antibody comprising:

(i)
- a heavy chain variable region (VH) comprising, in sequence, the three complementary determining regions HCDR1, HCDR2 and HCDR3, wherein said HCDR1 is amino acid sequence SEQ ID No: 1, or a conservative variant thereof; said HCDR2 is amino acid sequence SEQ ID No: 2, or a conservative variant thereof; said HCDR3 is amino acid sequence selected from any one of SEQ ID No: 3, or a conservative variant thereof; and
- a light chain variable region (VL) comprising, in sequence, the three complementary determining regions LCDR1, LCDR2 and LCDR3, wherein said LCDR1 is amino acid sequence SEQ ID No: 12, or a conservative variant thereof; said LCDR2 is amino acid sequence SEQ ID No: 13, or a conservative variant thereof; said LCDR3 having the amino acid sequence SEQ ID No: 14, or a conservative variant thereof; or (ii)
- a heavy chain variable region (VH) comprising, in sequence, the three complementary determining regions HCDR1, HCDR2 and HCDR3, wherein said HCDR1 is amino acid sequence SEQ ID No: 39, or a conservative variant thereof; said HCDR2 is amino acid sequence SEQ ID No: 40, or a conservative variant thereof; said HCDR3 is amino acid sequence selected from any one of SEQ ID No: 41, or a conservative variant thereof; and
- a light chain variable region (VL) comprising, in sequence, the three complementary determining regions LCDR1, LCDR2 and LCDR3, wherein said LCDR1 is amino acid sequence SEQ ID No: 50, or a conservative variant thereof; said LCDR2 is amino acid sequence SEQ ID No: 51, or a conservative variant thereof; said LCDR3 having the amino acid sequence SEQ ID No: 52, or a conservative variant thereof, wherein the antibody specifically binds to human IL-17A and/or neutralize IL-17A.

In one embodiment, an antibody of the disclosure is optimized for expression in a mammalian cell has a heavy chain variable region and a light chain variable region, wherein one or more of these sequences have specified amino acid sequences based on the antibodies described herein or conservative modifications thereof, and wherein the antibodies retain the desired functional properties of the antibodies of the disclosure. Accordingly, the disclosure provides a monoclonal antibody optimized for expression in a mammalian cell comprising a heavy chain variable region and a light chain variable region wherein: the heavy chain variable region comprises an amino acid sequence selected from (i) any of SEQ ID NOs: 10 and 11, and conservative modifications thereof; or (ii) any of SEQ ID NOs: 48 and 49, and conservative modifications thereof; and the light chain variable region comprises an amino acid sequence selected from (i) any of SEQ ID NOs: 21 and 22, and conservative modifications thereof; or (ii) any of SEQ ID NOs: 59 and 60, and conservative modifications thereof; wherein the antibody specifically binds to human IL-17A and/or neutralize IL-17A.

In one embodiment, an antibody of the disclosure is optimized for expression in a mammalian cell has a full length heavy chain sequence and a full length light chain sequence, wherein one or more of these sequences have specified amino acid sequences based on the antibodies described herein or conservative modifications thereof, and wherein the antibodies retain the desired functional properties of the antibodies of the disclosure.

As used herein, the term, "optimized" means that a nucleotide sequence has been altered to encode an amino acid sequence using codons that are preferred in the production cell or organism, generally a eukaryotic cell, for example, a cell of *Pichia*, a Chinese Hamster Ovary cell (CHO) or a human cell. The optimized nucleotide sequence is engineered to retain completely or as much as possible the amino acid sequence originally encoded by the starting nucleotide sequence, which is also known as the "parental" sequence. The optimized sequences herein have been engineered to have codons that are preferred in mammalian cells. However, optimized expression of these sequences in other eukaryotic cells or prokaryotic cells is also envisioned herein. The amino acid sequences encoded by optimized nucleotide sequences are also referred to as optimized.

Another type of variable region modification is to mutate amino acid residues within the VH and/or VL CDR1, CDR2 and/or CDR3 regions to thereby improve one or more binding properties (e.g., affinity) of the antibody of interest, known as "affinity maturation". Site-directed mutagenesis or PCR-mediated mutagenesis can be performed to introduce the mutation(s) and the effect on antibody binding, or other functional property of interest, can be evaluated in in vitro or in vivo assays as described herein and provided in the Examples. Conservative modifications (as discussed above) can be introduced. The mutations may be amino acid substitutions, additions or deletions. Moreover, typically no more than one, two, three, four or five residues within a CDR region are altered.

An "affinity-matured" antibody is one with one or more alterations in one or more variable domains thereof that result in an improvement in the affinity of the antibody for antigen, compared to a parent antibody that does not possess those alteration(s). In one embodiment, an affinity-matured antibody has nanomolar or even picomolar affinities for the target antigen. Affinity-matured antibodies are produced by procedures known in the art. For example, Marks et al, Bio/Technology 10:779-783 (1992) describes affinity maturation by VH- and VL-domain shuffling. Random mutagenesis of HVR and/or framework residues is described by, for example: Barbas et al. Proc Nat. Acad. Sci U.S.A. 91:3809-3813 (1994); Schier et al. Gene 169:147-155 (1995); Jackson et al, J. Immunol. 154(7):3310-9 (1995); and Hawkins et al, J. Mol. Biol. 226:889-896 (1992). Accordingly, the disclosure provides the antibody, wherein said antibody is affinity-matured.

An antibody of the disclosure further can be prepared using an antibody having one or more of the VH and/or VL sequences shown herein as starting material to engineer a modified antibody, which modified antibody may have altered properties from the starting antibody. An antibody can be engineered by modifying one or more residues within one or both variable regions (i.e., VH and/or VL), for example within one or more CDR regions and/or within one or more framework regions. Additionally or alternatively, an antibody can be engineered by modifying residues within the constant region(s), for example to alter the effector function(s) of the antibody.

One type of variable region engineering that can be performed is CDR grafting. Antibodies interact with target antigens predominantly through amino acid residues that are located in the six heavy and light chain complementarity determining regions (CDRs). For this reason, the amino acid sequences within CDRs are more diverse between individual antibodies than sequences outside of CDRs. Because CDR sequences are responsible for most antibody-antigen interactions, it is possible to express recombinant antibodies that mimic the properties of specific naturally occurring antibodies by constructing expression vectors that include CDR sequences from the specific naturally occurring antibody grafted onto framework sequences from a different antibody with different properties (see, e.g., Riechmann, L. et al., 1998 Nature 332:323-327; Jones, P. et al., 1986 Nature 321:522-525; Queen, C. et al., 1989 Proc. Natl. Acad. Sci. U.S.A. 86: 10029-10033; U.S. Pat. No. 5,225,539 to Winter, and U.S. Pat. Nos. 5,530,101; 5,585,089; 5,693,762 and 6,180,370 to Queen et al.).

Such framework sequences can be obtained from public DNA databases or published references that include germline antibody gene sequences or rearranged antibody sequences. For example, germline DNA sequences for human heavy and light chain variable region genes can be found in the "VBase" human germline sequence database (available on the Internet at www.mrc-cpe.cam.ac.uk/vbase), as well as in Kabat, E. A., et al., 1991 Sequences of Proteins of Immunological Interest, Fifth Edition, U.S. Department of Health and Human Services, NIH Publication No. 91-3242; Tomlinson, I. M., et al., 1992 J. fol. Biol. 227:776-798; and Cox, J. P. L. et al., 1994 Eur. J Immunol. 24:827-836; the contents of each of which are expressly incorporated herein by reference. For example, germline DNA sequences for human heavy and light chain variable region genes and rearranged antibody sequences can be found in "IMGT" database (available on the Internet at www.imgt.org; see Lefranc, M. P. et al., 1999 Nucleic Acids Res. 27:209-212; the contents of each of which are expressly incorporated herein by reference).

An example of framework sequences for use in the antibodies of the disclosure are those that are structurally similar to the framework sequences used by selected antibodies of the disclosure, e.g., consensus sequences and/or framework sequences used by monoclonal antibodies of the disclosure. The VH CDR1, 2 and 3 sequences, and the VL CDR1, 2 and 3 sequences, can be grafted onto framework regions that have the identical sequence as that found in the germline immunoglobulin gene from which the framework sequence derive, or the CDR sequences can be grafted onto framework regions that contain one or more mutations as compared to the germline sequences. For example, it has been found that in certain instances it is beneficial to mutate residues within the framework regions to maintain or enhance the antigen binding ability of the antibody (see e.g., U.S. Pat. Nos. 5,530,101; 5,585,089; 5,693,762 and 6,180,370 to Queen et al).

A wide variety of antibody/immunoglobulin frameworks or scaffolds can be employed so long as the resulting polypeptide includes at least one binding region which specifically binds to IL-17A. Such frameworks or scaffolds include the five main idiotypes of human immunoglobulins, antigen-binding fragments thereof, and include immunoglobulins of other animal species, preferably having humanized aspects.

In one aspect, the disclosure pertains to a method of generating non-immunoglobulin based antibodies using non-immunoglobulin scaffolds onto which CDRs of the disclosure can be grafted. Known or future non-immunoglobulin frameworks and scaffolds may be employed, as long as they comprise a binding region specific for the target IL-17A protein. Known non-immunoglobulin frameworks or scaffolds include, but are not limited to, fibronectin (Compound Therapeutics, Inc., Waltham, Mass.), ankyrin (Molecular Partners AG, Zurich, Switzerland), domain antibodies (Domantis, Ltd., Cambridge, Mass., and Ablynx nv, Zwijnaarde, Belgium), lipocalin (Pieris Proteolab AG, Freising, Germany), small modular immuno-pharmaceuticals (Trubion Pharmaceuticals Inc., Seattle, Wash.), maxybodies (Avidia, Inc., Mountain View, Calif.), Protein A (Affibody AG, Sweden), and affilin (gamma-crystallin or ubiquitin) (Scil Proteins GmbH, Halle, Germany).

The antibodies according to the disclosure have valuable properties predicted to be beneficial for human patients in need of a human IL-17A targeting therapy. The antibody according to the disclosure is characterized by one or more of the following properties (as determined in Examples 1 and 2):

the antibody specifically binds to human IL-17A and:
- (a) has a binding specificity for cynomolgus monkey IL-17A;
- (b) selectively binds to human IL-17A over human IL-17B, IL-17C, IL-17D, IL-17E and IL-17F as measured by ELISA;
- (c) inhibits or blocks binding between IL-17A and its receptor (IL-17RA);
- (d) reduces or neutralizes IL-17A activity;
- (e) capable of inhibiting GRO-α secretion when assessed in vitro in HT-29 assay;
- (f) has the ability to block interaction between IL-17A and IL-17RA with a potency relative to that of secukinumab (relative potency), determined in ELISA assay, greater than 5, particularly greater than 10, greater than 15, more particularly greater than 20, and wherein said relative potency is the ratio of the $IC_{50}$ value in ng/mL of secukinumab as measured by ELISA to the $IC_{50}$ value in ng/mL of the antibody of the invention in the scFv format as measured by ELISA;
- (g) has the ability to neutralize IL-17A with a potency relative to that of secukinumab (relative potency), determined by measuring GRO-α secretion in an HT-29 assay, greater than 50, particularly greater than 100, more particularly greater than 150, and wherein said relative potency is the ratio of the $IC_{50}$ value in ng/mL of secukinumab as measured in the HT-29 assay to the $IC_{50}$ value in ng/mL of the antibody of the invention in the scFv format as measured in the HT-29 assay;
- (h) capable of inhibiting the activity of 1 ng human IL-17A at a concentration of 1 ng/mL or less, particularly 0.5 ng/mL or less, more particularly 0.2 ng/mL or less, by 50%, said inhibitory activity is determined by measuring GRO-α secretion induced by human IL-17A in HT-29 assay in the presence of 50 pg/ml TNFα;
- (i) binds to human IL-17A with a dissociation constant ($K_D$) of less than 5 nM, in particular less than 1 nM, less than 0.5 nM, less than 0.2 nM, particularly less than 100 pM, more particularly less than 50 pM, as measured by surface plasmon resonance, preferably as measured by surface plasmon resonance in a direct setup;
- (j) binds to Cynomolgus IL-17A with a $K_D$ of less than 10 nM, e.g., less than 7 nM, less than 5 nM, less than 2 nM, less than 1 nM, particularly less than 0.5 nM as measured by surface plasmon resonance, particularly as measured by surface plasmon resonance in a capture setup;
- (k) when in scFv format, has a melting temperature (Tm), determined by differential scanning fluorimetry, of at least 60° C., particularly of at least 62° C., more particularly of at least 65° C., and even more particularly of at least 70° C., in particular wherein said antibody is in phosphate-citrate buffer at pH 6.4, 150 mM NaCl;
- (l) when in scFv format, has a loss in monomer content, after five consecutive freeze-thaw cycles, of less than 5%, particularly less than 3%, more particularly less than 1%, when the antibody of the invention is at a starting concentration of 10 mg/ml, in particular wherein said antibody is in phosphate buffered saline (PBS), pH 7.4; and/or
- (m) when in scFv format, has a loss in monomer content, after storage for at least two weeks, particularly for at least four weeks, at 4° C., of 5% or less, in particular less than 4%, less than 3%, less than 2%, particularly less than 1%, when the antibody of the disclosure is at a starting concentration of 10 mg/ml, in particular wherein said antibody is in phosphate buffered saline (PBS), pH 7.4; and/or
- (n) has a loss in monomer content, after storage for at least two weeks, particularly for at least four weeks, at 37° C., of less than 5%, when the antibody of the disclosure is at a starting concentration of 10 mg/ml.

In one embodiment, the antibody of the present disclosure selectively binds to human IL-17A over human IL-17B, IL-17C, IL-17D, IL-17E and IL-17F as measured by ELISA. As used herein, the terms "selectively binds to" shall mean that the antibody, composition, formulation, etc. does not significantly bind to IL-17B/C/D/E/F, but does bind to IL-17A. Selective binding is characterized by a high affinity (or low $K_D$) and a low to moderate $IC_{50}$ as distinguished from nonspecific binding which usually has a low affinity with a moderate to high $IC_{50}$. Typically, binding is considered selective when the antibody binds with a $K_D$ of less than $10^{-7}$ M. Suitably, the antibody of the present disclosure binds to human IL-17A with a higher affinity or with a lower $K_D$ than it binds to human IL-17B, IL-17C, IL-17D, IL-17E and IL-17F as measured by SPR. Suitably, the antibody of the present disclosure has $IC_{50}$s to IL-17B, IL-17C, IL-17D, IL-17E, and IL-17F of more than by a factor of 100 greater, particularly more than by a factor of 200 greater, more than by a factor of 300 greater, more than by a factor of 400 greater than the $IC_{50}$ to IL-17A as measured in ELISA.

The antibodies of the disclosure specifically bind to IL-17A, wherein binding to IL-17A (a) inhibits or blocks binding between IL-17A and its receptor (IL-17RA), and (b) reduces or neutralizes IL-17A activity.

As used herein, the term "neutralizing antibody" describes an antibody that is capable of neutralizing the biological signaling activity of IL-17A, for example by blocking binding of IL-17A to one or more of its receptors, in particular by blocking binding of IL-17A to IL-17RA. The antibody of the present disclosure is an IL-17A neutralizing antibody. It will be appreciated that the term "neutralizing" as used herein refers to a reduction in biological signaling activity which may be partial or complete. Neutralization of IL-17A may be determined by a variety of assays, examples of which are described elsewhere herein.

Thus, the antibody of the disclosure is capable of inhibiting GRO-α secretion when assessed in vitro in HT-29 assay (described in Examples 1 and 2). In one embodiment, the antibody of the disclosure has the ability to neutralize IL-17A with a potency relative to that of secukinumab (relative potency), determined by measuring GRO-α secretion in an HT-29 assay, greater than 50, preferably greater than 100, more preferably greater than 150, and wherein said relative potency is the ratio of the $IC_{50}$ value in ng/mL of secukinumab as measured in the HT-29 assay to the $IC_{50}$ value in ng/mL of the antibody of the disclosure in the scFv format as measured in the HT-29 assay. In a further embodiment, the antibody of the disclosure is capable of inhibiting the activity of 1 ng human IL-17A at a concentration of 1 ng/mL or less, preferably 0.5 ng/mL or less, more preferably 0.2 ng/mL or less, by 50%, said inhibitory activity is determined by measuring GRO-α secretion induced by human IL-17A in HT-29 assay in the presence of 50 pg/ml TNFα.

In one embodiment, the antibody of the disclosure has the ability to block interaction between IL-17A and IL-17RA with a potency relative to that of secukinumab (relative potency), determined in ELISA assay, greater than 5, preferably greater than 10, greater than 15, more particularly greater than 20, and wherein said relative potency is the ratio of the $IC_{50}$ value in ng/mL of secukinumab as measured by ELISA to the $IC_{50}$ value in ng/mL of the antibody of the disclosure in the scFv format as measured by ELISA.

As used herein, the term "affinity" refers to the strength of interaction between antibody and antigen at single antigenic sites. Within each antigenic site, the variable region of the antibody "arm" interacts through weak non-covalent forces with antigen at numerous sites; the more interactions, the stronger the affinity.

"Binding affinity" generally refers to the strength of the sum total of non-covalent interactions between a single binding site of a molecule (e.g., of an antibody) and its binding partner (e.g., an antigen). Unless indicated otherwise, as used herein, "binding affinity", "bind to", "binds to" or "binding to" refers to intrinsic binding affinity that reflects a 1:1 interaction between members of a binding pair (e.g., an antibody fragment and antigen). The affinity of a molecule X for its partner Y can generally be represented by the dissociation constant ($K_D$). Affinity can be measured by common methods known in the art, including those described herein. Low-affinity antibodies generally bind antigen slowly and tend to dissociate readily, whereas high-affinity antibodies generally bind antigen faster and tend to remain bound longer. A variety of methods of measuring binding affinity are known in the art, any of which can be used for purposes of the present disclosure. Specific illustrative and exemplary embodiments for measuring binding affinity, i.e. binding strength are described in the following.

The term "$k_{assoc}$", "ka" or "$k_{on}$", as used herein, is intended to refer to the association rate of a particular antibody-antigen interaction, whereas the term "$k_{dis}$", "kd" or "$k_{off}$", as used herein, is intended to refer to the dissociation rate of a particular antibody-antigen interaction. In one embodiment, the term "$K_D$", as used herein, is intended to refer to the dissociation constant, which is obtained from the ratio of kd to ka (i.e. kd/ka) and is expressed as a molar concentration (M). The "$K_D$" or "$K_D$ value" or "KD" or "KD value" according to this disclosure is in one embodiment measured by using a T200 device (Biacore, GE Healthcare) To measure affinity of the humanized scFvs to human IL-17A, biotinylated human IL-17A is captured using the Biotin-CAPture kit from Biacore. After each analyte injection cycle the CAP sensor chip is regenerated and new antigen is captured. The scFvs are injected as analyte using a dose response multi-cycle kinetic assay with concentrations of the analyte ranging from 0.35 to 90 nM diluted in running buffer. Obtained sensorgrams are fitted using the 1:1 binding model. Alternatively or in addition, affinity of the humanized scFvs can be measured and analyzed using an alternative SPR assay setup: IL-17A is immobilized on a CM5 sensor chip (GE Healthcare) by amine-coupling, and serial dilutions of scFvs ranging from 0.35 to 90 nM are re injected over the immobilized IL-17A.

Suitably, the affinity of the antibody of the disclosure to IL-17A, may be higher than the affinity of IL-17A to IL-17RA. It will be appreciated that a higher affinity of the antibody of the disclosure as compared to the affinity of IL-17A to IL-17RA may be particularly useful for dissociating or neutralizing the pre-formed IL-17RA/IL-17A complexes. In one embodiment, the antibody of the disclosure neutralizes IL-17RA/IL-17A interaction. In another embodiment, the antibody of the disclosure inhibits or blocks binding between IL-17A and its receptor (IL-17RA). In one embodiment, the antibody of the disclosure neutralizes IL-17A activity.

Suitably, the affinity of the antibody of the disclosure to IL-17A may be comparable to or higher, preferably higher, than the affinity of secukinumab to IL-17A. In one embodiment, the antibody of the disclosure neutralizes IL-17A activity with potency equal to or higher, preferably higher, than secukinumab. In a further embodiment, the antibody of the disclosure neutralizes IL-17RA/IL-17A interaction with potency equal to or higher, preferably higher, than secukinumab.

The binding affinity of an antibody may be determined, for example, by the dissociation constant ($K_D$). A stronger affinity is represented by a lower $K_D$, while a weaker affinity is represented by a higher $K_D$.

Thus, in a suitable embodiment, the antibody of the disclosure may have a $K_D$ of between 1 and 10000 pM, 1 and 7000 pM, 1 and 5000 pM, 1 and 2500 pM, 1 and 2000 pM, 1 and 1000 pM, 1 and 750 pM, 1 and 500 pM, 1 and 400 pM, 1 and 300 pM, 1 and 200 pM, 1 and 100 pM, 1 and 50 pM, preferably as measured by surface plasmon, more preferably as measured by surface plasmon resonance in a direct setup. In a suitable embodiment, the antibody of the disclosure has a $K_D$ of between 1 and 200 pM, in particular of between 1 and 100 pM. as measured by surface plasmon resonance in a direct setup. In a particular embodiment, the antibody of the disclosure has a $K_D$ of between 1 and 50 pM as measured by surface plasmon resonance in a direct setup. In a suitable embodiment, the antibody of the disclosure may have a $K_D$ of less than 5 nM, less than 4 nM, less than 3 nM, less than 2 nM, less than 1 nM, less than 0.5 nM, less than 0.4 nM, less than 0.3 nM, less than 0.25 nM, less than 0.2 nM, less than 150 pM, less than 100 pM, or less than 50 pM, preferably as measured by surface plasmon resonance, more preferably as measured by surface plasmon resonance in a direct setup. Suitably, the antibody of the disclosure has a $K_D$ of less than 1 nM, in particular of less than 100 pM. Suitably, the antibody of the disclosure has a $K_D$ of less than 0.5 nM, in particular of less than 50 pM. More suitably, the antibody of the disclosure has a $K_D$ of less than 0.2 nM, in particular of less than 50 pM as measured by surface plasmon resonance in a direct setup.

In a further embodiment, the antibody of the disclosure binds to Cynomolgus IL-17A with a $K_D$ of less than 10 nM, e.g. less than 7 nM, less than 5 nM, less than 2 nM, less than 1 nM, particularly less than 0.5 nM as measured by surface plasmon resonance (SPR) in a capture set-up.

Suitably, the antibody of the disclosure binds to human IL-17A with a $K_{on}$ rate of at least $10^3$ $M^{-1}s^{-1}$ or greater, at least $10^4$ $M^{-1}s^{-1}$ or greater, at least $5\times10^4$ $M^{-1}s^{-1}$ or greater, at least $10^5$ $M^{-1}s^{-1}$ or greater, at least $5\times10^5$ $M^{-1}s^{-1}$ or greater, at least $10^6$ $M^{-1}s^{-1}$ or greater as measured by surface plasmon resonance (SPR), preferably as measured by surface plasmon resonance in a direct setup. Preferably, the antibody of the disclosure has a $K_{on}$ rate of at least $10^5$ $M^{-1}s^{-1}$ or greater, particularly at least $5\times10^5$ $M^{-1}s^{-1}$ or greater, more particularly at least $10^6$ $M^{-1}s^{-1}$ or greater, as measured by SPR, preferably as measured by surface plasmon resonance in a direct setup.

Suitably, the antibody of the disclosure binds to human IL-17A with a $K_{off}$ rate of $5\times10^{-3}$ $s^{-1}$ or less, $3\times10^{-3}$ $s^{-1}$ or less, $10^{-3}$ $s^{-1}$ or less, $5\times10^{-4}$ $s^{-1}$ or less, $3\times10$ $s^{-1}$ or less, $10^{-4}$ $s^{-1}$ or less, $5\times10^{-5}$ $s^{-1}$ or less, as measured by surface plasmon resonance (SPR), preferably as measured by surface plasmon resonance in a direct setup. Preferably, the antibody of the disclosure has a $K_{off}$ rate of $10^{-4}$ $s^{-1}$ or less, in particular $5\times10^{-5}$ $s^{-1}$ or less as measured by SPR, preferably as measured by surface plasmon resonance in a direct setup.

Suitably, the antibody of the disclosure has beneficial biophysical properties.

Suitably, the antibody of the disclosure has a melting temperature (Tm) of at least 60° C., preferably of at least 62° C., more preferably at least 65° C., even more preferably at least 70° C., when expressed in the scFv (single chain variable fragment) antibody format, as determined by differential scanning fluorimetry (DSF) as described earlier (Egan, et al., MAbs, 9(1) (2017), 68-84; Niesen, et al., Nature Protocols, 2(9) (2007) 2212-2221). The midpoint of transition for the thermal unfolding of the scFv constructs is determined by Differential Scanning Fluorimetry using the fluorescence dye SYPRO® Orange (see Wong & Raleigh, Protein Science 25 (2016) 1834-1840). Samples in phosphate-citrate buffer at pH 6.4 are prepared at a final protein concentration of 50 µg/mL and containing a final concentration of 5×SYPRO® Orange in a total volume of 100 µl. Twenty-five microliters of prepared samples are added in triplicate to white-walled AB gene PCR plates. The assay is performed in a qPCR machine used as a thermal cycler, and the fluorescence emission is detected using the software's custom dye calibration routine. The PCR plate containing the test samples is subjected to a temperature ramp from 25° C. to 96° C. in increments of 1° C. with 30 s pauses after each temperature increment. The total assay time is about two hours. The Tm is calculated by the software GraphPad Prism using a mathematical second derivative method to calculate the inflection point of the curve. The reported Tm is an average of three measurements.

The antibody of the disclosure, in particular when expressed in the scFv (single chain variable fragment) antibody format, is characterized by a loss in monomer content, after five consecutive freeze-thaw cycles, of less than 5%, particularly less than 3%, more particularly less than 1%, when the antibody of the disclosure is at a starting concentration of 10 mg/ml.

After storage for at least two weeks, particularly for at least four weeks at 4° C., the antibody of the disclosure, in particular when expressed in the scFv (single chain variable fragment) antibody format, is characterized by a loss in monomer content of 5% or less, particularly less than 4%, less than 3%, less than 2%, preferably less than 1%, when the antibody of the disclosure is at a starting concentration of 10 mg/ml. The loss in monomer content is as determined by area under the curve calculation of SE-HPLC chromatograms. SE-HPLC is a separation technique based on a solid stationary phase and a liquid mobile phase as outlined by the USP chapter 621. This method separates molecules based on their size and shape utilizing a hydrophobic stationary phase and aqueous mobile phase. The separation of molecules is occurring between the void volume (V0) and the total permeation volume (VT) of a specific column. Measurements by SE-HPLC are performed on a Chromaster HPLC system (Hitachi High-Technologies Corporation) equipped with automated sample injection and a UV detector set to the detection wavelength of 280 nm. The equipment is controlled by the software EZChrom Elite (Agilent Technologies, Version 3.3.2 SP2) which also supports analysis of resulting chromatograms. Protein samples are cleared by centrifugation and kept at a temperature of 4-6° C. in the autosampler prior to injection. For the analysis of scFv samples the column Shodex KW403-4F (Showa Denko Inc., #F6989202) is employed with a standardized buffered saline mobile phase (50 mM sodium-phosphate pH 6.5, 300 mM sodium chloride) at the recommended flow rate of 0.35 mL/min. The target sample load per injection was 5 µg. Samples are detected by an UV detector at a wavelength of 280 nm and the data recorded by a suitable software suite. The resulting chromatograms are analyzed in the range of V0 to VT thereby excluding matrix associated peaks with >10 min elution time.

Suitably, the isolated antibody of the present disclosure is selected from the group consisting of: a monoclonal antibody, a chimeric antibody, a Fab, an Fv, an scFv, dsFv, an scAb, STAB, a single domain antibody (sdAb or dAb), a single domain heavy chain antibody, and a single domain light chain antibody, a VHH, a VNAR, single domain antibodies based on the VNAR structure from shark, and binding domains based on alternative scaffolds including but limited to ankyrin-based domains, fynomers, avimers, anticalins, fibronectins, and binding sites being built into constant regions of antibodies (e.g. F-star's Modular Antibody Technology™), preferably scFv.

Suitably, the antibody of the disclosure is an Fv. Suitably, the antibody of the disclosure is scFv antibody fragment. "Single-chain Fv" or "scFv" or "sFv" antibody fragments comprise the VH and VL domains of an antibody, wherein these domains are present in a single polypeptide chain. Generally, the Fv polypeptide further comprises a polypeptide linker between the VH and VL domains which enables the sFv to form the desired structure for target binding.

"Single-chain Fv" or "scFv" antibody fragments comprise the VH and VL domains of antibody, wherein these domains are present in a single polypeptide chain. Generally, the scFv polypeptides further comprises a polypeptide linker between the VH and VL domains which enables the scFv to form the desired structure for antigen binding (see, for example, Plückthun, The pharmacology of Monoclonal Antibodies, vol. 113, Rosenburg and Moore eds., (Springer-Verlag, New York, 1994), pp. 269-315). In particular embodiments, said functional fragment is an scFv format comprising the linker according to SEQ ID NO: 23. In one embodiment, an antibody that specifically binds to human IL-17A is an antibody that is described in TABLE 1. In one embodiment, an antibody that specifically binds to human IL-17A comprises an amino acid sequence that is at least 60, 70, 80, 90, 91, 92, 93, 94, 95, 96, 97, 98 or 99 percent, preferably at least 90 percent, identical to the amino acid sequence selected from (i) the group consisting of SEQ ID NOs: 24 and SEQ ID NO: 25; or (ii) the group consisting of SEQ ID NOs: 61 and SEQ ID NO: 62. In a further embodiment, the antibody of the disclosure is a single-chain variable fragment (scFv) (i) as shown in SEQ ID NO: 24 or in SEQ ID NO: 25; or (ii) as shown in SEQ ID NO: 61 or in SEQ ID NO: 62.

Suitably, the antibody of the disclosure is an IgG antibody. In one embodiment, the antibody of the disclosure is an IgG selected from the group consisting of an IgG1, an IgG2, an IgG3 and an IgG4, preferably an IgG1.

Exemplary Domains Specifically Binding to TNFα

The multispecific antibody of the disclosure comprises a second domain specifically binding TNFα, wherein said domain comprises a heavy chain variable region (VH) and a light chain variable region (VL), wherein: (a) said VH comprises, in sequence, the three complementary determining regions HCDR1, HCDR2 and HCDR3, and (b) said VL comprises, in sequence, the three complementary determining regions LCDR1, LCDR2 and LCDR3.

Suitable domains specifically binding TNFα for use in the multispecific antibody of the present disclosure include, but are not limited to:
  the humanized monoclonal antibodies or binding domains thereof whose sequences are listed in TABLE 1 (described in WO 2017/158101, which is incorporated herein by reference in its entirety);
  infliximab (Remicade®; U.S. Pat. Nos. 6,277,969, 6,284,471, 6,790,444, and 6,835,823, all of which are incorporated herein by reference);
  adalimumab/D2E7 (Humira®; described in U.S. Pat. No. 6,090,382, which is incorporated herein by reference in its entirety);
  certolizumab, a PEGylated Fab fragment (Cimzia®; described in U.S. Pat. Nos. 7,012,135 and 7,186,820, all of which are incorporated herein by reference);
  golimumab (Simponi®; published U.S. application 2009/214528, which is incorporated herein by reference in its entirety).

Preferred domains specifically binding TNFα for use in the multispecific antibody of the present disclosure include, but are not limited to, the humanized monoclonal antibodies or binding domains thereof whose sequences are listed in TABLE 1 (described in WO 2017/158101, which is incorporated herein by reference in its entirety).

Thus, in one embodiment, the disclosure provides the multispecific antibody comprising a first domain specifically binding IL-17A and a second domain specifically binding TNFα, wherein said second domain comprises a set of CDRs: HCDR1, HCDR2, HCDR3, LCDR1, LCDR2 and LCDR3, wherein the set of CDRs has 10 or fewer amino acid substitutions, e.g., 9 or fewer amino acid substitutions, 8 or fewer amino acid substitutions, 7 or fewer amino acid substitutions, 6 or fewer amino acid substitutions, 5 or fewer amino acid substitutions, 4 or fewer amino acid substitutions, 3 or fewer amino acid substitutions, 2 or fewer amino acid substitutions, 1 or 0 amino acid substitutions, preferably 0 amino acid substitutions, from a set of CDRs in which HCDR1' is amino acid sequence selected from any one of SEQ ID Nos: 25, 28, and 31, preferably SEQ ID NO: 25; HCDR2' is amino acid sequence selected from any one of SEQ ID Nos: 26, 29, and 32, preferably SEQ ID NO: 26; HCDR3' is amino acid sequence selected from any one of SEQ ID Nos: 27, 30, and 33, preferably SEQ ID NO: 27; LCDR1' is amino acid sequence selected from any one of SEQ ID Nos: 38, 41, and 44, preferably SEQ ID NO: 38; LCDR2' is amino acid sequence selected from any one of SEQ ID Nos: 39, 42, and 45, preferably SEQ ID NO: 39; and LCDR3' having the amino acid sequence selected from any one of SEQ ID Nos: 40, 43, and 46, preferably SEQ ID NO: 40.

In particular, the present disclosure provides the multispecific antibody comprising a first domain specifically binding IL-17A and a second domain specifically binding TNFα, wherein said second domain comprises a VH CDR having an amino acid sequence of any one of the VH CDRs listed in TABLE 1. In particular, the second domain specifically binding TNFα comprises (or alternatively, consisting of) one, two, three, or more VH CDRs having an amino acid sequence of any of the VH CDRs listed in TABLE 1.

Suitably, the present disclosure provides a second domain specifically binding TNFα, wherein said second domain comprises a heavy chain variable region (VH), wherein said VH comprises, in sequence, the three complementary determining regions HCDR1, HCDR2 and HCDR3, said HCDR1 having the amino acid sequence selected from any one of SEQ ID Nos: 25, 28, and 31, said HCDR2 having the amino acid sequence selected from any one of SEQ ID Nos: 26, 29, and 32, said HCDR3 having the amino acid sequence selected from any one of SEQ ID Nos: 27, 30, and 33. In particular, said second domain comprises HCDR1, HCDR2, and HCDR3 sequences of SEQ ID NOs: 25, 26, and 27, respectively.

The present disclosure also provides the multispecific antibody comprising a first domain specifically binding IL-17A and a second domain specifically binding TNFα, wherein said second domain comprises a VL CDR having an amino acid sequence of any one of the VL CDRs listed in TABLE 1. In particular, said second domain specifically binding TNFα comprises (or alternatively, consisting of) one, two, three or more VL CDRs having an amino acid sequence of any of the VL CDRs listed in TABLE 1.

Suitably, said second domain specifically binding TNFα comprises a light chain variable region (VL), wherein said VL comprises, in sequence, the three complementary determining regions LCDR1, LCDR2 and LCDR3, said LCDR1 having the amino acid sequence selected from any one of SEQ ID Nos: 38, 41, and 44, said LCDR2 having the amino acid sequence selected from any one of SEQ ID Nos: 39, 42, and 45, said LCDR3 having the amino acid sequence selected from any one of SEQ ID Nos: 40, 43, and 46. In particular, said second domain comprises LCDR1, LCDR2, and LCDR3 sequences of SEQ ID NOs: 38, 39, and 40, respectively.

Suitably, the present disclosure provides the multispecific antibody comprising a first domain specifically binding IL-17A and a second domain specifically binding TNFα, wherein said second domain comprises a heavy chain variable region (VH) and a light chain variable region (VL), wherein:
- (a) said VH comprises, in sequence, the three complementary determining regions HCDR1, HCDR2 and HCDR3, said HCDR1 having the amino acid sequence selected from any one of SEQ ID Nos: 25, 28, and 31, said HCDR2 having the amino acid sequence selected from any one of SEQ ID Nos: 26, 29, and 32, said HCDR3 having the amino acid sequence selected from any one of SEQ ID Nos: 27, 30, and 33; and
- (b) said VL comprises, in sequence, the three complementary determining regions LCDR1, LCDR2 and LCDR3, said LCDR1 having the amino acid sequence selected from any one of SEQ ID Nos: 38, 41, and 44, said LCDR2 having the amino acid sequence selected from any one of SEQ ID Nos: 39, 42, and 45, said LCDR3 having the amino acid sequence selected from any one of SEQ ID Nos: 40, 43, and 46.

In particular, the disclosure provides the multispecific antibody comprising a first domain specifically binding IL-17A and a second domain specifically binding TNFα, wherein said second domain comprises (a) HCDR1, HCDR2, and HCDR3 sequences of SEQ ID NOs: 25, 26, and 27, respectively, and (b) LCDR1, LCDR2, and LCDR3 sequences of SEQ ID NOs: 38, 39, and 40, respectively.

Other domains of the disclosure specifically binding TNFα include amino acids that have been mutated, yet have at least 60, 70, 80, 90, 91, 92, 93, 94, 95, 96, 97, 98 or 99 percent identity in the CDR regions with the CDR regions depicted in the sequences described in TABLE 1. Suitably, other domains of the disclosure specifically binding TNFα include mutant amino acid sequences wherein no more than 1, 2, 3, 4, 5 or 10 amino acids have been mutated by amino acid deletion, insertion or substitution in the CDR regions when compared with the CDR regions depicted in the sequences described in TABLE 1. Mutations, e.g., substitutions, may potentially be made at any residue within the set of CDRs, and may be within CDR1, CDR2 and/or CDR3.

Suitably, a second domain specifically binding TNFα of the multispecific antibody of the present disclosure comprises a heavy chain variable region (VH) and a light chain variable region (VL), wherein:
- (a) said VH comprises, in sequence, the three complementary determining regions HCDR1, HCDR2 and HCDR3, said HCDR1 having the amino acid sequence having at least 60, 70, 80, 90, 91, 92, 93, 94, 95, 96, 97, 98 or 99 percent identity to any one of SEQ ID NOs: 25, 28, and 31; said HCDR2 having the amino acid sequence having at least 60, 70, 80, 90, 91, 92, 93, 94, 95, 96, 97, 98 or 99 percent identity to any one of SEQ ID NOs: 26, 29, and 32; said HCDR3 having the amino acid sequence having at least 60, 70, 80, 90, 91, 92, 93, 94, 95, 96, 97, 98 or 99 percent identity to any one of SEQ ID NOs: 27, 30, and 33; and/or
- (b) said VL comprises, in sequence, the three complementary determining regions LCDR1, LCDR2 and LCDR3, said LCDR1 having the amino acid sequence having at least 60, 70, 80, 90, 91, 92, 93, 94, 95, 96, 97, 98 or 99 percent identity to any one of SEQ ID NOs: 38, 41, and 44; said LCDR2 having the amino acid sequence having at least 60, 70, 80, 90, 91, 92, 93, 94, 95, 96, 97, 98 or 99 percent identity to any one of SEQ ID NOs: 39, 42, and 45; said LCDR3 having the amino acid sequence having at least 60, 70, 80, 90, 91, 92, 93, 94, 95, 96, 97, 98 or 99 percent identity to any one of SEQ ID NOs: 40, 43, and 46.

Suitably, said second domain specifically binding TNFα comprises: HCDR1, HCDR2, and HCDR3 having at least 60, 70, 80, 90, 91, 92, 93, 94, 95, 96, 97, 98 or 99 percent identity to sequences of SEQ ID NOs: 25, 26, and 27, respectively, and/or LCDR1, LCDR2, and LCDR3 having at least 60, 70, 80, 90, 91, 92, 93, 94, 95, 96, 97, 98 or 99 percent identity to sequences of SEQ ID NOs: 38, 39, and 40, respectively.

In a further embodiment, said second domain specifically binding TNFα comprises a heavy chain variable region VHB and a light chain variable region VLB.

Suitably, the present disclosure provides the multispecific antibody comprising a first domain specifically binding IL-17A and a second domain specifically binding TNFα, wherein said second domain comprises a heavy chain variable region VHB and wherein said VHB is VH1A, VH1B, VH3 or VH4. In one embodiment, said second domain specifically binding TNFα of the present disclosure comprises a heavy chain variable region VHB, wherein said VHB is VH4. In a preferred embodiment, said second domain specifically binding TNFα of the present disclosure comprises a heavy chain variable region VHB, wherein said VHB is VH3.

Suitably, the present disclosure provides the multispecific antibody comprising a first domain specifically binding IL-17A and a second domain specifically binding TNFα, wherein said second domain comprises a light chain variable region VLB and wherein said VLB comprises Vκ frameworks FR1, FR2 and FR3, particularly Vκ1 or Vκ3 FR1 to FR3, preferably Vκ1 frameworks FR1 to FR3, and a framework FR4, which is selected from a Vκ FR4, particularly Vκ1 FR4, Vκ3 FR4, and a Vλ FR4. Suitable Vλ FR4 are as set forth in SEQ ID NO: 97 to SEQ ID NO: 103. In one embodiment, said second domain specifically binding TNFα comprises Vλ FR4 comprising the amino acid sequence having at least 60, 70, 80, 90 percent identity to an amino acid sequence selected from any of SEQ ID NO: 97 to SEQ ID NO: 103, preferably to SEQ ID NO: 97 or SEQ ID NO: 98, more preferably to SEQ ID NO: 97. Suitably, said second domain specifically binding TNFα comprises Vλ FR4 comprising the amino acid sequence selected from any of SEQ ID NO: 97 to SEQ ID NO: 103, preferably Vλ FR4 as set forth in SEQ ID NO: 97 or 98, more preferably Vλ FR4 as set forth in SEQ ID NO: 98.

Thus, in one embodiment, the disclosure provides the multispecific antibody comprising a first domain specifically binding IL-17A and a second domain specifically binding TNFα, wherein said second domain comprises:
- (a) the HCDR1, HCDR2, and HCDR3 sequences of SEQ ID NOs: 25, 26, and 27, respectively, and the LCDR1, LCDR2, and LCDR3 sequences of SEQ ID NOs: 38, 39, and 40, respectively;
- (b) a VHB, wherein said VHB is VH3 or VH4, preferably VH3; and
- (c) a VLB comprising a VL framework comprising Vκ frameworks FR1, FR2 and FR3, particularly Vκ1 or Vκ3 FR1 to FR3, preferably Vκ1 FR1 to FR3, and a framework FR4, which is selected from a Vκ FR4, particularly Vκ1 FR4, Vκ3 FR4, and a Vλ FR4, particularly Vλ FR4 comprising the amino acid sequence having at least 60, 70, 80, 90 percent identity to an amino acid sequence selected from any of SEQ ID NO: 97 to SEQ ID NO: 103, preferably Vλ FR4 as set forth in any of SEQ ID NO: 97 to SEQ ID NO: 103, preferably Vλ FR4 as set forth in SEQ ID NO: 97 or 98, more preferably Vλ FR4 as set forth in SEQ ID NO: 98.

Suitably, the present disclosure provides the multispecific antibody comprising a first domain specifically binding IL-17A and a second domain specifically binding TNFα, wherein said second domain comprises a VH listed in TABLE 1. Suitably, the present disclosure also provides the multispecific antibody comprising a first domain specifically binding IL-17A and a second domain specifically binding TNFα, wherein said second domain comprises (or alternatively, consisting of) a VH amino acid sequence listed in TABLE 1, wherein no more than about 20 amino acids, preferably no more than about 10 amino acids in a framework sequence (for example, a sequence which is not a CDR) have been mutated (wherein a mutation is, as various non-limiting examples, an addition, substitution or deletion). Other domains of the disclosure specifically binding TNFα include amino acids that have been mutated, yet have at least 60, 70, 80, 90, 91, 92, 93, 94, 95, 96, 97, 98 or 99 percent identity in the VH regions with the VH regions depicted in the sequences described in TABLE 1.

Suitably, the present disclosure provides the multispecific antibody comprising a first domain specifically binding IL-17A and a second domain specifically binding TNFα, wherein said second domain comprises a VL domain listed in TABLE 1. Suitably, the present disclosure also provides the multispecific antibody comprising a first domain specifically binding IL-17A and a second domain specifically binding TNFα, wherein said second domain comprises (or alternatively, consisting of) a VL amino acid sequence listed in TABLE 1, wherein no more than about 20 amino acids, preferably no more than about 10 amino acids in a framework sequence (for example, a sequence which is not a CDR) have been mutated (wherein a mutation is, as various non-limiting examples, an addition, substitution or deletion). Other domains of the disclosure specifically binding to TNFα include amino acids that have been mutated, yet have at least 60, 70, 80, 90, 91, 92, 93, 94, 95, 96, 97, 98 or 99 percent identity in the VL regions with the VL regions depicted in the sequences described in TABLE 1.

In one embodiment, the disclosure provides the multispecific antibody comprising a first domain specifically binding IL-17A and a second domain specifically binding TNFα, wherein said second domain comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence selected from the group consisting of SEQ ID NOs: 34, 35, 36 and 37, preferably SEQ ID NO: 34, and in particular wherein said domain comprises HCDR1, HCDR2, and HCDR3 sequences of SEQ ID NOs: 25, 26, and 27, respectively. In a preferred embodiment, said second domain specifically binding TNFα comprises a heavy chain variable region comprising an amino acid sequence that is at least 90 percent identical to the amino acid sequence SEQ ID NO: 34, and wherein said heavy chain variable region comprises G56A, R82L, S85A, K86Q (AHo numbering), and in particular wherein said domain comprises HCDR1, HCDR2, and HCDR3 sequences of SEQ ID NOs: 25, 26, and 27, respectively. Suitably, said second domain specifically binding TNFα may comprise a heavy chain variable region comprising an amino acid sequence that is at least 90 percent identical to the amino acid sequence SEQ ID NO: 36, and wherein said heavy chain variable region comprises A24K, G56A, R82L (AHo numbering), and in particular wherein said domain comprises HCDR1, HCDR2, and HCDR3 sequences of SEQ ID NOs: 25, 26, and 27, respectively. Suitably, said second domain specifically binding TNFα may comprise a heavy chain variable region comprising an amino acid sequence that is at least 90 percent identical to the amino acid sequence SEQ ID NO: 37, and wherein said heavy chain variable region comprises G56A, R82L, S85A, K86Q (AHo numbering), and in particular wherein said domain comprises HCDR1, HCDR2, and HCDR3 sequences of SEQ ID NOs: 25, 26, and 27, respectively.

In another embodiment, the disclosure provides the multispecific antibody comprising a first domain specifically binding IL-17A and a second domain specifically binding TNFα, wherein said second domain comprises a light chain variable region comprising an amino acid sequence that is at least 60, 70, 80, 90, 91, 92, 93, 94, 95, 96, 97, 98 or 99 percent, preferably at least 90 percent, identical to the amino acid sequence selected from the group consisting of SEQ ID NOs: 47, 48, 49, 50 and 51, preferably SEQ ID NO: 47, and in particular wherein said domain comprises LCDR1, LCDR2, and LCDR3 sequences of SEQ ID NOs: 38, 39, and 40, respectively.

In a preferred embodiment, said second domain specifically binding TNFα comprises a light chain variable region comprising an amino acid sequence that is at least 90 percent identical to the amino acid sequence SEQ ID NO: 47, and wherein said light chain variable region comprises T22N, A51R, F89Y (AHo numbering), and in particular wherein said domain comprises LCDR1, LCDR2, and LCDR3 sequences of SEQ ID NOs: 38, 39, and 40, respectively. Suitably, said second domain specifically binding TNFα may comprise a light chain variable region comprising an amino acid sequence that is at least 90 percent identical to the amino acid sequence SEQ ID NO: 49, and wherein said light chain variable region comprises T22N, D88E, S95G, E99A (AHo numbering), and in particular wherein said domain LCDR1, LCDR2, and LCDR3 sequences of SEQ ID NOs: 38, 39, and 40, respectively. Suitably, said second domain specifically binding TNFα may comprise a light chain variable region comprising an amino acid sequence that is at least 90 percent identical to the amino acid sequence SEQ ID NO: 50, and wherein said light chain variable region comprises T22N, A51R, F89Y, S95G, G141T, L145V (AHo numbering), and in particular wherein said domain LCDR1, LCDR2, and LCDR3 sequences of SEQ ID NOs: 38, 39, and 40, respectively. Suitably, said second domain specifically binding TNFα may comprise a light chain variable region comprising an amino acid sequence that is at least 90 percent identical to the amino acid sequence SEQ ID NO: 51, and wherein said light chain variable region comprises T22N, K50Q, A51R, F89Y, G141T, L145V (AHo numbering), and in particular wherein said domain LCDR1, LCDR2, and LCDR3 sequences of SEQ ID NOs: 38, 39, and 40, respectively.

In a further embodiment, the disclosure provides the multispecific antibody comprising a first domain specifically binding IL-17A and a second domain specifically binding TNFα, wherein said second domain comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 34; and a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 47.

Preferably, said second domain specifically binding TNFα comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO:

34; and a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 47, and wherein said domain comprises HCDR1, HCDR2, and HCDR3 sequences of SEQ ID NOs: 25, 26, and 27, respectively, and/or LCDR1, LCDR2, and LCDR3 sequences of SEQ ID NOs: 38, 39, and 40, respectively, preferably wherein said domain comprises HCDR1, HCDR2, and HCDR3 sequences of SEQ ID NOs: 25, 26, and 27, respectively, and LCDR1, LCDR2, and LCDR3 sequences of SEQ ID NOs: 38, 39, and 40, respectively.

Suitably, said second domain specifically binding TNFα comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 37; and a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 50 or 51, and wherein said domain comprises HCDR1, HCDR2, and HCDR3 sequences of SEQ ID NOs: 25, 26, and 27, respectively, and/or LCDR1, LCDR2, and LCDR3 sequences of SEQ ID NOs: 38, 39, and 40, respectively, preferably wherein said domain comprises HCDR1, HCDR2, and HCDR3 sequences of SEQ ID NOs: 25, 26, and 27, respectively, and LCDR1, LCDR2, and LCDR3 sequences of SEQ ID NOs: 38, 39, and 40, respectively.

In a specific embodiment, the disclosure provides the multispecific antibody comprising a first domain specifically binding IL-17A and a second domain specifically binding TNFα, wherein said second domain comprises a VH comprising an amino acid sequence selected from the group consisting of SEQ ID NOs: 34, 35, 36 and 37; and/or a VL thereof comprising an amino acid sequence selected from the group consisting of SEQ ID NOs: 47, 48, 49, 50 and 51. In particular embodiment, the second domain specifically binding TNFα comprises a VH sequence of SEQ ID NO: 34 and a VL sequence of SEQ ID NO: 47. In yet another particular embodiment, the second domain specifically binding TNFα comprises a VH sequence of SEQ ID NO: 37 and a VL sequence of SEQ ID NO: 50 or SEQ ID NO: 51.

In one embodiment, a domain that specifically binds to human TNFα is a domain that is described in TABLE 1. Other domains of the disclosure having a binding specificity for human TNFα include those wherein the amino acids or nucleic acids encoding the amino acids have been mutated, yet have at least 60, 70, 80, 90 or 95 percent identity to the sequences described in TABLE 1. In one embodiment, it includes mutant amino acid sequences wherein no more than 1, 2, 3, 4 or 5 amino acids have been mutated in the variable regions when compared with the variable regions depicted in the sequence described in TABLE 1, while retaining substantially the same activity.

In yet another embodiment, the present disclosure provides the multispecific antibody comprising a first domain specifically binding IL-17A and a second domain specifically binding TNFα, wherein said second domain comprises amino acid sequences that are homologous to the sequences described in TABLE 1, and said domain binds to human TNFα, and retains the desired functional properties of those domains described in TABLE 1.

In one embodiment, a domain of the disclosure specifically binding TNFα has a heavy chain variable region comprising HCDR1, HCDR2, and HCDR3 sequences and a light chain variable region comprising LCDR1, LCDR2, and LCDR3 sequences, wherein one or more of these CDR sequences have specified amino acid sequences based on the domains described herein or conservative modifications thereof, and wherein the domains retain the desired functional properties of the antibodies of the disclosure.

Accordingly, the disclosure provides the multispecific antibody comprising a first domain specifically binding IL-17A and a second domain specifically binding TNFα, wherein said second domain comprises (or consists of):
  a heavy chain variable region (VH) comprising, in sequence, the three complementary determining regions HCDR1, HCDR2 and HCDR3, wherein said HCDR1 is amino acid sequence SEQ ID No: 25, or a conservative variant thereof; said HCDR2 is amino acid sequence SEQ ID No: 26, or a conservative variant thereof; said HCDR3 is amino acid sequence selected from any one of SEQ ID No: 27, or a conservative variant thereof; and
  a light chain variable region (VL) comprising, in sequence, the three complementary determining regions LCDR1, LCDR2 and LCDR3, wherein said LCDR1 is amino acid sequence SEQ ID No: 38, or a conservative variant thereof; said LCDR2 is amino acid sequence SEQ ID No: 39, or a conservative variant thereof; said LCDR3 having the amino acid sequence SEQ ID No: 40, or a conservative variant thereof;
  wherein said domain specifically binds to human TNFα and/or neutralize TNFα.

Exemplary Domains Specifically Binding to Human Serum Albumin (HSA)

The multispecific antibody of the disclosure comprises a third domain specifically binding human serum albumin, wherein said domain comprises a heavy chain variable region (VH) and a light chain variable region (VL), wherein: (a) said VH comprises, in sequence, the three complementary determining regions HCDR1, HCDR2 and HCDR3, and (b) said VL comprises, in sequence, the three complementary determining regions LCDR1, LCDR2 and LCDR3.

Suitably, the multispecific antibody of the present disclosure may comprise a third binding domain having a third specificity different from the specificity of the first and second domains. Suitably, the multispecific antibody of the present disclosure may comprise a third domain specifically binding to human serum albumin (HSA). Thus, in one embodiment, the multispecific antibody of the disclosure comprises a first domain specifically binding IL-17A, a second domain specifically binding TNFα and a third domain specifically binding to human serum albumin.

Suitable domains specifically binding human serum albumin for use in the multispecific antibody of the present disclosure include, but are not limited to, the humanized monoclonal antibodies or binding domains thereof whose sequences are listed in TABLE 1.

In one embodiment, the domain specifically binding to human serum albumin comprises a set of CDRs: HCDR1, HCDR2, HCDR3, LCDR1, LCDR2 and LCDR3, wherein the set of CDRs has 10 or fewer amino acid substitutions, e.g., 9 or fewer amino acid substitutions, 8 or fewer amino acid substitutions, 7 or fewer amino acid substitutions, 6 or fewer amino acid substitutions, 5 or fewer amino acid substitutions, 4 or fewer amino acid substitutions, 3 or fewer amino acid substitutions, 2 or fewer amino acid substitutions, 1 or 0 amino acid substitutions, preferably 0 amino acid substitutions, from a set of CDRs in which
  (a) HCDR1' is as set forth in SEQ ID NO: 52; HCDR2' is as set forth in SEQ ID NO: 53; HCDR3' is as set forth in SEQ ID NO: 54; LCDR1' is as set forth in SEQ ID NO: 62; LCDR2' is as set forth in SEQ ID NO: 63; LCDR3' is as set forth in SEQ ID NO: 64; or (b) HCDR1' is as set forth in SEQ ID NO: 73; HCDR2' is as set forth in SEQ ID NO: 74; HCDR3' is as set forth in SEQ ID NO: 75; LCDR1' is as set forth in SEQ ID NO: 83; LCDR2' is as set forth in SEQ ID NO: 84; LCDR3' is as set forth in SEQ ID NO: 85.

In particular, the domain specifically binding to human serum albumin comprises a VH CDR having an amino acid sequence of any one of the VH CDRs listed in TABLE 1. In particular, the disclosure provides the multispecific antibody comprising a third domain specifically binding HSA, wherein said domain comprising (or alternatively, consisting of) one, two, three, or more VH CDRs having an amino acid sequence of any of the VH CDRs listed in TABLE 1.

Suitably, the domain specifically binding to human serum albumin comprises a heavy chain variable region (VH), wherein said VH comprises, in sequence, the three complementary determining regions HCDR1, HCDR2 and HCDR3, wherein (a) said HCDR1 is as set forth in the amino acid sequence selected from any one of SEQ ID Nos: 52, 55, and 58; said HCDR2 is as set forth in the amino acid sequence selected from any one of SEQ ID Nos: 53, 56, and 59; said HCDR3 is as set forth in the amino acid sequence selected from any one of SEQ ID Nos: 54, 57, and 60; or (b) said HCDR1 is as set forth in the amino acid sequence selected from any one of SEQ ID Nos: 73, 76, and 79; said HCDR2 is as set forth in the amino acid sequence selected from any one of SEQ ID Nos: 74, 77, and 80; said HCDR3 is as set forth in the amino acid sequence selected from any one of SEQ ID Nos: 75, 78, and 81.

In a preferred embodiment, the domain specifically binding to human serum albumin comprises HCDR1, HCDR2, and HCDR3 sequences of SEQ ID NOs: 52, 53, and 54, respectively. In another embodiment, the domain specifically binding to human serum albumin comprises HCDR1, HCDR2, and HCDR3 sequences of SEQ ID NOs: 73, 74, and 75, respectively.

Suitably, the domain specifically binding to human serum albumin comprises a VL CDR having an amino acid sequence of any one of the VL CDRs listed in TABLE 1. In particular, the disclosure provides the multispecific antibody comprising a third domain specifically binding HSA, wherein said domain comprises (or alternatively, consisting of) one, two, three or more VL CDRs having an amino acid sequence of any of the VL CDRs listed in TABLE 1.

Suitably, the domain specifically binding to human serum albumin comprises a light chain variable region (VL), wherein said VL comprises, in sequence, the three complementary determining regions LCDR1, LCDR2 and LCDR3, wherein (a) said LCDR1 is as set forth in the amino acid sequence selected from any one of SEQ ID Nos: 62, 65, and 68; said LCDR2 is as set forth in the amino acid sequence selected from any one of SEQ ID Nos: 63, 66, and 69; and said LCDR3 is as set forth in the amino acid sequence selected from any one of SEQ ID Nos: 64, 67, and 70; or (b) said LCDR1 is as set forth in the amino acid sequence selected from any one of SEQ ID Nos: 83, 86, and 89; said LCDR2 is as set forth in the amino acid sequence selected from any one of SEQ ID Nos: 84, 87, and 90; and said LCDR3 is as set forth in the amino acid sequence selected from any one of SEQ ID Nos: 85, 88, and 91.

In a preferred embodiment, the domain specifically binding to human serum albumin comprises LCDR1, LCDR2, and LCDR3 sequences of SEQ ID NOs: 62, 63, and 64, respectively. In another embodiment, the domain specifically binding to human serum albumin comprises LCDR1, LCDR2, and LCDR3 sequences of SEQ ID NOs: 83, 84, and 85, respectively.

Suitably, the present disclosure provides the multispecific antibody comprising a third domain specifically binding HSA, wherein said third domain comprises a heavy chain variable region (VH) and a light chain variable region (VL), wherein:

(a) said VH comprises, in sequence, the three complementary determining regions HCDR1, HCDR2 and HCDR3, said HCDR1 having the amino acid sequence selected from any one of SEQ ID Nos: 52, 55, and 58, said HCDR2 having the amino acid sequence selected from any one of SEQ ID Nos: 53, 56, and 59, said HCDR3 having the amino acid sequence selected from any one of SEQ ID Nos: 54, 57, and 60; and said VL comprises, in sequence, the three complementary determining regions LCDR1, LCDR2 and LCDR3, said LCDR1 having the amino acid sequence selected from any one of SEQ ID Nos: 62, 65, and 68, said LCDR2 having the amino acid sequence selected from any one of SEQ ID Nos: 63, 66, and 69, said LCDR3 having the amino acid sequence selected from any one of SEQ ID Nos: 64, 67, and 70; or (b) said VH comprises, in sequence, the three complementary determining regions HCDR1, HCDR2 and HCDR3, said HCDR1 having the amino acid sequence selected from any one of SEQ ID Nos: 73, 76, and 79, said HCDR2 having the amino acid sequence selected from any one of SEQ ID Nos: 74, 77, and 80, said HCDR3 having the amino acid sequence selected from any one of SEQ ID Nos: 75, 78, and 81; and said VL comprises, in sequence, the three complementary determining regions LCDR1, LCDR2 and LCDR3, said LCDR1 having the amino acid sequence selected from any one of SEQ ID Nos: 83, 86, and 89, said LCDR2 having the amino acid sequence selected from any one of SEQ ID Nos: 84, 87, and 90, said LCDR3 having the amino acid sequence selected from any one of SEQ ID Nos: 85, 88, and 91.

In a preferred embodiment, the disclosure provides the multispecific antibody comprising a third domain specifically binding HSA, wherein said third domain comprises (a) HCDR1, HCDR2, and HCDR3 sequences of SEQ ID NOs: 52, 53, and 54, respectively, and (b) LCDR1, LCDR2, and LCDR3 sequences of SEQ ID NOs: 62, 63, and 64, respectively. In another embodiment, the disclosure provides the multispecific antibody comprising a third domain specifically binding HSA, wherein said third domain comprises (a) HCDR1, HCDR2, and HCDR3 sequences of SEQ ID NOs: 73, 74, and 75, respectively, and (b) LCDR1, LCDR2, and LCDR3 sequences of SEQ ID NOs: 83, 84, and 85, respectively.

Other domains of the disclosure specifically binding HSA include amino acids that have been mutated, yet have at least 60, 70, 80, 90, 91, 92, 93, 94, 95, 96, 97, 98 or 99 percent identity in the CDR regions with the CDR regions depicted in the sequences described in TABLE 1. Suitably, other domains of the disclosure specifically binding HSA include mutant amino acid sequences wherein no more than 1, 2, 3, 4, 5 or 10 amino acids have been mutated by amino acid deletion, insertion or substitution in the CDR regions when compared with the CDR regions depicted in the sequences described in TABLE 1. Mutations, e.g., substitutions, may potentially be made at any residue within the set of CDRs, and may be within CDR1, CDR2 and/or CDR3.

Suitably, a third domain specifically binding HSA of the multispecific antibody of the present disclosure comprises: a heavy chain variable region (VH) and a light chain variable region (VL), wherein:
(a) said VH comprises, in sequence, the three complementary determining regions HCDR1, HCDR2 and HCDR3, said HCDR1 having the amino acid sequence having at least 60, 70, 80, 90, 91, 92, 93, 94, 95, 96, 97, 98 or 99 percent identity to any one of SEQ ID NOs: 52, 55, and 58; said HCDR2 having the amino acid sequence having at least 60, 70, 80, 90, 91, 92, 93, 94, 95, 96, 97, 98 or 99 percent identity to any one of SEQ ID NOs: 53, 56, and 59; said HCDR3 having the amino acid sequence having at least 60, 70, 80, 90, 91, 92, 93, 94, 95, 96, 97, 98 or 99 percent identity to any one of SEQ ID NOs: 54, 57, and 60; and/or
(b) said VL comprises, in sequence, the three complementary determining regions LCDR1, LCDR2 and LCDR3, said LCDR1 having the amino acid sequence having at least 60, 70, 80, 90, 91, 92, 93, 94, 95, 96, 97, 98 or 99 percent identity to any one of SEQ ID NOs: 62, 65, and 68; said LCDR2 having the amino acid sequence having at least 60, 70, 80, 90, 91, 92, 93, 94, 95, 96, 97, 98 or 99 percent identity to any one of SEQ ID NOs: 63, 66, and 69; said LCDR3 having the amino acid sequence having at least 60, 70, 80, 90, 91, 92, 93, 94, 95, 96, 97, 98 or 99 percent identity to any one of SEQ ID NOs: 64, 67, and 70.

Suitably, the multispecific antibody comprises a third domain specifically binding HSA, wherein said third domain comprises: HCDR1, HCDR2, and HCDR3 having at least 60, 70, 80, 90, 91, 92, 93, 94, 95, 96, 97, 98 or 99 percent identity to sequences of SEQ ID Nos: 52, 53, and 54, respectively, and/or LCDR1, LCDR2, and LCDR3 having at least 60, 70, 80, 90, 91, 92, 93, 94, 95, 96, 97, 98 or 99 percent identity to sequences of SEQ ID NOs: 62, 63, and 64, respectively.

Suitably, a third domain specifically binding HSA of the multispecific antibody of the present disclosure comprises: a heavy chain variable region (VH) and a light chain variable region (VL), wherein:
(a) said VH comprises, in sequence, the three complementary determining regions HCDR1, HCDR2 and HCDR3, said HCDR1 having the amino acid sequence having at least 60, 70, 80, 90, 91, 92, 93, 94, 95, 96, 97, 98 or 99 percent identity to any one of SEQ ID NOs: 73, 76, and 79; said HCDR2 having the amino acid sequence having at least 60, 70, 80, 90, 91, 92, 93, 94, 95, 96, 97, 98 or 99 percent identity to any one of SEQ ID NOs: 74, 77, and 80; said HCDR3 having the amino acid sequence having at least 60, 70, 80, 90, 91, 92, 93, 94, 95, 96, 97, 98 or 99 percent identity to any one of SEQ ID NOs: 75, 78, and 81; and/or
(b) said VL comprises, in sequence, the three complementary determining regions LCDR1, LCDR2 and LCDR3, said LCDR1 having the amino acid sequence having at least 60, 70, 80, 90, 91, 92, 93, 94, 95, 96, 97, 98 or 99 percent identity to any one of SEQ ID NOs: 83, 86, and 89; said LCDR2 having the amino acid sequence having at least 60, 70, 80, 90, 91, 92, 93, 94, 95, 96, 97, 98 or 99 percent identity to any one of SEQ ID NOs: 84, 87, and 90; said LCDR3 having the amino acid sequence having at least 60, 70, 80, 90, 91, 92, 93, 94, 95, 96, 97, 98 or 99 percent identity to any one of SEQ ID NOs: 85, 88, and 91.

Suitably, the multispecific antibody comprises a third domain specifically binding HSA, wherein said third domain comprises: HCDR1, HCDR2, and HCDR3 having at least 60, 70, 80, 90, 91, 92, 93, 94, 95, 96, 97, 98 or 99 percent identity to sequences of SEQ ID Nos: 73, 74, and 75, respectively, and/or LCDR1, LCDR2, and LCDR3 having at least 60, 70, 80, 90, 91, 92, 93, 94, 95, 96, 97, 98 or 99 percent identity to sequences of SEQ ID NOs: 83, 84, and 85, respectively.

In a further embodiment, the disclosure provides the multispecific antibody comprising a third domain specifically binding HSA, wherein said third domain comprises a heavy chain variable region VHC and a light chain variable region VLC.

Suitably, the present disclosure provides the multispecific antibody comprising a third domain specifically binding HSA, wherein said third domain comprises a heavy chain variable region VHC and wherein said VHC is VH1A, VH1B, VH3 or VH4. In one embodiment, a third domain of the present disclosure specifically binding HSA comprises a heavy chain variable region VHC, wherein said VHC is VH4. In a preferred embodiment, a third domain of the present disclosure specifically binding HSA comprises a heavy chain variable region VHC, wherein said VHC is VH3.

Suitably, the present disclosure provides the multispecific antibody comprising a third domain specifically binding HSA, wherein said third domain comprises a light chain variable region VLC and wherein said VLC comprises Vκ frameworks FR1, FR2 and FR3, particularly Vκ1 or Vκ3 FR1 to FR3, preferably Vκ1 frameworks FR1 to FR3, and a framework FR4, which is selected from a Vκ FR4, particularly Vκ1 FR4, Vκ3 FR4, and a Vλ FR4. Suitable Vλ FR4 are as set forth in SEQ ID NO: 97 to SEQ ID NO: 103. In one embodiment, said third domain comprises Vλ FR4 comprising the amino acid sequence having at least 60, 70, 80, 90 percent identity to an amino acid sequence selected from any of SEQ ID NO: 97 to SEQ ID NO: 103, preferably to SEQ ID NO: 97 or SEQ ID NO: 98, more preferably to SEQ ID NO: 97. Suitably, said third domain comprises Vλ FR4 comprising the amino acid sequence selected from any of SEQ ID NO: 97 to SEQ ID NO: 103, preferably Vλ FR4 as set forth in SEQ ID NO: 97 or 98, more preferably Vλ FR4 as set forth in SEQ ID NO: 98.

Thus, in a preferred embodiment, the disclosure provides the multispecific antibody comprising a third domain specifically binding HSA, wherein said third domain comprises:
(a) the HCDR1, HCDR2, and HCDR3 sequences of SEQ ID NOs: 52, 53, and 54, respectively, and the LCDR1, LCDR2, and LCDR3 sequences of SEQ ID NOs: 62, 63, and 64, respectively;
(b) a VHC, wherein said VHC is VH3 or VH4, preferably VH3; and
(c) a VLC comprising a VL framework comprising Vκ frameworks FR1, FR2 and FR3, particularly Vκ1 or Vκ3 FR1 to FR3, preferably Vκ1 FR1 to FR3, and a framework FR4, which is selected from a Vκ FR4, particularly Vκ1 FR4, Vκ3 FR4, and a Vλ FR4, particularly Vλ FR4 comprising the amino acid sequence having at least 60, 70, 80, 90 percent identity to an amino acid sequence selected from any of SEQ ID NO: 97 to SEQ ID NO: 103, preferably Vλ FR4 as set forth in amino acid sequence selected from any one of SEQ ID NO: 97 to SEQ ID NO: 103, preferably Vλ FR4 as set forth in SEQ ID NO: 97 or 98, more preferably Vλ FR4 as set forth in SEQ ID NO: 98.

In a further embodiment, the disclosure provides the multispecific antibody comprising a third domain specifically binding HSA, wherein said third domain comprises:
(i) the HCDR1, HCDR2, and HCDR3 sequences of SEQ ID NOs: 73, 74, and 75, respectively, and the LCDR1, LCDR2, and LCDR3 sequences of SEQ ID Nos: 83, 84, and 85, respectively;
(ii) a VHC, wherein said VHC is VH3 or VH4, preferably VH3; and
(iii) a VLC comprising a VL framework comprising Vκ frameworks FR1, FR2 and FR3, particularly Vκ1 or Vκ3 FR1 to FR3, preferably Vκ1 FR1 to FR3, and a framework FR4, which is selected from a Vκ FR4, particularly Vκ1 FR4, Vκ3 FR4, and a Vλ FR4, particularly Vλ FR4 comprising the amino acid sequence having at least 60, 70, 80, 90 percent identity to an amino acid sequence selected from any of SEQ ID NO: 97 to SEQ ID NO: 103, preferably Vλ FR4 as set forth in amino acid sequence selected from any one of SEQ ID NO: 97 to SEQ ID NO: 103, preferably Vλ FR4 as set forth in SEQ ID NO: 97 or 98, more preferably Vλ FR4 as set forth in SEQ ID NO: 98.

Suitably, the present disclosure provides the multispecific antibody comprising a third domain specifically binding HSA, wherein said third domain comprises a VH listed in TABLE 1. Suitably, the present disclosure also provides the multispecific antibody comprising a third domain specifically binding HSA, wherein said third domain comprises (or alternatively, consisting of) a VH amino acid sequence listed in TABLE 1, wherein no more than about 20 amino acids, preferably no more than about 10 amino acids in a framework sequence (for example, a sequence which is not a CDR) have been mutated (wherein a mutation is, as various non-limiting examples, an addition, substitution or deletion). Other domains of the disclosure specifically binding HSA include amino acids that have been mutated, yet have at least 60, 70, 80, 90, 91, 92, 93, 94, 95, 96, 97, 98 or 99 percent identity in the VH regions with the VH regions depicted in the sequences described in TABLE 1.

Suitably, the present disclosure provides the multispecific antibody comprising a third domain specifically binding HSA, wherein said third domain comprises a VL domain listed in TABLE 1. Suitably, the present disclosure also provides the multispecific antibody comprising a third domain specifically binding HSA, wherein said third domain comprises (or alternatively, consisting of) a VL amino acid sequence listed in TABLE 1, wherein no more than about 20 amino acids, preferably no more than about 10 amino acids in a framework sequence (for example, a sequence which is not a CDR) have been mutated (wherein a mutation is, as various non-limiting examples, an addition, substitution or deletion). Other domains of the disclosure specifically binding to HSA include amino acids that have been mutated, yet have at least 60, 70, 80, 90, 91, 92, 93, 94, 95, 96, 97, 98 or 99 percent identity in the VL regions with the VL regions depicted in the sequences described in TABLE 1.

In one embodiment, the disclosure provides the multispecific antibody comprising a third domain specifically binding HSA, wherein said third domain comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 61, and in particular wherein said domain comprises HCDR1, HCDR2, and HCDR3 sequences of SEQ ID NOs: 52, 53, and 54, respectively.

In another embodiment, the disclosure provides the multispecific antibody comprising a third domain specifically binding HSA, wherein said third domain comprises a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NOs: 71, and in particular wherein said domain comprises LCDR1, LCDR2, and LCDR3 sequences of SEQ ID NOs: 62, 63, and 64, respectively.

In a further embodiment, the disclosure provides the multispecific antibody comprising a third domain specifically binding HSA, wherein said third domain comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 61; and a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 71.

In a preferred embodiment, the present disclosure provides the multispecific antibody comprising a third domain specifically binding HSA, wherein said third domain comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 61; and a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 71, and wherein said domain comprises HCDR1, HCDR2, and HCDR3 sequences of SEQ ID NOs: 52, 53, and 54, respectively, and/or LCDR1, LCDR2, and LCDR3 sequences of SEQ ID NOs: 62, 63, and 64, respectively, preferably wherein said domain comprises HCDR1, HCDR2, and HCDR3 sequences of SEQ ID NOs: 52, 53, and 54, respectively, and LCDR1, LCDR2, and LCDR3 sequences of SEQ ID NOs: 62, 63, and 64, respectively.

In a specific embodiment, the disclosure provides the multispecific antibody comprising a third domain specifically binding HSA, wherein said third domain comprises a VH comprising an amino acid sequence SEQ ID NO: 61, and/or a VL thereof comprising an amino acid sequence SEQ ID NO: 71. In a preferred embodiment, the third domain specifically binding HSA comprises a VH sequence of SEQ ID NO: 61 and a VL sequence of SEQ ID NO: 71.

In yet another embodiment, the disclosure provides the multispecific antibody comprising a third domain specifically binding HSA, wherein said third domain comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 82, and in particular wherein said domain comprises HCDR1, HCDR2, and HCDR3 sequences of SEQ ID NOs: 73, 74, and 75, respectively.

In another embodiment, the disclosure provides the multispecific antibody comprising a third domain specifically binding HSA, wherein said third domain comprises a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 92, and in particular wherein said domain comprises LCDR1, LCDR2, and LCDR3 sequences of SEQ ID NOs: 83, 84, and 85, respectively.

In a further embodiment, the disclosure provides the multispecific antibody comprising a third domain specifically binding HSA, wherein said third domain comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 82; and a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 92.

In a preferred embodiment, the present disclosure provides the multispecific antibody comprising a third domain specifically binding HSA, wherein said third domain comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 82; and a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 92, and wherein said domain comprises HCDR1, HCDR2, and HCDR3 sequences of SEQ ID NOs: 73, 74, and 75, respectively, and/or LCDR1, LCDR2, and LCDR3 sequences of SEQ ID NOs: 83, 84, and 85, respectively, preferably wherein said domain comprises HCDR1, HCDR2, and HCDR3 sequences of SEQ ID NOs: 73, 74, and 75, respectively, and LCDR1, LCDR2, and LCDR3 sequences of SEQ ID NOs: 83, 84, and 85, respectively.

In a specific embodiment, the disclosure provides the multispecific antibody comprising a third domain specifically binding HSA, wherein said third domain comprises a VH comprising an amino acid sequence SEQ ID NO: 82, and/or a VL thereof comprising an amino acid sequence SEQ ID NO: 92. In a preferred embodiment, the third domain specifically binding HSA comprises a VH sequence of SEQ ID NO: 82 and a VL sequence of SEQ ID NO: 92.

In one embodiment, a domain that specifically binds to human serum albumin is a domain that is described in TABLE 1. In one embodiment, a domain that specifically binds to HSA comprises an amino acid sequence that is at least 60, 70, 80, 90, 91, 92, 93, 94, 95, 96, 97, 98 or 99 percent, preferably at least 90 percent, identical to the amino acid sequence selected from the group consisting of SEQ ID NOs: 72 and 93, preferably SEQ ID NO: 72. In one embodiment, a domain that specifically binds to HSA is as set forth in SEQ ID NO: 72 or SEQ ID NO: 93, preferably SEQ ID NO: 72.

Other domains of the disclosure having a binding specificity for HSA include those wherein the amino acids or nucleic acids encoding the amino acids have been mutated, yet have at least 60, 70, 80, 90 or 95 percent identity to the sequences described in TABLE 1. In one embodiment, it includes mutant amino acid sequences wherein no more than 1, 2, 3, 4 or 5 amino acids have been mutated in the variable regions when compared with the variable regions depicted in the sequence described in TABLE 1, while retaining substantially the same activity.

In yet another embodiment, the present disclosure provides the multispecific antibody comprising a third domain specifically binding, wherein said third domain comprises amino acid sequences that are homologous to the sequences described in TABLE 1, and said domain binds to human serum albumin, and retains the desired functional properties of those domains described in TABLE 1.

In one embodiment, a domain of the disclosure specifically binding HSA has a heavy chain variable region comprising HCDR1, HCDR2, and HCDR3 sequences and a light chain variable region comprising LCDR1, LCDR2, and LCDR3 sequences, wherein one or more of these CDR sequences have specified amino acid sequences based on the domains described herein or conservative modifications thereof, and wherein the domains retain the desired functional properties of the antibodies of the disclosure.

Accordingly, the disclosure provides the multispecific antibody comprising a third domain specifically binding HSA, wherein said third domain comprises (or consists of):
  a heavy chain variable region (VH) comprising, in sequence, the three complementary determining regions HCDR1, HCDR2 and HCDR3, wherein said HCDR1 is amino acid sequence SEQ ID No: 52, or a conservative variant thereof; said HCDR2 is amino acid sequence SEQ ID No: 53, or a conservative variant thereof; said HCDR3 is amino acid sequence selected from any one of SEQ ID No: 54, or a conservative variant thereof; and
  a light chain variable region (VL) comprising, in sequence, the three complementary determining regions LCDR1, LCDR2 and LCDR3, wherein said LCDR1 is amino acid sequence SEQ ID No: 62, or a conservative variant thereof; said LCDR2 is amino acid sequence SEQ ID No: 63, or a conservative variant thereof; said LCDR3 having the amino acid sequence SEQ ID No: 64, or a conservative variant thereof;
  wherein said domain specifically binds to human serum albumin.

The disclosure also provides the multispecific antibody comprising a third domain specifically binding HSA, wherein said third domain comprises (or consists of):
  a heavy chain variable region (VH) comprising, in sequence, the three complementary determining regions HCDR1, HCDR2 and HCDR3, wherein said HCDR1 is amino acid sequence SEQ ID No: 73, or a conservative variant thereof; said HCDR2 is amino acid sequence SEQ ID No: 74, or a conservative variant thereof; said HCDR3 is amino acid sequence selected from any one of SEQ ID No: 75, or a conservative variant thereof; and
  a light chain variable region (VL) comprising, in sequence, the three complementary determining regions LCDR1, LCDR2 and LCDR3, wherein said LCDR1 is amino acid sequence SEQ ID No: 83, or a conservative variant thereof; said LCDR2 is amino acid sequence SEQ ID No: 84, or a conservative variant thereof; said LCDR3 having the amino acid sequence SEQ ID No: 85, or a conservative variant thereof;
  wherein said domain specifically binds to human serum albumin.

Further Domains of the Multispecific Antibody of the Present Disclosure

Suitable domains for use in the multispecific antibody of the present disclosure in addition include, but are not limited to, the antibodies or binding domains thereof whose sequences are listed in TABLE 1 and which were further modified (modified versions thereof).

In one embodiment, the multispecific antibody comprises a first domain specifically binding IL-17A and a second domain specifically binding TNFα, wherein said first domain is optimized for expression in a mammalian cell, and has a heavy chain variable region and a light chain variable region, wherein one or more of these sequences have specified amino acid sequences based on the domains described herein or conservative modifications thereof, and wherein the domains retain the desired functional properties of the domains of the disclosure.

In one embodiment, the multispecific antibody comprises a first domain specifically binding IL-17A and a second domain specifically binding TNFα, wherein said second domain is optimized for expression in a mammalian cell, and has a heavy chain variable region and a light chain variable region, wherein one or more of these sequences have specified amino acid sequences based on the domains described herein or conservative modifications thereof, and wherein the domains retain the desired functional properties of the domains of the disclosure.

In one embodiment, the multispecific antibody comprises a third domain specifically binding HSA, wherein said third domain is optimized for expression in a mammalian cell and has a heavy chain variable region and a light chain variable region, wherein one or more of these sequences have specified amino acid sequences based on the domains described herein or conservative modifications thereof, and wherein the domains retain the desired functional properties of the domains of the disclosure.

As used herein, the term, "optimized" means that a nucleotide sequence has been altered to encode an amino acid sequence using codons that are preferred in the production cell or organism, generally a eukaryotic cell, for example, a cell of *Pichia*, a Chinese Hamster Ovary cell (CHO) or a human cell. The optimized nucleotide sequence is engineered to retain completely or as much as possible the amino acid sequence originally encoded by the starting nucleotide sequence, which is also known as the "parental" sequence. The optimized sequences herein have been engineered to have codons that are preferred in mammalian cells. However, optimized expression of these sequences in other eukaryotic cells or prokaryotic cells is also envisioned herein. The amino acid sequences encoded by optimized nucleotide sequences are also referred to as optimized.

Accordingly, the disclosure provides the multispecific antibody comprising a first domain specifically binding IL-17A and a second domain specifically binding TNFα, wherein said first domain is optimized for expression in a mammalian cell, comprising a heavy chain variable region and a light chain variable region wherein: the heavy chain variable region comprises an amino acid sequence selected from any of SEQ ID NOs: 10 and 11, and conservative modifications thereof; and the light chain variable region comprises an amino acid sequence selected from any of SEQ ID NOs: 21 and 22, and conservative modifications thereof; wherein said first domain specifically binds to human IL-17A and/or neutralize IL-17A.

Accordingly, the disclosure provides the multispecific antibody comprising a first domain specifically binding IL-17A and a second domain specifically binding TNFα, wherein said second domain is optimized for expression in a mammalian cell comprising a heavy chain variable region and a light chain variable region wherein: the heavy chain variable region comprises an amino acid sequence selected from any of SEQ ID NOs: 34, 35, 36 and 37, and conservative modifications thereof; and the light chain variable region comprises an amino acid sequence selected from any of SEQ ID NOs: 47, 48, 49, 50 and 51, and conservative modifications thereof; wherein said domain specifically binds to human TNFα and/or neutralize TNFα.

Accordingly, the disclosure provides the multispecific antibody comprising a third domain specifically binding HSA, wherein said third domain is optimized for expression in a mammalian cell comprising a heavy chain variable region and a light chain variable region wherein: the heavy chain variable region comprises an amino acid sequence selected from any of SEQ ID NO: 61, and SEQ ID NO: 82, and conservative modifications thereof; and the light chain variable region comprises an amino acid sequence selected from any of SEQ ID NO: 71, and SEQ ID NO: 92, and conservative modifications thereof; wherein said domain specifically binds to human serum albumin.

Another type of variable region modification is to mutate amino acid residues within the VH and/or VL CDR1, CDR2 and/or CDR3 regions to thereby improve one or more binding properties (e.g., affinity) of the antibody of interest, known as "affinity maturation". Site-directed mutagenesis or PCR-mediated mutagenesis can be performed to introduce the mutation(s) and the effect on antibody binding, or other functional property of interest, can be evaluated in in vitro or in vivo assays as described herein and provided in the Examples. Conservative modifications (as discussed above) can be introduced. The mutations may be amino acid substitutions, additions or deletions. Moreover, typically no more than one, two, three, four or five residues within a CDR region are altered.

An "affinity-matured" antibody is one with one or more alterations in one or more variable domains thereof that result in an improvement in the affinity of the antibody for antigen, compared to a parent antibody that does not possess those alteration(s). In one embodiment, an affinity-matured antibody has nanomolar or even picomolar affinities for the target antigen. Affinity-matured antibodies are produced by procedures known in the art. For example, Marks et al, Bio/Technology 10:779-783 (1992) describes affinity maturation by VH- and VL-domain shuffling. Random mutagenesis of HVR and/or framework residues is described by, for example: Barbas et al. Proc Natl. Acad. Sci. U.S.A 91:3809-3813 (1994); Schier et al. Gene 169:147-155 (1995); Jackson et al, J. Immunol. 154(7):3310-9 (1995); and Hawkins et al, J. Mol. Biol. 226:889-896 (1992). Accordingly, the disclosure provides the multispecific antibody comprising a first domain specifically binding IL-17A and a second domain specifically binding TNFα, wherein said first domain is an affinity-matured domain and/or said second domain is an affinity-matured domain. In a further embodiment, the disclosure provides the multispecific antibody further comprising a third domain specifically binding HSA, wherein said third domain is an affinity-matured domain.

An antibody of the disclosure further can be prepared using an antibody having one or more of the VH and/or VL sequences shown herein as starting material to engineer a modified antibody, which modified antibody may have altered properties from the starting antibody. An antibody can be engineered by modifying one or more residues within one or both variable regions (i.e., VH and/or VL), for example within one or more CDR regions and/or within one or more framework regions. Additionally or alternatively, an antibody can be engineered by modifying residues within the constant region(s), for example to alter the effector function(s) of the antibody.

One type of variable region engineering that can be performed is CDR grafting. Antibodies interact with target antigens predominantly through amino acid residues that are located in the six heavy and light chain complementarity determining regions (CDRs). For this reason, the amino acid sequences within CDRs are more diverse between individual antibodies than sequences outside of CDRs. Because CDR sequences are responsible for most antibody-antigen interactions, it is possible to express recombinant antibodies that mimic the properties of specific naturally occurring antibodies by constructing expression vectors that include CDR sequences from the specific naturally occurring antibody grafted onto framework sequences from a different antibody with different properties (see, e.g., Riechmann, L. et al., 1998 Nature 332:323-327; Jones, P. et al., 1986 Nature 321:522-525; Queen, C. et al., 1989 Proc. Natl. Acad. Sci. U.S.A. 86: 10029-10033; U.S. Pat. No. 5,225,539 to Winter, and U.S. Pat. Nos. 5,530,101; 5,585,089; 5,693,762 and 6,180,370 to Queen et al.).

Such framework sequences can be obtained from public DNA databases or published references that include germline antibody gene sequences or rearranged antibody sequences. For example, germline DNA sequences for human heavy and light chain variable region genes can be found in the "VBase" human germline sequence database (available on the Internet at www.mrc-cpe.cam.ac.uk/vbase), as well as in Kabat, E. A., et al., 1991 Sequences of Proteins of Immunological Interest, Fifth Edition, U.S. Department of Health and Human Services, NIH Publication No. 91-3242; Tomlinson, I. M., et al., 1992 J. fol. Biol. 227:776-798; and Cox, J. P. L. et al., 1994 Eur. J Immunol. 24:827-836; the contents of each of which are expressly incorporated herein by reference. For example, germline DNA sequences for human heavy and light chain variable region genes and rearranged antibody sequences can be found in "IMGT" database (available on the Internet at www.imgt.org; see Lefranc, M. P. et al., 1999 Nucleic Acids Res. 27:209-212; the contents of each of which are expressly incorporated herein by reference).

An example of framework sequences for use in the binding domains of the multispecific antibodies of the disclosure are those that are structurally similar to the framework sequences used by selected domains of the disclosure, e.g., consensus sequences and/or framework sequences used by domains of the disclosure. The VH CDR1, 2 and 3 sequences, and the VL CDR1, 2 and 3 sequences, can be grafted onto framework regions that have the identical sequence as that found in the germline immunoglobulin gene from which the framework sequence derive, or the CDR sequences can be grafted onto framework regions that contain one or more mutations as compared to the germline sequences. For example, it has been found that in certain instances it is beneficial to mutate residues within the framework regions to maintain or enhance the antigen binding ability of the antibody (see e.g., U.S. Pat. Nos. 5,530,101; 5,585,089; 5,693,762 and 6,180, 370 to Queen et al).

Exemplary Multispecific Antibodies of the Present Disclosure

In a specific embodiment, the disclosure provides the multispecific antibody comprising a first domain specifically binding IL-17A, a second domain specifically binding TNFα, and, optionally, a third domain specifically binding to HSA, wherein (i) said first domain comprises HCDR1, HCDR2, and HCDR3 sequences of SEQ ID NOs: 1, 2, and 3, respectively, and LCDR1, LCDR2, and LCDR3 sequences of SEQ ID NOs: 12, 13, and 14, respectively, and (ii) said second domain comprises HCDR1, HCDR2, and HCDR3 sequences of SEQ ID NOs: 25, 26, and 27, respectively, and LCDR1, LCDR2, and LCDR3 sequences of SEQ ID NOs: 38, 39, and 40, respectively, and (iii) optionally, said third domain comprises HCDR1, HCDR2, and HCDR3 sequences of SEQ ID NOs: 52, 53, and 54, respectively, and LCDR1, LCDR2, and LCDR3 sequences of SEQ ID NOs: 62, 63, and 64, respectively.

In a more specific embodiment, the disclosure provides the multispecific antibody comprising a first domain specifically binding IL-17A, a second domain specifically binding TNFα, and, optionally, a third domain specifically binding to HSA, wherein
 (i) said first domain specifically binding IL-17A of the multispecific antibody of the present disclosure comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 10; and a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 21, and wherein said domain comprises HCDR1, HCDR2, and HCDR3 sequences of SEQ ID NOs: 1, 2, and 3, respectively, and LCDR1, LCDR2, and LCDR3 sequences of SEQ ID NOs: 12, 13, and 14, respectively; and
 (ii) said second domain specifically binding TNFα comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 34; and a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 47, and wherein said domain comprises HCDR1, HCDR2, and HCDR3 sequences of SEQ ID NOs: 25, 26, and 27, respectively, and LCDR1, LCDR2, and LCDR3 sequences of SEQ ID NOs: 38, 39, and 40, respectively; and
 (iii) optionally, said third domain comprises a heavy chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 61; and a light chain variable region comprising an amino acid sequence that is at least 60, 70, 80, 90, 91, 92, 93, 94, 95, 96, 97, 98 or 99 percent, preferably at least 90 percent, identical to the amino acid sequence SEQ ID NO: 71, and wherein said domain comprises HCDR1, HCDR2, and HCDR3 sequences of SEQ ID NOs: 52, 53, and 54, respectively, and LCDR1, LCDR2, and LCDR3 sequences of SEQ ID NOs: 62, 63, and 64, respectively.

In a specific embodiment, the disclosure provides the multispecific antibody comprising a first domain specifically binding IL-17A, a second domain specifically binding TNFα and a third domain specifically binding to HSA, wherein said multispecific antibody comprises an amino acid sequence having at least 60, 70, 80, 90, 91, 92, 93, 94, 95, 96, 97, 98 or 99 percent identity, preferably at least 80% identity, more preferably at least 90% identity, to the sequence selected from any of SEQ ID NOs: 112, 113, 114, 115, 116, 117, 118, 119, 120, 121, 122, 123, and 124, preferably SEQ ID NO: 119, in particular wherein
 (a) said first binding domain comprises HCDR1, HCDR2, and HCDR3 sequences of SEQ ID NOs: 1, 2, and 3, respectively, and LCDR1, LCDR2, and LCDR3 sequences of SEQ ID NOs: 12, 13, and 14, respectively;

(b) said second binding domain comprises HCDR1, HCDR2, and HCDR3 sequences of SEQ ID NOs: 25, 26, and 27, respectively, and LCDR1, LCDR2, and LCDR3 sequences of SEQ ID NOs: 38, 39, and 40, respectively; and (c) said third binding domain comprises HCDR1, HCDR2, and HCDR3 sequences of SEQ ID NOs: 52, 53, and 54, respectively, and LCDR1, LCDR2, and LCDR3 sequences of SEQ ID NOs: 62, 63, and 64, respectively.

In a more specific embodiment, the disclosure provides the multispecific antibody comprising a first domain specifically binding IL-17A, a second domain specifically binding TNFα and a third domain specifically binding to HSA, wherein said multispecific antibody comprises (or consists of) an amino acid sequence selected from any of SEQ ID NOs: 112, 113, 114, 115, 116, 117, 118, 119, 120, 121, 122, 123, and 124, preferably SEQ ID NO: 119.

Additional Multispecific Molecules of the Disclosure

The present disclosure also provides an antibody which is a multispecific molecule comprising an anti-IL-17A antibody of the present disclosure and at least another specificity, e.g., bispecific molecule, trispecific molecule, tetraspecific, pentaspecific, hexaspecific molecule.

The term "multispecific molecule" or "multispecific antibody" as used herein, refers to an antibody that binds to two or more different epitopes on at least two or more different targets (e.g., IL-17A and another target different from IL-17A), or binds to two or more different epitopes of the same target.

The term "multispecific molecule" includes bispecific, trispecific, tetraspecific, pentaspecific and hexaspecific antibodies. The term "bispecific antibody" as used herein, refers to an antibody that binds to two different epitopes on two different targets or on the same target. The term "trispecific antibody" as used herein, refers to an antibody that binds to three different epitopes on three different targets or on the same target.

An antibody of the disclosure can be derivatized or linked to another functional molecule, e.g., another peptide or protein (e.g., another antibody or ligand for a receptor) to generate a multispecific molecule that binds to at least two binding sites and/or different target molecules. The antibody of the disclosure may in fact be derivatized or linked to more than one other functional molecule to generate multispecific molecules that bind to more than two different binding sites and/or target molecules. To create a multispecific molecule of the disclosure, an antibody of the disclosure can be functionally linked (e.g., by chemical coupling, genetic fusion, noncovalent association or otherwise) to one or more other binding molecules, such as another antibody, peptide or binding mimetic, such that a multispecific molecule results.

Accordingly, the present disclosure includes multispecific molecules comprising at least one first binding specificity for IL-17A and a second binding specificity for a second target epitope. For example, the second target epitope is present on another target molecule different from IL-17A. Accordingly, the present disclosure includes multispecific molecules comprising at least one first binding specificity for IL-17A and a second binding specificity for a second target epitope. For example, the second target epitope is another epitope of IL-17A different from the first target epitope. The multispecific molecule can further include a third binding specificity, in addition to the first and second target epitope.

In a further embodiment, the present disclosure includes multispecific molecules monovalent, bivalent or multivalent for IL-17A specificity, preferably monovalent.

In another particular embodiment of the present disclosure, the antibody of the present disclosure is a monovalent or multivalent for IL-17A specificity molecule, e.g., bivalent, trivalent, tetravalent, pentavalent, hexavalent.

The term "monovalent molecule" or "monovalent antibody", as used herein, refers to an antibody that has a single antigen-binding moiety that binds to a single epitope on a target molecule, such as IL-17A.

The term "multivalent antibody" refers to a single binding molecule with more than one valency, where "valency" is described as the number of antigen-binding moieties that binds to epitopes on identical target molecules. As such, the single binding molecule can bind to more than one target molecule, or more than one binding site on a target molecule that contains multiple copies of the epitope. Examples of multivalent antibodies include, but are not limited to bivalent antibodies, trivalent antibodies, tetravalent antibodies, pentavalent antibodies, and the like. The term "bivalent antibody" as used herein, refers to an antibody that has two antigen binding moieties, each of which binds to an identical epitope.

Suitably, the multispecific molecule of the present disclosure, e.g., bispecific molecule, and/or a multivalent molecule, e.g., monovalent for IL-17A specificity molecule, bivalent for IL-17A specificity molecule, is an antibody format selected from any suitable multispecific, e.g. bispecific, format known in the art, including, by way of non-limiting example, formats based on a single-chain diabody (scDb), a tandem scDb (Tandab), a linear dimeric scDb (LD-scDb), a circular dimeric scDb (CD-scDb), a bispecific T-cell engager (BiTE; tandem di-scFv), a tandem tri-scFv, a tribody (Fab-(scFv)$_2$) or bibody (Fab-(scFv)$_1$), Fab, Fab-Fv$_2$, Morrison (IgG CH3-scFv fusion (Morrison L) or IgG CL-scFv fusion (Morrison H)), triabody, scDb-scFv, bispecific Fab$_2$, di-miniantibody, tetrabody, scFv-Fc-scFv fusion, scFv-HSA-scFv fusion, di-diabody, DVD-Ig, COVD, IgG-scFab, scFab-dsscFv, Fv$_2$-Fc, IgG-scFv fusions, such as bsAb (scFv linked to C-terminus of light chain), Bs1Ab (scFv linked to N-terminus of light chain), Bs2Ab (scFv linked to N-terminus of heavy chain), Bs3Ab (scFv linked to C-terminus of heavy chain), Ts1Ab (scFv linked to N-terminus of both heavy chain and light chain), Ts2Ab (dsscFv linked to C-terminus of heavy chain), bispecific antibodies based on heterodimeric Fc domains, such as Knob-into-Hole antibodies (KiHs) (bispecific IgGs prepared by the KiH technology); an Fv, scFv, scDb, tandem-di-scFv, tandem tri-scFv, Fab-(scFv)$_2$, Fab-(scFv)$_1$, Fab, Fab-Fv$_2$, COVD fused to the N- and/or the C-terminus of either chain of a heterodimeric Fc domain or any other heterodimerization domain, a MATCH (described in WO 2016/0202457; Egan T., et al., mAbs 9 (2017) 68-84) and DuoBodies (bispecific IgGs prepared by the Duobody technology) (MAbs. 2017 February/March; 9(2):182-212. doi: 10.1080/19420862.2016.1268307). Particularly suitable for use herein is a single-chain diabody (scDb) or scDb-scFv.

The term "diabodies" refers to antibody fragments with two antigen-binding sites, which fragments comprise a VH connected to VL in the same polypeptide chain (VH-VL). By using a linker that is too short to allow pairing between the two domains on the same chain, the domains are forced to pair with the complementary domains of another chain to create two antigen-binding sites. Diabodies may be bivalent or bispecific. Diabodies are described more fully in, for example, EP404097, WO 93/01161, Hudson et al., Nat.

Med. 9:129-134 (2003), and Holliger et al., Proc. Natl. Acad. Sci. U.S.A. 90: 6444-6448 (1993). Triabodies and tetrabodies are also described in Hudson et al., Nat. Med. 9:129-134 (2003). The term "scDb-scFv" refers to an antibody format, wherein a single-chain Fv (scFv) fragment is fused by a flexible Gly-Ser linker to a single-chain diabody (scDb).

The bispecific scDb, in particular the bispecific monomeric scDb, particularly comprises two variable heavy chain domains (VH) or fragments thereof and two variable light chain domains (VL) or fragments thereof connected by linkers L1, L2 and L3 in the order VHA-L1-VLB-L2-VHB-L3-VLA, VHA-L1-VHB-L2-VLB-L3-VLA, VLA-L1-VLB-L2-VHB-L3-VHA, VLA-L1-VHB-L2-VLB-L3-VHA, VHB-L1-VLA-L2-VHA-L3-VLB, VHB-L1-VHA-L2-VLA-L3-VLB, VLB-L1-VLA-L2-VHA-L3-VHB or VLB-L1-VHA-L2-VLA-L3-VHB, wherein the VLA and VHA domains jointly form the antigen binding site for the first antigen, and VLB and VHB jointly form the antigen binding site for the second antigen.

The linker L1 particularly is a peptide of 2-10 amino acids, more particularly 3-7 amino acids, and most particularly 5 amino acids, and linker L3 particularly is a peptide of 1-10 amino acids, more particularly 2-7 amino acids, and most particularly 5 amino acids. The middle linker L2 particularly is a peptide of 10-40 amino acids, more particularly 15-30 amino acids, and most particularly 20-25 amino acids.

In one embodiment, the multispecific and/or multivalent molecules of the present disclosure is in a MATCH format described in WO 2016/0202457; Egan T., et al., mAbs 9 (2017) 68-84.

Multispecific and/or multivalent molecules of the present disclosure can be produced using any convenient antibody manufacturing method known in the art (see, e.g., Fischer, N. & Leger, O., Pathobiology 74 (2007) 3-14 with regard to the production of bispecific constructs; Hornig, N. & Färber-Schwarz, A., Methods Mol. Biol. 907 (2012)713-727, and WO 99/57150 with regard to bispecific diabodies and tandem scFvs). Specific examples of suitable methods for the preparation of the bispecific construct of the present disclosure further include, inter alia, the Genmab (see Labrijn et al., Proc. Natl. Acad. Sci. U.S.A. 110 (2013) 5145-5150) and Merus (see de Kruif et al., Biotechnol. Bioeng. 106 (2010) 741-750) technologies. Methods for production of bispecific antibodies comprising a functional antibody Fc part are also known in the art (see, e.g., Zhu et al., Cancer Lett. 86 (1994) 127-134); and Suresh et al., Methods Enzymol. 121 (1986) 210-228).

Other antibodies which can be employed in the multispecific and in the multivalent molecules of the disclosure are murine, chimeric and humanized monoclonal antibodies.

The multispecific molecules of the present disclosure can be prepared by conjugating the constituent binding specificities, using methods known in the art. For example, each binding specificity of the bispecific molecule can be generated separately and then conjugated to one another. When the binding specificities are proteins or peptides, a variety of coupling or cross-linking agents can be used for covalent conjugation. Examples of cross-linking agents include protein A, carbodiimide, N-succinimidyl-5-acetyl-thioacetate (SATA), 5,5'-dithiobis (2-nitrobenzoic acid) (DTNB), o-phenylenedimaleimide (oPDM), N-succinimidyl-3-(2-pyridyldithio)propionate (SPDP), and sulfosuccinimidyl 4-(N-maleimidomethyl)cyclohaxane-1-carboxylate (sulfo-SMCC) (see e.g., Karpovsky et al., 1984 J. Exp. Med. 160: 1686; Liu, M A et al., 1985 Proc. Natl. Acad. Sci. U.S.A. 82:8648). Other methods include those described in Paulus, 1985 Behring Ins. Mitt. No. 78, 118-132; Brennan et al., 1985 Science 229:81-83), and Glennie et al., 1987 J. Immunol. 139: 2367-2375). Conjugating agents are SATA and sulfo-SMCC, both available from Pierce Chemical Co. (Rockford, 111).

When the binding specificities are antibodies, they can be conjugated by sulfhydryl bonding of the C-terminus hinge regions of the two heavy chains. In a particularly embodiment, the hinge region is modified to contain an odd number of sulfhydryl residues, for example one, prior to conjugation.

Alternatively, two or more binding specificities can be encoded in the same vector and expressed and assembled in the same host cell. This method is particularly useful where the bispecific molecule is a mAb X mAb, mAb X Fab, Fab X F (ab')$_2$ or ligand X Fab fusion protein. Suitably, the multispecific molecule of the present disclosure can be a single chain molecule comprising one single chain antibody and a binding determinant, or a single chain multispecific molecule comprising two binding determinants. Multispecific molecules may comprise at least two single chain molecules. Methods for preparing multispecific molecules are described for example in U.S. Pat. Nos. 5,260,203; 5,455,030; 4,881,175; 5,132,405; 5,091,513; 5,476,786; 5,013,653; 5,258,498; and 5,482,858.

Binding of the multispecific molecules to their specific targets can be confirmed by, for example, enzyme-linked immunosorbent assay (ELISA), radioimmunoassay (REA), FACS analysis, bioassay (e.g., growth inhibition), or Western Blot assay. Each of these assays generally detects the presence of protein-antibody complexes of particular interest by employing a labeled reagent (e.g., an antibody) specific for the complex of interest.

Nucleic Acids, Vectors, Hosts Cells and Methods of Production of the Present Disclosure In a further aspect, the disclosure provides a nucleic acid encoding an antibody of the disclosure or a fragment or antigen-binding fragment thereof. The present disclosure also provides nucleic acid sequences that encode CDRs, VH, VL, and antigen-binding fragments thereof that specifically bind to IL-17A protein. The present disclosure also provides nucleic acid sequences that encode CDRs, VH, VL, and antigen-binding fragments thereof that specifically bind to TNFα protein. The present disclosure also provides nucleic acid sequences that encode CDRs, VH, VL, and antigen-binding fragments thereof that specifically bind to HSA protein. Such nucleic acid sequences can be optimized for expression in mammalian cells.

The term "nucleic acid" is used herein interchangeably with the term "polynucleotide" and refers to deoxyribonucleotides or ribonucleotides and polymers thereof in either single- or double-stranded form. The term encompasses nucleic acids containing known nucleotide analogs or modified backbone residues or linkages, which are synthetic, naturally occurring, and non-naturally occurring, which have similar binding properties as the reference nucleic acid, and which are metabolized in a manner similar to the reference nucleotides. Examples of such analogs include, without limitation, phosphorothioates, phosphoramidates, methyl phosphonates, chiral-methyl phosphorates, 2-O-methyl ribonucleotides, peptide-nucleic acids (PNAs). Unless otherwise indicated, a particular nucleic acid sequence also implicitly encompasses conservatively modified variants thereof (e.g., degenerate codon substitutions) and complementary sequences, as well as the sequence explicitly indicated. Specifically, as detailed below, degenerate codon substitutions may be achieved by generating sequences in which the third position of one or more selected (or all) codons is substituted with mixed-base and/or deoxyinosine residues (Batzer et al., Nucleic Acid Res. 19:5081, 1991; Ohtsuka et al., J. Biol. Chem. 260:2605-2608, 1985; and Rossolini et al., Mol. Cell. Probes 8:91-98, 1994).

The disclosure provides substantially purified nucleic acid molecules which encode polypeptides comprising segments or domains of the multispecific antibody chains described above and/or segments or domains of the IL-17A-binding antibody chains described above. When expressed from appropriate expression vectors, polypeptides encoded by these nucleic acid molecules are capable of exhibiting IL-17A and/or TNFα and/or HSA antigen binding capacity.

Also provided in the disclosure are polynucleotides which encode at least one CDR region and usually all three CDR regions from the heavy or light chain of the IL-17A-binding antibody set forth in TABLE 1, of the TNFα-binding domain set forth in TABLE 1, or of the HSA-binding domain set forth in TABLE 1. Some other polynucleotides encode all or substantially all of the variable region sequence of the heavy chain and/or the light chain of the IL-17A-binding antibody set forth in TABLE 1, of the TNFα-binding domain set forth in TABLE 1 or of the HSA-binding domain set forth in TABLE 1. Because of the degeneracy of the code, a variety of nucleic acid sequences will encode each of the immunoglobulin amino acid sequences.

The polynucleotide sequences can be produced by de novo solid-phase DNA synthesis or by PCR mutagenesis of an existing sequence (e.g., sequences as described in the Examples below) encoding an IL-17A-binding antibody set forth in TABLE 1, a TNFα-binding domain set forth in TABLE 1 or an HSA-binding domain set forth in TABLE 1. Direct chemical synthesis of nucleic acids can be accomplished by methods known in the art, such as the phosphotriester method of Narang et al., 1979, Meth. Enzymol. 68:90; the phosphodiester method of Brown et al., Meth. Enzymol. 68: 109, 1979; the diethylphosphoramidite method of Beaucage et al., Tetra. Lett., 22: 1859, 1981; and the solid support method of U.S. Pat. No. 4,458,066. Introducing mutations to a polynucleotide sequence by PCR can be performed as described in, e.g., PCR Technology: Principles and Applications for DNA Amplification, H. A. Erlich (Ed.), Freeman Press, NY, N.Y., 1992; PCR Protocols: A Guide to Methods and Applications, Innis et al. (Ed.), Academic Press, San Diego, Calif., 1990; Mattila et al., Nucleic Acids Res. 19:967, 1991; and Eckert et al., PCR Methods and Applications 1:17, 1991.

Also provided in the disclosure are expression vectors and host cells for producing the antibody of the disclosure.

The term "vector" is intended to refer to a polynucleotide molecule capable of transporting another polynucleotide to which it has been linked. One type of vector is a "plasmid", which refers to a circular double stranded DNA loop into which additional DNA segments may be ligated. Another type of vector is a viral vector, wherein additional DNA segments may be ligated into the viral genome. Certain vectors are capable of autonomous replication in a host cell into which they are introduced (e.g., bacterial vectors having a bacterial origin of replication and episomal mammalian vectors). Other vectors (e.g., non-episomal mammalian vectors) can be integrated into the genome of a host cell upon introduction into the host cell, and thereby are replicated along with the host genome.

Moreover, certain vectors are capable of directing the expression of genes to which they are operatively linked. Such vectors are referred to herein as "recombinant expression vectors" (or simply, "expression vectors"). In general, expression vectors of utility in recombinant DNA techniques are often in the form of plasmids. In the present specification, "plasmid" and "vector" may be used interchangeably as the plasmid is the most commonly used form of vector. However, the disclosure is intended to include such other forms of expression vectors, such as viral vectors (e.g., replication defective retroviruses, adenoviruses and adeno-associated viruses), which serve equivalent functions.

The term "operably linked" refers to a functional relationship between two or more polynucleotide (e.g., DNA) segments. Typically, it refers to the functional relationship of a transcriptional regulatory sequence to a transcribed sequence. For example, a promoter or enhancer sequence is operably linked to a coding sequence if it stimulates or modulates the transcription of the coding sequence in an appropriate host cell or other expression system. Generally, promoter transcriptional regulatory sequences that are operably linked to a transcribed sequence are physically contiguous to the transcribed sequence, i.e., they are cis-acting. However, some transcriptional regulatory sequences, such as enhancers, need not be physically contiguous or located in close proximity to the coding sequences whose transcription they enhance.

Various expression vectors can be employed to express the polynucleotides encoding the antibody of the disclosure. Both viral-based and nonviral expression vectors can be used to produce the antibodies in a mammalian host cell. Nonviral vectors and systems include plasmids, episomal vectors, typically with an expression cassette for expressing a protein or RNA, and human artificial chromosomes (see, e.g., Harrington et al., Nat Genet. 15:345, 1997). For example, nonviral vectors useful for expression of the multispecific antibody of the disclosure or domains thereof, including of the IL-17A-binding polynucleotides and polypeptides, in mammalian (e.g., human) cells include pThioHis A, B and C, pcDNA3.1/His, pEBVHis A, B and C, (Invitrogen, San Diego, Calif.), MPS V vectors, and numerous other vectors known in the art for expressing other proteins. Useful viral vectors include vectors based on retroviruses, adenoviruses, adenoassociated viruses, herpes viruses, vectors based on SV40, papilloma virus, HBP Epstein Barr virus, vaccinia virus vectors and Semliki Forest virus (SFV). See, Brent et al., supra; Smith, Annu. Rev. Microbiol. 49:807, 1995; and Rosenfeld et al., Cell 68: 143, 1992.

The choice of expression vector depends on the intended host cells in which the vector is to be expressed. Typically, the expression vectors contain a promoter and other regulatory sequences (e.g., enhancers) that are operably linked to the polynucleotides encoding the multispecific antibody of the disclosure or a domain thereof, including an IL-17A-binding antibody. In one embodiment, an inducible promoter is employed to prevent expression of inserted sequences except under inducing conditions. Inducible promoters include, e.g., arabinose, lacZ, metallothionein promoter or a heat shock promoter. Cultures of transformed organisms can be expanded under noninducing conditions without biasing the population for coding sequences whose expression products are better tolerated by the host cells. In addition to promoters, other regulatory elements may also be required or desired for efficient expression of the antibody of the disclosure or fragments thereof, including of an IL-17A-binding antibody. These elements typically include an ATG initiation codon and adjacent ribosome binding site or other sequences. In addition, the efficiency of expression may be enhanced by the inclusion of enhancers appropriate to the cell system in use (see, e.g., Scharf et al., Results Probl. Cell Differ. 20: 125, 1994; and Bittner et al., Meth. Enzymol., 153:516, 1987). For example, the SV40 enhancer or CMV enhancer may be used to increase expression in mammalian host cells.

The expression vectors may also provide a secretion signal sequence position to form a fusion protein with polypeptides encoded by inserted multispecific antibody-coding sequences, including IL-17A-binding antibody-coding sequences. More often, the inserted antibody sequences, e.g. multispecific antibody-coding or IL-17A-binding antibody-coding sequences, are linked to signal sequences before inclusion in the vector. Vectors to be used to receive sequences encoding light and heavy chain variable domains of a multispecific antibody, or of fragments or domains thereof, including of an IL-17A-binding antibody, sometimes also encode constant regions or parts thereof. Such vectors allow expression of the variable regions as fusion proteins with the constant regions thereby leading to production of intact antibodies. Typically, such constant regions are human.

The term "recombinant host cell" (or simply "host cell") refers to a cell into which a recombinant expression vector has been introduced. It should be understood that such terms are intended to refer not only to the particular subject cell but to the progeny of such a cell. Because certain modifications may occur in succeeding generations due to either mutation or environmental influences, such progeny may not, in fact, be identical to the parent cell, but are still included within the scope of the term "host cell" as used herein.

The host cells for harboring and expressing the chains of the multispecific antibody, or of fragments or domains thereof, including of an IL-17A-binding antibody, can be either prokaryotic or eukaryotic. *E. coli* is one prokaryotic host useful for cloning and expressing the polynucleotides of the present disclosure. Other microbial hosts suitable for use include bacilli, such as *Bacillus subtilis*, and other enterobacteriaceae, such as *Salmonella, Serratia*, and various *Pseudomonas* species. In these prokaryotic hosts, one can also make expression vectors, which typically contain expression control sequences compatible with the host cell (e.g., an origin of replication). In addition, any number of a variety of well-known promoters will be present, such as the lactose promoter system, a tryptophan (trp) promoter system, a beta-lactamase promoter system, or a promoter system from phage lambda. The promoters typically control expression, optionally with an operator sequence, and have ribosome binding site sequences and the like, for initiating and completing transcription and translation. Other microbes, such as yeast, can also be employed to express the chains of the multispecific antibody, or of fragments or domains thereof, including of an IL-17A-binding antibody, of the disclosure. Insect cells in combination with baculovirus vectors can also be used.

In one embodiment, mammalian host cells are used to express and produce the chains of the multispecific antibody, or of fragments or domains thereof, including of an IL-17A-binding antibody of the present disclosure. For example, they can be either a hybridoma cell line expressing endogenous immunoglobulin genes or a mammalian cell line harboring an exogenous expression vector. These include any normal mortal or normal or abnormal immortal animal or human cell. For example, a number of suitable host cell lines capable of secreting intact immunoglobulins have been developed including the CHO cell lines, various Cos cell lines, HeLa cells, myeloma cell lines, transformed B-cells and hybridomas. The use of mammalian tissue cell culture to express polypeptides is discussed generally in, e.g., Winnacker, FROM GENES TO CLONES, VCH Publishers, N.Y., N.Y., 1987. Expression vectors for mammalian host cells can include expression control sequences, such as an origin of replication, a promoter, and an enhancer (see, e.g., Queen, et al., Immunol. Rev. 89:49-68, 1986), and necessary processing information sites, such as ribosome binding sites, RNA splice sites, polyadenylation sites, and transcriptional terminator sequences. These expression vectors usually contain promoters derived from mammalian genes or from mammalian viruses. Suitable promoters may be constitutive, cell type-specific, stage-specific, and/or modulatable or regulatable. Useful promoters include, but are not limited to, the metallothionein promoter, the constitutive adenovirus major late promoter, the dexamethasone-inducible MMTV promoter, the SV40 promoter, the MRP polIII promoter, the constitutive MPS V promoter, the tetracycline-inducible CMV promoter (such as the human immediate-early CMV promoter), the constitutive CMV promoter, and promoter-enhancer combinations known in the art.

Methods for introducing expression vectors containing the polynucleotide sequences of interest vary depending on the type of cellular host. For example, calcium chloride transfection is commonly utilized for prokaryotic cells, whereas calcium phosphate treatment or electroporation may be used for other cellular hosts. (See generally Sambrook, et al., supra). Other methods include, e.g., electroporation, calcium phosphate treatment, liposome-mediated transformation, injection and microinjection, ballistic methods, virosomes, immunoliposomes, polycation:nucleic acid conjugates, naked DNA, artificial virions, fusion to the herpes virus structural protein VP22 (Elliot and O'Hare, Cell 88:223, 1997), agent-enhanced uptake of DNA, and ex vivo transduction. For long-term, high-yield production of recombinant proteins, stable expression will often be desired. For example, cell lines which stably express polypeptides of the multispecific antibody, or of fragments or domains thereof, including of an IL-17A-binding antibody, can be prepared using expression vectors of the disclosure which contain viral origins of replication or endogenous expression elements and a selectable marker gene. Following the introduction of the vector, cells may be allowed to grow for 1-2 days in an enriched media before they are switched to selective media. The purpose of the selectable marker is to confer resistance to selection, and its presence allows growth of cells which successfully express the introduced sequences in selective media. Resistant, stably transfected cells can be proliferated using tissue culture techniques appropriate to the cell type. The present disclosure thus provides a method of producing an antibody of the disclosure, wherein said method comprises the step of culturing a host cell comprising a nucleic acid or a vector encoding the antibody of the disclosure, whereby said antibody of the disclosure or a fragment thereof is expressed.

Pharmaceutical Compositions of the Disclosure

In a further aspect, the present disclosure relates to a pharmaceutical composition comprising the multispecific antibody of the present disclosure, an anti-IL-17A antibody of the present disclosure, or another multispecific molecule comprising an anti-IL-17A antibody of the present disclosure, and a pharmaceutically acceptable carrier. Pharmaceutically acceptable carriers enhance or stabilize the composition, or facilitate preparation of the composition. Pharmaceutically acceptable carriers include solvents, dispersion media, coatings, antibacterial and antifungal agents, isotonic and absorption delaying agents, and the like that are physiologically compatible.

A pharmaceutical composition of the present disclosure can be administered by a variety of methods known in the art. The route and/or mode of administration vary depending upon the desired results. Administration can be intravenous, intramuscular, intraperitoneal, or subcutaneous, or administered proximal to the site of the target. The pharmaceutically acceptable carrier should be suitable for intravenous, intramuscular, subcutaneous, parenteral, spinal or epidermal administration (e.g., by injection or infusion). Depending on the route of administration, the active compound, i.e., antibody, and multispecific molecule, may be coated in a material to protect the compound from the action of acids and other natural conditions that may inactivate the compound.

Pharmaceutical compositions of the disclosure can be prepared in accordance with methods well known and routinely practiced in the art. See, e.g., Remington: The Science and Practice of Pharmacy, Mack Publishing Co., 20th ed., 2000; and Sustained and Controlled Release Drug Delivery Systems, J. R. Robinson, ed., Marcel Dekker, Inc., New York, 1978. Pharmaceutical compositions are preferably manufactured under GMP conditions. Typically, a therapeutically effective dose or efficacious dose of the multispecific antibody of the present disclosure, an anti-IL-17A antibody of the present disclosure, or another multispecific molecule comprising an anti-IL-17A antibody of the present disclosure, is employed in the pharmaceutical compositions of the disclosure. The multispecific antibody of the present disclosure, an anti-IL-17A antibody of the present disclosure, or another multispecific molecule comprising an anti-IL-17A antibody of the present disclosure, is formulated into pharmaceutically acceptable dosage forms by conventional methods known to those of skill in the art. Dosage regimens are adjusted to provide the optimum desired response (e.g., a therapeutic response). For example, a single bolus may be administered, several divided doses may be administered over time or the dose may be proportionally reduced or increased as indicated by the exigencies of the therapeutic situation. It is especially advantageous to formulate parenteral compositions in dosage unit form for ease of administration and uniformity of dosage. Dosage unit form as used herein refers to physically discrete units suited as unitary dosages for the subjects to be treated; each unit contains a predetermined quantity of active compound calculated to produce the desired therapeutic effect in association with the required pharmaceutical carrier.

Actual dosage levels of the active ingredients in the pharmaceutical compositions of the present disclosure can be varied so as to obtain an amount of the active ingredient which is effective to achieve the desired therapeutic response for a particular patient, composition, and mode of administration, without being toxic to the patient. The selected dosage level depends upon a variety of pharmacokinetic factors including the activity of the particular compositions of the present disclosure employed, or the ester, salt or amide thereof, the route of administration, the time of administration, the rate of excretion of the particular compound being employed, the duration of the treatment, other drugs, compounds and/or materials used in combination with the particular compositions employed, the age, sex, weight, condition, general health and prior medical history of the patient being treated, and like factors.

Antibodies are usually administered on multiple occasions. Intervals between single dosages can be weekly, monthly or yearly. Intervals can also be irregular as indicated by measuring blood levels of the antibody in the patient. Alternatively, an antibody can be administered as a sustained release formulation, in which case less frequent administration is required. Dosage and frequency vary depending on the half-life of the antibody in the patient. In general, humanized antibodies show longer half-life than that of chimeric antibodies and nonhuman antibodies. The dosage and frequency of administration can vary depending on whether the treatment is prophylactic or therapeutic. In prophylactic applications, a relatively low dosage is administered at relatively infrequent intervals over a long period of time. Some patients continue to receive treatment for the rest of their lives. In therapeutic applications, a relatively high dosage at relatively short intervals is sometimes required until progression of the disease is reduced or terminated, and preferably until the patient shows partial or complete amelioration of symptoms of disease. Thereafter, the patient can be administered a prophylactic regime.

Uses and Methods of the Disclosure

The antibodies of the present disclosure have in vitro and in vivo diagnostic and therapeutic utilities. For example, these molecules can be administered to cells in culture, e.g. in vitro or in vivo, or in a subject, e.g., in vivo, to treat, prevent or diagnose a variety of disorders.

The term "subject" includes human and non-human animals. Non-human animals include all vertebrates, e.g., mammals and non-mammals, such as non-human primates, sheep, dog, cow, chickens, amphibians, and reptiles. Except when noted the terms "patient" or "subject" are used herein interchangeably.

The terms "treatment", "treating", "treat", "treated", and the like, as used herein, refer to obtaining a desired pharmacologic and/or physiologic effect. The effect may be therapeutic in terms of a partial or complete cure for a disease and/or adverse effect attributable to the disease or delaying the disease progression. "Treatment", as used herein, covers any treatment of a disease in a mammal, e.g., in a human, and includes: (a) inhibiting the disease, e.g., arresting its development; and (b) relieving the disease, e.g., causing regression of the disease.

The term "prevent" or "prevention" refers to a complete inhibition of development of a disease, or any secondary effects of disease. The term "prevent" or "prevention" as used herein covers prevention of a disease or condition from occurring in an individual who may be predisposed to the disease but has not yet been diagnosed as having it.

The term "therapeutically effective amount" or "efficacious amount" refers to the amount of an agent that, when administered to a mammal or other subject for treating a disease, is sufficient to effect such treatment for the disease. The "therapeutically effective amount" will vary depending on the agent, the disease and its severity and the age, weight, etc., of the subject to be treated.

In one aspect, the present disclosure relates to the antibody of the present disclosure, the multispecific molecule of the present disclosure, or the pharmaceutical composition of the present disclosure for use as a medicament.

In one aspect, the multispecific antibody of the present disclosure, or the pharmaceutical composition of the disclosure are particularly suitable for use in the treatment, prevention or diagnosis, in particular treatment, of a disorder mediated by IL-17A and/or TNFα or a disorder that can be treated by inhibiting Gro-α secretion.

In another aspect, the IL-17A-binding antibody of the disclosure or the pharmaceutical composition of the disclosure is particularly suitable for use in the treatment, prevention or diagnosis, in particular treatment, of a disorder mediated by IL-17A or a disorder that can be treated by inhibiting GRO-α secretion.

In the present disclosure, the term "a disorder mediated by IL-17A" encompasses all diseases and medical conditions in which IL-17A plays a role, whether directly or indirectly, in the disease or medical condition, including causation, development, progress, persistence or pathology of the disease or condition. Accordingly, the term "a disorder mediated by IL-17A" include conditions associated with or characterized by aberrant IL-17A levels and/or diseases or conditions that can be treated by reducing or suppressing IL-17A induced activity in target cells or tissues, e.g., production of IL-6 or GRO-α. In the present disclosure, the term "a disorder mediated by TNFα" encompasses all diseases and medical conditions in which TNFα plays a role, whether directly or indirectly, in the disease or medical condition, including causation, development, progress, persistence or pathology of the disease or condition. Accordingly, the term "a disorder mediated by TNFα" include conditions associated with or characterized by aberrant TNFα levels and/or diseases or conditions that can be treated by reducing or suppressing TNFα induced activity in target cells or tissues, e.g., production of Gro-α. Disorders mediated by IL-17A and/or TNFα include inflammatory conditions and autoimmune diseases, such as arthritis, rheumatoid arthritis, or psoriasis. These further include allergies and allergic conditions, hypersensitive reactions, chronic obstructive pulmonary disease, cystic fibrosis and organ or tissue transplant rejection. For example, an antibody of the disclosure may be used for the treatment of recipients of heart, lung, combined heart-lung, liver, kidney, pancreatic, skin or corneal transplants, including allograft rejection or xenograft rejection, and for the prevention of graft-versus-host disease, such as following bone marrow transplant, and organ transplant associated arteriosclerosis.

In one embodiment, the multispecific antibody of the present disclosure, an anti-IL-17A antibody of the present disclosure, or another multispecific molecule comprising an anti-IL-17A antibody of the present disclosure, or a pharmaceutical composition of the disclosure are particularly suitable for use in the treatment, prevention or diagnosis, in particular treatment, of an inflammatory condition or an autoimmune disease.

The multispecific antibody of the present disclosure, an anti-IL-17A antibody of the present disclosure, or another multispecific molecule comprising an anti-IL-17A antibody of the present disclosure, or a pharmaceutical composition of the disclosure is suitable for use in the treatment, prevention, or amelioration of autoimmune disease and of inflammatory conditions, in particular inflammatory conditions with an aetiology including an autoimmune component such as arthritis (for example rheumatoid arthritis, arthritis chronica progrediente and arthritis deformans) and rheumatic diseases, including inflammatory conditions and rheumatic diseases involving bone loss, inflammatory pain, spondyloarthropathies including ankylosing spondylitis, Reiter syndrome, reactive arthritis, psoriatic arthritis, juvenile idiopathic arthritis and enteropathic arthritis, enthesitis, hypersensitivity (including both airways hypersensitivity and dermal hypersensitivity) and allergies. Specific autoimmune diseases for which antibodies of the disclosure may be employed include autoimmune haematological disorders (including e.g. hemolytic anaemia, aplastic anaemia, pure red cell anaemia and idiopathic thrombocytopenia), systemic lupus erythematosus (SLE), lupus nephritis, inflammatory muscle diseases (dermatomyositis), periodontitis, polychondritis, scleroderma, Wegener granulomatosis, dermatomyositis, chronic active hepatitis, myasthenia gravis, psoriasis, Steven-Johnson syndrome, idiopathic sprue, autoimmune inflammatory bowel disease (including e.g. ulcerative colitis, Crohn's disease and irritable bowel syndrome), endocrine ophthalmopathy, Graves' disease, sarcoidosis, multiple sclerosis, systemic sclerosis, fibrotic diseases, primary biliary cirrhosis, juvenile diabetes (diabetes mellitus type I, type 1 diabetes), uveitis, keratoconjunctivitis sicca and vernal keratoconjunctivitis, interstitial lung fibrosis, periprosthetic osteolysis, glomerulonephritis (with and without nephrotic syndrome, e.g. including idiopathic nephrotic syndrome or minimal change nephropathy), multiple myeloma other types of tumors, inflammatory disease of skin and cornea, myositis, loosening of bone implants, metabolic disorders, (such as obesity, atherosclerosis and other cardiovascular diseases including dilated cardiomyopathy, myocarditis, diabetes mellitus type II, and dyslipidemia), and autoimmune thyroid diseases (including Hashimoto thyroiditis), small and medium vessel primary vasculitis, large vessel vasculitides including giant cell arteritis, hidradenitis suppurativa, neuromyelitis optica, Sjogren's syndrome, Behcet's disease, atopic and contact dermatitis, bronchiolitis, inflammatory muscle diseases, autoimmune peripheral neuropathies, immunological renal, hepatic and thyroid diseases, inflammation and atherothrombosis, autoinflammatory fever syndromes, immunohematological disorders, and bullous diseases of the skin and mucous membranes. Anatomically, uveitis can be anterior, intermediate, posterior, or pan-uveitis. It can be chronic or acute. The etiology of uveitis can be autoimmune or non-infectious, infectious, associated with systemic disease, or a white-dot syndrome.

In a particular embodiment, the multispecific antibody of the present disclosure, an anti-IL-17A antibody of the present disclosure, or another multispecific molecule comprising an anti-IL-17A antibody of the present disclosure, or a pharmaceutical composition of the disclosure, is suitable for use in the treatment of multiple sclerosis, psoriasis, asthma, systemic lupus erythematosus (SLE), and lupus nephritis. In another specific embodiment, the antibody of the disclosure is suitable for use in the treatment of diabetes, in particular diabetes mellitus type I or type II.

The term "a disorder mediated by IL-17A and/or TNFα" also includes inflammation-associated cancer. In a particular embodiment, the antibody of the disclosure is suitable for use in the treatment of cancer, in particular IL-17A- and/or TNFα-mediated cancer. In a particular embodiment, the antibody of the disclosure is suitable for use in the treatment of inflammation-associated cancer.

The term "cancer" refers to a disease characterized by the rapid and uncontrolled growth of aberrant cells. Cancer cells can spread locally or through the bloodstream and lymphatic system to other parts of the body. Examples of various cancers are described herein and include but are not limited to, breast cancer, prostate cancer, ovarian cancer, cervical cancer, skin cancer, pancreatic cancer, colorectal cancer, renal cancer, liver cancer, brain cancer, lymphoma, leukemia, lung cancer and the like. The terms "tumor" and "cancer" are used interchangeably herein, e.g., both terms encompass solid and liquid, e.g., diffuse or circulating, tumors. As used herein, the term "cancer" or "tumor" includes premalignant, as well as malignant cancers and tumors.

Non-limiting examples of inflammation-associated cancers include gastric cancers, colorectal cancers, non-small cell lung cancers, hepatocellular carcinomas and adenocarcinomas (Wu et al., 2014 Tumour Biol. 35(6):5347-56; Wu et al., 2012 PLoS One 7(12); Zhang et al. 2012 Asian Pac J Cancer Prev 13(8):3955-60; Liu et al., 2011 Biochem Biophys Res Commun. 407(2):348-54).

The multispecific antibody of the present disclosure, an anti-IL-17A antibody of the present disclosure, or another multispecific molecule comprising an anti-IL-17A antibody of the present disclosure, is also suitable for use in the diagnosis and/or prognosis of certain cancers, such as inflammation-associated cancers for example gastric cancers, colorectal cancers, non-small cell lung cancers, hepatocellular carcinomas and adenocarcinomas. For example, IL-17A has been linked to the prognosis and poor survival in patients suffering from non-small cell lung cancer (Chen et al., 2010 Lung Cancer 69(3):348-54), colorectal carcinoma and hepatocellular carcinoma (Punt et al., 2015 Oncoimmunology, 4(2): e984547).

Thus, in a particular embodiment, the multispecific antibody of the present disclosure, an anti-IL-17A antibody of the present disclosure, or another multispecific molecule comprising an anti-IL-17A antibody of the present disclosure, is suitable for use in the treatment of a cancer, arthritis, rheumatoid arthritis, osteoarthritis, reactive arthritis, psoriasis, chronic obstructive pulmonary disease, systemic lupus erythematosus (SLE), lupus nephritis, an autoimmune inflammatory bowel disease, asthma, multiple sclerosis, or cystic fibrosis, bone loss, airways hypersensitivity, a demyelinating disorder, dermal hypersensitivity, acute transplant rejection, allograft rejection, graft-versus host disease, systemic sclerosis, an urological inflammatory disorder, a cardiovascular disease, vasculitis, a periodic fever, a glucose metabolism disorder, a pulmonary disease, peridontitis, hepatic stromal keratitis, an allergy, inflammatory pain, a spondyloarthropathy, septicaemia, septic or endotoxic shock, meningitis, surgical trauma, an autoimmune haematological disorder, Alzheimer's disease, sarcoidosis, cirrhosis, hepatitis, glomerulonephritis or dislipidemia.

In one aspect, the present disclosure relates to use of the multispecific antibody of the present disclosure, an anti-IL-17A antibody of the present disclosure, or another multispecific molecule comprising an anti-IL-17A antibody of the present disclosure, or a pharmaceutical composition of the disclosure, in a manufacture of a medicament.

In another aspect, the present disclosure relates to use of the multispecific antibody of the present disclosure, an anti-IL-17A antibody of the present disclosure, or another multispecific molecule comprising an anti-IL-17A antibody of the present disclosure, or a pharmaceutical composition of the disclosure, in a manufacture of a medicament for use in the treatment, prevention or diagnosis, in particular treatment, of a disorder mediated by IL-17A and/or TNFα or a disorder that can be treated by inhibiting GRO-α secretion. In one embodiment, the present disclosure relates to use of the multispecific antibody of the present disclosure, an anti-IL-17A antibody of the present disclosure, or another multispecific molecule comprising an anti-IL-17A antibody of the present disclosure, or a pharmaceutical composition of the disclosure, in a manufacture of a medicament for use in the treatment, prevention or diagnosis, in particular treatment, of an inflammatory condition or an autoimmune disease. In another embodiment, the present disclosure relates to use of the multispecific antibody of the present disclosure, an anti-IL-17A antibody of the present disclosure, or another multispecific molecule comprising an anti-IL-17A antibody of the present disclosure, or a pharmaceutical composition of the disclosure, in a manufacture of a medicament for use in the treatment, prevention or diagnosis, in particular treatment, of multiple sclerosis, psoriasis, asthma, systemic lupus erythematosus (SLE), and lupus nephritis. In a further embodiment, the present disclosure relates to use of the multispecific antibody of the present disclosure, an anti-IL-17A antibody of the present disclosure, or another multispecific molecule comprising an anti-IL-17A antibody of the present disclosure, or a pharmaceutical composition of the disclosure, in a manufacture of a medicament for use in the treatment, prevention or diagnosis, in particular treatment, of diabetes, in particular diabetes mellitus type I or type II. In a further embodiment, the present disclosure relates to use of the multispecific antibody of the present disclosure, an anti-IL-17A antibody of the present disclosure, or another multispecific molecule comprising an anti-IL-17A antibody of the present disclosure, or a pharmaceutical composition of the disclosure, in a manufacture of a medicament for use in the treatment, prevention or diagnosis, in particular treatment, of cancer, in particular IL-17A and/or TNFα-mediated cancer, in a particular inflammation-associated cancer.

In another aspect, the present disclosure relates to a method for the treatment of a subject in need of therapy, characterized by administering to the subject a therapeutically effective amount of multispecific antibody of the present disclosure, an anti-IL-17A antibody of the present disclosure, or another multispecific molecule comprising an anti-IL-17A antibody of the present disclosure, or a pharmaceutical composition of the disclosure.

In a further aspect, the present disclosure relates to a method of treating a disorder mediated by IL-17A and/or TNFα, said method comprising administering an effective amount of multispecific antibody of the present disclosure, an anti-IL-17A antibody of the present disclosure, or another multispecific molecule comprising an anti-IL-17A antibody of the present disclosure, or a pharmaceutical composition of the disclosure, such that the condition is alleviated. In one embodiment, the present disclosure relates to a method of treating an inflammatory condition or an autoimmune disease, said method comprising administering an effective amount of the multispecific antibody of the present disclosure, an anti-IL-17A antibody of the present disclosure, or another multispecific molecule comprising an anti-IL-17A antibody of the present disclosure, or a pharmaceutical composition of the disclosure, such that the condition is alleviated. In another embodiment, the present disclosure relates to a method of treating multiple sclerosis, psoriasis, asthma, systemic lupus erythematosus (SLE), and lupus nephritis, said method comprising administering an effective amount of the multispecific antibody of the present disclosure, an anti-IL-17A antibody of the present disclosure, or another multispecific molecule comprising an anti-IL-17A antibody of the present disclosure, or a pharmaceutical composition of the disclosure, such that the condition is alleviated. In further embodiment, the present disclosure relates to a method of treating diabetes, in particular diabetes mellitus type I or type II, said method comprising administering an effective amount of the multispecific antibody of the present disclosure, an anti-IL-17A antibody of the present disclosure, or another multispecific molecule comprising an anti-IL-17A antibody of the present disclosure, or a pharmaceutical composition of the disclosure, such that the condition is alleviated. In further embodiment, the present disclosure relates to a method of treating cancer, in particular IL-17A- and/or TNFα-mediated cancer, in particular inflammation-associated cancer, said method comprising administering an effective amount of the multispecific antibody of the present disclosure, an anti-IL-17A antibody of the present disclosure, or another multispecific molecule comprising an anti-IL-17A antibody of the present disclosure, or a pharmaceutical composition of the disclosure, such that the condition is alleviated.

Also within this disclosure is a kit comprising the multispecific antibody of the present disclosure, an anti-IL-17A antibody of the present disclosure, or another multispecific molecule comprising an anti-IL-17A antibody of the present disclosure, or a pharmaceutical composition of the disclosure. The kit can include one or more other elements including: instructions for use; other reagents, e.g., a label, a therapeutic agent, or an agent useful for chelating, or otherwise coupling, an antibody to a label or therapeutic agent, or a radioprotective composition; devices or other materials for preparing the antibody molecule for administration; pharmaceutically acceptable carriers; and devices or other materials for administration to a subject. In a specific embodiment, the kit comprises the multispecific antibody of the present disclosure, an anti-IL-17A antibody of the present disclosure, or another multispecific molecule comprising an anti-IL-17A antibody of the present disclosure, in a pharmaceutically effective amount. In a further embodiment, the kit comprises a pharmaceutically effective amount of the multispecific antibody of the present disclosure, an anti-IL-17A antibody of the present disclosure, or another multispecific molecule comprising an anti-IL-17A antibody of the present disclosure, in lyophilized form and a diluent and, optionally, instructions for use. Said kit may further comprise a filter needle for reconstitution and a needle for injecting.

TABLE 1

Sequence listing.

| SEQ ID NO: | Description | Sequence |
|---|---|---|
| | Anti-IL-17A Antibody 27-07-G02 | |
| 1 | HCDR1 (H27-H42; AHo numbering) | GFSFSSDYWMC |
| 2 | HCDR2 (H57-H76; AHo numbering) | CIYAGDVDDTDYASWARG |
| 3 | HCDR3 (H108-H138; AHo numbering) | RVDGFDITYFDL |
| 4 | HCDR1 (Kabat) | SDYWMC |
| 5 | HCDR2 (Kabat) | CIYAGDVDDTDYASWARG |
| 6 | HCDR3 (Kabat) | VDGFDITYFDL |
| 7 | HCDR1 (Chothia) | GFSFSSDY |
| 8 | HCDR2 (Chothia) | AGDVD |
| 9 | HCDR3 (Chothia) | DGFDITYFD |
| 10 | VH (VH3; CDR-graft; from A1) | EVQLVESGGGLVQPGGSLRLSCAASGFSFSSDYWMCWVRQAPGKGLEWIGCIYAGDVDDTDYASWARGRFTISRDNSKNTVYLQMNSLRAEDTAVYYCARVDGFDITYFDLWGQGTLVTVSS |
| 11 | VH (VH3; STR-graft; from A2) Mutations (AHo): Q14K; G16E; G56A | EVQLVESGGGLVKPEGSLRLSCAASGFSFSSDYWMCWVRQAPGKGLEWIACIYAGDVDDTDYASWARGRFTISRDNSKNTVYLQMNSLRAEDTAVYYCARVDGFDITYFDLWGQGTLVTVSS |
| 12 | LCDR1 (L24-L42; AHo numbering) | QASQTINYWLA |
| 13 | LCDR2 (L58-L72; AHo numbering) | RASTLAS |
| 14 | LCDR3 (L107-L138; AHo numbering) | QNYYYSTSRSYG |
| 15 | LCDR1 (Kabat) | QASQTINYWLA |
| 16 | LCDR2 (Kabat) | RASTLAS |
| 17 | LCDR3 (Kabat) | QNYYYSTSRSYG |
| 18 | LCDR1 (Chothia) | SQTINYW |
| 19 | LCDR2 (Chothia) | RAS |
| 20 | LCDR3 (Chothia) | YYYSTSRSY |

TABLE 1-continued

Sequence listing.

| SEQ ID NO: | Description | Sequence |
|---|---|---|
| 21 | VL (Vk1-sk12; CDR-graft; from A1) | DIQMTQSPSSLSASVGDRVTITCQASQTINYWLAWYQQKPGKAPKLLIYRASTLASGVPS SGSGSGTDFTLTISSLQPEDFATYYCQNYYYSTSRSYGFGGGTKLTVLG |
| 22 | VL (Vk1-sk12; STR-graft; from A2) Mutations (AHo): A51P | DIQMTQSPSSLSASVGDRVTITCQASQTINYWLAWYQQKPGKPPKLLIYRASTLASGVPSRF SGSGSGTDFTLTISSLQPEDFATYYCQNYYYSTSRSYGFGGGTKLTVLG |
| 23 | Linker | GGGGSGGGGSGGGGSGGGGS |
| 24 | A1 (scFv; VL-linker-VH) | DIQMTQSPSSLSASVGDRVTITCQASQTINYWLAWYQQKPGKAPKLLIYRASTLASGVPSRF SGSGSGTDFTLTISSLQPEDFATYYCQNYYYSTSRSYGFGGGTKLTVLGGGGGSGGGGSGG GGSGGGGSEVQLVESGGGLVQPGGSLRLSCAASGFSFSSDYWMCWVRQAPGKGLEWIGCI YAGDVDDTDYASWARGRFTISRDNSKNTVYLQMNSLRAEDTAVYYCARVDGFDITYFDL WGQGTLVTVSS |
| 25 | A2 (scFv; VL-linker-VH) | DIQMTQSPSSLSASVGDRVTITCQASQTINYWLAWYQQKPGKPPKLLIYRASTLASGVPSRF SGSGSGTDFTLTISSLQPEDFATYYCQNYYYSTSRSYGFGGGTKLTVLGGGGGSGGGGSGG GGSGGGGSEVQLVESGGGLVKPEGSLRLSCAASGFSFSSDYWMCWVRQAPGKGLEWIACI YAGDVDDTDYASWARGRFTISRDNSKNTVYLQMNSLRAEDTAVYYCARVDGFDITYFDL WGQGTLVTVSS |

Vλ germline-based FR4

| 26 | Vλ, germline-based FR4, Sk17 | FGTGTKVTVLG |
| 27 | Vλ, germline-based FR4, Sk12 | FGGGTKLTVLG |
| 28 | Vλ, germline-based FR4 | FGGGTQLIILG |
| 29 | Vλ, germline-based FR4 | FGEGTELTVLG |
| 30 | Vλ, germline-based FR4 | FGSGTKVTVLG |
| 31 | Vλ, germline-based FR4 | FGGGTQLTVLG |
| 32 | Vλ, germline-based FR4 | FGGGTQLTALG |

IL-17 family

| 33 | IL-17A UniProt ID NO: Q16552 | MTPGKTSLVSLLLLLSLEAIVKAGIAIPQNPGCPNSEDKNFPRTVMVNLNIHNRNTNTNPKRS SDYYNRSTSPWNLHRNEDPERYPSVIWEAKCRHLGCVNADGKVDYHMNSVPIQQEILVLR REPPHCPNSFRLEKILVSVGCTCVTPIVHHVS |
| 34 | IL-17B UniProt ID NO: Q9UHF5 | MDWPHNLLFLLTISIFLGLGQPRSPKSKRKGQGRPGPLAPGPHQVPLDLVSRMKPYARMEE YERNIEEMVAQLRNSSELAQRKCEVNLQLWMSNKRSLSPWGYSINHDPSRIPVDLPEARCL CLGCVNPFTMQEDRSMVSVPVFSQVPVRRRLCPPPPRTGPCRQRAVMETIAVGCTCIF |
| 35 | IL-17C UniProt ID NO: Q9P0M4 | MTLLPGLLFLTWLHTCLAHHDPSLRGHPSHGTPHCYSAEELPLGQAPPHLLARGAKWGQ ALPVALVSSLEAASHRGRHERPSATTQCPVLRPEEVLEADTHQRSISPWRYRVDTDEDRYP QKLAFAECLCRGCIDARTGRETAALNSVRLLQSLLVLRRRPCSRDGSGLPTPGAFAHTEFI HVPVGCTCVLPRSV |
| 36 | IL-17D UniProt ID NO: Q8TAD2 | MLVAGFLLALPPSWAAGAPRAGRRPARPRGCADRPEELLEQLYGRLAAGVLSAFHHTLQL GPREQARNASCPAGGRPADRRFRPPTNLRSVSPWAYRISYDPARYPRYLPEAYCLCRGCLT GLFGEEDVRFRSAPVYMPTVVLRRTPACAGGRSVYTEAYVTIPVGCTCVPEPEKDADSINSS IDKQGAKLLLGPNDAPAGP |
| 37 | IL-17E UniProt ID NO: Q9H293 | MRERPRLGEDSSLISLFLQVVAFLAMVMGTHTYSHWPSCCPSKGQDTSEELLRWSTVPPP LEPARPNRHPESCRASEDGPLNSRAISPWRYELDRDLNRLPQDLYHARCLCPHCVSLQTGSH MDPRGNSELLYHNQTVFYRRPCHGEKGTHKGYCLERRLYRVSLACVCVRPRVMG |
| 38 | IL-17F UniProt ID NO: Q96PD4 | MTVKTLHGPAMVKYLLLSILGLAFLSEAAARKIPKVGHTFFQKPESCPPVPGGSMKLDIGIIN ENQRVSMSRNIESRSTSPWNYTVTWDPNRYPSEVVQAQCRNLGCINAQGKEDISMNSVPIQ QETLVVRRKHQGCSVSFQLEKVLVTVGCTCVTPVIHHVQ |

Anti-IL17A Antibody 27-31-C04

| 39 | HCDR1 (H27-H42; AHo numbering) | GFSFSGFYYMC |

TABLE 1-continued

Sequence listing.

| SEQ ID NO: | Description | Sequence |
|---|---|---|
| 40 | HCDR2 (H57-H76; AHo numbering) | CIDTGDGTTYYASWAKG |
| 41 | HCDR3 (H108-H138; AHo numbering) | RDAAYGGYAYPAHGMDL |
| 42 | HCDR1 (Kabat) | GFYYMC |
| 43 | HCDR2 (Kabat) | CIDTGDGTTYYASWAKG |
| 44 | HCDR3 (Kabat) | DAAYGGYAYPAHGMDL |
| 45 | HCDR1 (Chothia) | GFSFSGFY |
| 46 | HCDR2 (Chothia) | TGDG |
| 47 | HCDR3 (Chothia) | AAYGGYAYPAHGMD |
| 48 | VH (VH3; CDR-graft; from PRO571) | EVQLVESGGGLVQPGGSLRLSCAASGFSFSGFYYMCWVRQAPGKGLEWIGCIDTGDGTTYYASWAKGRFTISRDNSKNTVYLQMNSLRAEDTAVYYCARDAAYGGYAYPAHGMDLWGQGTLVTVSS |
| 49 | VH (VH3; STR-graft; from PRO592) Mutations (AHo): R20T; Q141P | EVQLVESGGGLVQPGGSLTLSCAASGFSFSGFYYMCWVRQAPGKGLEWIGCIDTGDGTTYYASWAKGRFTISRDNSKNTVYLQMNSLRAEDTAVYYCARDAAYGGYAYPAHGMDLWGPGTLVTVSS |
| 50 | LCDR1 (L24-L42; AHo numbering) | QASESIYRYLS |
| 51 | LCDR2 (L58-L72; AHo numbering) | LASTLTS |
| 52 | LCDR3 (L107-L138; AHo numbering) | QSNFGTASTTYYNT |
| 53 | LCDR1 (Kabat) | QASESIYRYLS |
| 54 | LCDR2 (Kabat) | LASTLTS |
| 55 | LCDR3 (Kabat) | QSNFGTASTTYYNT |
| 56 | LCDR1 (Chothia) | SESIYRY |
| 57 | LCDR2 (Chothia) | LAS |
| 58 | LCDR3 (Chothia) | NFGTASTTYYN |
| 59 | VL (Vk1-sk12; CDR-graft; from PRO571) | DIQMTQSPSSLSASVGDRVTITCQASESIYRYLSWYQQKPGKAPKLLIYLASTLTSGVPSRFSGSGSGTDFTLTISSLQPEDFATYYCQSNFGTASTTYYNTFGGGTKLTVLG |
| 60 | VL (Vk1-sk12; STR-graft; from PRO592) | DIQMTQSPSSLSASVGDRVTITCQASESIYRYLSWYQQKPGKAPKLLIYLASTLTSGVPSRFSGSGSGTDFTLTISSLQPEDFATYYCQSNFGTASTTYYNTFGGGTKLTVLG |
| 61 | PRO571 (scFv; VL-linker-VH) | DIQMTQSPSSLSASVGDRVTITCQASESIYRYLSWYQQKPGKAPKLLIYLASTLTSGVPSRFSGSGSGTDFTLTISSLQPEDFATYYCQSNFGTASTTYYNTFGGGTKLTVLGGGGGSGGGGSGGGGSGGGGSEVQLVESGGGLVQPGGSLRLSCAASGFSFSGFYYMCWVRQAPGKGLEWIGCIDTGDGTTYYASWAKGRFTISRDNSKNTVYLQMNSLRAEDTAVYYCARDAAYGGYAYPAHGMDLWGQGTLVTVSS |
| 62 | PRO592 (scFv; VL-linker-VH) | DIQMTQSPSSLSASVGDRVTITCQASESIYRYLSWYQQKPGKAPKLLIYLASTLTSGVPSRFSGSGSGTDFTLTISSLQPEDFATYYCQSNFGTASTTYYNTFGGGTKLTVLGGGGGSGGGGSGGGGSGGGGSEVQLVESGGGLVQPGGSLTLSCAASGFSFSGFYYMCWVRQAPGKGLEWIGCIDTGDGTTYYASWAKGRFTISRDNSKNTVYLQMNSLRAEDTAVYYCARDAAYGGYAYPAHGMDLWGPGTLVTVSS |

TABLE 1-continued

Sequence listing.

| SEQ ID NO: | Description | Sequence |
|---|---|---|
| | Anti-TNFα domain (16-19-B11-sc06) | |
| 63 | HCDR1 (H27-H42; AHo numbering) | GIDFSTYGIS |
| 64 | HCDR2 (H57-H76; AHo numbering) | YIYPDYGITDYASWVNG |
| 65 | HCDR3 (H108-H138; AHo numbering) | RSGSYYSRGWGAHYFNL |
| 66 | HCDR1 (Kabat) | TYGIS |
| 67 | HCDR2 (Kabat) | YIYPDYGITDYASWVNG |
| 68 | HCDR3 (Kabat) | SGSYYSRGWGAHYFNL |
| 69 | HCDR1 (Chothia) | GIDFSTY |
| 70 | HCDR2 (Chothia) | PDYG |
| 71 | HCDR3 (Chothia) | GSYYSRGWGAHYFN |
| 72 | VH16-19-B11-sc06 (VH3) | EVQLVESGGGLVQPGGSLRLSCAASGIDFSTYGISWVRQAPGKGLEWIAYIYPDYGITDYASWVNGRFTISLDNAQNTVYLQMNSLRAEDTAVYYCARSGSYYSRGWGAHYFNLWGQGTLVTVSS |
| 73 | VH16-19-B11-sc01 (VH3) | EVQLVESGGGLVQPGGSLRLSCAASGIDFSTYGISWVRQAPGKGLEWIGYIYPDYGITDYASWVNGRFTISRDNSKNTVYLQMNSLRAEDTAVYYCARSGSYYSRGWGAHYFNLWGQGTLVTVSS |
| 74 | VH16-19-B11-sc02 (VH3) | EVQLVESGGGLVQPGGSLRLSCKASGIDFSTYGISWVRQAPGKGLEWIAYIYPDYGITDYASWVNGRFTISLDNSKNTVYLQMNSLRAEDTAVYYCARSGSYYSRGWGAHYFNLWGQGTLVTVSS |
| 75 | VH16-19-B11-sc10 or sc11 (VH3) | EVQLVESGGGLVQPGGSLRLSCAASGIDFSTYGISWVRQAPGKGLEWIAYIYPDYGITDYASWVNGRFTISLDNAQNTVYLQMNSLRAEDTAVYYCARSGSYYSRGWGAHYFNLWGQGTLVTVSS |
| 76 | LCDR1 (L24-L42; AHo numbering) | QASESISSWLA |
| 77 | LCDR2 (L58-L72; AHo numbering) | KASTLAS |
| 78 | LCDR3 (L107-L138; AHo numbering) | QGYYLDSSVDDNV |
| 79 | LCDR1 (Kabat) | QASESISSWLA |
| 80 | LCDR2 (Kabat) | KASTLAS |
| 81 | LCDR3 (Kabat) | QGYYLDSSVDDNV |
| 82 | LCDR1 (Chothia) | SESISSW |

TABLE 1-continued

Sequence listing.

| SEQ ID NO: | Description | Sequence |
|---|---|---|
| 83 | LCDR2 (Chothia) | KAS |
| 84 | LCDR3 (Chothia) | YYLDSSVDDN |
| 85 | VL16-19-B11-sc06 (Vκ1-sk12) | DIQMTQSPSSLSASVGDRVTINCQASESISSWLAWYQQKPGKRPKLLIYKASTLASGVPSRFSGSGSGTDYTLTISSLQPEDFATYYCQGYYLDSSVDDNVFGGGTKLTVLG |
| 86 | VL16-19-B11-sc01 (Vκ-sk12) | DIQMTQSPSSLSASVGDRVTITCQASESISSWLAWYQQKPGKAPKLLIYKASTLASGVPSRFSGSGSGTDFTLTISSLQPEDFATYYCQGYYLDSSVDDNVFGGGTKLTVLG |
| 87 | VL16-19-B11-sc02 (Vκ1-sk12) | DIQMTQSPSSLSASVGDRVTINCQASESISSWLAWYQQKPGKAPKLLIYKASTLASGVPSRFSGSGSGTEFTLTISGLQPADFATYYCQGYYLDSSVDDNVFGGGTKLTVLG |
| 88 | VL16-19-B11-sc10 (Vκ1-sk12) | DIQMTQSPSSLSASVGDRVTINCQASESISSWLAWYQQKPGKRPKLLIYKASTLASGVPSRFSGSGSGTDYTLTISGLQPEDFATYYCQGYYLDSSVDDNVFGTGTKVTVLG |
| 89 | VL16-19-B11-sc11 (Vκ1-sk12) | DIQMTQSPSSLSASVGDRVTINCQASESISSWLAWYQQKPGQRPKLLIYKASTLASGVPSRFSGSGSGTDYTLTISSLQPEDFATYYCQGYYLDSSVDDNVFGTGTKVTVLG |
| | Anti-HSA domain (19-01-H04-sc03) | |
| 90 | HCDR1 (H27-H42; AHo numbering) | GFSLSSNAMG |
| 91 | HCDR2 (H57-H76; AHo numbering) | IISVGGFTYYASWAKG |
| 92 | HCDR3 (H108-H138; AHo numbering) | RDRHGGDSSGAFYL |
| 93 | HCDR1 (Kabat) | SNAMG |
| 94 | HCDR2 (Kabat) | IISVGGFTYYASWAKG |
| 95 | HCDR3 (Kabat) | DRHGGDSSGAFYL |
| 96 | HCDR1 (Chothia) | GFSLSSN |
| 97 | HCDR2 (Chothia) | VGG |
| 98 | HCDR3 (Chothia) | RHGGDSSGAFY |
| 99 | VH | EVQLVESGGGLVQPGGSLRLSCAASGFSLSSNAMGWVRQAPGKGLEYIGIISVGGFTYYASWAKGRFTISRDNSKNTVYLQMNSLRAEDTATYFCARDRHGGDSSGAFYLWGQGTLVTVSS |
| 100 | LCDR1 (L24-L42; AHo numbering) | QSSESVYSNNQLS |
| 101 | LCDR2 (L58-L72; AHo numbering) | DASDLAS |
| 102 | LCDR3 (L107-L138; AHo numbering) | AGGFSSSSDTA |
| 103 | LCDR1 (Kabat) | QSSESVYSNNQLS |
| 104 | LCDR2 (Kabat) | DASDLAS |

TABLE 1-continued

Sequence listing.

| SEQ ID NO: | Description | Sequence |
|---|---|---|
| 105 | LCDR3 (Kabat) | AGGFSSSSDTA |
| 106 | LCDR1 (Chothia) | SESVYSNNQ |
| 107 | LCDR2 (Chothia) | DAS |
| 108 | LCDR3 (Chothia) | GFSSSSDT |
| 109 | VL | DIQMTQSPSSLSASVGDRVTITCQSSESVYSNNQLSWYQQKPGQPPKLLIYDASDLASGVPSR FSGSGSGTDFTLTISSLQPEDFATYYCAGGFSSSSDTAFGGGTKLTVLG |
| 110 | scFv | DIQMTQSPSSLSASVGDRVTITCQSSESVYSNNQLSWYQQKPGQPPKLLIYDASDLASGVPSR FSGSGSGTDFTLTISSLQPEDFATYYCAGGFSSSSDTAFGGGTKLTVLGGGGGSGGGGSGGGG SGGGGGSEVQLVESGGGLVQPGGSLRLSCAASGFSLSSNAMGWVRQAPGKGLEYIGIISVG GFTYYASWAKGRFTISRDNSKNTVYLQMNSLRAEDTATYFCARDRHGDSSGAFYLWGQG TLVTVSS |

Anti-HSA domain (23-13-A01-sc03)

| SEQ ID NO: | Description | Sequence |
|---|---|---|
| 111 | HCDR1 (H27-H42; AHo numbering) | GFSFSSSYWIC |
| 112 | HCDR2 (H57-H76; AHo numbering) | CVFTGDGTTYYASWAKG |
| 113 | HCDR3 (H108-H138; AHo numbering) | RPVSVYYYGMDL |
| 114 | HCDR1 (Kabat) | SSYWIC |
| 115 | HCDR2 (Kabat) | CVFTGDGTTYYASWAKG |
| 116 | HCDR3 (Kabat) | PVSVYYYGMDL |
| 117 | HCDR1 (Chothia) | GFSFSSSY |
| 118 | HCDR2 (Chothia) | TGDG |
| 119 | HCDR3 (Chothia) | VSVYYYGMD |
| 120 | VH | EVQLVESGGGLVQPGGSLRLSCAASGFSFSSSYWICWVRQAPGKGLEWVGCVFTGDGTTY YASWAKGRFTISRDNSKNTVYLQMNSLRAEDTATYFCARPVSVYYYGMDLWGQGTLVTV SS |
| 121 | LCDR1 (L24-L42; AHo numbering) | QASQIISSRSA |
| 122 | LCDR2 (L58-L72; AHo numbering) | QASKLAS |
| 123 | LCDR3 (L107-L138; AHo numbering) | QCTYIDSNFGA |
| 124 | LCDR1 (Kabat) | QASQIISSRSA |

TABLE 1-continued

Sequence listing.

| SEQ ID NO: | Description | Sequence |
|---|---|---|
| 125 | LCDR2 (Kabat) | QASKLAS |
| 126 | LCDR3 (Kabat) | QCTYIDSNFGA |
| 127 | LCDR1 (Chothia) | SQIISSR |
| 128 | LCDR2 (Chothia) | QAS |
| 129 | LCDR3 (Chothia) | TYIDSNFG |
| 130 | VL | DVVMTQSPSSLSASVGDRVTITCQASQIISSRSAWYQQKPGQPPKLLIYQASKLASGVPSRFS GSGSGTDFTLTISSLQPEDFATYYCQCTYIDSNFGAFGGGTKLTVLG |
| 131 | scFv | DVVMTQSPSSLSASVGDRVTITCQASQIISSRSAWYQQKPGQPPKLLIYQASKLASGVPSRFS GSGSGTDFTLTISSLQPEDFATYYCQCTYIDSNFGAFGGGTKLTVLGGGGGSGGGGSGGGGS GGGGSEVQLVESGGGLVQPGGSLRLSCAASGFSFSSSYWICWVRQAPGKGLEWVGCVFTG DGTTYYASWAKGRFTISRDNSKNTVYLQMNSLRAEDTATYFCARPVSVYYYGMDLWGQG TLVTVSS |

Additional Linkers

| | | |
|---|---|---|
| 132 | Linker sequence unit | GGGGS |
| 133 | Generic linker sequence | (GmS)n, with m being selected from 2, 3 and 4 and with n being selected from 2, 3, 4, 5 and 6 |

TNFα

| | | |
|---|---|---|
| 134 | Transmembrane TNFα | MSTESMIRDVELAEEALPKKTGGPQGSRRCLFLSLFSFLIVAGATTLFCLLHFGVIGPQREEFP RDLSLISPLAQAVRSSSRTPSDKPVAHVVANPQAEGQLQWLNRRANALLANGVELRDNQLV VPSEGLYLIYSQVLFKGQGCPSTHVLLTHTISRIAVSYQTKVNLLSAIKSPCQRETPEGAEAKP WYEPIYLGGVFQLEKGDRLSAEINRPDYLDFAESGQVYFGIIAL |
| 135 | Soluble TNFα | VRSSSRTPSDKPVAHVVANPQAEGQLQWLNRRANALLANGVELRDNQLVVPSEGLYLIYS QVLFKGQGCPSTHVLLTHTISRIAVSYQTKVNLLSAIKSPCQRETPEGAEAKPWYEPIYLGGV FQLEKGDRLSAEINRPDYLDFAESGQVYFGIIAL |

Examples of multispecific molecules of the present invention

| | | |
|---|---|---|
| 136 | A3 LC | DIQMTQSPSSLSASVGDRVTITCQSSESVYSNNQLSWYQQKPGQPPKLLIYDASDLASGVPSR FSGSGSGTDFTLTISSLQPEDFATYYCAGGFSSSSDTAFGGGTKLTVLGRTRTVAAPSVFIFPP SDEQLKSGTASVVCLLNNFYPREAKVQWKVDNALQSGNSQESVTEQDSKDSTYSLSSTLTL SKADYEKHKVYACEVTHQGLSSPVTKSFNRGECGGGGSGGGGSDIQMTQSPSSLSASVGDR VTINCQASESISSWLAWYQQKPGKRPKLLIYKASTLASGVPSRFSGSGSGTDYTLTISSLQPE DFATYYCQGYYLDSSVDDNVFGGGTKLTVLGGGGGSGGGGSGGGGSGGGGSEVQLVESG GGLVQPGGSLRLSCAASGIDFSTYGISWVRQAPGKGLEWIAYIYPDYGITDYASWVNGRFTI SLDNAQNTVYLQMNSLRAEDTAVYYCARSGSYYSRGWGAHYFNLWGQGTLVTVSS |
| 137 | A3 HC | EVQLVESGGGLVQPGGSLRLSCAASGFSLSSNAMGWVRQAPGKGLEYIGIISVGGFTYYAS WAKGRFTISRDNSKNTVYLQMNSLRAEDTATYFCARDRHGGDSSGAFYLWGQGTLVTVSS ASTKGPSVFPLAPSSKSTSGGTAALGCLVKDYFPEPVTVSWNSGALTSGVHTFPAVLQSSGL YSLSSVVTVPSSSLGTQTYICNVNHKPSNTKVDKKVEPKSCGGGGSGGGGSDIQMTQSPSSL SASVGDRVTITCQASQTINYWLAWYQQKPGKAPKLLIYRASTLASGVPSRFSGSGSGTDFTL TISSLQPEDFATYYCQNYYYSTSRSYGFGGGTKLTVLGGGGGSGGGGSGGGGSGGGGSEVQ LVESGGGLVQPGGSLRLSCAASGFSFSSDYWMCWVRQAPGKGLEWIGCIYAGDVDDTDYA SWARGRFTISRDNSKNTVYLQMNSLRAEDTAVYYCARVDGFDITYFDLWGQGTLVTVSS |
| 138 | A4 LC | DIQMTQSPSSLSASVGDRVTITCQASQTINYWLAWYQQKPGKAPKLLIYRASTLASGVPSRF SGSGSGTDFTLTISSLQPEDFATYYCQNYYYSTSRSYGFGGGTKLTVLGRTRTVAAPSVFIFP PSDEQLKSGTASVVCLLNNFYPREAKVQWKVDNALQSGNSQESVTEQDSKDSTYSLSSTLT LSKADYEKHKVYACEVTHQGLSSPVTKSFNRGECGGGGSGGGGSDIQMTQSPSSLSASVGD RVTINCQASESISSWLAWYQQKPGKRPKLLIYKASTLASGVPSRFSGSGSGTDYTLTISSLQP EDFATYYCQGYYLDSSVDDNVFGGGTKLTVLGGGGGSGGGGSGGGGSGGGGSEVQLVES GGGLVQPGGSLRLSCAASGIDFSTYGISWVRQAPGKGLEWIAYIYPDYGITDYASWVNGRFT ISLDNAQNTVYLQMNSLRAEDTAVYYCARSGSYYSRGWGAHYFNLWGQGTLVTVSS |
| 139 | A4 HC | EVQLVESGGGLVQPGGSLRLSCAASGFSFSSDYWMCWVRQAPGKGLEWIGCIYAGDVDDT DYASWARGRFTISRDNSKNTVYLQMNSLRAEDTAVYYCARVDGFDITYFDLWGQGTLVTV |

TABLE 1-continued

Sequence listing.

| SEQ ID NO: | Description | Sequence |
|---|---|---|
| | | SSASTKGPSVFPLAPSSKSTSGGTAALGCLVKDYFPEPVTVSWNSGALTSGVHTFPAVLQSS GLYSLSSVVTVPSSSLGTQTYICNVNHKPSNTKVDKKVEPKSCGGGGSGGGGSDIQMTQSPS SLSASVGDRVTITCQSSESVYSNNQLSWYQQKPGQPPKLLIYDASDLASGVPSRFSGSGSGT DFTLTISSLQPEDFATYYCAGGFSSSSDTAFGGGTKLTVLGGGGSGGGGSGGGGSGGGGSE VQLVESGGGLVQPGGSLRLSCAASGFSLSSNAMGWVRQAPGKGLEYIGIISVGGFTYYASW AKGRFTISRDNSKNTVYLQMNSLRAEDTATYFCARDRHGGDSSGAFYLWGQGTLVTVSS |
| 140 | A5 LC | DIQMTQSPSSLSASVGDRVTINCQASESISSWLAWYQQKPGKRPKLLIYKASTLASGVPSRFS GSGSGTDYTLTISSLQPEDFATYYCQGYYLDSSVDDNVFGGGTKLTVLGRTRTVAAPSVFIF PPSDEQLKSGTASVVCLLNNFYPREAKVQWKVDNALQSGNSQESVTEQDSKDSTYSLSSTL TLSKADYEKHKVYACEVTHQGLSSPVTKSFNRGCGGGGSGGGGSDIQMTQSPSSLSASVG DRVTITCQSSESVYSNNQLSWYQQKPGQPPKLLIYDASDLASGVPSRFSGSGSGTDFTLTISS LQPEDFATYYCAGGFSSSSDTAFGGGTKLTVLGGGGSGGGGSGGGGSGGGGSEVQLVES GGGLVQPGGSLRLSCAASGFSLSSNAMGWVRQAPGKGLEYIGIISVGGFTYYASWAKGRFTI SRDNSKNTVYLQMNSLRAEDTATYFCARDRHGGDSSGAFYLWGQGTLVTVSS |
| 141 | A5 HC | EVQLVESGGGLVQPGGSLRLSCAASGIDFSTYGISWVRQAPGKGLEWIAYIYPDYGITDYAS WVNGRFTISLDNAQNTVYLQMNSLRAEDTAVYYCARSGSYYSRGWGAHYFNLWGQGTLV TVSSASTKGPSVFPLAPSSKSTSGGTAALGCLVKDYFPEPVTVSWNSGALTSGVHTFPAVLQ SSGLYSLSSVVTVPSSSLGTQTYICNVNHKPSNTKVDKKVEPKSCGGGGSGGGGSDIQMTQS PSSLSASVGDRVTITCQASQTINYWLAWYQQKPGKAPKLLIYRASTLASGVPSRFSGSGSGT DFTLTISSLQPEDFATYYCQNYYYSTSRSYGFGGGTKLTVLGGGGSGGGGSGGGGSGGGG SEVQLVESGGGLVQPGGSLRLSCAASGFSFSSDYWMCWVRQAPGKGLEWIGCIYAGDVDD TDYASWARGRFTISRDNSKNTVYLQMNSLRAEDTAVYYCARVDGFDITYFDLWGQGTLVT VSS |
| 142 | A6 | DIQMTQSPSSLSASVGDRVTITCQASQTINYWLAWYQQKPGKAPKLLIYRASTLASGVPSRF SGSGSGTDFTLTISSLQPEDFATYYCQNYYYSTSRSYGFGGGTKLTVLGGGGSEVQLVESG GGLVQPGGSLRLSCAASGFSLSSNAMGWVRQAPGKGLEYIGIISVGGFTYYASWAKGRFTIS RDNSKNTVYLQMNSLRAEDTATYFCARDRHGGDSSGAFYLWGQGTLVTVSSGGGGSGGG GSGGGGSGGGGSDIQMTQSPSSLSASVGDRVTITCQSSESVYSNNQLSWYQQKPGQPPKLLI YDASDLASGVPSRFSGSGSGTDFTLTISSLQPEDFATYYCAGGFSSSSDTAFGGGTKLTVLGG GGGSEVQLVESGGGLVQPGGSLRLSCAASGFSFSSDYWMCWVRQAPGKGLEWIGCIYAGD VDDTDYASWARGRFTISRDNSKNTVYLQMNSLRAEDTAVYYCARVDGFDITYFDLWGQGT LVTVSSGGGGSGGGGSDIQMTQSPSSLSASVGDRVTINCQASESISSWLAWYQQKPGKRPKL LIYKASTLASGVPSRFSGSGSGTDYTLTISSLQPEDFATYYCQGYYLDSSVDDNVFGGGTKLT VLGGGGGSGGGGSGGGGSGGGGSEVQLVESGGGLVQPGGSLRLSCAASGIDFSTYGISWVR QAPGKGLEWIAYIYPDYGITDYASWVNGRFTISLDNAQNTVYLQMNSLRAEDTAVYYCAR SGSYYSRGWGAHYFNLWGQGTLVTVSS |
| 143 | A7 | DIQMTQSPSSLSASVGDRVTINCQASESISSWLAWYQQKPGKRPKLLIYKASTLASGVPSRFS GSGSGTDYTLTISSLQPEDFATYYCQGYYLDSSVDDNVFGGGTKLTVLGGGGGSEVQLVES GGGLVQPGGSLRLSCAASGFSFSSDYWMCWVRQAPGKGLEWIGCIYAGDVDDTDYASWA RGRFTISRDNSKNTVYLQMNSLRAEDTAVYYCARVDGFDITYFDLWGQGTLVTVSSGGGG SGGGGSGGGGSGGGGSDIQMTQSPSSLSASVGDRVTITCQASQTINYWLAWYQQKPGKAPK LLIYRASTLASGVPSRFSGSGSGTDFTLTISSLQPEDFATYYCQNYYYSTSRSYGFGGGTKLT VLGGGGGSEVQLVESGGGLVQPGGSLRLSCAASGIDFSTYGISWVRQAPGKGLEWIAYIYPD YGITDYASWVNGRFTISLDNAQNTVYLQMNSLRAEDTAVYYCARSGSYYSRGWGAHYFNL WGQGTLVTVSSGGGGSGGGGSDIQMTQSPSSLSASVGDRVTITCQSSESVYSNNQLSWYQQ KPGQPPKLLIYDASDLASGVPSRFSGSGSGTDFTLTISSLQPEDFATYYCAGGFSSSSDTAFGG GTKLTVLGGGGSGGGGSGGGGSGGGGSEVQLVESGGGLVQPGGSLRLSCAASGFSLSSNA MGWVRQAPGKGLEYIGIISVGGFTYYASWAKGRFTISRDNSKNTVYLQMNSLRAEDTATYF CARDRHGGDSSGAFYLWGQGTLVTVSS |
| 144 | A8 | DIQMTQSPSSLSASVGDRVTITCQSSESVYSNNQLSWYQQKPGQPPKLLIYDASDLASGVPSR FSGSGSGTDFTLTISSLQPEDFATYYCAGGFSSSSDTAFGGGTKLTVLGGGGGSEVQLVESGG GLVQPGGSLRLSCAASGIDFSTYGISWVRQAPGKGLEWIAYIYPDYGITDYASWVNGRFTIS LDNAQNTVYLQMNSLRAEDTAVYYCARSGSYYSRGWGAHYFNLWGQGTLVTVSSGGGGS GGGGSGGGGSGGGGSDIQMTQSPSSLSASVGDRVTINCQASESISSWLAWYQQKPGKRPKL LIYKASTLASGVPSRFSGSGSGTDYTLTISSLQPEDFATYYCQGYYLDSSVDDNVFGGGTKLT VLGGGGGSEVQLVESGGGLVQPGGSLRLSCAASGFSLSSNAMGWVRQAPGKGLEYIGIISV GGFTYYASWAKGRFTISRDNSKNTVYLQMNSLRAEDTATYFCARDRHGGDSSGAFYLWGQ GTLVTVSSGGGGSGGGGSDIQMTQSPSSLSASVGDRVTITCQASQTINYWLAWYQQKPGKA PKLLIYRASTLASGVPSRFSGSGSGTDFTLTISSLQPEDFATYYCQNYYYSTSRSYGFGGGTK LTVLGGGGSGGGGSGGGGSGGGGSEVQLVESGGGLVQPGGSLRLSCAASGFSFSSDYWM CWVRQAPGKGLEWIGCIYAGDVDDTDYASWARGRFTISRDNSKNTVYLQMNSLRAEDTA VYYCARVDGFDITYFDLWGQGTLVTVSS |
| 145 | A9 | DIQMTQSPSSLSASVGDRVTINCQASESISSWLAWYQQKPGKRPKLLIYKASTLASGVPSRFS GSGSGTDYTLTISGLQPEDFATYYCQGYYLDSSVDDNVFGTGTKVTVLGGGGGSEVQLVES GGGLVQPGGSLRLSCAASGFSFSSDYWMCWVRQAPGKGLEWIGCIYAGDVDDTDYASWA RGRFTISRDNSKNTVYLQMNSLRAEDTAVYYCARVDGFDITYFDLWGQGTLVTVSSGGGG SGGGGSGGGGSGGGGSDIQMTQSPSSLSASVGDRVTITCQASQTINYWLAWYQQKPGKAPK LLIYRASTLASGVPSRFSGSGSGTDFTLTISSLQPEDFATYYCQNYYYSTSRSYGFGGGTKLT |

TABLE 1-continued

Sequence listing.

| SEQ ID NO: | Description | Sequence |
|---|---|---|
| | | VLGGGGGSEVQLVESGGGLVQPGGSLRLSCAASGIDESTYGISWVRQAPGKGLEWIAYIYPD YGITDYASWVNGRFTISLDNAQNTVYLQMNSLRAEDTAVYCARSGSYYSRGWGAHYFNL WGQGTLVTVSSGGGGSGGGGSDIQMTQSPSSLSASVGDRVTITCQSSESVYSNNQLSWYQQ KPGQPPKLLIYDASDLASGVPSRFSGSGSGTDFTLTISSLQPEDFATYYCAGGFSSSSDTAFGG GTKLTVLGGGGSGGGGSGGGGSGGGGSEVQLVESGGGLVQPGGSLRLSCAASGFSLSSNA MGWVRQAPGKGLEYIGIISVGGFTYYASWAKGRFTISRDNSKNTVYLQMNSLRAEDTATYF CARDRHGGDSSGAFYLWGQGTLVTVSS |
| 146 | A10 | DIQMTQSPSSLSASVGDRVTINCQASESISSWLAWYQQKPGQRPKLLIYKASTLASGVPSRFS GSGSGTDYTLTISSLQPEDFATYYCQGYYLDSSVDDNVFGTGTKVTVLGGGGGSEVQLVES GGGLVQPGGSLRLSCAASGFSFSSDYWMCWVRQAPGKGLEWIGCIYAGDVDDTDYASWA RGRFTISRDNSKNTVYLQMNSLRAEDTAVYYCARVDGFDITYFDLWGQGTLVTVSSGGGG SGGGGSGGGGSGGGGSDIQMTQSPSSLSASVGDRVTITCQASQTINYWLAWYQQKPGKAPK LLIYRASTLASGVPSRFSGSGSGTDFTLTISSLQPEDFATYYCQNYYYSTSRSYGFGGGTKLT VLGGGGGSEVQLVESGGGLVQPGGSLRLSCAASGIDFSTYGISWVRQAPGKGLEWIAYIYPD YGITDYASWVNGRFTISLDNAQNTVYLQMNSLRAEDTAVYYCARSGSYYSRGWGAHYFNL WGQGTLVTVSSGGGGSGGGGSDIQMTQSPSSLSASVGDRVTITCQSSESVYSNNQLSWYQQ KPGQPPKLLIYDASDLASGVPSRFSGSGSGTDFTLTISSLQPEDFATYYCAGGFSSSSDTAFGG GTKLTVLGGGGSGGGGSGGGGSGGGGSEVQLVESGGGLVQPGGSLRLSCAASGFSLSSNA MGWVRQAPGKGLEYIGIISVGGFTYYASWAKGRFTISRDNSKNTVYLQMNSLRAEDTATYF CARDRHGGDSSGAFYLWGQGTLVTVSS |
| 147 | A11 | DIQMTQSPSSLSASVGDRVTINCQASESISSWLAWYQQKPGKRPKLLIYKASTLASGVPSRFS GSGSGTDYTLTISGLQPEDFATYYCQGYYLDSSVDDNVFGTGTKVTVLGGGGGSEVQLVES GGGLVQPGGSLRLSCAASGFSFSSDYWMCWVRQAPGKGLEWIGCIYAGDVDDTDYASWA RGRFTISRDNSKNTVYLQMNSLRAEDTAVYYCARVDGFDITYFDLWGQGTLVTVSSGGGG SGGGGSGGGGSGGGGSIQMTQSPSSLSASVGDRVTITCQASQTINYWLAWYQQKPGKAPKL LIYRASTLASGVPSRFSGSGSGTDFTLTISSLQPEDFATYYCQNYYYSTSRSYGFGGGTKLTV LGGGGGSEVQLVESGGGLVQPGGSLRLSCAASGIDFSTYGISWVRQAPGKGLEWIAYIYPDY GITDYASWVNGRFTISLDNAQNTVYLQMNSLRAEDTAVYYCARSGSYYSRGWGAHYFNL WGQGTLVTVSSGGGGSGGGGSIQMTQSPSSLSASVGDRVTITCQSSESVYSNNQLSWYQQK PGQPPKLLIYDASDLASGVPSRFSGSGSGTDFTLTISSLQPEDFATYYCAGGFSSSSDTAFGGG TKLTVLGGGGSGGGGSGGGGSGGGGSEVQLVESGGGLVQPGGSLRLSCAASGFSLSSNA MGWVRQAPGKGLEYIGIISVGGFTYYASWAKGRFTISRDNSKNTVYLQMNSLRAEDTATYF CARDRHGGDSSGAFYLWGQGTLVTVSS |
| 148 | A12 | DIQMTQSPSSLSASVGDRVTINCQASESISSWLAWYQQKPGQRPKLLIYKASTLASGVPSRFS GSGSGTDYTLTISSLQPEDFATYYCQGYYLDSSVDDNVFGTGTKVTVLGGGGGSEVQLVES GGGLVQPGGSLRLSCAASGFSFSSDYWMCWVRQAPGKGLEWIGCIYAGDVDDTDYASWA RGRFTISRDNSKNTVYLQMNSLRAEDTAVYYCARVDGFDITYFDLWGQGTLVTVSSGGGG SGGGGSGGGGSGGGGSIQMTQSPSSLSASVGDRVTITCQASQTINYWLAWYQQKPGKAPKL LIYRASTLASGVPSRFSGSGSGTDFTLTISSLQPEDFATYYCQNYYYSTSRSYGFGGGTKLTV LGGGGGSEVQLVESGGGLVQPGGSLRLSCAASGIDFSTYGISWVRQAPGKGLEWIAYIYPDY GITDYASWVNGRFTISLDNAQNTVYLQMNSLRAEDTAVYYCARSGSYYSRGWGAHYFNL WGQGTLVTVSSGGGGSGGGGSIQMTQSPSSLSASVGDRVTITCQSSESVYSNNQLSWYQQK PGQPPKLLIYDASDLASGVPSRFSGSGSGTDFTLTISSLQPEDFATYYCAGGFSSSSDTAFGGG TKLTVLGGGGSGGGGSGGGGSGGGGSEVQLVESGGGLVQPGGSLRLSCAASGFSLSSNA MGWVRQAPGKGLEYIGIISVGGFTYYASWAKGRFTISRDNSKNTVYLQMNSLRAEDTATYF CARDRHGGDSSGAFYLWGQGTLVTVSS |
| 149 | A13 | DIQMTQSPSSLSASVGDRVTINCQASESISSWLAWYQQKPGKRPKLLIYKASTLASGVPSRFS GSGSGTDYTLTISSLQPEDFATYYCQGYYLDSSVDDNVFGGGTKLTVLGGGGGSEVQLVES GGGLVQPGGSLRLSCAASGFSLSSNAMGWVRQAPGKGLEYIGIISVGGFTYYASWAKGRFTI SRDNSKNTVYLQMNSLRAEDTATYFCARDRHGGDSSGAFYLWGQGTLVTVSSGGGGSGG GGSGGGGSGGGGSDIQMTQSPSSLSASVGDRVTITCQSSESVYSNNQLSWYQQKPGQPPKLL IYDASDLASGVPSRFSGSGSGTDFTLTISSLQPEDFATYYCAGGFSSSSDTAFGGGTKLTVLG GGGGSEVQLVESGGGLVQPGGSLRLSCAASGIDFSTYGISWVRQAPGKGLEWIAYIYPDYGI TDYASWVNGRFTISLDNAQNTVYLQMNSLRAEDTAVYYCARSGSYYSRGWGAHYFNLWG QGTLVTVSS |

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. All combinations of the embodiments pertaining to the invention are specifically embraced by the present invention and are disclosed herein just as if each and every combination was individually and explicitly disclosed. In addition, all sub-combinations of the various embodiments and elements thereof are also specifically embraced by the present invention and are disclosed herein just as if each and every such sub-combination was individually and explicitly disclosed herein.

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

To the extent possible under the respective patent law, all patents, applications, publications, test methods, literature, and other materials cited herein are hereby incorporated by reference.

The following Examples illustrates the invention described above, but is not, however, intended to limit the scope of the invention in any way. Other test models known as such to the person skilled in the pertinent art can also determine the beneficial effects of the claimed invention.

EXAMPLES

Example 1: Generation of Rabbit Antibodies Directed Against Human IL-17A 1.1 Immunization Rabbits have been immunized with recombinantly produced and purified IL-17A (Peprotech, Cat. No. 200-17). During the course of the immunization, the strength of the humoral immune response against the antigen was qualitatively assessed by determining the maximal dilution (titer) for the serum of each rabbit that still results in detectable binding of the polyclonal serum antibodies to the antigen. Serum antibody titers against the immobilized antigen (recombinant human IL-17A) were assessed using an enzyme-linked immunosorbent assay (ELISA).

The ability of the rabbit sera to inhibit the biological activity of IL-17A was assessed using a cell-based assay with HT-29 cells that secrete GRO-α upon IL-17A-stimulation. 50'000 HT-29 cells per well were seeded in 96-well plates and stimulated with 50 ng/ml IL-17A. 5-fold serial dilutions of final bleeds of IL-17A immunized rabbits were tested for the potency to neutralize biological function of IL-17A. All five sera inhibited GRO-α secretion of HT-29 cells. Lymphocytes were isolated from spleens of immunized animals and were a subject for the subsequent Hit Identification procedures.

Figure 1:
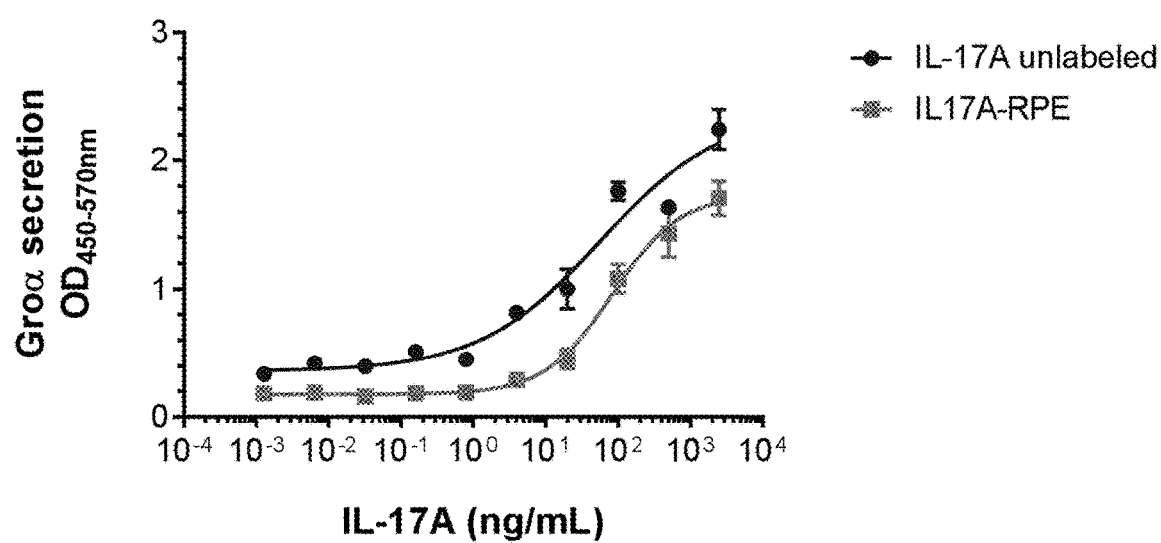
FIG. 1 shows that labeled IL-17A is suitable for use in the sorting process. Biological activity of labeled IL-17A in the HT-29 assay. 3-fold serial dilutions of labeled and un-labeled IL-17A were tested in parallel for their potential to induce GRO-α secretion in HT-29 cells. $EC_{50}$ values for labeled (IL-17A-RPE) and unlabeled (IL-17A) IL-17A are 82.8 ng/ml and 55 ng/ml respectively.

1.2 Identification of Anti-IL-17A Antibodies 1.2.1 Isolation of B Cells Expressing Anti-IL-17A Antibodies To identify IL-17A binding B-cells, IL-17A was labeled with R-Phycoerythrin (RPE). Since the IL-17 receptor A binding site on the labeled IL-17A could potentially be blocked by the bulky RPE label, accessibility of the epitope was confirmed by two approaches. In a first assay, binding of RPE labeled IL-17A to secukinumab and IL-17 receptor A was analyzed using flow-cytometry. Secukinumab and IL-17 receptor A extracellular domain fused to the Fc part of a human IgG1 were captured on protein G beads, and binding of RPE labeled IL-17A was confirmed by flow-cytometry. Binding of IL-17A to secukinumab and IL-17 receptor A Fc chimera was thereby confirmed while no binding to an unrelated IgG or cytokine receptor was detected. In a second approach, biological activity of the labeled IL-17A was confirmed in the HT-29 assay. As shown in FIG. 1, RPE labeled IL-17A showed only slightly reduced biological activity when compared to unlabeled IL-17A (1.5-fold higher $EC_{50}$ for induction of IL-17A-dependent GRO-α secretion). Therefore, it was confirmed that the labeled IL-17A is suitable for use in the sorting process.

1.2.2 Screening of IL-17A-Binding Supernatants

The results obtained during the screening phase are based on assays performed with non-purified antibodies from culture supernatants of antibody secreting cells (ASC). ASC supernatants were screened in a high-throughput ELISA for binding to recombinant human IL-17A. IL-17A-binding supernatants were further characterized for their binding kinetics and for their potential to neutralize the biological activity of IL-17A in the cell-based HT-29 assay and a competition ELISA. IL-17A-binding supernatants were further characterized for binding to Cynomolgus monkey IL-17A by ELISA.

1.2.2.1 IL-17A Binding by ELISA

To identify B-cell clones that produce antibodies binding human IL-17A, cell culture supernatants of B-cell clones were analyzed for the presence of antibodies to human IL-17A by ELISA. The ELISA method used assesses the "quantity" of antibodies of the IgG subtype bound to recombinant human IL-17A, gives however no information about the affinity or the concentration of the antibodies.

1.2.2.2 Affinity to Human IL-17A

Binding affinities of monoclonal rabbit antibodies toward human IL-17A from culture supernatants that qualified positive during the primary screening were determined by surface plasmon resonance (SPR) using a MASS-1 SPR device (Sierra Sensors). For affinity screening, an antibody specific for the Fc region of rabbit IgGs was immobilized on a sensor chip (SPR-2 Affinity Sensor, High Capacity Amine, Sierra Sensors) using a standard amine-coupling procedure. Rabbit monoclonal antibodies in B-cell supernatants were captured by the immobilized anti-rabbit IgG antibody. A minimal IgG concentration in the B-cell supernatants is required to allow sufficient capture. After capturing of the monoclonal antibodies, human IL-17A was injected into the flow cells for 3 min at a concentration of 90 nM, and dissociation of the protein from the IgG captured on the sensor chip was allowed to proceed for 5 min. The apparent dissociation (kd) and association (ka) rate constants and the apparent dissociation equilibrium constant ($K_D$) were calculated with the MASS-1 analysis software (Analyzer, Sierra Sensors) using one-to-one Langmuir binding.

1.2.2.3 Neutralization of IL-17A by the HT-29 Assay and a Competition ELISA

For the assessment of potency, a cell-based assay (HT-29 assay), as well as a receptor ligand competition-ELISA, were developed.

The ability of the antibodies in B cell supernatant to inhibit the biological activity of IL-17A was assessed using a cell-based assay with HT-29 cells that secrete GRO-α upon IL-17A stimulation. 50'000 HT-29 cells per well were seeded in 96-well plates and stimulated with 5 ng/ml IL-17A. B cell supernatants at a final concentration of 50% were analyzed for the potency to neutralize biological function of IL-17A.

The inhibition of hIL-17A binding to hIL-17RA was assessed by competitive ELISA. hIL-17RA was coated on the ELISA plate at a concentration of 4 µg/ml. Biotinylated hIL-17A (20 ng/ml) was preincubated with B cell supernatants (95%) for 1 h, the mixture was then added to the ELISA plate to allow binding to the hIL-17RA for 1.5 h. Then, Streptavidin-HRP, used to Biotinylated IL-17A was detected by Streptavidin-HRP.

1.2.2.4 Species Cross-Reactivity (Binding to Cynomolgus Monkey IL-17A by SPR)

Selected hits were analyzed for species cross-reactivity to cynomolgus monkey IL-17A by SPR. Binding affinities were determined by surface plasmon resonance (SPR) using a MASS-1 SPR device (Sierra Sensors) similarly as described in section 1.2.2.2 for human IL-17A with the exception that 90 nM cynomolgus monkey IL-17A was used instead of human IL-17A.

1.2.2.5 IL-17F Binding by ELISA

To confirm specificity of the anti-IL-17A scFvs, binding to all the IL-17 family members (IL-17B, IL-17C, IL-17D, IL-17F and IL-17E) was assessed for the best performing humanized scFvs. The sort supernatants were screened in ELISA for binding to IL-17F because IL-17F shows the highest identity to IL-17A (47%, see TABLE 2). Binding was quantified relative to the signal obtained with 2 μg/ml secukinumab.

TABLE 2

Identity between IL-17A and the other members of the IL-17 family. Data was obtained by aligning the IL-17A sequence (UniProtKB/Swiss-Prot: Q16552.1) to IL-17B, IL-17C, IL-17D, IL-17F and IL-17E using EMBOSS NEEDLE (with std settings).

| IL-17 Family Member | Identity to IL-17A | Similarity to IL-17A |
|---|---|---|
| IL-17B | 26.6 | 36.4 |
| IL-17C | 23.4 | 31.8 |
| IL-17D | 21.8 | 27.5 |
| IL-17E | 21.3 | 31.7 |
| IL-17F | 47.2 | 62 |

1.3 Functional Characterization

Based on pharmacologic properties of monoclonal antibodies in B-cell supernatant a number of clones were selected for hit confirmation analysis. Pharmacologic properties of monoclonal antibodies of the selected clone in B-cell supernatant are presented in TABLE 3.

1.3.1 IL-17A Binding Kinetics (by SPR)

Binding kinetics of a number of purified monoclonal rabbit antibodies to human IL-17A were determined by SPR (Mass-1) measurements. Each IgG was captured via an anti-rabbit IgG (Bethyl Laboratories, Cat. No. A120-111A) coupled to a carboxylmethylated dextran surface (SPR-2 Affinity Sensor, High Capacity Amine, Sierra Sensors) and an IL-17A dose response was measured to allow accurate fitting of kinetic parameters. After capturing of the monoclonal antibodies, human IL-17A (Peprotech, Cat. No. 200-17) was injected into the flow cells for 3 min and dissociation of the protein from the IgG captured on the sensor chip was allowed to proceed for 5 min. After each injection cycle, surfaces were regenerated with two injections of 10 mM Glycine-HCl. The apparent dissociation (kd) and association (ka) rate constants and the apparent dissociation equilibrium constant ($K_D$) were calculated with the MASS-1 analysis software (Analyzer, Sierra Sensors) using one-to-one Langmuir binding model and quality of the fits was monitored based on relative Chi2 (Chi2 normalized to the extrapolated maximal binding level of the analyte), which is a measure for the quality of the curve fitting.

High-affinity binding to human IL-17A was confirmed for all antibodies with $K_D$ values ranging down to sub-picomolar affinities ($2.87 \times 10^{-10}$ to below $1.51 \times 10^{-13}$ M). Monoclonal antibodies of the selected clone 27-07-G02 have a dissociation constant ($K_D$) of 1.88 pM, ka for on-rates of $2.44 \times 10^6 M^{-1}s^{-1}$, and kd for off-rates of $4.58 \times 10^{-6} s^{-1}$ as measured by SPR (see TABLE 3). Monoclonal antibodies of the selected clone 27-31-004 have a dissociation constant ($K_D$) of less than 0.5 pM, ka for on-rates of $1.99 \times 10^6 M^{-1}s^{-1}$, and kd for off-rates less than $1 \times 10^{-6} s^{-1}$ as measured by SPR (see TABLE 3).

1.3.2 Cross-Reactivity to Cynomolgus Monkey IL-17A (by SPR)

Species cross-reactivity for cynomolgus monkey IL-17A was determined for the selected purified monoclonal rabbit antibodies by SPR (Mass-1) measurements similarly as described above. Trenzyme company custom-produced cynomolgus monkey IL-17A was used in the assays. Monoclonal antibodies of the selected clone 27-07-G02 had a dissociation constant ($K_D$) of 0.6 pM, ka for on-rates of $1.24 \times 10^6 M^{-1}s^{-1}$, and kd for off-rates of $7.72 \times 10^{-6} s^{-1}$ as measured by SPR (see TABLE 3). The ration of $K_{DcynoIL-17A}/K_{DhumanIL-17A}$ as measured by SPR was determined to be 0.3 (see TABLE 3). Monoclonal antibodies of the selected clone 27-31-C04 had a dissociation constant ($K_D$) of less than 25 pM, ka for on-rates of $1.69 \times 10^6 M^{-1}s^{-1}$, and kd for off-rates $4.22 \times 10^{-5} s^{-1}$ as measured by SPR (see TABLE 3). The ration of $K_{DcynoIL-17A}/K_{DhumanIL-17A}$ as measured by SPR was determined to be more than 5 (see TABLE 3).

1.3.3 Neutralization of Human IL-17A (by the HT-29 Assay)

The effects of purified rabbit monoclonal antibodies on IL-17A-induced GRO-α secretion of the human colon carcinoma cell line HT-29 was examined. The potency ($IC_{50}$) to neutralize IL-17A-induced GRO-α secretion (as quantified by a commercial ELISA) was analyzed for serial dilutions of all antibodies and compared to the potency of secukinumab. Data were analyzed using a four-parameter logistic curve fit, and the molar concentration of IL-17A inhibitor required to reduce GRO-α secretion to 50% ($IC_{50}$) was derived from inhibition curves. In order to render $IC_{50}$ values from different assay plates directly comparable to each other, individual $IC_{50}$ values on each plate were calibrated against the $IC_{50}$ of the reference molecule secukinumab that was taken along on each plate (relative $IC_{50}$: $IC_{50,\ secukinumab}/IC_{50,\ test\ antibody}$). Relative $IC_{50}$ values were calculated in mass units (ng/ml) of secukinumab and the scFvs.

Neutralization assays can distinguish potencies of target blocking antibodies only if they bind their target with an equilibrium binding constant ($K_D$) that is higher than the target concentration used in the potency assay ($K_D$>target concentration). For the HT-29 assay an IL-17A concentration of 20 ng/ml (=645 pM) was used. Therefore, theoretically, the HT-29 assay can differentiate potencies between IgGs with $K_D$>645 pM. Since all of the IgGs analyzed showed $K_D$ values below 645 pM, potencies between IgGs with different affinities (but similar mechanism of action) cannot be differentiated with this. Thus, the HT-29 assay was further developed to include 50 pg/ml TNFα in order to better resolve potencies. This cytokine acts synergistically with IL-17A to induce GRO-α secretion, and as a result the IL-17A concentration could be reduced to 1 ng/ml (=32 pM) in the presence of TNFα.

The selected clone 27-07-G02 showed a potency above 50-fold of (see TABLE 3, FIG. 2). More specifically, the clone 27-07-G02 was shown to have a potency to neutralize IL-17A relative to that of secukinumab (relative potency), determined in an HT-29 assay, of 75 for $IC_{50}$ and 48 for $IC_{90}$, and wherein said relative potency is the ratio of the $IC_{50}$ or $IC_{90}$ value in ng/mL of secukinumab in the HT-29 assay to the $IC_{50}$ or $IC_{90}$ value in ng/mL of the monoclonal antibody of the clone 27-07-G02 in the HT-29 assay (see TABLE 3, FIG. 2).

The selected clone 27-31-004 showed a potency above 100-fold of secukinumab (see TABLE 3, FIG. 2). More specifically, the selected clone 27-31-004 was shown to have a potency to neutralize IL-17A relative to that of secukinumab (relative potency), determined in an HT-29 assay, of 287 for $IC_{50}$ and 704 for $IC_{90}$, and wherein said relative potency is the ratio of the $IC_{50}$ or $IC_{90}$ value in ng/mL of secukinumab in the HT-29 assay to the $IC_{50}$ or $IC_{90}$ value in ng/mL of the monoclonal antibody of the clone 27-31-004 in the HT-29 assay (see TABLE 3, FIG. 2).

1.3.4 Blocking of the Human IL-17A/IL-17RA Interaction (by Competitive ELISA)

The inhibition of hIL-17A binding to hIL-17RA was assessed by competitive ELISA. hIL-17RA was coated on the ELISA plate by adding 50 μl of PBS containing 4 μg/ml IL-17RA (Sino Biological Cat. No. 10895-H08H) ON at 4° C. Biotinylated hIL-17A was preincubated with the rabbit monoclonal antibodies for 1 h, the mixture was then added to the ELISA plate to allow binding to the hIL-17RA for 1.5 h. Then, 50 μl of 10 ng/ml streptavidin-polyHRP40 (SDT Cat. No. SP40C), used to detect the biotinylated IL-17A, was added and the plate was incubated for 1 h. Finally, Tetramethylbenzidin solution (KPL, Cat. No. 53-00-00) was added to develop the plate for 5 to 10 minutes and the reaction was stopped with 1 M HCl. The plate was read using a microtiter plate reader (Infinity reader M200 Pro, Tecan) at a wavelength of 450 nm and 570 nm (reference wavelength).

Dose-response curve obtained for the selected rabbit IgG is represented in FIG. 3. $IC_{50}$ values and $IC_{90}$ values compared to the reference secukinumab are summarized in TABLE STABLE 3. As mentioned in the previous section, neutralization assays can distinguish potencies of target blocking antibodies only if they bind their target with an equilibrium binding constant ($K_D$) that is higher than the target concentration used in the potency assay ($K_D$>target concentration). For the HT-29 assay a IL-17A concentration of 32 pM was used while in the IL-17A/IL-17RA inhibition ELISAs a IL-17A concentration of 193 pM was used. Therefore, theoretically, the HT-29 assay can differentiate potencies between IgGs with $K_D$>32 pM, while the inhibition ELISA can only differentiate potencies between IgGs with $K_D$>193 pM. Like in the HT-29 assay, clone 27-07-G02 and clone 27-31-004 showed a higher potency than secukinumab. The clone 27-07-G02 was shown to have a potency to block IL-17A/IL-17RA interaction relative to that of secukinumab (relative potency), determined in an ELISAassay, of 5 for $IC_{50}$ and 14 for $IC_{90}$, and wherein said relative potency is the ratio of the $IC_{50}$ or $IC_{90}$ value in ng/mL of secukinumab in the ELISA assay to the $IC_{50}$ or $IC_{90}$ value in ng/mL of the monoclonal antibody of the clone 27-07-G02 in the ELISA assay. Similarly, the clone 27-31-004 was shown to have a potency to block IL-17A/IL-17RA interaction relative to that of secukinumab (relative potency), determined in an ELISA assay, of 8 for $IC_{50}$ and 21 for $IC_{90}$, (see TABLE 3).

1.3.5 Cross-Reactivity to Cynomolgus Monkey IL-17A (by HT-29 Assay)

50'000 HT-29 cells were plated in each well of a 96-well plate. In addition to serial dilutions of rabbit monoclonal antibodies and the internal reference secukinumab, pre-dilutions of human TNFα (50 pg/ml) and human or cynomolgus monkey IL-17A (1 ng/ml), respectively, were added to the HT-29 cells. After 24 h incubation at 37° C. and 5% CO2, supernatants were collected and GRO-α (CXCL1 chemokine) secretion was quantified by ELISA. In order to render $IC_{50}$ values obtained with cynomolgus IL-17A directly comparable to each other, individual $IC_{50}$ values on each plate were calibrated against the $IC_{50}$ obtained with human IL-17A that was taken along on each plate (relative $IC_{50}$: $IC_{50,\ cynomolgus\ IL-17A}/IC_{50,\ human\ IL-17A}$). Potency of the selected clone is presented in TABLE 3. For the clone 27-07-G02 the potency ($IC_{50}$) to neutralize cynomolgus IL-17A-induced GRO-α secretion was determined to be 0.64 ng/ml, and for the clone 27-31-004 the potency ($IC_{50}$) to cynomolgus IL-17A-induced GRO-α secretion was determined to be 0.49 ng/ml (see TABLE 3).

Amended Description

TABLE 3

Pharmacodynamic properties of clones 27-07-G02 and 27-31-C04 monoclonal rabbit anti-IL-17A IgGs selected from immunization.

| | IgG | | | | | | |
|---|---|---|---|---|---|---|---|
| | Affinity for human IL-17A (SPR) | | | Affinity for cynomolgus IL-17A (SPR) | | | Ratio IL-17A binding SPR $(KD_{cynoIL-17A})/(KD_{human\ IL-17A})$ |
| Clone ID | $k_a$ [M$^{-1}$ s$^{-1}$] | $k_d$ [s$^{-1}$] | $K_D$ [M] | $k_a$ [M$^{-1}$ s$^{-1}$] | $k_d$ [s$^{-1}$] | $K_D$ [M] | |
| 27-07-G02 | 2.44E+06 | 4.58E−06 | 1.88E−12 | 1.24E+06 | 7.72E−07 | 6.22E−13 | 0.3 |

| | IgG | | | | | | |
|---|---|---|---|---|---|---|---|
| | Potency in HT-29 assay | | Potency in IL17A-IL17RA ELISA | | HT-29 assay with human and cyno IL17A | | Relative binding to IL-17F (ELISA) |
| Clone ID | rel. $IC_{50}$* | rel. $IC_{90}$* | rel. $IC_{50}$* | rel. $IC_{90}$* | $IC_{50}$ [ng/mL] human IL17A | $IC_{50}$ [ng/mL] cyno IL17A | rel. $IC_{50}$** | Rel. OD$_{(450-690\ nm)}$ [OD$_{,IL17F}$/OD$_{,IL17A}$] |
| 27-07-G02 | 74.88 | 47.95 | 4.94 | 13.64 | 0.32 | 0.64 | 1.98 | 1% |

| | IgG | | | | | | |
|---|---|---|---|---|---|---|---|
| | Affinity for human IL-17A (SPR) | | | Affinity for cynomolgus IL-17A (SPR) | | | Ratio IL-17A binding SPR $(KD_{cynoIL-17A})/(KD_{human\ IL-17A})$ |
| Clone ID | $k_a$ [M$^{-1}$ s$^{-1}$] | $k_d$ [s$^{-1}$] | $K_D$ [M] | $k_a$ [M$^{-1}$ s$^{-1}$] | $k_d$ [s$^{-1}$] | $K_D$ [M] | |
| 27-31-C04 | 1.99E+06 | <1E−06 | <5.03E−13 | 1.69E+06 | 4.22E−05 | 2.50E−11 | >5.0 |

| | IgG | | | | | | |
|---|---|---|---|---|---|---|---|
| | Potency in HT-29 assay | | Potency in IL17A-IL17RA ELISA | | HT-29 assay with human and cyno IL17A | | Relative binding to IL-17F (ELISA) |
| Clone ID | rel. $IC_{50}$* | rel. $IC_{90}$* | rel. $IC_{50}$* | rel. $IC_{90}$* | $IC_{50}$ [ng/mL] human IL17A | $IC_{50}$ [ng/mL] cyno IL17A | rel. $IC_{50}$** | Rel. OD$_{(450-690\ nm)}$ [OD$_{,IL17F}$/OD$_{,IL17A}$] |
| 27-31-C04 | 286.79 | 703.62 | 7.93 | 21.31 | 0.41 | 0.49 | 1.19 | 19% |

*$IC_{XX}$, Secukinumab/$IC_{XX}$, Test Sample
**$IC_{XX}$, cyno IL17A/$IC_{XX}$, human IL17A

TABLE 4

Binding of rabbit monoclonal antibodies to IL-17F. The OD(450-690 nm) for IL-17F binding by IgG (10 µg/ml) is calculated relative to a) OD(450-690 nm) for secukinumab binding and b) OD(450-690 nm) for IL-17A binding.

| Clone ID | IgG Relative binding IL-17F compared to secukinumab at 10 µg/ml Binding IL-17F rel. to 10 µg/ml secukinumab (%) | Relative binding IL-17F compared to IL-17A at 10 µg/ml $OD_{IL-17F}/OD_{IL-17A}$ (%) |
|---|---|---|
| 27-31-C04 | 19.7% | 19.1% |

1.3.6 Selectivity for IL-17A Versus IL-17F

Selectivity of IgG binding to IL-17A over other IL-17 family members was determined to ensure target-specific binding. To determine the binding of anti-IL-17A IgG to IL-17F a direct ELISA was developed in which the plate is coated with IL-17A or IL-17F (Peprotech Cat. No. 200-25) and incubated with 10 µg/ml recombinant anti-IL-17A IgG (including secukinumab as control). The OD(450-690 nm) for IL-17F binding is calculated relative to a) OD(450-690 nm) for IL-17A binding and b) OD(450-690 nm) for secukinumab binding. Data is summarized in TABLE 4.

Example 2: Humanization and Generation of scFv 2.1 Generation of Humanized scFv Antibodies Based on data obtained during hit confirmation, clones 27-07-G02 and 27-31-004 were selected for humanization. The humanization of the selected clones comprised the transfer of the rabbit CDRs onto an scFv acceptor framework of the Vκ1-λcap/VH3 type as described in WO 2014/206561. In this process, the amino acid sequence of the six CDR regions was identified on the donor sequence (rabbit mAb) and grafted into the acceptor scaffold sequence, resulting in the constructs termed "CDR graft" (see (see SEQ ID NO: 24, A1; and SEQ ID NO: 61, PRO571, respectively). In addition, a second graft was designed for both clones 27-07-G02 and 27-31-004 (SEQ ID NO: 25, A2; and SEQ ID NO: 62, PRO592, respectively), which included additional amino acids modifications from the rabbit donor in certain framework positions, which have been described to potentially influence CDR positioning and thus antigen binding and/or stability (Borras et al., 2010; J. Biol. Chem., 285:9054-9066). These humanized construct are termed "structural (STR) graft". Further, in the case of clone 27-07-G02, four mutations, namely A51P on variable light chain, and Q14K, G16E, and G56A on variable heavy chain (according to AHo numbering) were introduced in the structure-based graft (SEQ ID NO: 25, A2) in order to improve affinity. In the case of clone 27-31-004, two mutations, namely R20T and Q141P (according to AHo numbering) were introduced in variable heavy chain of the structure-based graft SEQ ID NO: 62, PRO592) in order to improve affinity.

In case the comparison of the characterization data for these constructs revealed a significant advantage of the STR constructs additional variants can be designed that combine the CDR grafted VL with STR grafted VH. This combination has been proven to be often sufficient to retain the activity of the STR graft (Borras et al. JBC. 2010; 285:9054-9066) and would generally be preferred as fewer non-human alterations in the human acceptor scaffold reduce the risk for impaired stability and also the potential for immunogenicity.

2.2 Manufacture of Humanized scFv

Once the in-silico construct design was completed, the corresponding genes were synthesized and bacterial expression vectors were constructed. The sequence of the expression constructs was confirmed on the level of the DNA and the constructs were manufactured according to generic expression and purification protocols.

The heterologous expression of the proteins was performed in E. coli as insoluble inclusion bodies by induced overnight expression in small scale (55 mL). The inclusion bodies were isolated from the homogenized cell pellet by a centrifugation protocol that included several washing steps to remove cell debris and other host cell impurities. The purified inclusion bodies were solubilized in a denaturing buffer (100 mM Tris/HCl pH 8.0, 6 M Gdn-HCl, 2 mM EDTA) and the scFvs were refolded by a scalable refolding protocol that generated milligram amounts of natively folded, monomeric scFv. At this point a standardized protocol was employed to purify the scFvs. The product after refolding was captured by an affinity chromatography to yield the purified scFvs. In addition, melting temperatures of scFvs were determined by differential scanning fluorimetry (DSF) measurement in order to support the selection of molecules entering more extensive stability assessment after completion of pharmacodynamic characterization described in the following paragraphs. DSF measurement of selected molecules is shown in more detail under paragraph 2.4.2.

2.3 Functional Characterization of Humanized scFvs

In the following the humanized scFvs were characterized for the primary pharmacodynamics properties, using the same assay systems as described for the Hit confirmation phase, with certain adaptations though to accommodate for the different format of the scFv molecules.

2.3.1 Affinity to Human IL-17A and to Cynomolgus Monkey IL-17A

Affinity of humanized scFvs to human IL-17A as well as Cynomolgus monkey (Macaca fascicularis) IL-17A was determined by SPR analysis on a T200 device (Biacore, GE Healthcare). In this experiment, biotinylated human IL-17A was captured using the Biotin-CAPture kit from Biacore ("capture setup"). After each analyte injection cycle the CAP sensor chip was regenerated and new antigen was captured. The scFvs were injected as analyte using a dose response multi-cycle kinetic assay with concentrations of the analyte ranging from 0.35 to 90 nM diluted in running buffer. Obtained sensorgrams were fitted using the 1:1 binding model. In addition, the scFvs were analyzed in an alternative SPR assay setup ("direct setup"). IL-17A was immobilized on a CM5 sensor chip (GE Healthcare) by amine-coupling. Serial dilutions of scFvs ranging from 0.35 to 90 nM were injected over the immobilized IL-17A. When using the direct setup affinities were 2- to more than 50-fold higher for the scFv tested compared to the capture setup. The lower affinities using the capture setup could be due to interference of biotin with binding of the scFvs.

Cross-reactivity to cynomolgus IL-17A was measured with the IL-17A produced by Trenzyme in a similar assay as used to measure binding to human IL-17A.

The scFvs A1 (CDR) and A2 (STR) bound to human IL-17A with affinities of $2.5 \times 10^{-10}$ and $3 \times 10^{-9}$ M, respectively (TABLE 5), as measured in the SPR capture setup. In the direct SPR setup, the scFvs A1 (CDR) and A2 (STR) bound to human IL-17A with affinities of $1.4 \times 10^{-10}$ and $5.5 \times 10^{-11}$ M, respectively (TABLE 5). The scFvs A1 (CDR) and A2 (STR) bound to Cynomolgus IL-17A with affinities of $9 \times 10^{-10}$ and $5 \times 10^{-9}$ M, respectively (TABLE 5).

The scFvs PRO571 (CDR) and PRO592 (STR) bound to human IL-17A with affinities of $1.2 \times 10^{-10}$ and $3.7 \times 10^{-10}$ M, respectively (TABLE 5), as measured in the SPR capture setup. In the direct SPR setup, the scFvs PRO571 (CDR) and PRO592 (STR) bound to human IL-17A with affinities of $4 \times 10^{-11}$ and $3.8 \times 10^{-11}$ M, respectively (TABLE 5). The scFvs PRO571 (CDR) and PRO592 (STR) bound to Cynomolgus IL-17A with affinities of $3.3 \times 10^{-11}$ and $1.6 \times 10^{-10}$ M, respectively (TABLE 5).

parison of $IC_{50}$ values from different assay plates. Relative $IC_{50}$ values were calculated in mass units (ng/ml) of secukinumab and the scFvs.

The humanized scFvs derived from clone 27-07-G02, A1 and A2, as well as the humanized scFvs derived from clone 27-31-004, PRO571 and PRO592, inhibited IL-17A-induced GRO-α secretion with lower $IC_{50}$ than secukinumab (see TABLE 5 and TABLE 6), and showed a more than 100-fold higher potency compared to secukinumab (see TABLE 5 and TABLE 6).

TABLE 5

Pharmacodynamic properties of the humanized scFvs.

| Protein number | Clone ID | Affinity to human IL-17A (Capture setup) ka ($M^{-1} s^{-1}$) | kd ($s^{-1}$) | $K_D$ (M) | Affinity to human IL-17A (Direct setup) ka ($M^{-1} s^{-1}$) | kd ($s^{-1}$) | $K_D$ (M) |
|---|---|---|---|---|---|---|---|
| A1 | 27-07-G02-sc01 | 4.55E+05 | 1.12E−04 | 2.47E−10 | 7.37E+05 | 1.02E−04 | 1.39E−10 |
| A2 | 27-07-G02-sc02 | 2.27E+05 | 6.97E−04 | 3.07E−09 | 1.08E+06 | 5.92E−05 | 5.51E−11 |

| Protein number | Clone ID | Affinity to cyno IL-17A ka ($M^{-1} s^{-1}$) | kd ($s^{-1}$) | $K_D$ (M) | $K_{D, cyno}/K_{D, human}$ | Neutralization of IL-17A in HT-29 assay rel. $IC_{50}$* | Blocking of IL-17A/IL-17RA interaction rel. $IC_{50}$* |
|---|---|---|---|---|---|---|---|
| A1 | 27-07-G02-sc01 | 2.88E+05 | 2.61E−04 | 9.05E−10 | 3.66 | 173.3 | 19.3 |
| A2 | 27-07-G02-sc02 | 1.67E+05 | 8.68E−04 | 5.19E−09 | 1.69 | 375.4 | 24.0 |

| Protein number | Clone ID | Affinity to human IL17A (Capture setup) ka ($M^{-1} s^{-1}$) | kd ($s^{-1}$) | $K_D$ (M) | Affinity to human IL17A (Direct setup) ka ($M^{-1} s^{-1}$) | kd ($s^{-1}$) | $K_D$ (M) |
|---|---|---|---|---|---|---|---|
| PRO571 | 27-31-C04-sc01 | 1.21E+06 | 1.44E−04 | 1.19E−10 | 1.13E+06 | 4.55E−05 | 4.03E−11 |
| PRO592 | 27-31-C04-sc02 | 3.87E+05 | 1.42E−04 | 3.67E−10 | 1.08E+06 | 4.07E−05 | 3.76E−11 |

| Protein number | Clone ID | Affinity to cyno IL17A ka ($M^{-1} s^{-1}$) | kd ($s^{-1}$) | $K_D$ (M) | $K_{D, cyno}/K_{D, human}$ | Neutralization of IL17A in HT-29 assay rel. $IC_{50}$* | Blocking of IL17A-IL17RA interaction rel. $IC_{50}$* |
|---|---|---|---|---|---|---|---|
| PRO571 | 27-31-C04-sc01 | 1.17E+06 | 3.88E−05 | 3.31E−11 | 0.28 | 190.8 | 22.9 |
| PRO592 | 27-31-C04-sc02 | 3.36E+05 | 5.38E−05 | 1.6E−10 | 0.44 | 196.0 | 40.9 |

*$IC_{50, secukinumab}/IC_{50, Test Sample}$ 2.3.2 HT-29 Assay (Neutralization of Human IL-17A)

The HT29 assay tested the ability of the humanized scFvs to inhibit IL-17A-induced GRO-α secretion of the human colon carcinoma cell line HT-29. As described above in sections 1.3.3 and 1.3.5 TNFα was added in addition to IL-17A to increase the sensitivity of the assay. 50'000 HT-29 cells were plated in each well of a 96-well plate. In addition to the serially diluted scFvs as well as the internal reference secukinumab, pre-dilutions of human TNFα (50 pg/ml) and human IL-17A (1 ng/ml) were added to the HT-29 cells. After 24 h incubation at 37° C. and 5% CO2, supernatants were collected and GRO-α (CXCL1 chemokine) secretion was quantified by ELISA.

Inhibition curves for the humanized scFvs A1, PRO571 and PRO592 are shown in FIG. 4. All potency data are summarized in TABLE 5 and TABLE 6. The relative $IC_{50}$ values reported for each molecule were calibrated to the reference antibody secukinumab to allow for direct com-

TABLE 6

Potencies of anti-IL-17A scFv to inhibit IL-17A-induced GRO-α secretion of the human colon carcinoma cell line HT-29.

| Protein ID | scFv Clone ID | Potency in HT-29 assay $IC_{50}$ [ng/mL] | rel. $IC_{50}$* |
|---|---|---|---|
| A1 | 27-07-G02-sc01 | 0.2 | 173.3 |
| A2 | 27-07-G02-sc02 | 0.1 | 375.4 |
| PRO571 | 27-31-C04-sc01 | 0.1 | 190.8 |
| PRO592 mea | 27-31-C04-sc02 | 0.13 | 196.0 |

*$IC_{50}$, secukinumab/$IC_{50}$, Test Sample 2.3.3 Competitive ELISA (Inhibition of hIL-17A Binding to hIL-17-RA)

In addition to the HT-29 assay, the potency of each humanized scFv to inhibit the interaction between human IL-17A and human IL-17RA was assessed by ELISA with the same procedure as described in section 1.3.4. Similarly to the HT-29 assay, individual $IC_{50}$ values on each plate are calibrated against the $IC_{50}$ of the reference molecule secukinumab that is taken along on each plate and relative $IC_{50}$ (relative $IC_{50}$: $IC_{50, \, secukinumab}/IC_{50, \, test \, antibody}$) (TABLE 5 and TABLE 7). In this assay 6 ng/ml IL-17A is implemented which means that the assay can only resolve potencies between IgGs with $K_D$>193 pM. Inhibition curves for A1, A2, PRO571 and PRO592 are shown in FIG. 5 and potencies are summarized in TABLE 5 and TABLE 7.

TABLE 7

Potencies of anti-IL-17A scFv to block of the human IL-17A/IL-17RA interaction (ELISA).

| Protein ID | scFv Clone ID | Potency in IL-17A/IL-17RA ELISA | |
|---|---|---|---|
| | | $IC_{50}$ [ng/mL] | rel. $IC_{50}$* |
| A1 | 27-07-G02-sc01 | 2.0 | 19.3 |
| A2 | 27-07-G02-sc02 | 1.6 | 24.0 |
| PRO571 | 27-31-C04-sc01 | 1.8 | 22.9 |
| PRO592 | 27-31-C04-sc02 | 0.9 | 40.9 |

*$IC_{50, \, secukinumab}/IC_{50, \, Test \, Sample}$ 2.3.4 Selectivity Against IL-17B, IL-17C, IL-17D, IL-17E and IL-17F (Competition ELISA)

The relative potential of IL-17B to F, as compared to IL-17A to half-maximally inhibit IL-17A binding to each scFv was assessed by competition ELISA. The potential to inhibit the interaction of biotinylated IL-17A with scFvs by unlabeled IL-17B, IL-17C, IL-17D, IL-17E and IL-17F was analyzed by competition ELISA. For this purpose, the scFvs were coated on a 96-well ELISA plate. Binding of biotinylated IL-17A to the coated scFvs in presence of serially diluted IL-17A or IL-17B to IL-17F was detected using the biotin-binding streptavidin conjugated to HRP. For the dose-response curve with IL-17A data were analyzed using a four-parameter logistic curve fit, and the concentration of IL-17A required to block the interaction of biotinylated IL-17A with the coated scFv by 50% ($EC_{50}$) was calculated. IL-17B to IL-17F did not show any significant inhibition of the interaction between biotinylated TNF and scFvs (see FIG. 6). To quantify the relative potential of these IL-17 family members as compared to IL-17A to inhibit IL-17A binding to each scFv the $EC_{50}$ to inhibit the interaction by IL-17 family members relative to IL-17A was calculated. Since no significant inhibition was observed when using IL-17 members at an approximately 100 to 40'000-fold higher concentration than the $EC_{50}$ of IL-17A, the selectivity for binding to IL-17A over IL-17 family members was determined to be significantly higher than 100 to 40'000-fold.

As shown in FIG. 6 and summarized in TABLE 8 for A1, PRO571 and PRO592, the interaction between the scFvs A1, PRO571 and PRO592 with biotinylated IL-17A was blocked by unlabeled IL-17A, while IL-17B, IL-17C, IL-17D, IL-17E and IL-17F did not show any significant effect even at the highest concentration of cytokine tested (20 to 500 µg/ml). Hence, A1, PRO571 and PRO592 bind specifically to IL-17A but not to its closest homologues, IL-17B to IL-17F. Therefore, off-target binding of the scFvs described herein appears highly unlikely.

2.4 Biophysical Characterization of the Humanized scFvs
2.4.1 Manufacture of Stability Material The scFvs were produced again using the same manufacture process as described above (see section 2.2) at higher scale (1.2 L-2.4 L expression volume). Additionally, protein samples were concentrated to >10 mg/mL using centrifugal concentration tubes after purification. High scale manufacture of material for stability assessment is compiled in TABLE 9. All molecules could be produced in sufficient amounts and purity (>95% monomeric).

The producibility of the scFv constructs was characterized by different reporting points (TABLE 9). The producibility criterion shall ensure that the selected scFv entity can be expressed, refolded and purified in sufficient amounts to support later development of the lead molecule. The defined criteria were the expression yield of scFv per liter of fermentation broth, as assessed by SDS-PAGE, and the purification yield achieved in the generic lab-scale process, as assessed by measurement of the amount of purified protein by UV spectrometry, calculated back to 1 liter of refolding solution.

The expression titer was determined on the level of the crude *E. coli* lysate after the harvest of the cells by centrifugation. During the harvest a small loss of cells was anticipated, however, this factor was neglected for the calculation of the expression yield in favor of a more conservative estimation of the productivity. For the quantification of the scFv product in the lysate coomassie stained reducing SDS-PAGE was chosen due to the high specificity of the method that allows discriminating the product from the host cell proteins in the sample.

A second criterion to assess the producibility was the purification yield of scFv calculated per liter of refolding solution. This parameter addresses the potential bottleneck in the anticipated manufacturing process that includes a protein refolding step. Since the efficiency of the refolding procedure has proven to be limiting in comparable manufacturing processes the performance of the different constructs can be compared with respect to the producibility normalized to a defined refolding volume. For the calculation of the yield the final protein sample from each batch was quantified by UV absorbance and divided by the actual refolding volume of the respective purification.

TABLE 8

Target selectivity of the humanized scFvs.

| | | scFv | | | | | |
|---|---|---|---|---|---|---|---|
| | | Selectivity IL-17B | | Selectivity IL-17C | | Selectivity IL-17D | |
| Protein ID | Clone ID | rel. IC50 [IC50, IL-17B/ IC50, IL-17A] | highest conc. tested (ng/ml) | rel. IC50 [IC50, IL-17C/ IC50, IL-17A] | highest conc. tested (ng/ml) | rel. IC50 [IC50, IL-17D/ IC50, IL-17A] | highest conc. tested (ng/ml) |
| A1 | 27-07-G02-sc01 | >>1307 | 100000 | >>1307 | 100000 | >>11871 | 500000 |
| PRO571 | 27-31-C04-sc01 | >>8636 | 100000 | >>8636 | 100000 | >>42808 | 500000 |
| PRO592 | 27-31-C04-sc02 | >>1102 | 100000 | >>1102 | 100000 | >>7716 | 500000 |

TABLE 8-continued

| | | scFv | | | |
|---|---|---|---|---|---|
| | | Selectivity IL-17E | | Selectivity IL-17F | |
| Protein ID | Clone ID | rel. IC50 [IC50, IL-17E/ IC50, IL-17A] | highest conc. tested (ng/ml) | rel. IC50 [IC50, IL-17F/ IC50, IL-17A] | highest conc. tested (ng/ml) |
| A1 | 27-07-G02-sc01 | >>475 | 20000 | >>475 | 20000 |
| PRO571 | 27-31-C04-sc01 | >>1712 | 20000 | >>1712 | 20000 |
| PRO592 | 27-31-C04-sc02 | >>309 | 20000 | >>309 | 20000 |

| Manufacture of material for stability assessment. | | | | | | |
|---|---|---|---|---|---|---|
| Protein ID | Construct ID | Expression volume [mL] | Yield post Capto L [mg] | Final yield [mg] | Yield per L refolding [mg/L] | Yield per L expression [mg/L] | Purity SE-HPLC [% monomer] |
| A1 | 27-07-G02-sc01 | 1200 | 126.8 | 26.5 | 13.3 | 22.1 | 99.9 |
| PRO592 | 27-31-C04-sc02 | 1200 | 74.0 | 51.7 | 25.8 | 43.1 | 97.6 |
| PRO571 | 27-31-C04-sc01 | 2400 | 124.0 | 88.5 | 22.1 | 36.9 | 98.9 |

2.4.2 Thermal Unfolding

Thermal unfolding curves obtained from DSF measurements of the scFvs constructs A1, PRO571 and PRO592 are presented in FIG. 7. For DSF measurement material produced in small scale expression was used. Samples in 50 mM phosphate-citrate buffer at pH6.4 were prepared at a final protein concentration of 50 µg/mL and a final concentration of 5×SYPRO® Orange in a total volume of 100 µl. Twenty-five microliters of prepared samples were added in triplicate to white-walled AB gene PCR plates. The assay was performed in a qPCR machine used as a thermal cycler, and the fluorescence emission was detected using the software's custom dye calibration routine. The PCR plate containing the test samples was subjected to a temperature ramp from 25° C. to 96° C. in increments of 1° C. with 30 s pauses after each temperature increment. The total assay time was about two hours. The Tm was calculated by the software GraphPad Prism using a mathematical second derivative method to calculate the inflection point of the curve. Measurements were done in duplicates, or in triplicates, respectively, as shown by error bars. Resulting Tm values have been determined by fitting of data to a Boltzmann equation.

FIG. 7 shows melting curve of selected domain which was used for calculation of Tm by fitting the data to a Boltzmann equation. TABLE 10 summarizes calculated melting temperature and purities measured by SE-HPLC of A1, PRO571 and PRO592.

TABLE 9

Monomeric content and Tm of selected domains.

| Protein ID | Purity SE-HPLC [% monomer] | Tm [° C.] |
|---|---|---|
| A1 | 95.1 | 74.3 |
| PRO592 | 99.7 | 66.1 |
| PRO571 | 98.9 | 68.8 |

2.4.3 Storage Stability Study

Figure 8:
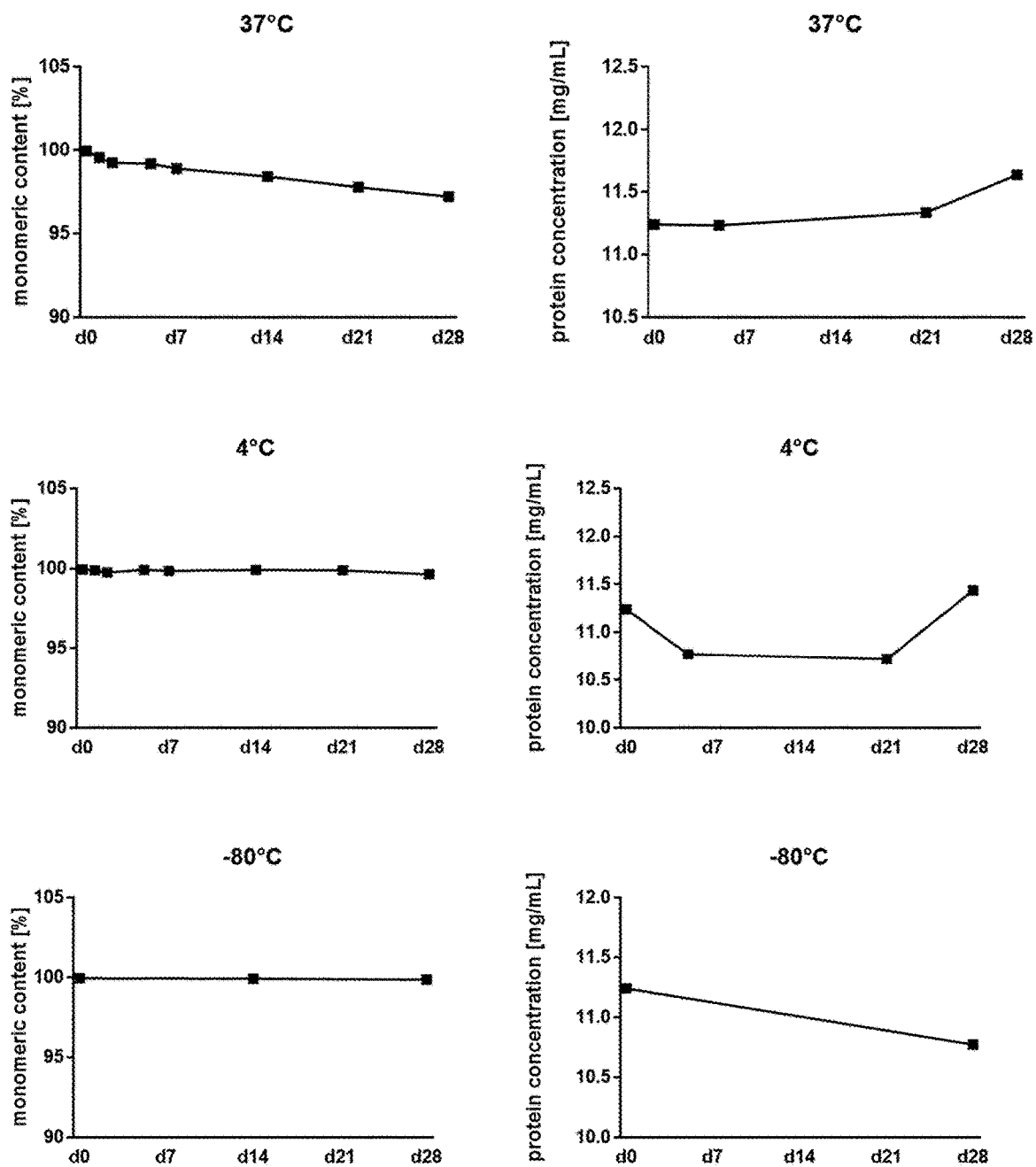
FIG. 8 shows the storage stability study the scFv A1 (A), and scFvs PRO571 and PRO592 (B), performed at a concentration of >10 mg/mL for 4 weeks at three temperatures (37° C., 4° C. and −80° C.). Monomeric content over time at different storage temperatures is shown on the left; protein concentration at different storage temperatures (4° C. (left) and 37° C. (right)) over the course of time is shown on the right. Monomeric content was determined by integration of SE-HPLC peak areas and protein concentrations were calculated by $UV_{280}$ measurement.
Figure 8:
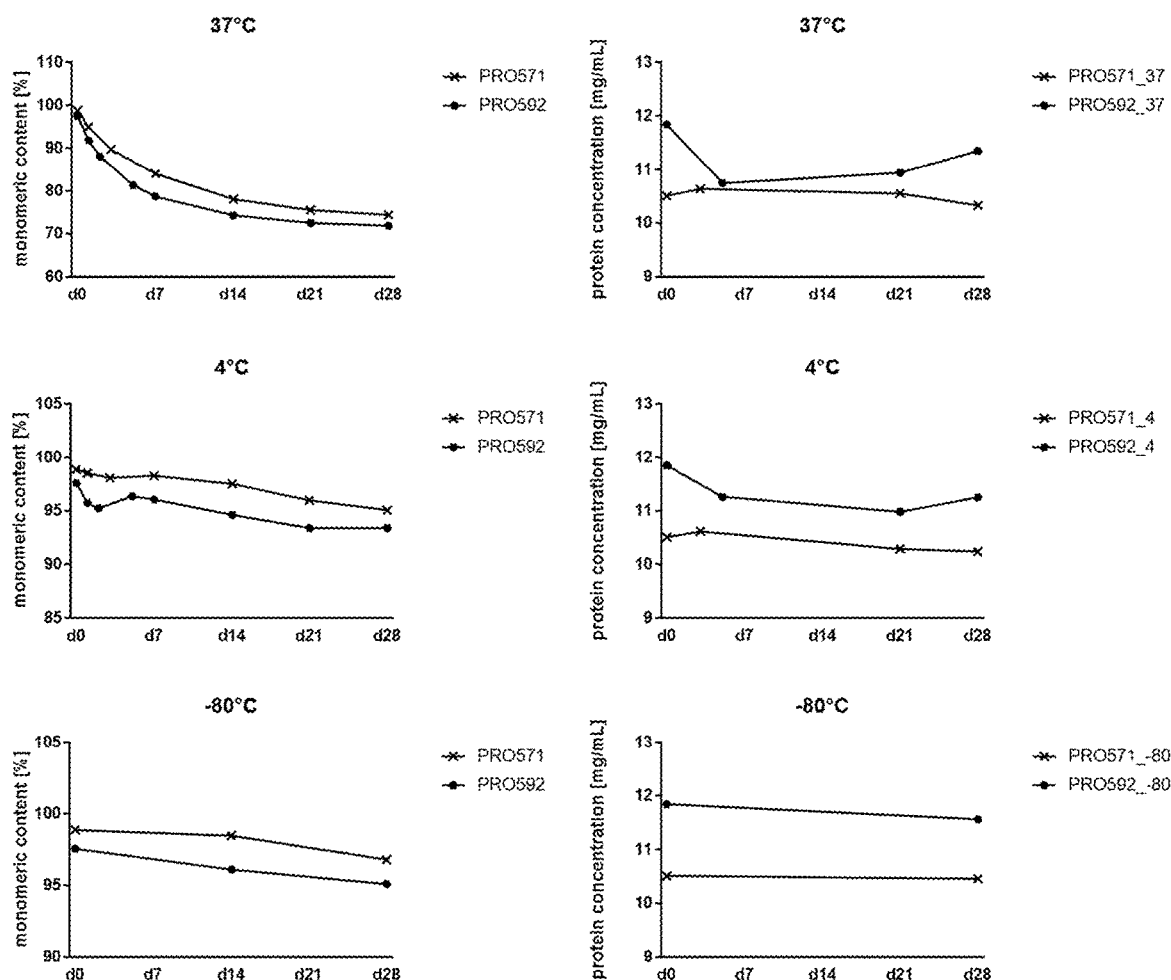

The scFvs A1, PRO571 and PRO592 were subjected to further stability studies such as a four-week stability study, in which the scFv was be formulated in an aqueous buffer at 10 mg/ml and stored at <−65° C., 4° C. and 37° C. for four weeks. At one week, two weeks and at the end of each study, the fraction of monomers and oligomers in the formulation were evaluated by integration of SE-HPLC peak areas. TABLE 11 compares endpoint measurements obtained at d28 of the study. Monomeric content in % and protein concentration in mg/mL over time course of 28 days are shown in FIG. 8. The scFvs of the invention were shown to have 5% or less monomer loss, and in particular in the case of A1 less than 1% monomer loss, upon storage at a temperature of 4° C. and a concentration of >10 mg/ml. Furthermore, the scFv A1 of the invention was shown to have <5% monomer loss upon storage at a temperature of 37° C. and a concentration of >10 mg/ml.

TABLE 10

4 w stability study at 10 mg/mL and storage temperatures of 37° C., 4° C. and −80° C.

| Protein ID | Temp. [° C.] | Conc. [mg/mL] | [% monomer content] d 0 | [% monomer content] d 28 | % monomer loss d 28 | % content loss d 28 |
|---|---|---|---|---|---|---|
| A1 | 37 | >10 | 99.9 | 97.2 | 2.72 | −3.51 |
| | 4 | | | 99.6 | 0.3 | −1.76 |
| | −80 | | | 99.8 | 0.09 | 4.16 |
| PRO592 | 37 | >10 | 97.6 | 71.9 | 26.3 | 4.2 |
| | 4 | | | 93.4 | 4.26 | 5.03 |
| | −80 | | | 95.1 | 2.53 | 2.38 |
| PRO571 | 37 | >10 | 98.9 | 74.4 | 24.76 | 1.71 |
| | 4 | | | 95.1 | 3.84 | 2.52 |
| | −80 | | | 96.8 | 2.09 | 0.49 |

2.4.4 Freeze-Thaw Stability Study

In addition to the storage stability study described above the compatibility of the scFvs A1, PRO571 and PRO592 were assessed with respect to freeze-thawing (F/T) cycles (colloidal stability).

For the F/T stability assessment the same analytical methods and parameters (% monomer content and % monomer loss) as for the storage stability study (SE-HPLC, SDS-PAGE) were applied to monitor the quality of the molecules after five F/T cycles. Samples were formulated in PBS and were concentrated using VivaSpin concentration devices to 10 mg/mL prior to study initiation. Small sample volumes (<20 µL) allowed rapid freezing and thawing intervals. Samples were subjected to five repeated freeze-thawing cycles. They were frozen at a temperature of −80° C. and thawed at RT. To assess stability of A1, PRO571 and PRO592, after each cycle analytical read-outs, such as protein content and purity, were recorded at different time points by SE-HPLC and $UV_{280}$ measurement. Data are presented in TABLE 12. FIG. 9 illustrates the course of monomer content in % over five repeated F/T cycles.

2.4.5 pH Stability Study

The scFvs A1, PRO571 and PRO592 were subjected to a short-term stress stability study, in which the scFv molecules were formulated at 20 mg/ml in a set of aqueous (phosphate-citrate) buffer systems with pH values between 3.5 and 7.5. Monomeric content in % and % monomer loss was analyzed after storage for 48h at 4° C. and 8h at 25° C. (TABLE 13 TABLE 12). A1, PRO571 and PRO592 exhibited <5% monomer loss in any of the tested buffer systems at any timepoint measured (TABLE 13 and TABLE 14).

It is important to note that the different studies suggested within the scope of this assessment address distinct mechanistic aspects of protein stability. While both methods are designed to give an estimation of the potential product shelf live and stability the mechanisms addressed are profoundly different. The midpoint of transition (Tm) assessed by thermal unfolding is a qualitative measure for protein domain stability (does not allow for thermodynamic determination of ΔG). Highly stable protein domains (high Tm) are less likely to spontaneously unfold at ambient temperature and thus less prone to irreversible aggregation/precipitation driven by unfolded domain interactions. High domain stability indicates dense packaging of amino acid residues, which also correlates with resistance towards protease cleavage. The SE-HPLC assessment on the other hand quantitatively determines the content of the monomeric fraction as well as of soluble oligomers/aggregates. Such soluble oligomers are oftentimes reversible and relatively loose associations driven by electrostatic or hydrophobic interactions between correctly folded proteins. There is some correlation between Tm as assessed by thermal unfolding and the propensity for oligomer/aggregate formation as assessed by SE-HPLC particularly for proteins with "border line" stability. Beyond a certain threshold Tm of approximately 60° C. antibody variable domains are generally sufficiently stable to be resistant toward aggregation/precipitation and proteolytic degradation due to partial domain unfolding at ambient temperature. Oligomerization driven by hydrophobic and/or electrostatic interactions of surface residues may, however, still occur. Importantly, in an accelerated (stress) stability study at elevated temperature (e.g. 37° C.) the various mechanisms of oligomer formation and precipitation may occur simultaneously.

TABLE 11

Freeze-thaw stability assessment of selected clones.

| Protein ID | Freeze/ Thaw cycles | Conc. [mg/mL] | [% monomer content] | | | | | |
|---|---|---|---|---|---|---|---|---|
| | | | FT0 | FT1 | FT2 | FT3 | FT4 | FT5 |
| A1 | 5 | 10 | 99.9 | 99.9 | 99.9 | 99.9 | 99.9 | 99.9 |
| PRO592 | 5 | 10 | 97.6 | 96.1 | 95.6 | 95.4 | 95.2 | 95.2 |
| PRO571 | 5 | 10 | 98.9 | 98.8 | 98.8 | 98.6 | 98.5 | 98.5 |

| Protein ID | Freeze/ Thaw cycles | Conc. [mg/mL] | % monomer loss | | | | |
|---|---|---|---|---|---|---|---|
| | | | FT1 | FT2 | FT3 | FT4 | FT5 |
| A1 | 5 | 10 | 0.0 | 0.0 | 0.0 | 0.0 | 0.0 |
| PRO592 | 5 | 10 | 1.5 | 2.0 | 2.2 | 2.4 | 2.4 |
| PRO571 | 5 | 10 | 0.1 | 0.1 | 0.3 | 0.4 | 0.4 |

TABLE 12

Monitoring of monomeric content and monomer loss at two defined time points (t8, t48) and temperatures (4° C., 25° C.) during short-term pH stress stability.

| Protein ID | pH | [% monomer content] | | | % monomer loss | |
|---|---|---|---|---|---|---|
| | | t0 | t8 | t48 | t8 | t48 |
| A1 | 3.5 | 99.7 | 99.6 | 99.6 | 0.2 | 0.2 |
| | 4.5 | 99.6 | 99.6 | 99.5 | 0.0 | 0.1 |
| | 5.5 | 99.5 | 99.5 | 99.4 | 0.0 | 0.1 |
| | 6.5 | 99.7 | 99.5 | 99.5 | 0.1 | 0.2 |
| | 7.5 | 99.6 | 99.5 | 99.4 | 0.1 | 0.2 |
| PRO571 | 3.5 | 98.0 | 95.6 | 95.7 | 2.5 | 2.3 |
| | 4.5 | 97.9 | 97.1 | 97.0 | 0.8 | 0.9 |
| | 5.5 | 96.5 | 95.8 | 95.4 | 0.8 | 1.1 |
| | 6.5 | 97.4 | 95.6 | 95.0 | 1.9 | 2.5 |
| | 7.5 | 96.2 | 95.2 | 95.0 | 1.0 | 1.3 |
| PRO592 | 3.5 | 99.5 | 98.3 | 98.4 | 1.2 | 1.1 |
| | 4.5 | 99.5 | 99.0 | 99.1 | 0.5 | 0.5 |
| | 5.5 | 99.5 | 98.8 | 98.8 | 0.7 | 0.7 |
| | 6.5 | 99.5 | 98.7 | 98.7 | 0.8 | 0.8 |
| | 7.5 | 99.5 | 98.8 | 98.8 | 0.7 | 0.7 |

TABLE 13

Monitoring of protein concentration at two defined time points (t8, t48) and temperatures (4° C., 25° C.) during short-term pH stress stability

| Protein ID | pH | protein concentration [mg/mL] | | | % content loss | |
|---|---|---|---|---|---|---|
| | | t0 | t8 | t48 | t8 | t48 |
| A1 | 3.5 | 99.7 | 99.6 | 99.6 | 0.2 | 0.2 |
| | 4.5 | 99.6 | 99.6 | 99.5 | 0.0 | 0.1 |
| | 5.5 | 99.5 | 99.5 | 99.4 | 0.0 | 0.1 |
| | 6.5 | 99.7 | 99.5 | 99.5 | 0.1 | 0.2 |
| | 7.5 | 99.6 | 99.5 | 99.4 | 0.1 | 0.2 |
| PRO571 | 3.5 | 27.7 | 26.4 | 26.3 | 4.8 | 5.0 |
| | 4.5 | 26.5 | 27.1 | 26.2 | −2.3 | 1.1 |
| | 5.5 | 29.3 | 27.9 | 28.4 | 4.8 | 3.1 |
| | 6.5 | 29.5 | 27.4 | 29.2 | 7.4 | 1.1 |
| | 7.5 | 29.3 | 29.3 | 29.2 | 0.1 | 0.2 |
| PRO592 | 3.5 | 28.3 | 27.8 | 28.0 | 1.8 | 1.1 |
| | 4.5 | 26.2 | 25.1 | 26.4 | 4.5 | −0.7 |
| | 5.5 | 25.3 | 25.8 | 25.3 | −2.0 | 0.1 |
| | 6.5 | 28.4 | 27.7 | 28.1 | 2.5 | 1.1 |
| | 7.5 | 28.7 | 28.4 | 28.5 | 1.0 | 0.9 |

TABLE 14

Summary of the biophysical characterization data.

| Protein ID | Clone ID | Tm [° C.] | % monomer loss, 10 mg/mL, 5xFT | % monomer loss, 28 d, 10 mg/mL, 37° C. | % monomer loss, 28 d, 10 mg/mL, 4° C. | % monomer loss, 28 d, 10 mg/mL, −80° C. | % monomer loss, pH 3.5-7.5, 20 mg/mL, RT, t8 | % monomer loss, pH 3.5-7.5, 20 mg/mL, 4° C., t48 |
|---|---|---|---|---|---|---|---|---|
| A1 | 27__07__G02__sc01 | 71.2 | 0.0 | 2.72 | 0.3 | 0.09 | 0.0-0.2 | 0.1-0.2 |
| PRO592 | 27__31__C04__sc02 | 68.4 | 2.4 | 26.3 | 4.26 | 2.53 | 0.5-1.2 | 0.5-1.1 |
| PRO571 | 27__31__C04__sc01 | 68.8 | 0.4 | 24.76 | 3.84 | 2.09 | 0.8-2.5 | 0.9-2.3 |

2.4.6 Methods 2.4.6.1 Reducing SDS-PAGE

Sodium Dodecyl Sulfate Polyacrylamide Gel Electrophoresis (SDS-PAGE) is an analysis technique used for qualitative characterization and to control purity of proteins. According to the United States Pharmacopeia (USP) (USP Chapter 1056) analytical gel electrophoresis is an appropriate and routine method to identify and to assess the homogeneity of proteins in drug substances.

The method is used to quantify the amount of scFv product from E. coli lysates to derive the expression yield after fermentation. Another application of the method is to verify the identity of test substances based on their molecular weight with respect to the theoretical values. For supportive purposes this method is used to quantify the purity of test samples with respect to process-related impurities (host cell proteins) and product related impurities (degradation products or adducts).

The SDS-PAGE analyses were performed with commercially available precast gel system "Mini Protean" obtained from Bio-Rad Laboratories Inc. Humanized scFvs were analyzed on "Any kD" resolving gels (#456-9036). In both cases the Tris/Glycine buffer system recommended by the manufacturer was used. For the detection of protein bands coomassie staining with SimplyBlue™ staining solution (Life Technologies Corp., #LC6060) was employed. For the staining procedures the protocols of the supplier was followed.

The documentation and analysis of the stained protein gels was performed with the documentation system ChemiDoc XRS System (Bio-Rad Laboratories Inc., #170-8265) and software Image Lab, Version 4.0.1 (Bio-Rad Laboratories Inc., #170-9690).

2.4.6.2 UV Absorbance at 280 nm

The method UV absorbance at 280 nm is a total protein assay as outlined in USP Chapter 1057. Protein solutions absorb UV light at a wavelength of 280 nm due to the presence of aromatic amino acids. The UV absorbance is a function of the content of tyrosine and tryptophan residues in the protein and is proportional to the protein concentration. The absorbance of an unknown protein solution can be determined according to USP Chapter 851 on spectroscopy by applying Beer's law: $A = \varepsilon * l * c$, where the absorbance (A) is equal to the product of the molar absorptivity (c), the absorption path length and the concentration of the substance. The molar absorptivity for the scFv was calculated with the software Vector NTI® (Life Technologies Corporation).

The measurement of the UV absorbance is performed with the Infinity reader M200 Pro equipped with Nanoquant plate (Tecan Group Ltd.). The absorbance of the protein samples is measured at 280 nm and 310 nm, where the latter wavelength is serving as a reference signal that is subtracted from the 280 nm signal. To account for potential interference of the sample matrix a blank subtraction is performed for each measurement. The final absorbance signal of a protein sample obtained is used to calculate the protein concentration using Lambert-Beer's law.

All measurements are performed within the range given by the instruments specifications in the measurement range of 0-4 OD, where a reproducibility of <1% and a uniformity of <3% is specified by the manufacturer.

2.4.6.3 SE-HPLC (Size Exclusion High-Pressure Liquid Chromatography)

SE-HPLC is a separation technique based on a solid stationary phase and a liquid mobile phase as outlined by the USP chapter 621. This method separates molecules based on their size and shape utilizing a hydrophobic stationary phase and aqueous mobile phase. The separation of molecules is occurring between the void volume (VO) and the total permeation volume (VT) of a specific column. Measurements by SE-HPLC are performed on a Chromaster HPLC system (Hitachi High-Technologies Corporation) equipped with automated sample injection and a UV detector set to the detection wavelength of 280 nm. The equipment is controlled by the software EZChrom Elite (Agilent Technologies, Version 3.3.2 SP2) which also supports analysis of resulting chromatograms. Protein samples are cleared by centrifugation and kept at a temperature of 4-6° C. in the autosampler prior to injection. For the analysis of scFv samples the column Shodex KW402.5-4F (Showa Denko Inc., #F6989201) is employed with a standardized buffered saline mobile phase (50 mM Sodium acetate pH 6.0, 250 mM sodium chloride) at the recommended flow rate of 0.35 mL/min. The target sample load per injection was 5 µg. Samples are detected by an UV detector at a wavelength of 280 nm and the data recorded by a suitable software suite. The resulting chromatograms are analyzed in the range of VO to VT thereby excluding matrix associated peaks with >10 min elution time.

To ensure intermediate precision of the method, a reference standard is routinely measured at the beginning and end of each HPLC sequence. The reference standard used for this system suitability test is an scFv that has been produced as a batch and is aliquoted to be used for each measurement timepoint.

2.4.6.4 DSF (Differential Scanning Fluorimetry)

The midpoint of transition for the thermal unfolding of the tested scFv constructs was determined by Differential Scanning Fluorimetry (DSF), essentially as described by Niesen (Niesen et al., Nat Protoc. 2 (2007) 2212-21). The method DSF is a non-compendial method to measure temperature-dependent protein unfolding. The measurement of the thermal unfolding temperature by DSF are performed with a MX3005P qPCR machine (Agilent Technologies) controlled with the MX Pro software package (Agilent Technologies) and equipped with an excitation/emission filter set at 492/610 nm. The reactions are set-up in Thermo fast 96 white PCR plates (Abgene; #AB-0600/W). For the detection of protein unfolding a commercially available stock solution of the dye SYPRO orange (Molecular Probes; #S6650) is used at a final dilution of 1:1'000. The protein samples are diluted for the unfolding measurements to a final concentration of 50 µg/mL in a standardized buffered saline solution. The thermal unfolding is performed by a temperature program starting at 25° C. ramping up to 96° C. in 1° C. steps with a duration of 30 seconds. During the temperature program the fluorescence emission of each sample is recorded. The recorded raw data is processed and evaluated with a package of Microsoft Excel templates (Niesen, Nature Protocols 2007, Vol. 2 No. 9) and the fluorescence data is fitted with a Boltzmann equation using the program GraphPad Prism (GraphPad Software, Inc.) to obtain the midpoint of transition (Tm).

In order to produce reliable and robust measurements of the midpoint of unfolding at least duplicate measurements are performed. For an assessment of the intermediate precision a reference standard (known characterized scFv) is included with every measurement to allow for comparison of assay performance on different days.

2.4.6.5 Stability Study

In order to assess the stability of different scFv constructs as a read-out for the developability of these molecules a short-term stability study protocol can be designed. The protein constructs are concentrated in a simple buffered saline formulation (see above) to the target concentrations of 10 mg/mL. The monomer content is determined by SE-HPLC to confirm that the purity is exceeding the success criteria of >95%. Subsequently the protein samples are stored at <−80° C., 4° C. and 37° C. for the duration of 4 weeks and aliquots are analyzed at various time points. The primary read-out is the analysis by SE-HPLC, which allows the quantification of soluble higher molecular weight oligomers and aggregates. As supportive measurements the protein content is determined by UV absorbance at 280 nm, which gives an indication whether during the storage period substantial amounts of protein were lost by precipitation. Additionally, purity at the end point of the study is determined by SDS-PAGE that indicates the stability of the construct with respect to degradation or covalent multimerization.

Example 3: Multispecific Construct Generation

Anti-IL-17 (27-07-G02-sc01, see TABLE 1), anti-TNFα (16-19-B11-sc06, see TABLE 1, described in WO 2017/158101) and anti-HSA-binding domains (19-01-H04-sc03, see TABLE 1) were combined into two different trispecific antibody formats: Tribody and scDb-scFv formats (TABLE 1 Fehler! Verweisquelle konnte nicht gefunden werden). The tribody format is a fusion of a Fab fragment with one scFv molecule fused to the carboxy terminus of each chain of the Fab resulting in a trispecific molecule (Fab-(scFv)$_2$). The format employs a heterodimeric assembly of a Fab fragment consisting of a variable light domain (VL) fused to a constant light domain (CL) on one protein chain and a variable heavy domain (VH) fused to a constant heavy domain (CH1) on the second protein chain. At the carboxy terminus, constant domains are each connected via a flexible Gly-Ser linker to an scFv fragment. The scDb-scFv is a format in which an scFv fragment is fused by a flexible Gly-Ser linker to the highly stable single chain diabody (scDb) format. Both formats, the Fab-scFv$_2$ (tribody) and the scDb-scFv can be expressed recombinantly in CHO-S host cells.

The optimal relative location of the individual binding domains in the trispecific formats was tested in terms of pharmacodynamic and biophysical parameters. As each format allows for different configurations, i.e. relative positioning of the domains to each other.

ScFv fusions at positions CL and CH1 of the tribody fragment are considered as equivalent, resulting in three variants of this format (FIG. 10, A). Because the C-terminal fusions of the scFv moiety to the single chain Diabody (scDb) core domain of the molecule are superior to N-terminal fusions, only C-terminal fusion variants of this format were evaluated. Several permutation-variants of this format were analyzed (FIG. 10, B). Sequences of all molecules are listed in TABLE 1.

Example 4: Lead Manufacture Generic Process

Expression of all trispecific constructs was performed in CHO-S cells using CHOgro transient transfection kit (Mirus). Cultures were harvested after 5-7 days (cell viability <70%) of expression at 37° C. by centrifugation and proteins were purified from clarified culture supernatants by Protein L affinity chromatography followed by a polishing step by size-exclusion chromatography. For the quality control of the manufactured material standard analytical methods, such as SE-HPLC, SDS-PAGE, and UV280 were used.

Figure 11:
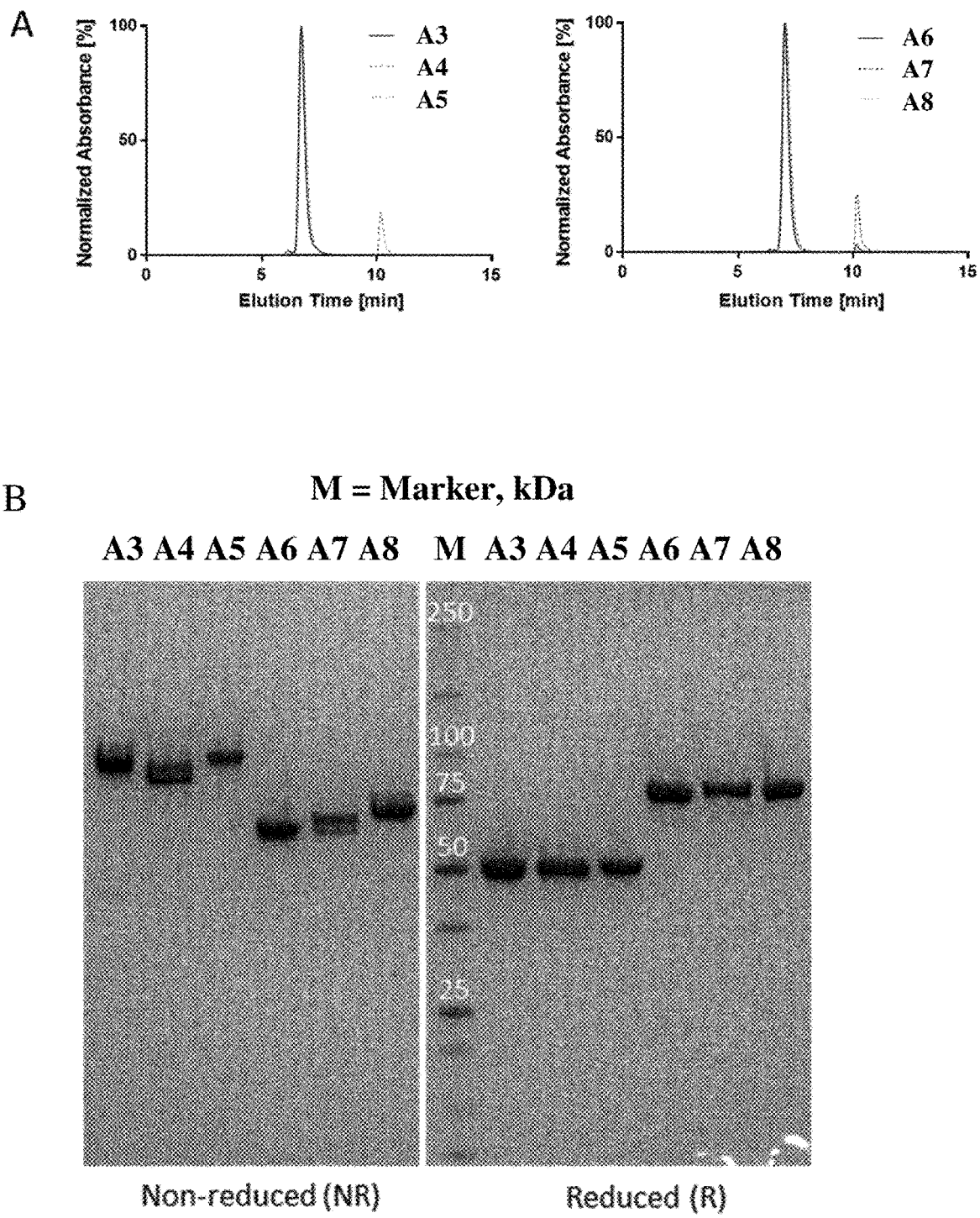
FIG. 11 shows the lead manufacture generic process. A, overlay of SE-HPLC traces of final A3-A5 (left graph) and A6-A8 (right graph) samples. Peaks with a retention time of 7-8 minutes correspond to the apparent molecular weight of the monomer of the respective molecules; peaks with a retention time >10 minutes are buffer and salt related artefacts. B, SDS-PAGE analysis of A3-A8 under non-reducing (left) and reducing (right) buffer conditions. A molecular weight reference was loaded in middle lane. Bands under non-reducing conditions correspond to the expected molecular weight of ~100 kDa for A3-A5 and ~75 kDa for A6-A8, respectively. As expected, for the heterodimeric Fab-(scFv)$_2$ antibody format (A3-A5) bands shift to ~50 kDa under reducing conditions, while for A6-A8 bands at a molecular weight of ~75 kDa can be observed also under reducing conditions.

TABLE 16 outlines production and characterization summary of trispecific format variants. FIG. 11 outlines production and purification of A3-A8. Antibody fragments were captured directly from CHO cell culture supernatant using a packed Protein L column pre-equilibrated in phosphate buffered saline (PBS) binding buffer. After sample application, column was washed with binding buffer, and protein was eluted with a one-step pH gradient. Monomeric content of protein fractions was determined by size-exclusion high-performance liquid chromatography (SE-HPLC) and fractions were pooled and buffer exchanged to phosphate citrate buffer at pH6.4 (Final Buffer) by dialysis. Fraction pools were concentrated using centrifugal concentrators to reduce total sample volume for subsequent preparative size exclusion chromatography (SEC) which was done for polishing of protein samples using a GE Superdex 200 10/300 column pre-equilibrated in PBS. Samples were eluted isocratically using Final Buffer and were further characterized by SE-HPLC, SDS-PAGE and UV$_{280}$.

TABLE 16

Production and characterization summary of trispecific format variants.

| Protein ID | Format | Yield post ProteinL [mg/L culture]* | Purity SE-HPLC post SEC [% monomer] |
| --- | --- | --- | --- |
| A3 | Tribody | 65.9 | 98.4 |
| A4 | Tribody | 17.5** | 99.2 |
| A5 | Tribody | 41.1 | 100.0 |
| A6 | scDb-scFv | 36.3 | 98.9 |
| A7 | scDb-scFv | 22.5 | 100.0 |
| A8 | scDb-scFv | 29.6 | 98.9 |

*UV280
**~50% loss due to experimental error

Example 5: Pharmacological Characterization 5.1 Affinity to HSA and CSA at pH 5.5 and pH 7.4

The binding to human serum albumin (HSA) and cynomolgus serum albumin (CSA) was assessed for purified trispecific molecules by running SPR spectroscopy on a MASS-1 device (Sierra Sensors). HSA was directly immobilized on a high capacity amine sensor chip (Sierra Sensors) and trispecific molecules were injected as analyte using a dose response multicycle kinetic assay with concentrations of the analyte ranging from 0.35 to 90 nM diluted either in running buffer at pH5.5 or pH7.5. Obtained sensorgrams were fitted using the 1:1 binding model. Affinity to CSA was assessed in a similar approach using a CSA immobilized sensor chip. Binding to CSA was measured for A5 and A7 at pH5.5 and pH7.5 only. The following table (TABLE 17) summarizes obtained affinities to HSA and CSA.

and cynomolgus IL-17A. As shown in this table, for some molecules binding to TNFα or IL-17A was lower than 10%. One can possibly explain this finding by reduced accessibility of the domains to their respective target. Although the measured affinity of these low binders was in a similar range and sometimes even significantly higher as compared to the molecules reaching higher binding levels the potential of the molecules to inhibit biological activity of TNFα and IL-17A was significantly reduced (see TABLE 19 and TABLE 21).

The effect of the purified trispecific molecules on TNF-induced biological responses was determined using mouse L929 fibroblasts. First, L929 cells were growth-arrested with

TABLE 17

Affinity to HSA and CSA at pH 5.5 and pH 7.4

| | Affinity to HSA at pH 5.5 | | | | Affinity to HSA at pH 7.4 | | | |
|---|---|---|---|---|---|---|---|---|
| Protein number | ka (M−1 s−1) | kd (s−1) | KD (M) | Binding (%)# | ka (M−1 s−1) | kd (s−1) | KD (M) | Binding (%)# |
| A3 | 6.23E+05 | 5.90E−04 | 9.47E−10 | 70.2% | 4.06E+05 | 5.57E−04 | 1.372E−09 | 60.5% |
| A4 | 1.85E+05 | 3.08E−04 | 1.67E−09 | 51.5% | 8.72E+04 | 4.17E−04 | 4.788E−09 | 43.3% |
| A5 | 1.80E+05 | 2.99E−04 | 1.66E−09 | 54.0% | 1.10E+05 | 2.95E−04 | 2.686E−09 | 42.8% |
| A6 | 4.75E+05 | 3.65E−04 | 7.7E−10 | 62.3% | 2.66E+05 | 3.32E−04 | 1.248E−09 | 57.5% |
| A7 | 2.84E+05 | 3.73E−04 | 1.32E−09 | 58.7% | 1.93E+05 | 3.69E−04 | 1.913E−09 | 55.0% |
| A8 | 4.69E+05 | 3.75E−04 | 7.99E−10 | 62.2% | 3.10E+05 | 4.40E−04 | 1.421E−09 | 56.3% |

| | Affinity to CSA at pH 5.5 | | | | Affinity to CSA at pH 7.4 | | | |
|---|---|---|---|---|---|---|---|---|
| Protein number | ka (M−1 s−1) | kd (s−1) | KD (M) | Binding (%)# | ka (M−1 s−1) | kd (s−1) | KD (M) | Binding (%)# |
| A3 | | | not measured | | | | not measured | |
| A4 | | | not measured | | | | not measured | |
| A5 | 1.81E+05 | 1.44E−04 | 7.952E−10 | 37.1% | 7.78E+04 | 1.93E−04 | 2.474E−09 | 19.4% |
| A6 | | | not measured | | | | not measured | |
| A7 | 3.18E+05 | 1.47E−04 | 4.63E−10 | 44.1% | 1.64E+05 | 2.15E−04 | 1.311E−09 | 31.6% |
| A8 | | | not measured | | | | not measured | |

Figure 12:
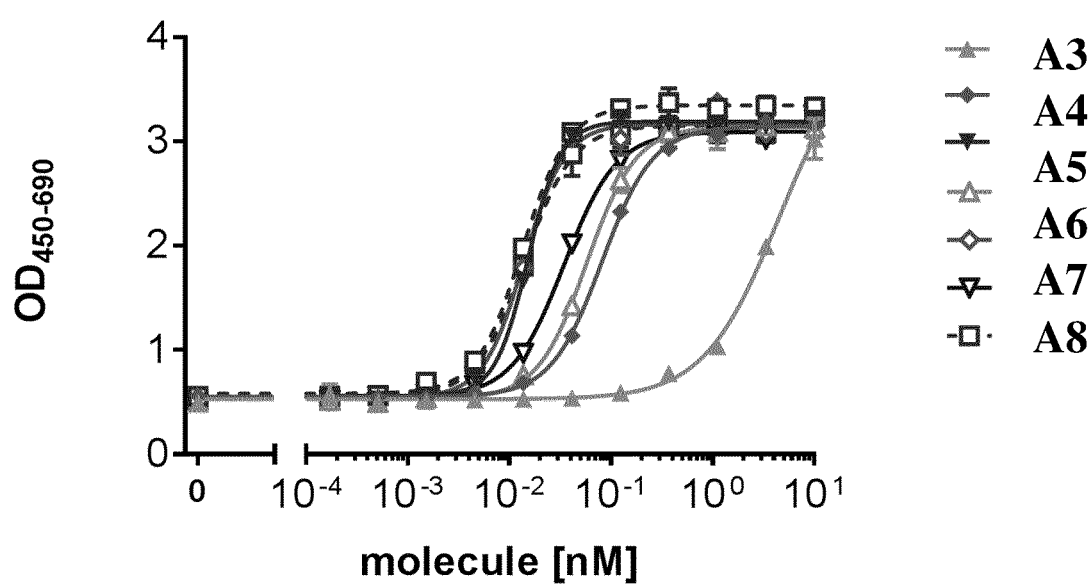
FIG. 12 shows the potency to neutralize TNFα in L929 assay. Absorbances measured using the cell counting kit-8 are presented in function of the trispecific molecules A3-A8 concentrations in nM. A13 (parental bispecific, HSA binder and TNFα blocker) was used as reference.
Figure 13:
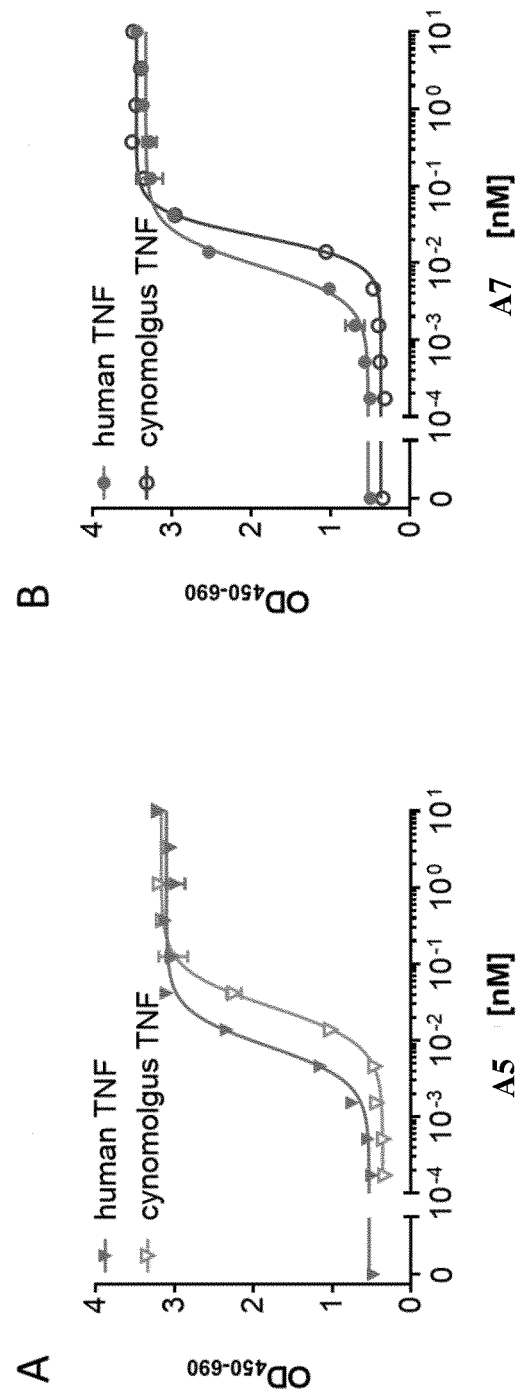
FIG. 13 shows a comparison between potency to neutralize human and cynomolgus TNFα. Absorbances measured using the cell counting kit-8 in presence of human or cynomolgus TNF-α are presented in function to the A5 and A7 concentrations.

Maximum binding level achieved normalized to theoretical Rmax 5.2 Affinity to Human TNFα and to Human and Cynomolgus Monkey IL-17A The affinity to human TNFα and human and cynomolgus IL-17A was measured using SPR analysis on a T200 device (Biacore, GE Healthcare). In this experiment, the biotinylated antigens were captured using the Biotin-CAPture kit from Biacore. After each analyte injection cycle the CAP sensor chip was regenerated and new antigen was captured. Trispecific molecules were injected as analyte using a dose response multicycle kinetic assay with concentrations of the analyte ranging from 0.35 to 90 nM diluted in running buffer. Obtained sensorgrams were fitted using the 1:1 binding model. Binding to cynomolgus IL-17A was measured only for A5 and A7. The following table (TABLE 18) summarizes affinities obtained for human TNFα and human Actinomycin D. Then, 60'000 cells were plated per well and then treated with human (5 pM) or cynomolgus (5 pM) TNFα as well as with 3-fold serially diluted trispecific molecules and the internal reference A13, an scDb containing the identical anti-TNF domain as the trispecific molecules (SEQ ID NO: 125). After 20h incubation cell viability was assessed using the cell counting kit-8 from Sigma-Aldrich. Data obtained for the neutralization of TNFα by the six trispecific molecules are depicted in FIG. 12. In addition, results obtained for A5 and A7 comparing their ability to neutralize human and cynomolgus TNFα are presented in FIG. 13. Determined relative $IC_{50}$ values to the reference A13 for human TNFα as well as the ratio between the $IC_{50}$ values obtained for human and cyno TNFα are summarized in TABLE 19.

TABLE 18

Affinity to human TNFα and to human and cynomolgus IL-17A

| | Affinity to human TNFα | | | | Affinity to human IL-17A | | | | Affinity to cynomolgous IL-17A | | | |
|---|---|---|---|---|---|---|---|---|---|---|---|---|
| Protein number | ka (M−1 s−1) | kd (s−1) | KD (M) | Binding (%)# | ka (M−1 s−1) | kd (s−1) | KD (M) | Binding (%)# | ka (M−1 s−1) | kd (s−1) | KD (M) | Binding (%)# |
| A3 | 4.31E+04 | <1.00E−6 | <2.32E−11 | 1.0% | 5.91E+04 | 9.04E−05 | 1.53E−09 | 5.8% | | | not measured | |

TABLE 18-continued

Affinity to human TNFα and to human and cynomolgus IL-17A

| Protein number | Affinity to human TNFα | | | | Affinity to human IL-17A | | | | Affinity to cynomolgous IL-17A | | | |
|---|---|---|---|---|---|---|---|---|---|---|---|---|
| | ka (M−1 s−1) | kd (s−1) | KD (M) | Binding (%)# | ka (M−1 s−1) | kd (s−1) | KD (M) | Binding (%)# | ka (M−1 s−1) | kd (s−1) | KD (M) | Binding (%)# |
| A4 | 9.08E+04 | 2.33E−05 | 2.57E−10 | 4.4% | 2.15E+05 | 7.23E−05 | 3.37E−10 | 29.6% | | | not measured | |
| A5 | 2.91E+05 | 2.92E−05 | 1.00E−10 | 11.7% | 1.39E+05 | 7.99E−05 | 5.75E−10 | 19.3% | 7.39E+04 | 3.86E−05 | 5.23E−10 | 23.3% |
| A6 | 1.12E+05 | 2.66E−06 | 2.37E−11 | 6.0% | 2.16E+05 | 8.96E−05 | 4.14E−10 | 30.2% | | | not measured | |
| A7 | 2.96E+05 | 3.59E−05 | 1.22E−10 | 14.0% | 2.29E+05 | 7.83E−05 | 3.41E−10 | 31.6% | 2.64E+05 | 5.89E−05 | 2.23E−10 | 51.5% |
| A8 | 2.19E+05 | 4.06E−05 | 1.85E−10 | 9.3% | 1.73E+05 | 8.36E−05 | 4.83E−10 | 25.6% | | | not measured | |

Maximum binding level achieved normalized to theoretical Rmax

TABLE 19

Summary table of relative potency data obtained in the L929 assay for the trispecific molecules.

| | Neutralization of TNF in L929 assay | | |
|---|---|---|---|
| Protein ID | Human | | IC50, cyno/ IC50, human |
| | IC50 [nM] | rel. IC50 & A13 | |
| A3 | 4.5 | 0.003 | n.a. |
| A4 | 0.08 | 0.2 | n.a. |
| A5 | 0.02 | 0.9 | 3.3 |
| A6 | 0.06 | 0.2 | n.a. |
| A7 | 0.01 | 1 | 2.5 |
| A8 | 0.03 | 0.4 | n.a. |

&: IC50, A13/IC50, Test Sample (nM)

5.3 HT-29 Assay (Concomitant Blocking of Human TNF and Human IL-17A)

IL-17A synergizes with TNF in up-regulating the expression of a subset of chemokines and cytokines such as Gro-α/CXCL1 in the colorectal adenocarcinoma cell line HT-29. Therefore, concomitant blockade of human TNFα and human IL-17A was assessed by analyzing Gro-α/CXCL1 secretion by HT-29 cells. To test the impact of HSA binding on potency the $IC_{50}$ to inhibit Gro-α/CXCL1 secretion induced by IL-17A and TNFα was also assessed in presence of HSA. Experiments were conducted in absence and presence of 1 mg/ml HSA. 50'000 HT-29 cells were plated in each well of a 96-well plate. In addition to the titrated tested trispecific molecules as well as with the internal reference A13 (SEQ ID NO: 125) and secukinumab, pre-dilutions of human TNFα (0.2 ng/ml) and human IL-17A (2 ng/ml) were added to the HT-29 cells. After 24 h incubation at 37° C. and 5% CO2, supernatants were collected and GRO-α (CXCL1 chemokine) secretion was quantified by ELISA. The titration curves generated for the six trispecific molecules in presence of 1 mg/ml of human serum albumin (HSA) are presented in FIG. 14. Relative $IC_{50}$ values to both references secukinumab and A13 as well as the percentage of inhibition observed in presence or absence of HSA are summarized in TABLE 20. Relative $IC_{50}$ to secukinumab was calculated by dividing the $IC_{50}$ of secukinumab in ng/ml by the $IC_{50}$ of the tested trispecific molecule in ng/ml. Relative $IC_{50}$ to A13 was calculated by dividing the $IC_{50}$ of A13 in nM by the $IC_{50}$ of the tested trispecific molecule in nM.

The best potency was observed for A5, A7 and A8. Potencies of trispecific molecules are 50 to 90-fold higher than secukinumab and 2 to 5-fold higher than A13. Concomitant blockade of TNFα and IL-17A drastically increased effect size compared to single blockade of TNFα or IL-17A. Approximatively 200-fold and 60-fold lower concentrations are required to reach the same effect as the maximum effect achieved with secukinumab and A13, respectively.

TABLE 20

Summary of relative potency data obtained in the HT-29 assay for the trispecific molecules.

| | Neutralization of IL-17A and TNF in HT-29 assay (−/+HSA) | | | | | |
|---|---|---|---|---|---|---|
| Protein ID | rel. IC50* secukinumab (ng/ml) | | rel. IC50& A13 (nM) | | % Inhibition | |
| | −HSA | +HSA | −HSA | +HSA | −HSA | +HSA |
| A3 | 2.4 | 11.8 | 0.2 | 0.5 | 80.2 | 52.2 |
| A4 | 7.1 | 6 | 0.6 | 0.3 | 106.6 | 104 |
| A5 | 88.9 | 63 | 2.4 | 1.5 | 104.7 | 101.7 |
| A6 | 30 | 26.8 | 0.6 | 1 | 105.1 | 98.9 |
| A7 | 52 | 64.5 | 4.8 | 1 | 103.7 | 101.2 |
| A8 | 44.1 | 304.2 | 3.9 | 4.6 | 103.4 | 100.4 |

*IC50, secukinumab/IC50, Test Sample (ng/ml)
&IC50, A13/IC50, Test Sample (nM)

5.4 Competitive ELISA (Inhibition of hIL-17A Binding to hIL-17RA)

The inhibition of hIL-17A binding to hIL-17RA was assessed by competitive ELISA. hIL-17RA was coated on the ELISA plate. Biotinylated hIL-17A was preincubated with the trispecific molecules for 1.5 h, the mixture was then added to the ELISA plate to allow binding to the hIL-17RA for 1 h. Then, Streptavidin-HRP, used to detect the biotinylated IL-17A, was added and the plate was incubated for 1 h. Finally, Tetramethylbenzidine solution was added to develop the plate for 5 to 10 minutes and the reaction was stopped with 1 M HCl. The plate was read at 450 nm and 570 nm (reference wavelength). Titration curves obtained for the six trispecific molecules are represented in FIG. 15. Calculated relative $IC_{50}$ values to the reference secukinumab are summarized in TABLE 21.

TABLE 2115

Summary table of potency obtained in competition ELISA for trispecific molecules.

| Protein number | Blocking of IL-17A/IL-17RA interaction rel. IC50 * secukinumab (ng/ml) |
|---|---|
| A3 | 2.2 |
| A4 | 6.3 |

TABLE 2115-continued

Summary table of potency obtained in competition ELISA for trispecific molecules.

| Protein number | Blocking of IL-17A/IL-17RA interaction rel. IC50 * secukinumab (ng/ml) |
|---|---|
| A5 | 4.9 |
| A6 | 10 |
| A7 | 10.6 |
| A8 | 10.2 |

* IC50, secukinumab/IC50, Test Sample (ng/ml)

5.5 Simultaneous Binding to TNF, IL-17A and HSA

To demonstrate simultaneous binding of the trispecific molecules to human TNFα, human IL-17A and HSA, a SPR experiment was employed. In brief, the six trispecific molecules (A3-A8) were directly immobilized on a high capacity amine sensor chip (Sierra Sensors) and the antigens were sequentially injected as analytes at concentrations of 2500 nM (HSA), 180 nM (TNFα) and 90 nM (IL-17A) ensuring that saturation of each binding was reached. All possible sequences of antigen injection were tested resulting in six possible sequences. For all trispecific molecules simultaneous binding to all three antigens was observed. Sensorgrams demonstrating the simultaneous binding to trispecific molecules are shown in FIG. 16.

To evaluate concomitant binding of each antigen to trispecific molecules, the binding level relative to the theoretical Rmax was calculated for each injection using the respective ligand and analyte molecular masses and the immobilization level of the trispecific molecules. The average of the maximum binding relative to theoretical Rmax for each antigen was obtained by averaging individual maximum binding relative to theoretical Rmax obtained for the two injections where the respective antigen was injected as first analyte (in the absence of other bound antigens). Next, the binding relative to the theoretical Rmax of each analyte injection was compared to its average maximum binding to calculate the fraction binding obtained in the presence of other bound antigens. The binding levels of each antigen relative to its average maximum binding are shown in TABLE 12, which shows relative binding levels of each antigen compared to the average maximum binding. The binding levels relative to the theoretical Rmax and the average of maximum binding (binding levels in the absence of other antigens) of each antigen were calculated. To evaluate binding of each antigen in the presence of other bound antigens, the binding relative to the theoretical Rmax of each analyte injection was normalized to its average maximum binding yielding a binding value that shows the degree of binding in the presence of other antigens.

Relative binding levels of each antigen compared to the average maximum binding.

| | Binding levels of antigen relative to theoretical Rmax | | | | Average of maximum binding levels relative to theoretical Rmax | | | | Antigen binding levels obtained compared to average maximum binding levels relative to theoretical Rmax | | |
|---|---|---|---|---|---|---|---|---|---|---|---|
| | Binding of first antigen | second antigen | Binding of third antigen | | | | | | Binding of first antigen | Binding of second antigen | Binding of third antigen |
| 1. cycle | HSA | TNFα | IL-17A | | HSA | TNFα | IL-17A | | HSA | TNFα | IL-17A |
| A3 | 21% | 34% | 52% | A3 | 21% | 37% | 48% | A3 | 98.8% | 92.8% | 108.9% |
| A4 | 18% | 37% | 59% | A4 | 19% | 39% | 58% | A4 | 97.8% | 94.2% | 101.8% |
| A5 | 33% | 43% | 56% | A5 | 33% | 44% | 54% | A5 | 99.6% | 97.8% | 104.6% |
| A6 | 16% | 21% | 34% | A6 | 16% | 22% | 32% | A6 | 99.6% | 94.1% | 104.6% |
| A7 | 30% | 23% | 38% | A7 | 31% | 25% | 32% | A7 | 99.4% | 92.6% | 118.7% |
| A8 | 24% | 24% | 37% | A8 | 24% | 26% | 35% | A8 | 99.6% | 93.7% | 105.8% |
| 2. cycle | HSA | IL-17A | TNFα | | | | | | HSA | IL-17A | TNFα |
| A3 | 21% | 43% | 47% | | | | | A3 | 101.2% | 89.3% | 126.6% |
| A4 | 19% | 53% | 39% | | | | | A4 | 102.2% | 91.9% | 100.6% |
| A5 | 33% | 50% | 48% | | | | | A5 | 100.4% | 92.9% | 108.2% |
| A6 | 16% | 29% | 24% | | | | | A6 | 100.4% | 91.3% | 107.6% |
| A7 | 31% | 28% | 30% | | | | | A7 | 100.6% | 85.4% | 122.0% |
| A8 | 24% | 31% | 29% | | | | | A8 | 100.4% | 88.9% | 111.6% |
| 3. cycle | TNFα | HSA | IL-17A | | | | | | TNFα | HSA | IL-17A |
| A3 | 37% | 21% | 52% | | | | | A3 | 99.3% | 98.7% | 107.5% |
| A4 | 39% | 14% | 56% | | | | | A4 | 99.7% | 77.7% | 97.6% |
| A5 | 44% | 30% | 54% | | | | | A5 | 99.7% | 92.7% | 101.5% |
| A6 | 22% | 14% | 33% | | | | | A6 | 99.6% | 84.5% | 103.5% |
| A7 | 25% | 26% | 37% | | | | | A7 | 99.7% | 86.1% | 114.3% |
| A8 | 26% | 21% | 36% | | | | | A8 | 99.8% | 84.9% | 102.2% |
| 4. cycle | TNFα | IL-17A | HSA | | | | | | TNFα | IL-17A | HSA |
| A3 | 37% | 53% | 21% | | | | | A3 | 100.7% | 110.8% | 97.6% |
| A4 | 39% | 58% | 13% | | | | | A4 | 100.3% | 100.5% | 71.8% |
| A5 | 44% | 56% | 26% | | | | | A5 | 100.3% | 105.5% | 78.3% |
| A6 | 22% | 35% | 11% | | | | | A6 | 100.4% | 107.8% | 71.3% |
| A7 | 25% | 39% | 24% | | | | | A7 | 100.3% | 122.5% | 77.3% |
| A8 | 26% | 39% | 18% | | | | | A8 | 100.2% | 110.1% | 72.7% |

| Relative binding levels of each antigen compared to the average maximum binding. | | | | | | | |
|---|---|---|---|---|---|---|---|
| Binding levels of antigen relative to theoretical Rmax | | | Average of maximum | Antigen binding levels obtained compared to average maximum binding levels relative to theoretical Rmax | | | |
| | Binding of first antigen | second antigen | Binding of third antigen | binding levels relative to theoretical Rmax | | Binding of first antigen | Binding of second antigen | Binding of third antigen |
| 5. cycle | IL-17A | HSA | TNFα | | | IL-17A | HSA | TNFα |
| A3 | 48% | 21% | 47% | | A3 | 99.5% | 100.8% | 128.3% |
| A4 | 57% | 17% | 39% | | A4 | 99.3% | 91.5% | 99.5% |
| A5 | 53% | 28% | 48% | | A5 | 99.2% | 85.0% | 108.6% |
| A6 | 32% | 13% | 24% | | A6 | 99.3% | 83.1% | 108.2% |
| A7 | 32% | 28% | 30% | | A7 | 98.5% | 90.5% | 120.9% |
| A8 | 35% | 21% | 28% | | A8 | 98.6% | 88.2% | 109.3% |
| 6. cycle | IL-17A | TNFα | HSA | | | IL-17A | TNFα | HSA |
| A3 | 48% | 47% | 21% | | A3 | 100.5% | 128.8% | 100.2% |
| A4 | 58% | 39% | 14% | | A4 | 100.7% | 99.6% | 73.5% |
| A5 | 54% | 48% | 25% | | A5 | 100.8% | 108.2% | 77.6% |
| A6 | 32% | 24% | 11% | | A6 | 100.7% | 110.3% | 70.7% |
| A7 | 33% | 30% | 24% | | A7 | 101.5% | 122.1% | 79.5% |
| A8 | 36% | 29% | 18% | | A8 | 101.4% | 113.6% | 73.0% |

For all combinations, the antigen binding was at least 70% of the average maximum binding relative to the theoretical Rmax (for example when TNFα was injected over immobilized A3 as second or third analyte, the relative binding levels obtained were found either slightly decreased, to 92.8%, or slightly increased, to 126.6%, when compared to the binding levels in the absence of other antigens). Of note, when HSA was injected as the last analyte, the relative binding levels decreased to approximately 70% for all trispecific molecules except for A3. In summary, simultaneous binding was observed for all trispecific molecules without substantial differences between the tested molecules.

5.6 Summary of Pharmacokinetic Characterization and Molecule Selection for Basic Developability Assessment TABLE 23 outlines pharmacological characterization of six trispecific molecules and provided basis for selection of molecules for developability assessment. Three molecules, namely A5, A7 and A8, were selected for developability assessment based on their overall better performance than A3, A4 and A6 in terms of TNF neutralization in L929 assay and concomitant neutralization of TNFα and IL-17A in HT29 assay. All three molecules showed similar affinities to each of the three targets. A7 shows highest potency to neutralize both IL-17A and TNFα, while A5 shows approximately 2-fold reduced potency to neutralize IL-17A and A8 shows approximately 2-fold lower potency to neutralize TNFα compared to A7.

TABLE 23

Summary of pharmacological characterization.

| | Affinity to human TNF | | Affinity to human IL-17 (Capture setup) | | Affinity to HSA at pH 5.5 | | Neutralization of IL-17A and TNF in HT-29 assay | |
|---|---|---|---|---|---|---|---|---|
| Protein | | Binding | | Binding | | Binding | rel. IC50* secukinumab | |
| number | KD (M) | (%)# | KD (M) | (%)# | KD (M) | (%)# | −HSA | +HSA |
| A3 | <2.32E−11 | 1.0% | 1.53E−09 | 5.8% | 9.467E−10 | 70.2% | 2.4 | 11.8 |
| A4 | 2.57E−10 | 4.4% | 3.37E−10 | 29.6% | 1.67E−09 | 51.5% | 7.1 | 6.0 |
| A5 | 1.00E−10 | 11.7% | 5.75E−10 | 19.3% | 1.659E−09 | 54.0% | 88.9 | 63.0 |
| A6 | 2.37E−11 | 6.0% | 4.14E−10 | 30.2% | 7.697E−10 | 62.3% | 30.0 | 26.8 |
| A7 | 1.22E−10 | 14.0% | 3.41E−10 | 31.6% | 1.316E−09 | 58.7% | 52.0 | 64.5 |
| A8 | 1.85E−10 | 9.3% | 4.83E−10 | 25.6% | 7.991E−10 | 62.2% | 44.1 | 304.2 |

| | Neutralization of IL-17A and TNF in HT-29 assay | | | | Blocking of IL-17A/ IL-17RA interaction | Neutralization of TNF in L929 assay |
|---|---|---|---|---|---|---|
| Protein | rel. IC50& A13 | | % Inhibition | | | |
| number | −HSA | +HSA | −HSA | +HSA | rel. IC50* | rel. IC50& |
| A3 | 0.2 | 0.5 | 80.2 | 52.2 | 2.2 | 0.003 |
| A4 | 0.6 | 0.3 | 106.6 | 104.0 | 6.3 | 0.2 |
| A5 | 2.4 | 1.5 | 104.7 | 101.7 | 4.9 | 0.9 |
| A6 | 0.6 | 1.0 | 105.1 | 98.9 | 10.0 | 0.2 |

TABLE 23-continued

Summary of pharmacological characterization.

| | | | | | | |
|---|---|---|---|---|---|---|
| A7 | 4.8 | 1.0 | 103.7 | 101.2 | 10.6 | 1.0 |
| A8 | 3.9 | 4.6 | 103.4 | 100.4 | 10.2 | 0.4 |

*IC50, secukinumab/IC50, Test Sample (ng/ml)
&IC50, A13/IC50, Test Sample (nM)
Maximum binding level achieved normalized to theoretical Rmax

Example 6: Developability Assessment

As A3, A4 and A6 displayed significantly reduced binding and potency of the anti-TNF domain, only A5, A7 and A8 were selected for developability assessment.

6.1 Exploratory pH Compatibility

Selected purified trispecific candidates (A5, A7 and A8) were concentrated to >20 g/L and subsequently formulated in buffers covering the potential pH range of the formulation process. At these conditions ranging from pH 3.5 to 7.5, the molecules were incubated for either 8 h at 20° C. or 48 h at 4° C. before the generic stability indicating methods SE-HPLC and SDS-PAGE were applied to establish an initial compatibility profile of the molecules with potential process conditions and to define the buffer conditions for the storage stability assessment of the molecules.

The exploratory pH experiment was performed with A5 and A7 in multiple 50 mM phosphate-citrate buffers ranging from pH 3.5 to 7.5 (TABLE 24). In addition, the experiment was done in PBS buffer at pH7.4 with A5, A7 and A8 (TABLE 25). All three molecules did not lose >5% monomeric content in any of the buffers assessed.

cycler, and the fluorescence emission was detected using the software's custom dye calibration routine. The PCR plate containing the test samples was subjected to a temperature ramp from 25° C. to 96° C. in increments of 1° C. with 30 s pauses after each temperature increment. The total assay time was about two hours. The Tm was calculated by the software GraphPad Prism using a mathematical second derivative method to calculate the inflection point of the curve. The reported Tm is an average of three measurements.

TABLE 26 shows melting temperatures of trispecific molecules formulated in generic buffer (phosphate-citrate buffer at pH 6.4, 150 mM NaCl).

TABLE 26

DSF measurement of trispecific molecules in generic buffer.

| Protein ID | Antibody Format | DSF in Generic buffer, Tm [° C.] |
|---|---|---|
| A5 | Tribody | 64.3 |
| A7 | scDb-scFv | 60.5 |
| A8 | scDb-scFv | 59.0 |

TABLE 24

Exploratory pH compatibility study in generic phosphate-citrate buffer.

| Protein | | [% monomer content] | | | [% monomer loss] | | Protein Concentration [mg/mL] | | | [% Content loss] | |
|---|---|---|---|---|---|---|---|---|---|---|---|
| ID | pH | t0 | t8 | t48 | t8 | t48 | t0 | t8 | t48 | t8 | t48 |
| A5 | pH 3.5 | 94.6 | 89.5 | 89.2 | 5.3 | 5.7 | 9.4 | 8.3 | 8.1 | 11.0 | 13.8 |
| | pH 4.5 | 95.5 | 93.8 | 94.5 | 1.8 | 1.1 | 10.4 | 7.3 | 9.0 | 29.6 | 13.3 |
| | pH 5.5 | 93.1 | 91.5 | 90.8 | 1.7 | 2.5 | 17.2 | 21.7 | 18.7 | −25.9 | −8.3 |
| | pH 6.5 | 91.6 | 89.9 | 89.1 | 1.9 | 2.8 | 27.6 | 33.9 | 23.4 | −22.7 | 15.5 |
| | pH 7.5 | 90.8 | 87.7 | 88.2 | 3.4 | 2.9 | 43.9 | 22.8 | 53.3 | 48.1 | −21.3 |
| A7 | pH 3.5 | NA* | NA | NA | NA | NA | NA | NA | NA | NA | NA |
| | pH 4.5 | 98.6 | 98.0 | 97.8 | 0.6 | 0.8 | 0.8 | −0.6 | 0.4 | 171.3 | 46.3 |
| | pH 5.5 | 98.2 | 97.3 | 97.6 | 0.9 | 0.6 | 3.3 | 1.2 | 2.2 | 63.8 | 34.9 |
| | pH 6.5 | 98.2 | 97.2 | 97.5 | 1.0 | 0.7 | 4.0 | 1.9 | 3.9 | 52.7 | 1.2 |
| | pH 7.5 | 97.8 | 96.2 | 96.3 | 1.6 | 1.5 | 6.1 | 3.7 | 5.6 | 40.3 | 8.4 |

TABLE 25

Exploratory pH compatibility study in PBS.

| Protein | [% monomer content] | | | [% monomer loss] | |
|---|---|---|---|---|---|
| ID | t0 | t8 | t48 | t8 | t48 |
| A5 | 98.91 | 98.18 | 98.6 | 0.74 | 0.31 |
| A7 | 97.67 | 94.62 | 92.81 | 3.12 | 4.98 |
| A8 | 98.35 | 97.54 | 94.43 | 0.82 | 3.99 |

6.2 Thermal Unfolding

Differential scanning fluorimetry (DSF) is a non-compendial method to measure temperature-dependent protein unfolding and was measured as described below.

Samples in 50 mM phosphate-citrate buffer at pH6.4 were prepared at a final protein concentration of 50 µg/mL and a final concentration of 5×SYPRO® Orange in a total volume of 100 µl. Twenty-five microliters of prepared samples were added in triplicate to white-walled AB gene PCR plates. The assay was performed in a qPCR machine used as a thermal

6.3 Storage Stability

As an indication for stability and ultimately developability of selected trispecific molecules a short-term stability study at different temperatures and protein concentrations in a generic non-optimized formulation buffer (PBS, pH7.4) was performed with selected molecules (A5, A7 and A8).

Samples were formulated in PBS and were concentrated using VivaSpin concentration devices to 10 mg/mL prior to study initiation. Incubation conditions applied for this study were temperatures of −80° C., 4° C. and 37° C. and protein concentrations of 10 mg/mL for a duration of 4 weeks. To assess stability of the molecules analytical read-outs such as protein content and purity were recorded at different time points by SE-HPLC, UV$_{280}$ measurement and SDS-PAGE (FIG. 17 and TABLE 27).

TABLE 2717

Storage stability study performed at temperatures of 37° C., 4° C. and −80° C. at a protein concentration of 10 mg/mL for 4 weeks.

| Protein ID | Temp. [° C.] | Conc [mg/mL] | [% monomer content] | | | | | | % monomer loss | | | | |
|---|---|---|---|---|---|---|---|---|---|---|---|---|---|
| | | | d 0 | d 2 | d 7 | d 14 | d 21 | d 28 | d 2 | d 7 | d 14 | d 21 | d 28 |
| A5 | −80.0 | 10.0 | 98.9 | 98.9 | 98.9 | 98.8 | 98.8 | 98.8 | 0.0 | 0.0 | 0.1 | 0.1 | 0.1 |
| | 4.0 | | 98.9 | 98.9 | 98.7 | 98.2 | 98.0 | 97.8 | 0.0 | 0.2 | 0.7 | 0.9 | 1.1 |
| | 37.0 | | 98.9 | 93.2 | 88.3 | 79.3 | 63.9 | 65.4 | 5.8 | 10.7 | 19.8 | 35.4 | 33.9 |
| A7 | −80.0 | 10.0 | 98.1 | 97.4 | 97.6 | 97.0 | 97.4 | 97.1 | 0.7 | 0.5 | 1.1 | 0.7 | 1.0 |
| | 4.0 | | 98.1 | 96.2 | 95.2 | 94.6 | 94.6 | 94.1 | 1.9 | 3.0 | 3.6 | 3.6 | 4.1 |
| | 37.0 | | 98.1 | 92.3 | 90.5 | 88.1 | 80.8 | 83.7 | 5.9 | 7.7 | 10.2 | 17.6 | 14.6 |
| A8 | −80.0 | 10.0 | 98.3 | 98.2 | 98.2 | 98.2 | 98.2 | 98.1 | 0.0 | 0.1 | 0.1 | 0.1 | 0.2 |
| | 4.0 | | 98.3 | 98.0 | 97.2 | 95.9 | 95.3 | 95.0 | 0.3 | 1.1 | 2.4 | 3.0 | 3.3 |
| | 37.0 | | 98.3 | 79.9 | 67.7 | 66.2 | 45.7 | 42.4 | 18.7 | 31.1 | 32.6 | 53.5 | 56.8 |

Recording of % monomeric content over time at 37° C. revealed substantial differences between molecules as shown by overlays of SE-HPLC traces of d0 and d28 stability samples in FIG. 18. A8 was of clearly inferior stability, exhibiting a considerable amount high molecular weight species, when compared to A5 and A7, which is unexpected as the latter molecule shares the same antibody format and consists of the same domains as A7 although with a permuted domain orientation.

6.4 Freeze/Thaw Stability

In addition to the storage stability study described above, the compatibility of the molecules was assessed with respect to five repeated freeze-thawing (F/T) cycles (TABLE 28). For the F/T stability assessment the same analysis methods as in the storage stability study were used to monitor the quality of the molecules after five F/T cycles. All molecules showed a loss in monomeric content below 1% (TABLE 28).

Samples were formulated in PBS and were concentrated using VivaSpin concentration devices to 10 mg/mL prior to study initiation. Small sample volumes (<20 µL) allowed rapid freezing and thawing intervals. Samples were subjected to five repeated freeze-thawing cycles. They were frozen at a temperature of −80° C. and thawed at RT. To assess stability of the molecules after each cycle analytical read-outs, such as protein content and purity, were recorded at different time points by SE-HPLC and $UV_{280}$ measurement.

TABLE 28

F/T stability assessment. Trispecific molecules were repeatedly frozen and thawed and monomeric content was measured after each cycle.

| Protein ID | Temp. [° C.] | Conc [mg/mL] | [% monomer content] | | | | | % monomer loss | | | | |
|---|---|---|---|---|---|---|---|---|---|---|---|---|
| | | | FT1 | FT2 | FT3 | FT4 | FT5 | FT1 | FT2 | FT3 | FT4 | FT5 |
| A5 | −80/RT | 10.0 | 98.9 | 98.9 | 98.8 | 98.8 | 98.8 | 0.0 | 0.0 | 0.1 | 0.1 | 0.1 |
| A7 | −80/RT | 10.0 | 97.4 | 97.6 | 97.0 | 97.4 | 97.1 | 0.7 | 0.5 | 1.1 | 0.7 | 1.0 |
| A8 | −80/RT | 10.0 | 98.2 | 98.2 | 98.2 | 98.2 | 98.1 | 0.0 | 0.1 | 0.1 | 0.1 | 0.2 |

6.5 Summary of Basic Developability Assessment

Developability assessment is summarized in TABLE 29.

TABLE 29

Developability assessment.

| Protein number | Tm | monomer loss 4 w, 10 mg/mL @ 4° C. | monomer loss after 5 F/T cycles | monomer loss 8 h, ≥20 mg/mL @ 20° C. in any buffer system in pH range 3.5-7.5 | monomer loss 48 h, ≥20 mg/mL @ 4° C. in any buffer system in pH range 3.5-7.5 |
|---|---|---|---|---|---|
| A5 | 64.0° C. | 1.10% | 0.10% | 0.70% | 0.30% |
| A7 | 60.5° C. | 4.10% | 1.00% | 3.10% | 5.00% |
| A8 | 59.0° C. | 3.30% | 0.20% | 0.82% | 3.99% |
| | >60° C. | ≤5% | ≤5% | ≤5% | ≤5% |

Example 7: Pharmacokinetic (PK) Characterization in Cynomolgus Monkeys

To confirm prolongation of half-life with the use of a trispecific format comprising an anti-HSA domain, a non-GLP pharmacokinetic study in cynomolgus monkeys was performed. A7 was administered to cynomolgus monkeys according to the study plan briefly outlined below (see also TABLE 30). The pharmacokinetics of A7 were determined following intravenous and subcutaneous administration to male cynomolgus monkeys. A total of six non-naïve animals (three in each group) received a single administration of A7 at a target dose level of 3 mg/kg. The protein was pre-formulated in sterile 1× phosphate buffered saline, 150 mM L-Arginine, 500 mM sucrose, at pH 7.5 (TABLE 30).

TABLE 30

Overview of dosing regimen.

| Group | Animal ID | Test Item | Route | Dose Level (mg/kg) | Dose Vol. (mL/kg) | Dose Conc. (mg/mL) |
|---|---|---|---|---|---|---|
| 1 | 001M-003M | A7 | IV | 3 | 1.003 | 2.99 |
| 2 | 004M-006M | A7 | SC | 3 | 1.003 | 2.99 |

Serum was prepared from blood samples collected at the following timepoints: predose, 10 and 30 min and 1, 2, 4, 6, 8, 12, 24, 36, 48, 72, 96, 144, 192, 240, 288, 336, 384, 432 and 504 h post dose.

Measured serum concentrations are shown in FIG. 19. A strong decrease of A7 concentrations was observed from 192 hours on. All samples from timepoints 288 to 504h were below the limit of quantitation (BLQ). This decrease in signal suggested the development of anti-drug antibodies (ADA) by the monkeys. Formation of ADAs against human variable domains is expected and has been observed before with the anti-TNFα×HSA interim antibodies. Therefore, an assay was performed where A7 was coated on an ELISA plate and incubated with the serum samples. Cynomolgus IgGs bound to A7 were detected using an anti-monkey IgG antibody. The presence of ADA was confirmed and results are shown in FIG. 19. Since the animals developed ADAs from 192h on, later timepoints were omitted in the estimation of PD parameters in order to not underestimate the half-life of A7.

Monkey serum samples were subsequently analyzed in a PK-ELISA. Serum samples from all treated animals were diluted. ELISA plates were coated overnight with human TNFα and serial dilutions of A7 in 5% cynomolgus serum were added to the plates to yield a calibration curve. TNFα-bound A7 was detected with biotinylated human IL-17A followed by streptavidin poly-HRP. Serum samples with unknown concentrations were diluted 20-fold or more if required and A7 concentrations were interpolated from the calibration curve. For assay qualification, lower and upper limits of quantitation and quality controls were set to define an analytical range of 50-600 ng/ml. The assay was tested for dilution linearity, hook effect and selectivity. Additionally, stability of A7 in cynomolgus serum subjected to 1-3 freeze-thaw cycles was shown prior to quantification.

The data from PK analysis was then utilized for calculation of PK parameters. Pharmacokinetic parameters were estimated using WinNonlin pharmacokinetic software (Phoenix version 1.4) using a non-compartmental approach.

Accurate evaluation of different kinetic parameters requires the AUC from time zero to infinity. The extrapolation from the time of the last measured concentration ($t_{last}$) is done by mathematical integration of the curve from $t_{last}$ infinity. The extrapolated area from the last to sample to infinity should be less than 20% of the total AUC to confirm the accuracy of the derived kinetic parameters. For both IV and SC administration of A7, the extrapolation of the AUC to infinity represents more than 20% of the total area. As a result, the calculated data (TABLE 31) needs to be interpreted with caution. Most likely this effect arises due to the development of anti-drug antibodies, which interfere with the assay. Such interference could potentially be avoided through higher dosing.

TABLE 31

Pharmacokinetic parameters of A7 following intravenous and subcutaneous injection at a target dose level of 3 mg/kg.

| Route (Target Dose) | Animal No. | C0 (ng/mL) | Tmax (h) | Cmax (ng/mL) | AUC(0-t) (h*ng/mL) | AUC(0-inf)A (h*ng/mL) | CLA//CLFA (mL/h/kg) | VdA/Vd FA (mL/kg) | T½A (h) |
|---|---|---|---|---|---|---|---|---|---|
| IV | 001M | 47000 | 4 | 63900 | 4920000 | 10000000 | 0.345 | 76.1 | 153 |
| (3 mg/kg) | 002M | 57400 | 0.5 | 76800 | 3570000 | 7740000 | 0.423 | 108 | 178 |
| | 003M | 48300 | 2 | 53200 | 3750000 | 7230000 | 0.472 | 87.2 | 128 |
| | Mean* | 50900 | 2 | 64600 | 4080000 | 8330000 | 0.413 | 90.6 | 153 |
| | SD | 5680 | — | 11800 | 732000 | 1490000 | 0.0638 | 16.3 | 24.7 |
| SC | 004M | — | 36 | 43500 | 4390000 | 11100000 | 0.301 | 73.3 | 169 |
| (3 mg/kg) | 005M | — | 48 | 27800 | 3110000 | 5490000 | 0.603 | 93.6 | 108 |
| | 006M | — | 24 | 33100 | 3420000 | 19100000 | 0.170 | 107 | 436 |
| | Mean* | — | 36 | 34800 | 3640000 | 11900000 | 0.358 | 91.2 | 237 |
| | SD | — | — | 8000 | 666000 | 6830000 | 0.222 | 16.9 | 175 |

*Median Tmax reported.
AExtrapolation of the AUC to infinity represents more than 20% of the total area. For 002M and 006M, the coefficient of determination of the elimination phase was <0.800. Values considered to be representative as detailed above.
NA Not applicable.

A clear half-life extension was observed for the scDb-scFv comprising an anti-HSA domain. Half-life (t½) of A7 was more than 5 days. This was achieved independently of the mode of administration, as shown in TABLE 31. Due to stronger variations in the last points of the elimination phase (prior to signal drop), the half-live of 436 hours calculated for animal 006M might be less accurate than the half-lives determined for the remaining animals. Mean half-lives were higher after SC injection than after IV administration, with average half-lives of 237 hours (9.9 days) and of 153 hours (6.4 days) respectively.

Example 8: Complex Formation Analysis

In this study, various ratios of the scDb-scFv A7, and Morrison L A14 and A15 (see FIG. 20) and the target binding molecules, human IL-17A and human TNFα, were co-incubated and the generated complexes characterized.

A14 is a Morrison L format with the anti TNFα binding domains placed on the Fab arms and the anti IL-17A binding domains attached C-terminally to the light chains as scFvs.

A15 is a Morrison L format with the anti IL-17A binding domains placed on the Fab arms and the anti TNFα binding domains attached C-terminally to the light chains as scFvs.

Expression of A7, A14 and A15 was performed in FreeStyle CHO-S cells using the transient CHOgro expression system (Mirus). The genes of interest were optimized for mammalian expression, synthesized and cloned into a standard pcDNA3.1 vector. The signal sequences originate from mouse heavy chain IgG. Expression cultures were cultivated in batch for 6 to 7 days (cell viability <70%) either at 37° C. or for one day at 37° C. followed by a temperature shift to 32° C. for five to six days. The culture supernatant was separated by centrifugation followed by 0.45 µm filtration. A7 was captured from the clarified culture supernatants by Protein L affinity chromatography followed by polishing size-exclusion chromatography.

Recombinant human IL-17A was purchased from Peprotech, Rocky Hill, N.J., USA, as disulfide-linked homodimer expressed in *E. coli* and purified to a purity of ≥98% by SDS-PAGE and HPLC (Catalog #200-17, Lot #061184).

Recombinant human TNFα was purchased from Peprotech, Rocky Hill, N.J., USA, as homotrimer expressed in *E. coli* and purified to a purity of >98% by SDS-PAGE and HPLC (Catalog #300-01A, Lot #0906CY25).

The characterization of the formed complexes was conducted post-centrifugation with hydrodynamic radius determination by dynamic light scattering (DLS) and with protein concentration recovery by absorption at 280 nm measurement.

Dynamic Light Scattering is a fast and sensitive method to determine the size distribution of particles in solution by recording scattered light intensity fluctuations over time. The data is mathematically transformed to its autocorrelation function that yields the translational diffusion coefficient ($D_t$). The hydrodynamic radius ($R_h$) is subsequently derived from the Stokes-Einstein equation, $$R_h = \frac{k_b T}{6\pi \eta D_t}$$

where $k_b$ is the Boltzmann constant, T is the Temperature in Kelvin and $\eta$ is the solvent viscosity.

The hydrodynamic radius was determined using the DynaPro® Plate Reader™ II and the Dynamics software package (Wyatt Technology Corp., Santa Barbara, Calif., USA). 25 µL were applied to a 384 well optical clear bottom microtiter plate (e.g. Corning® 384 well microplate, Merck, CLS3540-50EA) and remaining air bubbles removed by centrifugation (1000 g, 4 min). The samples were measured at 25° C. for 10 acquisitions of 5 to 10 s. The viscosity was set to PBS.

During the complex formation experiment, A7 was incubated with each of its soluble targets, human IL-17A and human TNFα, at the relative molar ratio given in TABLE 32 (relative numbers of binding sites (paratopes) on A7, and epitopes on the respective target), and a concentration at least 1000 fold above $K_D$ (TABLE 32). The concentration range of each epitope/binding site and A7 was between 0.5 and 5 µM.

TABLE 32

Relative number of paratopes and epitope in solution (Molar ratios for each target epitope and paratopes on A7)

| | Molar ratios for paratope and epitopes | | |
|---|---|---|---|
| Experiment | Antibody | human IL-17A | human TNFα |
| A | 1 | 1 | 0 |
| B | 1 | 1 | 0.2 |
| C | 1 | 1 | 1 |
| D | 0.2 | 0.2 | 1 |
| E | 1 | 0 | 1 |
| F | 1 | 0.2 | 1 |

TABLE 32-continued

Relative number of paratopes and epitope in solution (Molar ratios for each target epitope and paratopes on A7)

| | Molar ratios for paratope and epitopes | | |
|---|---|---|---|
| Experiment | Antibody | human IL-17A | human TNFα |
| G | 0.2 | 1 | 0.2 |
| H | 1 | 0.2 | 0.2 |
| I | 1 | 0 | 0 |

The hydrodynamic radii of the formed soluble complexes at each of the tested binding partner ratios are summarizes in FIG. 21, FIG. 22 and FIG. 23. The percentage of recovered, soluble protein concentration is summarized in FIG. 24, FIG. 25 and FIG. 26.

1. For most of the conditions a complete recovery of protein concentration was observed that indicate no or limited formation of insoluble complexes for A7
2. Limited increase of hydrodynamic radius during complex size formation to maximum 5 fold for A7
3. Limited immunogenic risk because of soluble complexes formation and minor size increase for A7
4. Monovalent binding for each target by A7 facilitates the formation of only soluble complexes with minor size increase upon complex formation

CONCLUSIONS

Antibody mediated immune complex formation has been associated with immunogenicity and immune related adverse events. Such immune complexes for example form, if a bivalent antibody cross-links a target molecule that exists in a multimeric form (i.e. dimeric, trimeric, tetrameric, etc). In the situation of a trimeric target (e.g. TNFα) an antibody can bind with its two Fab arms to two different TNF trimers resulting in a small soluble complex. The two unbound units of each of the two engaged TNF trimers in the complex can in turn be bound by other antibodies. Upon concomitant engagement by multiple antibodies, this leads to the formation of higher order complexes and immune precipitates. Such large immune complexes enhance immunogenicity of the therapeutic antibodies and can trigger the formation of anti-drug antibodies and immune related adverse events. The risk for immune complex formation becomes even more evident in the case where a molecule can simultaneously engage more than one target type, each by bivalent interactions. Examples for this are the bispecific anti-TNFα/IL-17 blockers ABT122 and COVA322, which are interacting with each of their targets in a bivalent binding mode. While ABT122 was reported to trigger anti-drug antibody formation with high incidence, COVA322 even resulted in immune related adverse reactions (skin rashes), presumably triggered by immune complex formation.

Here we show that the bispecific monovalent scDb-scFv exemplified by A7 has a remarkably reduced capacity to mediate immune complex formation when compared to bispecific formats that interact in a bivalent manner with their targets (e.g. A14 and A15) comprising the same binding domains as A7. Thus we conclude that a monovalent bispecific format is preferred over a bispecific bivalent format due to its reduced risk for ADA formation and its favorable risk-to-benefit profile.

Oftentimes, bivalent formats are chosen to compensate for the relatively low affinities to the target (e.g. COVA322 binding to IL-17). Therefore, in order to enable monovalent formats in multispecific approaches very high affinities to the respective targets are required. The high affinities of the Fv domains in A7 (and variants thereof) enable the use of a monovalent format, resulting in a highly potent bi-specific therapeutic.

Further, the absence of an Fc region in the monovalent bispecific scDb-scFv format avoids binding to Fc receptors on immune cells, which may also contribute to the generation of immune related adverse events.

The invention claimed is:

1. An isolated multispecific antibody comprising a first domain specifically binding IL-17A, a second domain specifically binding TNFα, and, optionally, a third domain specifically binding to human serum albumin (HSA), wherein
   (a) said first domain comprises a set of CDRs: HCDR1, HCDR2, and HCDR3 sequences of SEQ ID NOs: 1, 2, and 3, respectively, and LCDR1, LCDR2, and LCDR3 sequences of SEQ ID NOs: 12, 13, and 14, respectively; and
   (b) said second domain comprises a set of CDRs: HCDR1, HCDR2, and HCDR3 sequences of SEQ ID NOs: 63, 64, and 65, respectively, and LCDR1, LCDR2, and LCDR3 sequences of SEQ ID NOs: 76, 77, and 78, respectively; and
   (c) said third domain, when present, comprises a set of CDRs: (i) HCDR1, HCDR2, and HCDR3 sequences of SEQ ID NOs: 90, 91, and 92, respectively, and LCDR1, LCDR2, and LCDR3 sequences of SEQ ID NOs: 100, 101, and 102, respectively; or (ii) HCDR1, HCDR2, and HCDR3 sequences of SEQ ID NOs: 111, 112, and 113, respectively, and LCDR1, LCDR2, and LCDR3 sequences of SEQ ID NOs: 121, 122, and 123, respectively.

2. The multispecific antibody of claim 1, wherein said antibody comprises only one domain specifically binding IL-17A and/or only one domain specifically binding TNFα.

3. The multispecific antibody of claim 1, wherein said domains are capable of binding to their respective antigen or receptor simultaneously.

4. The multispecific antibody of claim 1, wherein said first domain and/or said second domain, and/or, said third domain, when present, comprise(s) a heavy chain variable region VH and wherein said VH is VH3 or VH4.

5. The multispecific antibody of claim 4, wherein said VH of the first domain comprises an amino acid sequence that is at least 90 percent identical to the amino acid sequence SEQ ID NO: 10; and/or said VL of the first domain comprises an amino acid sequence that is at least 90 percent identical to the amino acid sequence SEQ ID NO: 21.

6. The multispecific antibody of claim 5, wherein said VH of the first domain comprises an amino acid sequence selected from the group consisting of SEQ ID NOs: 10 and 11; and/or said VL of the first domain comprises an amino acid sequence selected from the group consisting of SEQ ID NOs: 21 and 22.

7. The multispecific antibody of claim 6, wherein said VH of the first domain is set forth in SEQ ID NO: 10 and/or said VL of the first domain is set forth in SEQ ID NO: 21.

8. The multispecific antibody of claim 4, wherein said VH of the second domain comprises an amino acid sequence that is at least 90 percent identical to the amino acid sequence selected from the group consisting of SEQ ID NOs: 72, 73, 74 or 75; and/or said VL of the second domain comprises an amino acid sequence that is at least 90 percent identical to the amino acid sequence selected from the group consisting of SEQ ID NOs: 85, 86, 87, 88 and 89.

9. The multispecific antibody of claim 8, wherein said VH of the second domain comprises an amino acid sequence selected from the group consisting of SEQ ID NOs: 72, 73, 74 or 75; and/or said VL of the second domain comprises an amino acid sequence selected from the group consisting of SEQ ID NOs: 85, 86, 87, 88 and 89.

10. The multispecific antibody of claim 9, wherein said VH of the second domain is set forth in SEQ ID NO: 72 and/or said VL of the second domain is set forth SEQ ID NO: 85.

11. The multispecific antibody of claim 4, wherein the third domain is present and
   (i) said VH of the third domain comprises an amino acid sequence that is at least 90 percent identical to the amino acid sequence SEQ ID NO: 99; and/or said VL of the third domain comprises an amino acid sequence that is at least 90 percent identical to the amino acid sequence SEQ ID NO: 109; or
   (ii) said VH of the third domain comprises an amino acid sequence that is at least 90 percent identical to the amino acid sequence SEQ ID NO: 120; and/or said VL comprises an amino acid sequence that is at least 90 percent identical to the amino acid sequence SEQ ID NO: 130.

12. The multispecific antibody of claim 11, wherein the third domain is present and
   (i) wherein said VH of the third domain is set forth in SEQ ID NO: 99 and/or a VL of the third domain is set forth in SEQ ID NO: 109; or
   (ii) wherein said VH of the third domain is set forth in SEQ ID NO: 120 and/or said VL of the third domain is set forth in SEQ ID NO: 130.

13. The multispecific antibody of claim 4, wherein said VH is VH3.

14. The multispecific antibody of claim 1, wherein said first domain and/or said second domain, and/or, said third domain, when present, comprise(s) a light chain variable region VL and wherein said VL comprises Vκ frameworks FR1, FR2 and FR3, and a framework FR4, which is selected from a Vκ FR4 and VA FR4.

15. The multispecific antibody of claim 14, wherein said first domain and/or said second domain, and/or said third domain, when present, comprise(s) a light chain variable region VL and wherein said VL comprises Vκ1 or Vκ3 frameworks FR1, FR2 and FR3, and a framework FR4, which is a VA FR4 comprising the amino acid sequence having at least 60, 70, 80, or 90 percent identity to an amino acid sequence selected from any of SEQ ID NO: 26 to SEQ ID NO: 32.

16. The multispecific antibody of claim 1, wherein said multispecific antibody is in a format selected from the group consisting of a single-chain diabody, a tandem scDb, a linear dimeric scDb, a circular dimeric scDb, a tandem di-scFv, a tandem tri-scFv, a Fab-(scFv) 2 or Fab-(scFv) 1,Fab-Fv$_2$, IgG CH3-scFv fusion (Morrison L) or IgG CL-scFv fusion (Morrison H), triabody, scDb-scFv, bispecific Fab$_2$, diminiantibody, tetrabody, scFv-Fc-scFv fusion, scFv-HSA-scFv fusion, di-diabody, DVD-Ig, IgG-scFab, scFab-dsscFv, Fv$_2$-Fc, IgG-scFv fusions selected from bsAb being a scFv linked to C-terminus of light chain, Bs1Ab being a scFv linked to N-terminus of light chain, Bs2Ab being a scFv linked to N-terminus of heavy chain, Bs3Ab being a scFv linked to C-terminus of heavy chain, Ts1Ab being a scFv linked to N-terminus of both heavy chain and light chain, Ts2Ab being a dsscFv linked to C-terminus of heavy chain; Bispecific Knob-into-Hole antibodies based on heterodimeric Fc domains; a fusion of an Fv, scFv, scDb, tandem-di-scFv, tandem tri-scFv, Fab-(scFv)$_2$, Fab-(scFv)$_1$, Fab, or Fab-Fv$_2$ to the N- and/or the C-terminus of either chain of a heterodimeric Fc domain and a MATCH.

17. The multispecific antibody of claim 1, wherein the antibody comprises an amino acid sequence having at least 80% identity, to the sequence selected from any of SEQ ID NOs: 142, 143, 144, 145, 146, 147, and 148, provided that the antibody comprises
 (i) a first domain specifically binding IL-17A comprising HCDR1, HCDR2, and HCDR3 sequences of SEQ ID NOs: 1, 2, and 3, respectively, and LCDR1, LCDR2, and LCDR3 sequences of SEQ ID NOs: 12, 13, and 14, respectively, and
 (ii) a second domain specifically binding TNFα comprising HCDR1, HCDR2, and HCDR3 sequences of SEQ ID NOs: 63, 64, and 65, respectively, and LCDR1, LCDR2, and LCDR3 sequences of SEQ ID NOs: 76, 77, and 78, respectively, and
 (iii) a third domain specifically binding HSA comprising HCDR1, HCDR2, and HCDR3 sequences of SEQ ID NOs: 90, 91, and 92, respectively, and LCDR1, LCDR2, and LCDR3 sequences of SEQ ID NOs: 100, 101, and 102, respectively.

18. The multispecific antibody of claim 17, wherein the multispecific antibody comprises an amino acid sequence having at least 90% identity to the sequence selected from any of SEQ ID NOs: 142, 143, 144, 145, 146, 147, and 148, provided that the antibody comprises
 (i) a first domain specifically binding IL-17A comprising HCDR1, HCDR2, and HCDR3 sequences of SEQ ID NOs: 1, 2, and 3, respectively, and LCDR1, LCDR2, and LCDR3 sequences of SEQ ID NOs: 12, 13, and 14, respectively, and
 (ii) a second domain specifically binding TNFα comprising HCDR1, HCDR2, and HCDR3 sequences of SEQ ID NOs: 63, 64, and 65, respectively, and LCDR1, LCDR2, and LCDR3 sequences of SEQ ID NOs: 76, 77, and 78, respectively, and
 (iii) a third domain specifically binding HSA comprising HCDR1, HCDR2, and HCDR3 sequences of SEQ ID NOs: 90, 91, and 92, respectively, and LCDR1, LCDR2, and LCDR3 sequences of SEQ ID NOs: 100, 101, and 102, respectively.

19. The multispecific antibody of claim 18, wherein the antibody comprises an amino acid sequence selected from any of SEQ ID NOS: 142, 143, 144, 145, 146, 147, and 148.

20. The multispecific antibody of claim 19, wherein the multispecific antibody comprises the amino acid sequence of SEQ ID NOs: 143.

21. A pharmaceutical composition comprising the multispecific antibody of claim 1 and a pharmaceutically acceptable carrier.

22. A medicament comprising the multispecific antibody of claim 1.

23. A kit comprising the multispecific antibody of claim 1.

24. The multispecific antibody of claim 1, wherein said antibody comprises only one domain specifically binding IL-17A and/or only one domain specifically binding TNFα, and/or comprises only one domain specifically binding human serum albumin.

25. The multispecific antibody of claim 1, wherein the multispecific antibody comprises a combination of amino acid sequences having at least 80% identity, to a combination of amino acid sequences selected from any of SEQ ID NOs: 136 with SEQ ID NO: 137/137, SEQ ID NO: 138 with SEQ ID NO: 139, and SEQ ID NO: 140 with SEQ ID NO: 141, and wherein provided that the multispecific antibody comprises
 (i) a first domain specifically binding IL-17A comprising HCDR1, HCDR2, and HCDR3 sequences of SEQ ID NOs: 1, 2, and 3, respectively, and LCDR1, LCDR2, and LCDR3 sequences of SEQ ID NOs: 12, 13, and 14, respectively, and
 (ii) a second domain specifically binding TNFα comprising HCDR1, HCDR2, and HCDR3 sequences of SEQ ID NOs: 63, 64, and 65, respectively, and LCDR1, LCDR2, and LCDR3 sequences of SEQ ID NOs: 76, 77, and 78, respectively, and
 (iii) a third domain specifically binding HSA comprising HCDR1, HCDR2, and HCDR3 sequences of SEQ ID NOs: 90, 91, and 92, respectively, and LCDR1, LCDR2, and LCDR3 sequences of SEQ ID NOs: 100, 101, and 102, respectively.

26. The multispecific antibody of claim 25, wherein the multispecific antibody comprises a combination of amino acid sequences having at least 90% identity, to a combination of amino acid sequences selected from any of SEQ ID NOs: 136 with SEQ ID NO: 137, SEQ ID NO: 138 with SEQ ID NO: 139, and SEQ ID NO: 140 with SEQ ID NO: 141, provided that the multispecific antibody comprises
 (i) a first domain specifically binding IL-17A comprising HCDR1, HCDR2, and HCDR3 sequences of SEQ ID NOs: 1, 2, and 3, respectively, and LCDR1, LCDR2, and LCDR3 sequences of SEQ ID NOs: 12, 13, and 14, respectively, and
 (ii) a second domain specifically binding TNFα comprising HCDR1, HCDR2, and HCDR3 sequences of SEQ ID NOs: 63, 64, and 65, respectively, and LCDR1, LCDR2, and LCDR3 sequences of SEQ ID NOs: 76, 77, and 78, respectively, and
 (iii) a third domain specifically binding HSA comprising HCDR1, HCDR2, and HCDR3 sequences of SEQ ID NOs: 90, 91, and 92, respectively, and LCDR1, LCDR2, and LCDR3 sequences of SEQ ID NOs: 100, 101, and 102, respectively.

27. The multispecific antibody of claim 26, wherein the multispecific antibody comprises a combination of amino acid sequences selected from any of SEQ ID NOs: 136 with SEQ ID NO: 137, SEQ ID NO: 138 with SEQ ID NO: 139, and SEQ ID NO: 140 with SEQ ID NO: 141.

28. An isolated multispecific antibody comprising a first domain specifically binding IL-17A, a second domain specifically binding TNFα, and, optionally, a third domain specifically binding to human serum albumin (HSA), provided that
  (a) said first domain comprises a set of CDRs: HCDR1, HCDR2, and HCDR3 sequences of SEQ ID NOs: 39, 40, and 41, respectively, and LCDR1, LCDR2, and LCDR3 sequences of SEQ ID NOs: 50, 51, and 52, respectively; and
  (b) said second domain comprises a set of CDRs: HCDR1, HCDR2, and HCDR3 sequences of SEQ ID NOs: 63, 64, and 65, respectively, and LCDR1, LCDR2, and LCDR3 sequences of SEQ ID NOs: 76, 77, and 78, respectively; and
  (c) said third domain, when present, comprises a set of CDRs: (i) HCDR1, HCDR2, and HCDR3 sequences of SEQ ID NOs: 90, 91, and 92, respectively, and LCDR1, LCDR2, and LCDR3 sequences of SEQ ID NOs: 100, 101, and 102, respectively; or (ii) HCDR1, HCDR2, and HCDR3 sequences of SEQ ID NOs: 111, 112, and 113, respectively, and LCDR1, LCDR2, and LCDR3 sequences of SEQ ID NOs: 121, 122, and 123, respectively.

* * * * *